(12) United States Patent
Yamagishi

(10) Patent No.: US 6,834,157 B2
(45) Date of Patent: Dec. 21, 2004

(54) INFORMATION SIGNAL PROCESSING APPARATUS

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 10/170,516

(22) Filed: Jul. 16, 2002

(65) Prior Publication Data

US 2003/0108339 A1 Jun. 12, 2003

Related U.S. Application Data

(63) Continuation of application No. 09/510,943, filed on Feb. 23, 2000, now Pat. No. 6,594,443, which is a continuation of application No. 08/748,128, filed on Nov. 12, 1996, now Pat. No. 6,347,184, which is a division of application No. 08/619,124, filed on Mar. 20, 1996, now Pat. No. 5,610,723, which is a continuation of application No. 08/116,446, filed on Sep. 3, 1993, now abandoned.

(30) Foreign Application Priority Data

| Sep. 9, 1992 | (JP) | 4-266596 |
| Sep. 22, 1992 | (JP) | 4-252894 |
| Sep. 22, 1992 | (JP) | 4-252922 |
| Sep. 22, 1992 | (JP) | 4-252923 |

(51) Int. Cl.[7] .................................... H04N 5/91
(52) U.S. Cl. .................................... 386/107; 386/117
(58) Field of Search ............................ 386/107, 117, 386/46, 109, 52, 38, 1; 348/222, 231, 232, 207; 380/40; H04N 5/91

(56) References Cited

U.S. PATENT DOCUMENTS

| 5,016,107 A | * | 5/1991 | Sasson et al. | 348/231.1 |
| 5,027,214 A | * | 6/1991 | Fujimori | 348/231.7 |
| 6,594,443 B1 | * | 7/2003 | Yamagishi | 386/107 |

* cited by examiner

Primary Examiner—Robert Chevalier
(74) Attorney, Agent, or Firm—Cowan, Liebowitz & Latman, P.C.

(57) ABSTRACT

An information signal processing apparatus according to the present invention is arranged to receive, as an input, an information signal to temporarily store therein the input information signal and to temporarily store therein management information prepared during a recording of the information signal in the recording medium, thereby recording the temporarily stored information signal and management information in the recording medium. Accordingly, it is possible to record an information signal having a large amount of information in the recording medium without lowering a recording speed and it is also possible to easily reduce the size, weight and cost of the apparatus.

2 Claims, 69 Drawing Sheets

F I G. 56
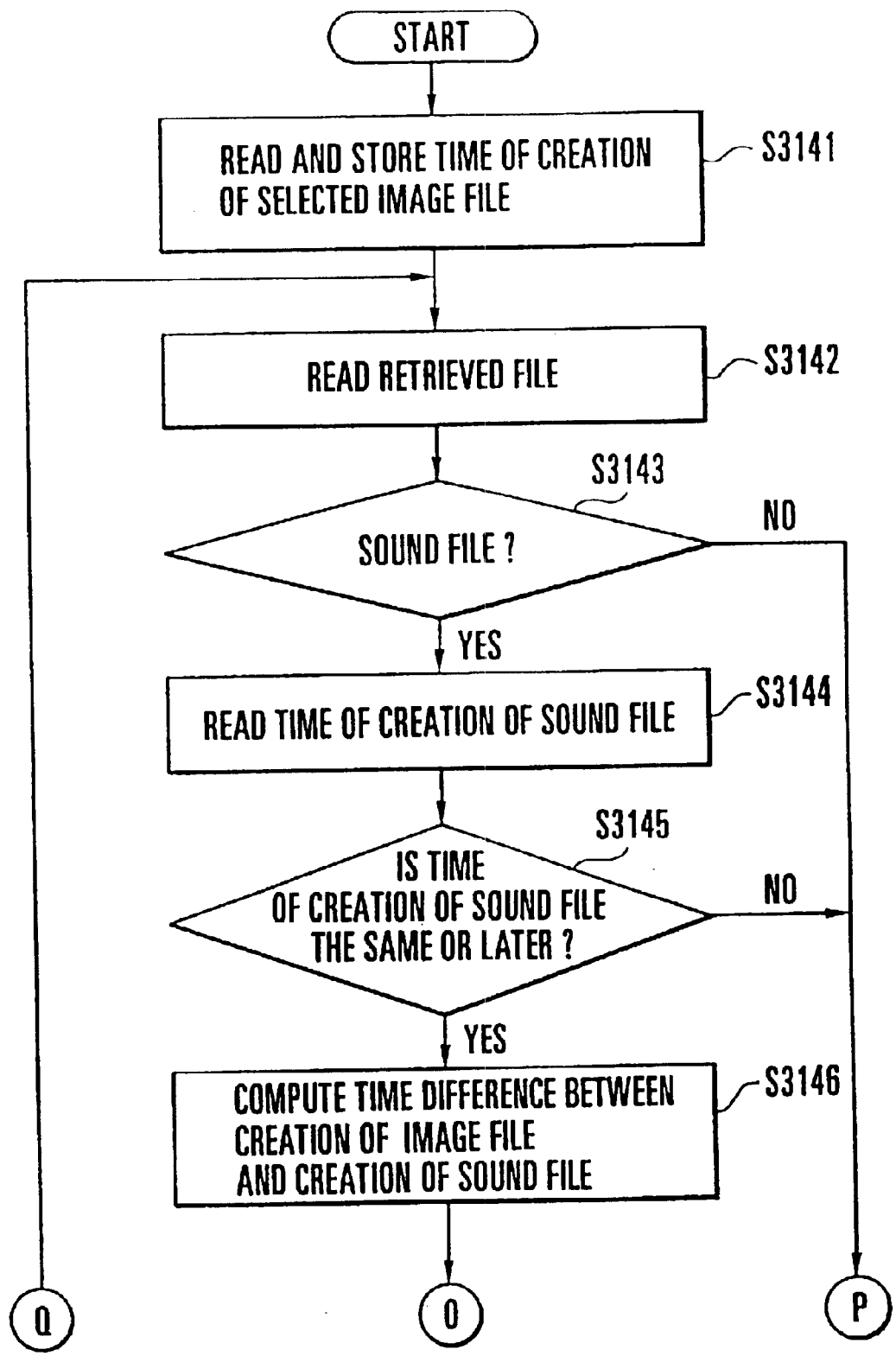

F I G. 59
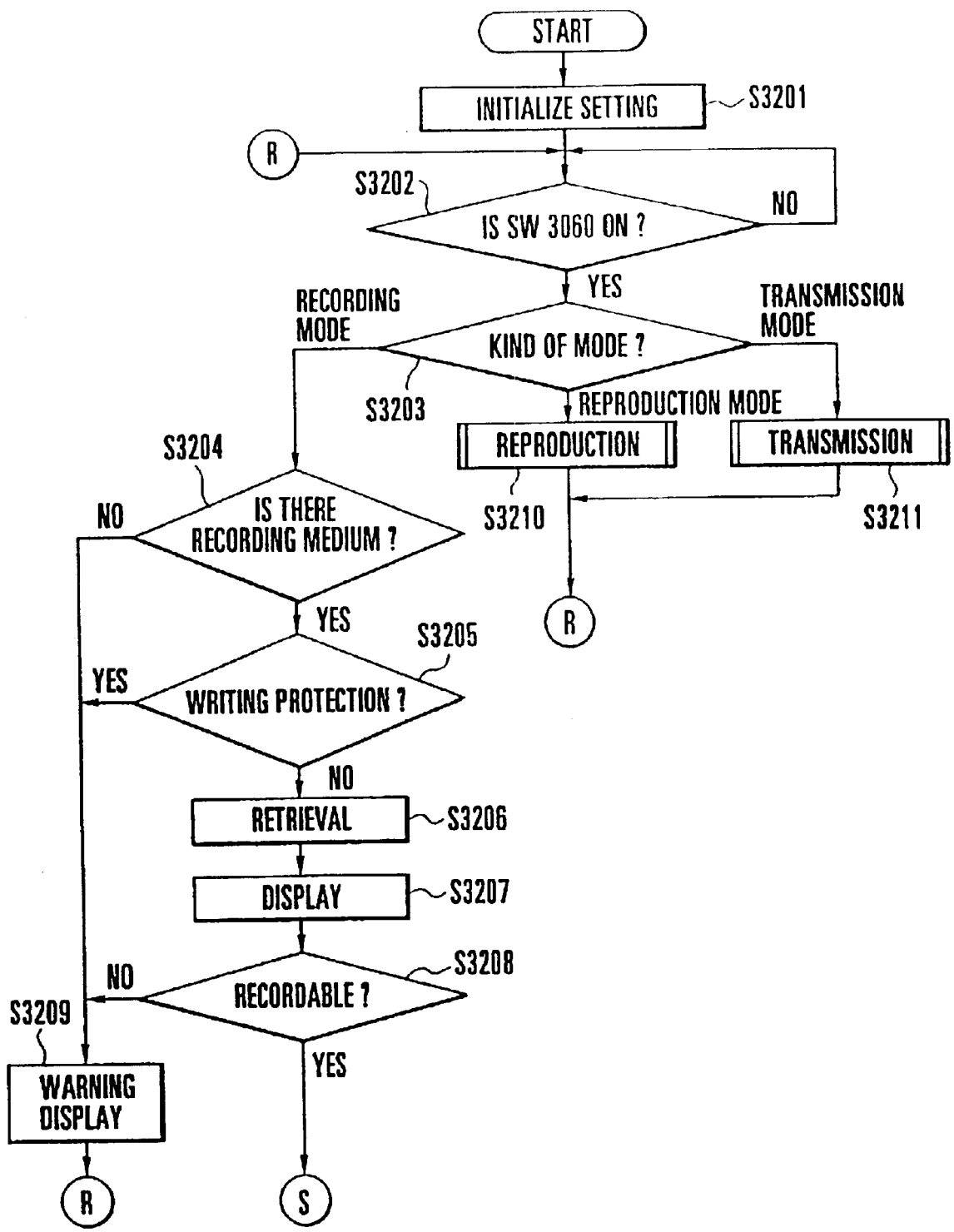

F I G.64
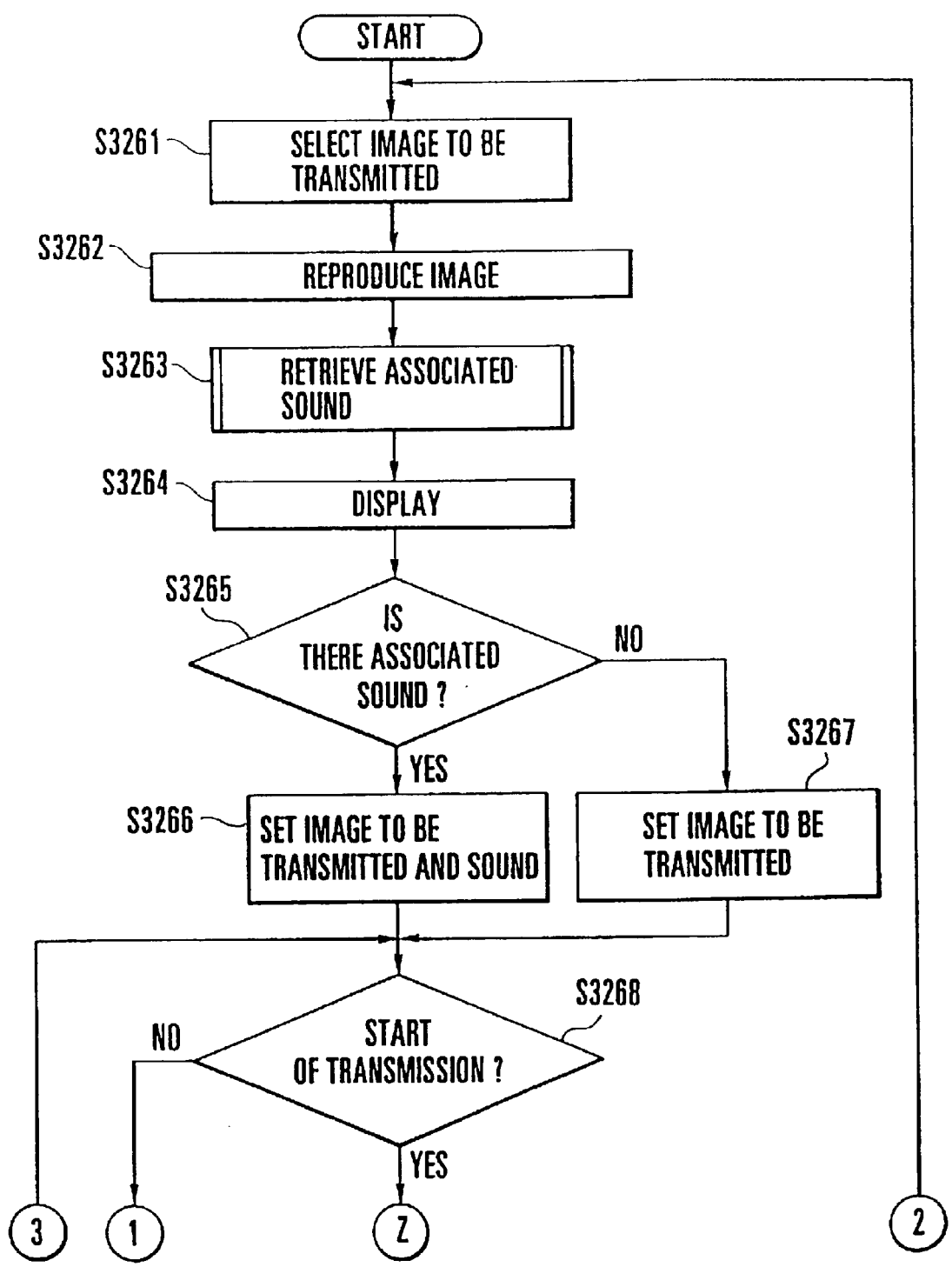

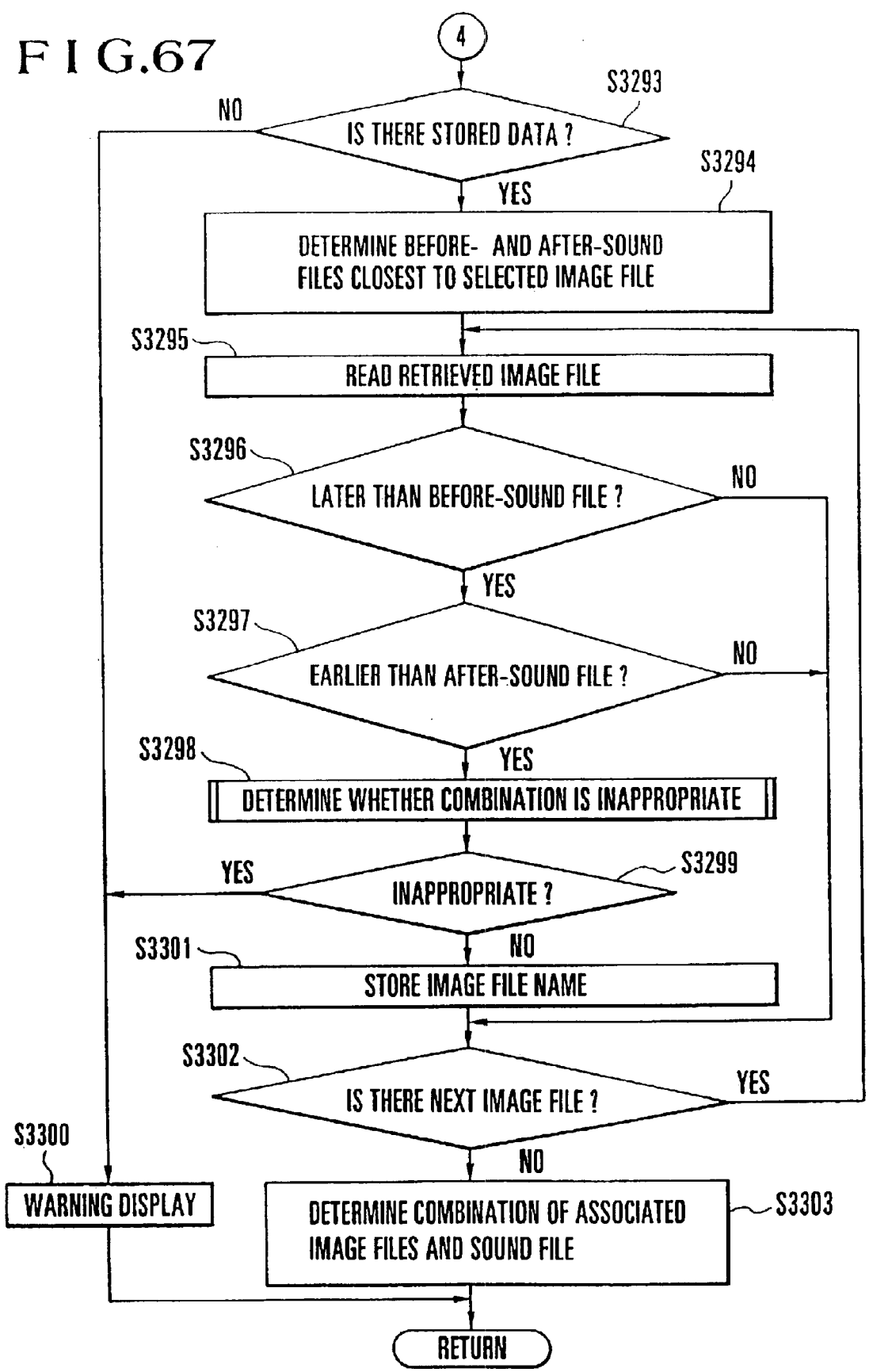
F I G.67

INFORMATION SIGNAL PROCESSING APPARATUS

CROSS REFERENCE TO RELATED APPLICATIONS

This application is a continuation of application Ser. No. 09/510,943, filed Feb. 23, 2000, now U.S. Pat. No. 6,594,443 which is a continuation of application Ser. No. 08/748,128, filed Nov. 12, 1996, now U.S. Pat. No. 6,347,184 which is a divisional of application Ser. No. 08/619,124, filed Mar. 20, 1996, now U.S. Pat. No. 5,610,723, which is continuation of application Ser. No. 08/116,446, filed Sep. 3, 1993 now abandoned.

BACKGROUND OF THE INVENTION

1. Field of the Invention

The present invention relates to an information signal processing apparatus for processing an information signal and, more particularly, to an information signal processing apparatus for recording an information signal in a recording medium.

2. Description of the Related Art

An electronic still video system has heretofore been known as one example of an information signal processing apparatus for processing an information signal. The electronic still video system is arranged to record information signals, such as image signals or sound signals, on a plurality of concentric recording tracks which are formed on a magnetic disk, and to select an arbitrary recording track from among the recording tracks formed on the magnetic disk and reproduce the information signal, such as the image signal or the sound signal, recorded on the selected recording track.

Such an electronic still video system is arranged to record the image signals or the sound signals on the recording tracks formed on the magnetic disk, in the state of analog signals. However, a new system has recently been proposed which is arranged to store digitized image signals or sound signals in a memory card including a plurality of RAMs (random access memories) made from semiconductor memory elements such as D-RAMs, S-RAMs or EEP-ROMs.

However, the storage capacity of the memory card is limited because of the limited storage capacity per chip of the memory device or the limits of the number of chips of a memory element which can be mounted on a single memory card. Further, since the memory element is more expensive than other recording media, it is presently economically difficult to utilize the memory card as a recording medium of large storage capacity.

In contrast, a hard disk unit is known as a recording medium having a larger storage capacity than the memory card, and there has recently been provided a hard disk unit which is removably attachable to an apparatus body similarly to the memory card. If such a hard disk unit is used with an electronic still video camera as a recording medium, it is possible to construct comparatively inexpensively a system having a large storage capacity.

Various kinds of hard disk units are provided for various specifications such as recording capacity, weight, power consumption and recording speed. If the system is constructed so that plural kinds of hard disk units can be attached, it is possible to meet a variety of demands of users.

The aforesaid system is constructed to record a digitized image signal (i.e., image data) or a digitized sound signal (i.e., sound data) in a recording medium such as the memory card or the hard disk unit in the following manner. The recording area of the recording medium is divided into an information data recording area and a management, data recording area, and the image data or the sound data is divided into units each corresponding to what is called "cluster", and each of the units is recorded in one cluster in the information data recording area. Information data indicative of the state of use of each cluster is recorded in the management data recording area.

If image data or sound data is to be recorded over a plurality of clusters, during recording of the image data or the sound data, while the position of a cluster in which the image data or the sound data is recorded is being stored in a management data memory provided in a system control circuit, the image data or the sound data is recorded in the information data recording area. After the completion of the recording of the image data or the sound data, the information data indicative of the state of use of each cluster, which is stored in the management data memory provided in the system control circuit, is recorded in the management data recording area.

However, if the amount of data of the image data or the sound data to be recorded in the recording medium is increased and the number of clusters used for recording the image data or the sound data is increased for the purpose of recording high-quality-image data or high-quality-sound data, it is necessary to provide a management data memory of large storage capacity within the system control circuit so that the positions of clusters used for recording the image data or the sound data can be stored during the recording of the image data or the sound data. With such an arrangement, it as extremely difficult to reduce the size, weight and cost of the apparatus.

On the other hand, if a memory of small storage capacity is used as the management data memory provided within the system control circuit, the size, weight and cost of the system can be reduced. However, the management data memory of small storage capacity does not have a sufficient storage capacity to store the positions of clusters used during recording of the image data or the sound data. Accordingly, the management data memory of small storage capacity needs to repeat the processing of stopping once the operation of recording the image data or the sound data in the information data recording area, reading information data indicative of reading information data, stored in the management data recording area, indicative of the state of use of each cluster, recording the read information data in the management data recording area, and restarting the operation of recording the image data or the sound data in the information data recording area. As a result, there is the problem that the speed of recording of the image data or the sound data lowers remarkably while image data corresponding to a plurality of images or sound data corresponding to a long-time sound is being continuously recorded.

The data files of the image data or the sound data which are recorded in the recording medium, such as a memory card or a hard disk unit, in the above-described manner, are read from the recording medium in units of one data file and transmitted to an external device, such as an external computer, a printer and a data transmission device. In the external device, various processing such as operational processing, printing processing or data transmission processing is performed. Each of the data files recorded in the recording medium is handled as an independent file.

To prevent a wrong data file from being erroneously read out together with a desired file recorded in the recording medium or to prevent a wrong data file from being erroneously erased during erasure of a desired file recorded in the recording medium, it is necessary to individually add a discrimination number to each data file during recording of the data files in the recording medium so that each of the data files can be identified. For example, a system which records image data files in the recording medium is arranged to count the number of photographic pictures recorded during photographing and recording operations, store the counted number of recorded photographic pictures in a system body, generates a discrimination number corresponding to the stored number or recorded photographic pictures, add the generated discrimination number to an obtained image data file, and record the image data file in the recording medium together with the generated discrimination number.

Since the above-described electronic still video camera is a portable device, a supply of electric power depends on a battery and, if the remaining amount of battery power becomes less during photographing and recording, it will be necessary to replace the battery.

If the remaining amount of power in the battery provided in the system body is insufficient or the battery is removed from the system body for battery replacement, the number of recorded photographic pictures which has been stored in the system body in the above-described manner will be reset. If photographing and recording operations are executed after the battery replacement, a discrimination number identical to a discrimination number which is already added to an image data file recorded in the recording medium is added to a new image data file, and the new image data file is recorded together with the already used discrimination number. When a predetermined image data file recorded in the recording medium is to be read out and transmitted to an external device, such as an external computer, a printer and a data transmission device for the purpose of executing various processing such as operational processing, printing processing or data transmission processing in the external device, there is the problem that a wrong data file is erroneously read out together with the desired file. Otherwise, when a predetermined data file recorded in the recording medium is to be erased, there is the problem that a wrong file is erroneously erased in place of the desired file.

To solve the above-described problems, a nonvolatile memory may be provided in the system body so that the counted number of recorded photographic pictures is stored in the nonvolatile memory during photographing and recording operations. With this arrangement, if the remaining amount of power in the battery provided in the system body becomes insufficient or the battery is removed from the system body for battery replacement, it is possible to prevent resetting of the counted number of recorded photographic pictures which are stored in the nonvolatile memory within the system body in the above-described manner. However, the number of times of data rewriting of the nonvolatile memory is limited, and if the number of times of rewriting of data about the number of recorded photographic pictures exceeds the allowable number of times of data writing of the nonvolatile memory, data about the number of recorded photographic pictures is not correctly updated. As a result, a discrimination number identical to a discrimination number which is already added to an image data file recorded in the recording medium is added to a new image data file, and the new image data file is recorded together with the already used discrimination number.

The above-described system is also arranged in the following manner. If a digitized image signal (i.e., image data) or a digitized sound signal (i.e., sound data) are to be recorded in a recording medium such as a memory card or a hard disk unit, after the image data or the sound data is stored in an image memory once, the image data or the sound data stored in the image memory is read out and recorded in the recording medium. During photographing and recording operations, if the storage capacity of the image memory is filled with the image data or the sound data stored in the image memory once, the photographing and recording operations are interrupted once and the image data or the sound data stored in the image memory is transmitted to and recorded in the recording medium. Thus, if a storage capacity capable of storing the image data or the sound data occurs in the storage capacity of the image memory, the system is placed in the state of being able to restart the photographing and recording operations.

However, in the case of the electronic still camera having the above-described arrangement, an operator cannot make a judgement as to whether the photographing and recording operations are interrupted because the storage capacity of the image memory is full or the photographing and recording operations can be performed because the storage capacity of the image memory contains a data storable portion. Such an electronic still camera, therefore, involves the following operational disadvantages. For example, if the operator operates a recording start instructing switch to continue the photographing and recording operations, it may be impossible to start the photographing and recording operations. If the operator operates the recording start instructing switch during an interruption of the photographing and recording operations and the recording start instructing switch remains operated, the photographing and recording operations are restarted at an unintended timing for the operator, so that unintended image data or sound data will be recorded in the recording medium. It is particularly difficult for the operator to make a judgement as to the timings of starting, resuming and ending of the photographing and recording operations during a continuous-shooting recording mode.

Such an electronic still camera has also conventionally been realized as an apparatus capable of recording and reproducing still image data and sound data in a recording medium using a magnetic disk called a still video floppy disk. An electronic still camera is also proposed which uses a memory card including a solid-state memory element, such as a DRAM, an SRAM or an EEPROM, which is packaged in card form.

If the still image data and the sound data are to be recorded in the recording medium described above, the still image data and the sound data are recorded in file form on picture-by-picture basis, and combination information indicative of a correspondence between each image file and each sound file is also recorded as a control file. On the basis of the combination information in the control file, the image files and the sound files are combined so that reproduction or transmission can be performed.

However, in the case of the conventional electronic still camera, if the control file is erased, the correspondence between the image files and the sound files is lost, so that it is impossible to optimumly combine the image files with the sound files so that reproduction or transmission can be performed.

SUMMARY OF THE INVENTION

It is, therefore, an object of the present invention to an information signal processing apparatus capable of solving the above-described problems.

Another object of the present invention is to provide an information signal processing apparatus which is capable of recording an information signal having a large amount of information in a recording medium without lowering a recording speed and the size, weight and cost of which can be easily reduced.

To achieve the above-described objects, according to one aspect of the present invention, there is provided an information signal processing apparatus which is arranged to record an information signal in a recording medium and which comprises recording means for recording the information in the recording medium, and temporarily storing means for receiving, as its input, an information signal, temporarily storing therein the input information signal and storing therein management information prepared during a recording of the information signal in the recording medium.

Another object of the present invention is to provide an information signal processing apparatus of good operability which is capable of preventing erroneous discrimination information from being added to an information signal when discrimination information which serves to discriminate among information signals to be recorded in a recording medium in predetermined units is to be added to the information signal, so that the information signal can be recorded in the recording medium with correct discrimination information added to the information signal. In such an information signal processing apparatus, it is possible to accurately read out the information signal recorded in the recording medium in the predetermined units so that the read information signal can be erased or subjected to various processings in the external device.

To achieve the above-described object, according to another aspect of the present invention, there is provided an information signal processing apparatus which is arranged to record an information signal in a recording medium and which comprises management information adding means for receiving, as an input, an information signal and adding management information corresponding to an order of recording of the information signal in the recording medium to the information signal during a recording of the input information signal in the recording medium, and recording means for recording in the recording medium the information signal to which the management information is added by the management information adding means.

Another object of the present invention is to provide an information signal processing apparatus of good operability which is arranged so that when an image signal is to be continuously recorded in a recording medium, an operator can easily make a judgement as to the recording timing of the image signal to record the necessary information in a recording medium at the desired timing, whereby it is possible to prevent erroneous recording of an unnecessary information signal.

To achieve the above object, in accordance with another aspect of the present invention, there is provided an information signal processing apparatus which is arranged to record an information signal in a recording medium and which comprises temporarily storing means for receiving, as an input, an information signal and temporarily storing the input information signal, display means for displaying a state of a recording capacity of the information signal in the temporarily storing means, recording means for reading the information signal temporarily stored in the temporarily storing means and recording the read information signal in the recording medium, and controlling means for controlling the temporarily storing means and the recording means so that the information signal temporarily stored in the temporarily storing means is recorded in the recording medium by the recording means and for causing the display means to display the state of the recording capacity of the information signal in the temporarily storing means.

Another object of the present invention is to provide an information signal processing apparatus capable of optimumly combining still image data with sound data for the purpose of reproduction or transmission even if there is no information indicative of a correspondence relation between the still image data and the sound data.

To achieve the above object, in accordance with another aspect of the present invention, there is provided an information signal processing apparatus which is arranged to record still image data and sound data in a recording medium and which comprises decision means for determining whether a combination of the still image data and the sound data recorded in the recording medium is appropriate, on the basis of a recording time of each of the still image data and the sound data, and processing means for combining, if the decision means determines that the combination of the still image data and the sound data is appropriate, the still image data with the sound data and executing predetermined processing.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 56 is part of a flowchart showing in detail another example of the associated-sound retrieval operation according to the tenth embodiment of the present invention;

FIG. 59 is part of a flowchart showing a main operation according to the eleventh embodiment of the present invention;

FIG. 64 is part of a flowchart showing in detail a transmission operation according to the eleventh embodiment of the present invention;

FIG. 67 is part of the flowchart showing in detail the associated-sound retrieval operation according to the eleventh embodiment of the present invention;

DETAILED DESCRIPTION OF THE PREFERRED EMBODIMENTS

Embodiments of the present invention will be described below with reference to the accompanying drawings.

Figure 1:
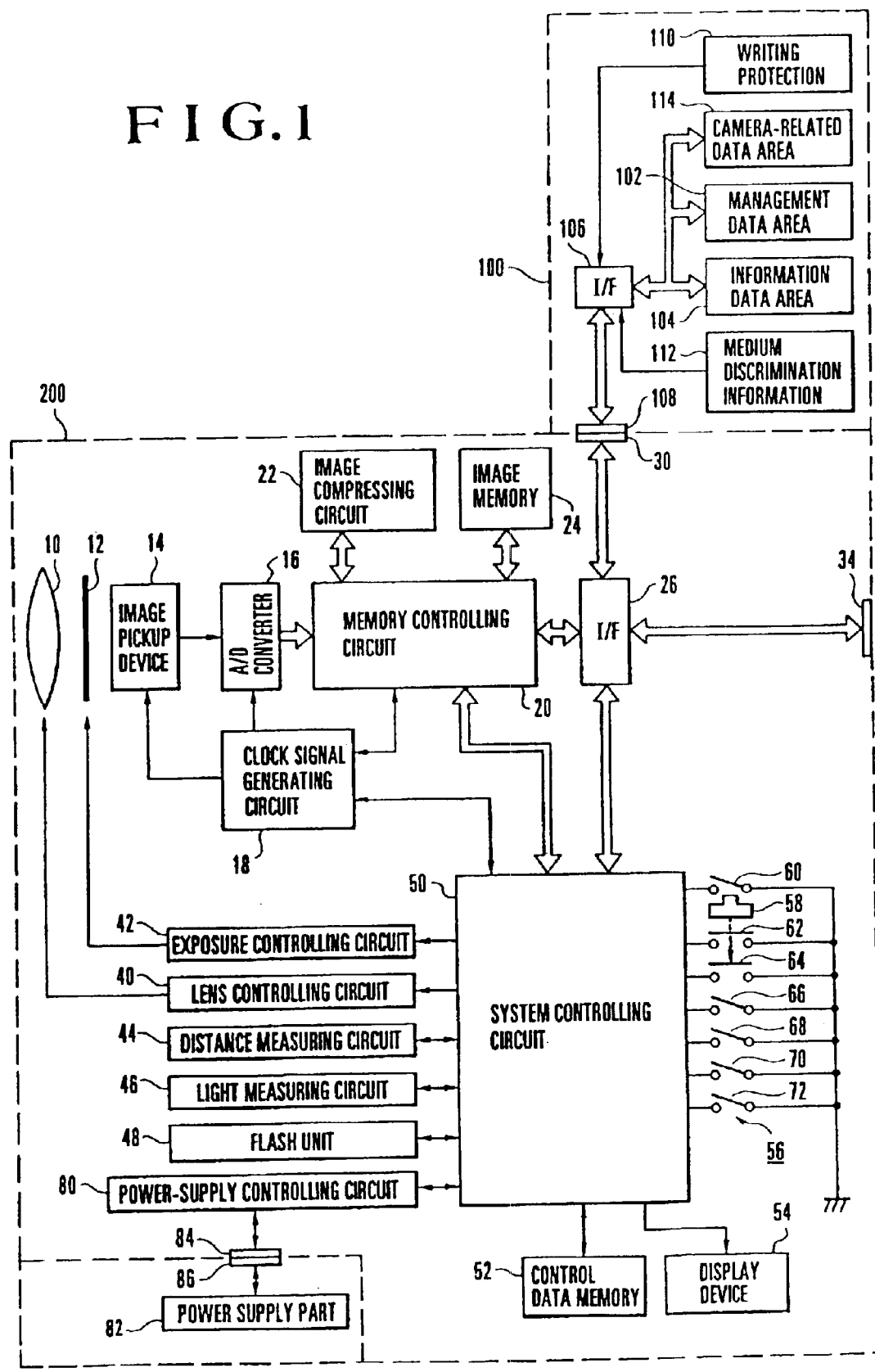
FIG. 1 is a block diagram schematically showing the arrangement of an electronic still video system to which the present invention is applied as a first embodiment thereof.

FIG. 1 is a block diagram schematically showing the arrangement of an electronic still video system to which the present invention is applied as a first embodiment thereof.

The electronic still video system shown in FIG. 1 includes a photographic optical system 10 composed of a photographic lens, an exposure controlling member 12 made up of a diaphragm mechanism, a shutter mechanism and associated elements, an image pickup device 14 for converting a photographic optical image formed by the photographic optical system 10 and the exposure controlling member 12 into an image signal of electrical-signal form, an analog/digital (A/D) conversion circuit 16 for digitizing an analog image signal outputted from the image pickup device 14 and outputting image data, and a clock signal generating circuit 18 for supplying various signals, such as a clock signal and a control signal, to the image pickup device 14, the A/D conversion circuit 16 and a memory controlling circuit 20 which will be described later. The clock signal generating circuit 18 is controlled by the memory controlling circuit 20 as well as a system controlling circuit 50 which will be described later.

The electronic still video system shown in FIG. 1 also includes an image compressing circuit 22 for compressing image data by a compression method such as adaptive discrete cosine transform (ADCT), and an image memory 24.

The memory controlling circuit 20 is provided for controlling the clock signal generating circuit 18, the image compressing circuit 22 and the image memory 24, and the image data outputted from the A/D conversion circuit 16 is written into the image memory 24 by the memory controlling circuit 20.

In the process of compressing the image data, the image data which is written into the image memory 24 in the above-described manner is read therefrom and the read image data is compressed by the image compressing circuit 22. The compressed image data is written into the image memory 24.

The electronic still video system also includes an interface 26 for establishing communication with a recording medium 100 (to be described later), such as a memory card or a hard disk unit, or with an external device, a connector 30 for permitting exchange of data or a control signal with the recording medium 100, such as a memory card or a hard disk unit, and a connector 34 for permitting exchange of data or a control signal with the external device. Communication with the external device can be performed by means of the connector 34.

Each of the connectors 30 and 34 is arranged so that transmission and reception of data or a control signal can be performed not only by a communication method using an electrical signal but also by mechanical, optical, acoustic or various other methods.

The shown electronic still video system also includes a lens controlling circuit 40 for controlling the movement of a focusing lens provided in the photographic optical system 10, an exposure controlling circuit 42 for controlling a diaphragm mechanism and a shutter mechanism which are provided in the exposure controlling member 12, a distance measuring circuit 44 for measuring the distance to a subject, a light measuring circuit 46 for measuring the luminance of the subject, and a flash unit 48 for illuminating the subject.

The shown electronic still video system also includes the system controlling circuit 50 for controlling the operation of the entire system, a control data memory 52 in which are stored various constant data, various variable data, operating programs and the like for use in the control operation of the system controlling circuit 50, and a display device 54, such as a liquid-crystal display, for displaying the operational state and the like of the system.

The shown electronic still video system also includes a switch group 56 which is operated to input various operational instructions into the system controlling circuit 50. The switch group 56 includes, for example, a main switch 60 for instructing the system to operate, a distance·light measuring switch 62 arranged to be closed by a first stroke of a two-stroke release switch 58 to instruct the distance measuring circuit 44 to start a distance measuring operation as well as to instruct the light measuring circuit 46 to start a light measuring operation, a recording starting switch 64 arranged to be closed by a second stroke of the two-stoke release switch 58 to input an instruction to start recording a picked-up image signal corresponding to a photographed subject image in the recording medium 100, such as the memory card or the hard disk unit, a shooting-recording-mode selecting switch 66 for selecting any recording mode from among a single-shooting recording (S) mode for executing photography and recording a field or frame image signal for one picture, a continuous-shooting recording (C) mode for continuously executing photography and recording field or frame image signals for a plurality of pictures, and a self-timer photography recording mode, a recording-condition setting switch 68 for selecting various setting conditions associated with an image signal recording operation, such as the number of photographic pictures to be recorded as image signals, the discrimination between frame recording and field recording, the aspect ratio of an image signal obtained by photography, the pixel arrangement of an image obtained by photography, a data compression method, and the compression ratio at which data is compressed by the data compression method, an erase mode selecting switch 70 for selecting an erase mode, and an erasing operation starting switch 72 for inputting an instruction to start an erasing operation.

The shown electronic still video system also includes a power-supply controlling circuit 80 which is made up of constituent elements, such as a detecting circuit for detecting the state of supply of electric power from a power supply part 82 which will be described later, a DC-DC converter for converting a DC voltage supplied from the power supply part 82 into a voltage suitable for application to each part, and a switch for selecting a circuit block to be supplied with the electric power. The power-supply controlling circuit 80 serves to detect whether the power supply part 82 is attached to the body of the electronic still video system, the kind of the attached power supply part 82 or, if the power supply part 82 is formed by a battery, the amount of power remaining in the attached battery and so on. On the basis of the result of the detection and an instruction supplied from the system controlling circuit 50, the power supply part 82 controls the DC-DC converter and supplies the required amount of electric power to each part at the required time interval. The power supply part 82 is made from, for example, a rechargeable secondary battery. Connectors 84 and 86 serve to provide connection between the power supply part 82 and the body of the electronic still video system.

In accordance with a distance-measurement result provided by the distance measuring circuit 44, the system controlling circuit 50 causes the lens controlling circuit 40 to control the movement of the focusing lens provided in the photographic optical system 10, thereby bringing the photographic optical system 10 into an in-focus state. Also, in accordance with a light-measurement result provided by the light measuring circuit 46, the system controlling circuit 50 causes an exposure controlling circuit 42 to execute exposure control using the exposure controlling member 12 so that an optical image of a photographed subject which is formed on the image pickup surface of the image pickup device 14 can achieve an optimum amount of exposure.

The recording medium 100, such as the memory card or the hard disk unit, has a recording area formed by a management data recording area 102 and an information data recording area 104, and writing of data from the outside to the recording medium 100 or reading of data from the recording medium 100 to the outside is executed through an interface 106 and a connector 108.

The recording medium 100 is also provided with a writing protection information recording area 110 for recording writing protection (writing inhibition) information relative to the management data recording area 102 and the information data recording area 104. Writing and reading of the writing protection information are performed in such a manner that writing and reading of writing protection data from and to the outside are executed through the interface 106 and the connector 108.

The recording medium 100 further has a recording-medium discrimination information recording area 112 in which data indicative of recording-medium discrimination information representative of the kind, characteristics and the like of the recording medium 100 are recorded. The system controlling circuit 50 which will be described later is arranged to read such data through the interface 106 and the connector 108, and detects the kind and characteristics of the recording medium 100 connected to the connector 30 on the basis of information indicated by the read data.

The operation of the electronic still video system according to the first embodiment of the present invention will be described below with reference to the flowcharts shown in FIGS. 2 and 3.

Figure 2:
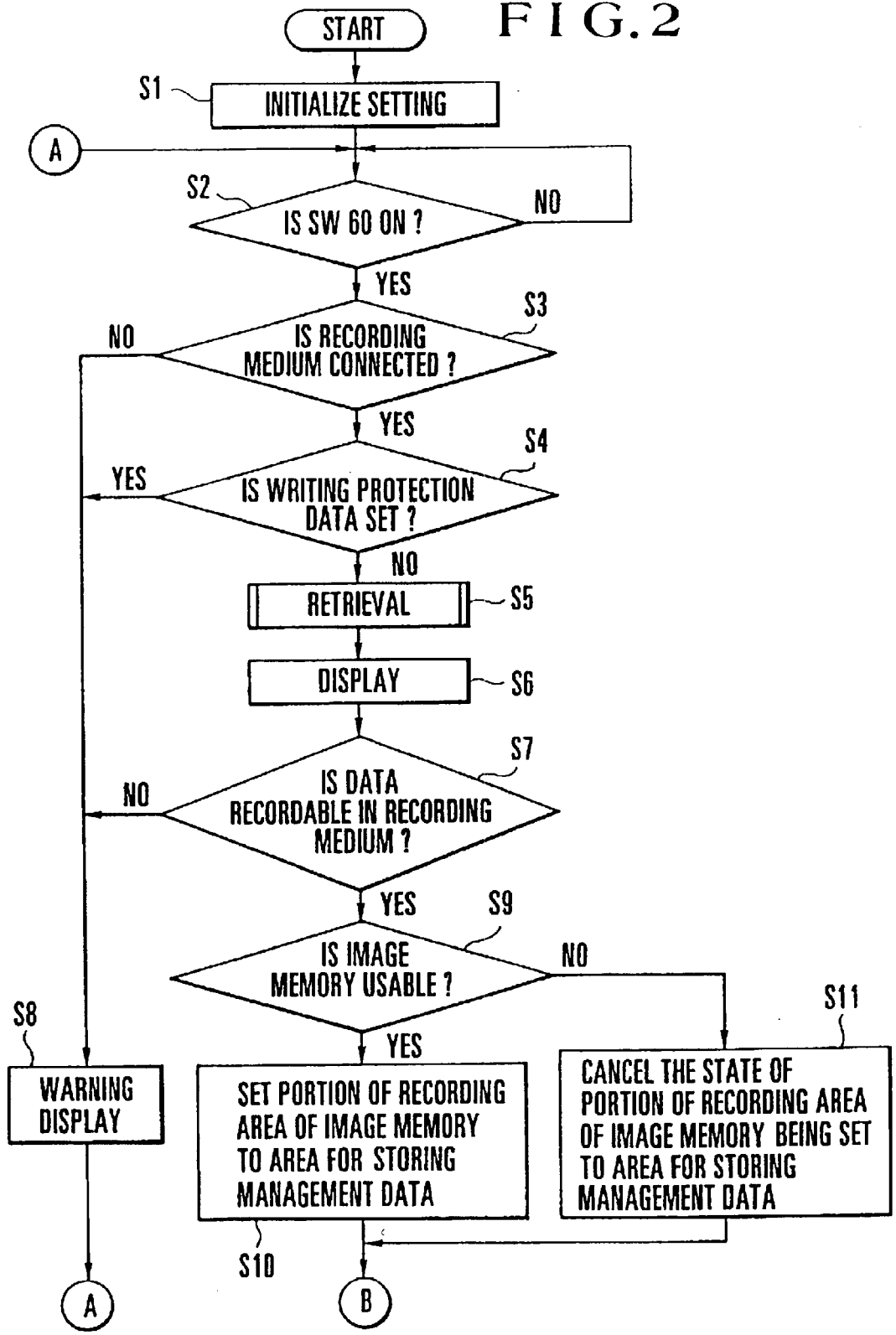
FIG. 2 is part of a flowchart showing the operating routine of the electronic still video system shown in FIG. 1.
Figure 3:
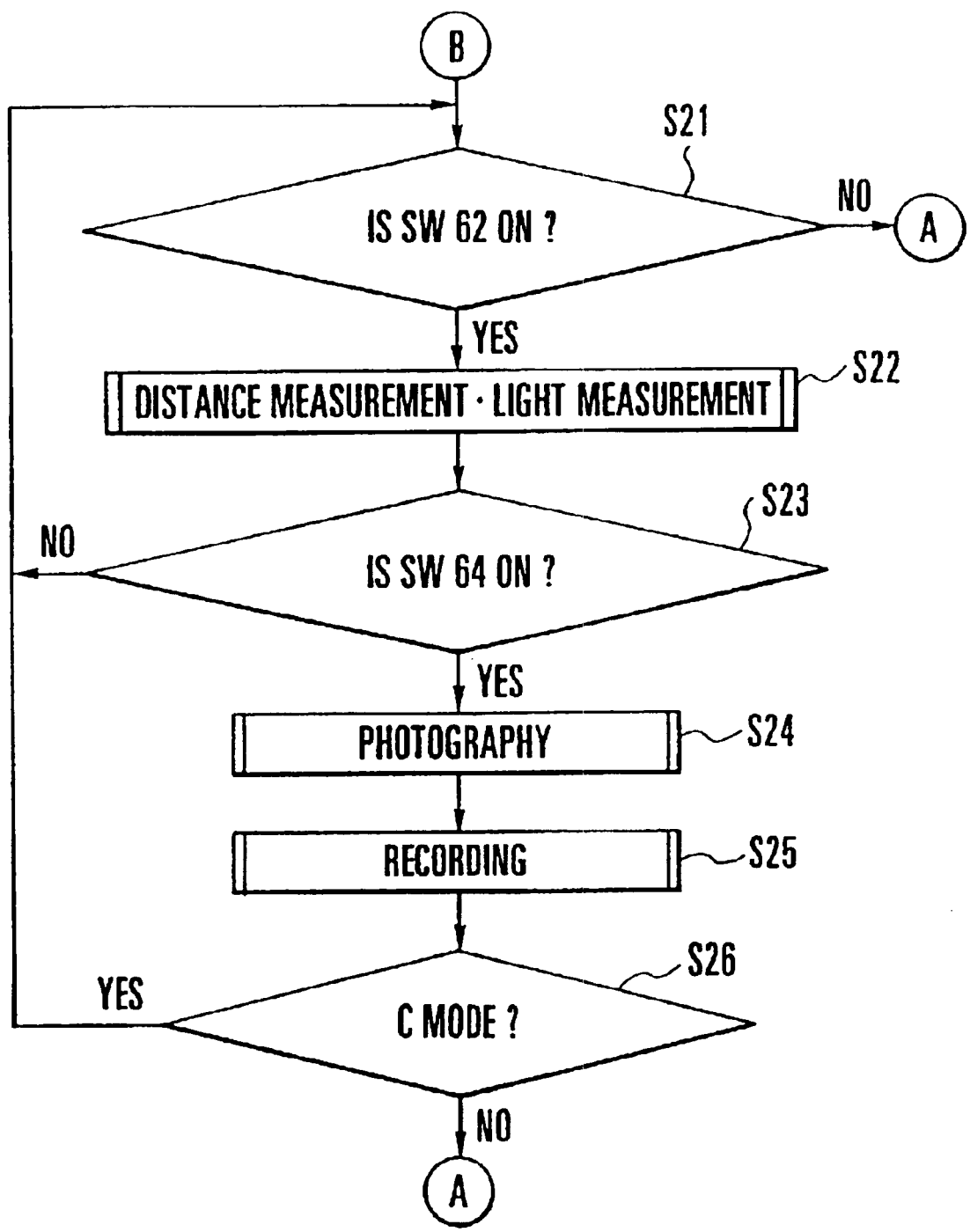
FIG. 3 is part of the flowchart showing the operating routine of the electronic still video system shown in FIG. 1.

FIGS. 2 and 3 are flowcharts showing the main operating routine of the electronic still video system shown in FIG. 1.

Referring to FIGS. 2 and 3, when the power supply part 82 is attached to the body of the electronic still video system, the system controlling circuit 50 initializes various flags, control variables and the like (Step S1 in FIG. 2), and is held in its standby state until the main switch 60 is turned on. If the main switch 60 is turned on (Step S2 in FIG. 2) and if the recording medium 100, such as the memory card or the hard disk unit, is connected to the body of the electronic still video system (Step S3 in FIG. 2), the process proceeds to Step S4, where it is determined whether writing protection data indicative of writing protection is set in the writing protection information recording area 110 of the recording medium 100 connected to the body of the electronic still video system. If it is determined in Step S4 of FIG. 2 that the writing protection data is not set in the writing protection information recording area 110, the operation of performing retrieval as to the state of recording in the recording medium is executed (Step S5 in FIG. 2).

The retrieval operation will be described later in detail.

If it is determined (Step S3 in FIG. 2) that the recording medium 100 is not connected to the body of the electronic still video system or if it is determined (Step S4 in FIG. 2) that the aforesaid writing protection data is set in the writing protection information recording area 110, the process proceeds to Step S8 of FIG. 2, where the system controlling circuit 50 causes the display device 54 to provide a warning display indicating that the recording medium 100 is not connected to the body or that the writing protection data is set in the writing protection information recording area 110.

Then, the system controlling circuit 50 causes the display device 54 to visually display the number of photographic pictures recorded on the recording medium 100, the date of photography and the associated shooting recording modes, on the basis of management data which is recorded in the management data recording area 102 of the recording medium 100 in the above-described manner, various kinds of modes which are selectively set by the switch group 56 and various kinds of modes which are selectively set according to the kind of the recording medium 100 connected to the body of the electronic still video system (Step S6 in FIG. 2). Then, if there is no recordable empty area in the information data recording area 104 of the recording medium 100 (Step S7 in FIG. 2), the display device 54 is made to provide a warning display indicating that there is no recordable empty area in the information data recording area 104 of the recording medium 100. Then, the process returns to Step S2.

Then, the system controlling circuit 50 detects the state of recording in the image memory 24 and determines whether a portion of the data recording area of the image memory 24 can be used for storing management data about the recording medium 100 (Step S9 in FIG. 2). If there is a portion which can be used, the system controlling circuit 50 sets the portion of the data recording area of the image memory 24 to an area for storing the management data (Step S10 in FIG. 2). If there is no portion which can be used, the system controlling circuit 50 cancels the operation of setting a portion of the data recording area of the image memory 24 to an area for storing the management data (Step S11 in FIG. 2).

Then, the system controlling circuit 50 detects the state of the distance·light measuring switch 62. If the distance·light measuring switch 62 is off, the process returns to Step S2 (Step S21 in FIG. 3). If the distance·light measuring switch 62 is on, the system controlling circuit 50 causes the distance measuring circuit 44 to measure the distance to a subject and then causes the lens controlling circuit 40 to drive the focusing lens of the photographic optical system 10 on the basis of the result of the distance measurement executed by the distance measuring circuit 44, thereby focusing the photographic optical system 10 onto the subject. Further, the system controlling circuit 50 causes the light measuring circuit 46 to measure the luminance of the subject and, on the basis of the result of the light measurement executed by the light measuring circuit 46, causes the exposure controlling circuit 42 to control the diaphragm mechanism or the shutter mechanism of the exposure controlling member 12 so that the subject optical image formed on the image pickup surface of the image pickup device 14 achieves an optimum amount of exposure, thereby determining the amount of exposure of the subject by means of the exposure controlling member 12 (Step S22 in FIG. 3).

Then, the system controlling circuit 50 detects the state of the recording starting switch 64, and the distance measuring operation and the light measuring operation of Step S22 are repeated until the recording starting switch 64 is turned on (Step S23 in FIG. 3). If it is determined that the recording starting switch 64 is turned on, the system controlling circuit 50 initiates a photographic operation, and causes the A/D conversion circuit 16 to digitize an analog image signal outputted from the image pickup device 14 and stores the obtained image data in the image memory 24 (Step S24 in FIG. 3).

The above-mentioned distance measuring operation, light measuring operation and photographic operation will be described later in greater detail.

After the photographic operation for one picture has been completed in the above-described manner, if the system controlling circuit 50 has set, in Step S10 of FIG. 2, a portion of the data recording area of the image memory 24 to the area for storing the management data, the system controlling circuit 50 executes the following operation when the image data stored in the image memory 24 is to be recorded in the information data recording area 104 of the recording medium 100. The system controlling circuit 50 reads the image data stored in the image memory 24 while storing management data, such as a FAT (file allocation table) representative of the state of use of each cluster corresponding to the unit of use of the information data recording area 104, in the portion of the data recording area of the image memory 24, which management data is to be recorded in the management data recording area 102 of the recording medium 100 together with the image data. Then, the system controlling circuit 50 records the read image data in the information data recording area 104 of the recording medium 100 through the interface 26 and the connector 30. After the completion of the photographic operation for one picture, if the system controlling circuit 50 has cancelled, in Step S10 of FIG. 2, the operation of setting a portion of the data recording area of the image memory 24 to an area for storing the management data, the system controlling circuit 50 executes the following operation when the image data stored in the image memory 24 is to be recorded in the information data recording area 104 of the recording medium 100. The system controlling circuit 50 reads the image data stored in the image memory 24 while storing the management data, such as the FAT, which is to be recorded in the management data recording area 102 of the recording medium 100 together with the image data, not in the portion of the data recording area of the image memory 24 but in a register of the system controlling circuit 50 or the control data memory 52. Then, the system controlling circuit 50 records the read image data in the information data recording area 104 of the recording medium 100 through the interface 26 and the connector 30 (Step S25 in FIG. 3).

If the system controlling circuit 50 has cancelled, in Step S11 of FIG. 2, the operation of setting a portion of the data recording area of the image memory 24 to an area for storing the management data, the amount of the management data, such as the FAT, which can be stored in the register of the system controlling circuit 50 or the control data memory 52 is limited since either of the register of the system controlling circuit 50 and the control data memory 52 has a small memory capacity. Accordingly, if the amount of information carried by the image data to be stored is excessively large, the system controlling circuit 50 needs to repeat the operation of temporarily interrupting the recording of the stored image data of the image memory 24 in the recording medium 100, recording the stored management data of the register of the system controlling circuit 50 or the control data memory 52 in the recording medium 100, and then restarting the recording of the image data in the recording medium 100. If the system controlling circuit 50 has set, in Step S10 of FIG. 2, a portion of the data recording area of the image memory 24 to an area for storing the management data, the portion of the data recording area of the image memory 24 can be used as the area for storing the management data so that the memory capacity for the management data is large compared to the register of the system controlling circuit 50 or the control data memory 52. Accordingly, the system controlling circuit 50 does not need to repeat the operation of temporarily interrupting the recording of the stored image data of the image memory 24 in the recording medium 100, recording the stored management data of the register of the system controlling circuit 50 or the control data memory 52 in the recording medium 100, and then restarting the recording of the image data in the recording medium 100. Accordingly, the image data stored in the image memory 24 can be continuously recorded in the recording medium 100 without such a temporary interruption.

The above-described recording operation will be described below in greater detail.

If the C mode is set by the shooting-recording-mode selecting switch 66 to continuously perform a photographic operation, the process returns to Step S21 of FIG. 3, and the above-described processing operation is repeated. If a series of recording operations is completed, the process returns to Step S2 (Step S26 in FIG. 3).

The operation of an electronic still video system according to a second embodiment of the present invention will be described below with the flowcharts shown in FIGS. 4, 5, 6, 10, 11 and 12.

Figure 11:
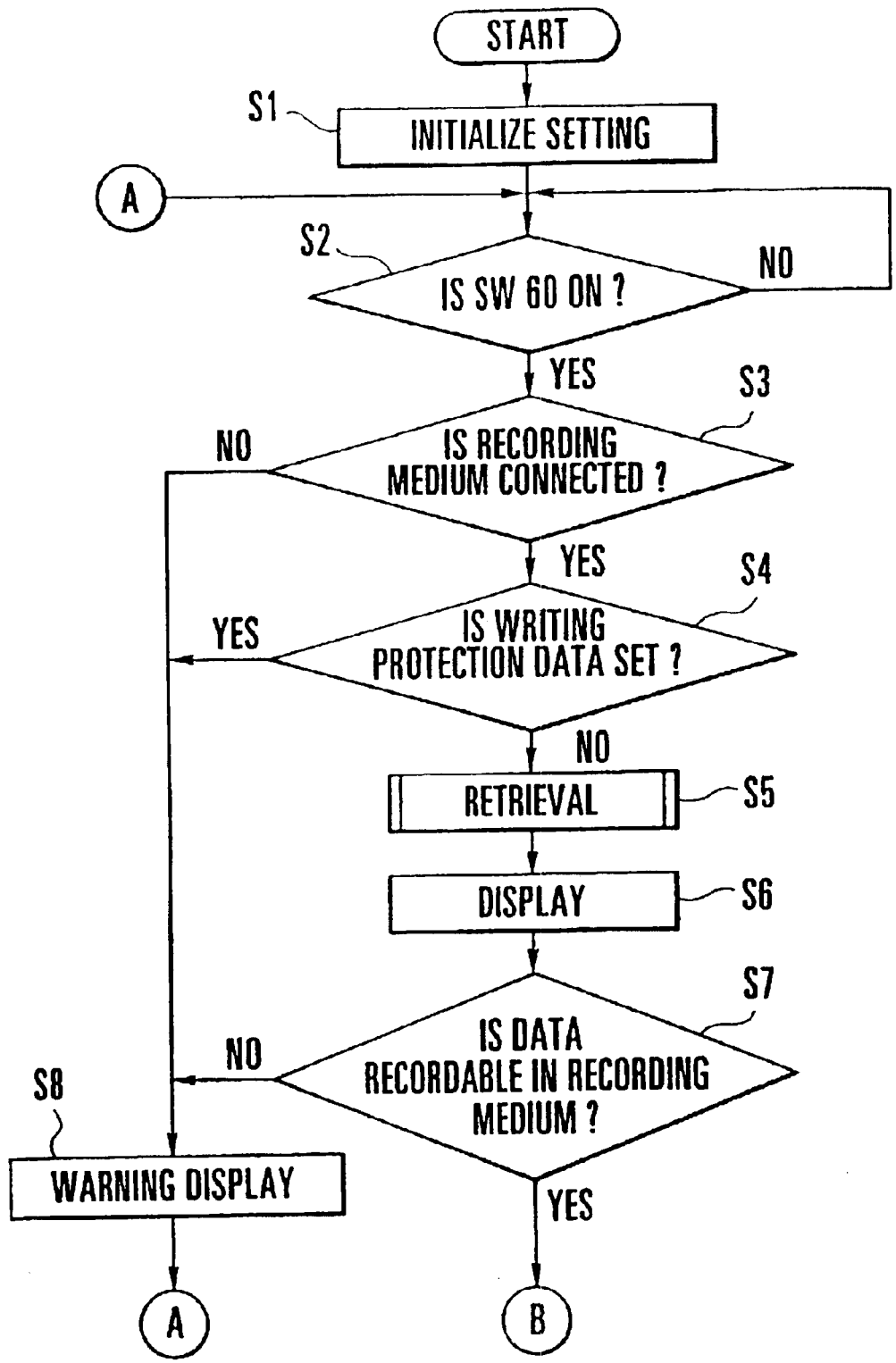
FIG. 11 is part of a flowchart showing the main operating routine of an electronic still video system according to a second embodiment of the present invention.
Figure 12:
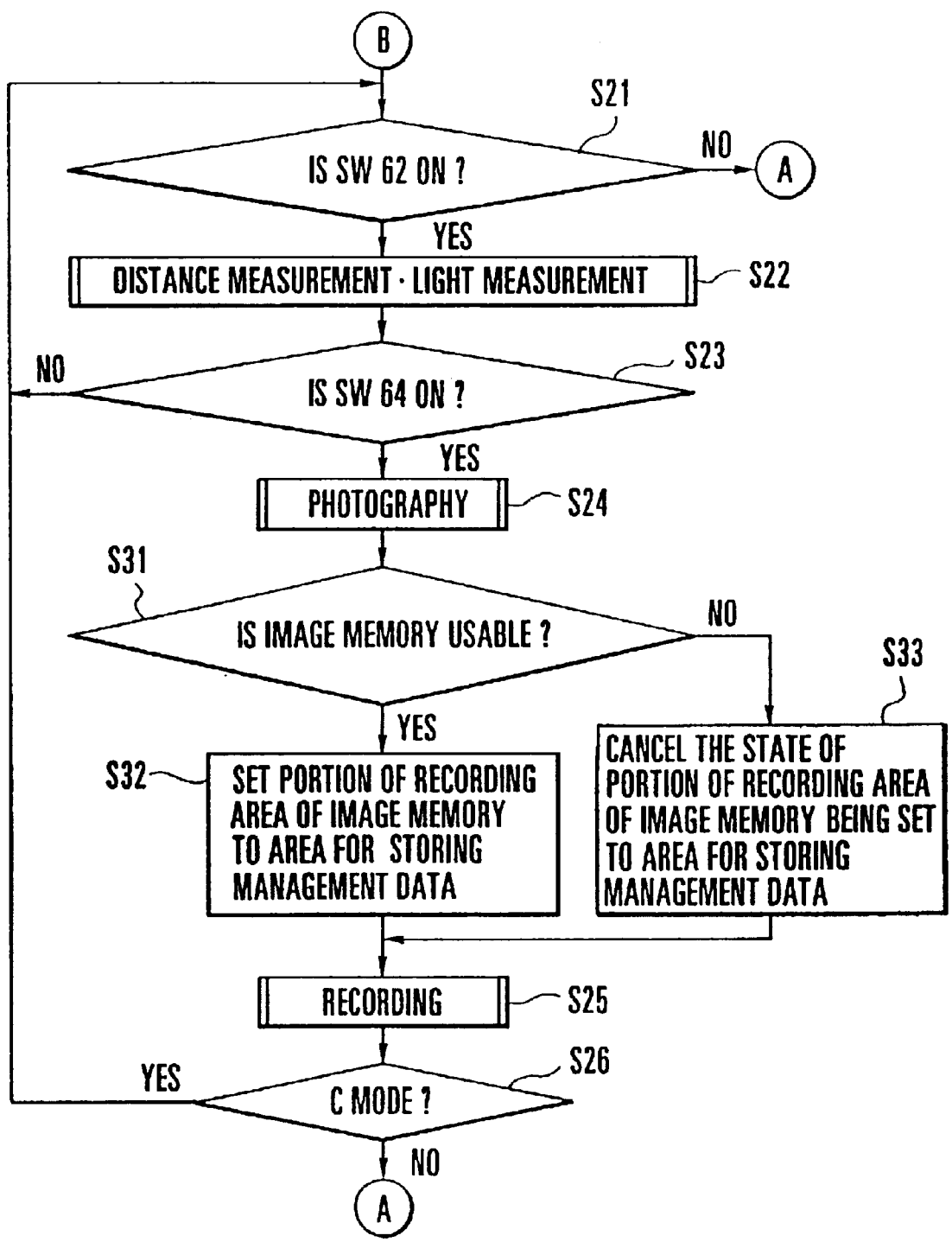
FIG. 12 is part of the flowchart showing the main operating routine of the electronic still video system according to the second embodiment of the present invention.

FIGS. 11 and 12 show in combination a flowchart of the main operating routine of the electronic still video system generally shown in FIG. 1.

Referring to FIGS. 11 and 12, when the power supply part 82 is attached to the body of the electronic still video system, the system controlling circuit 50 initializes various flags, control variables and the like (Step S1 in FIG. 11), and is held in its standby state until the main switch 60 is turned on. If the main switch 60 is turned on (Step S2 in FIG. 11) and if the recording medium 100, such as the memory card or the hard disk unit, is connected to the body of the electronic still video system (Step S3 in FIG. 11), the process proceeds to Step S4, where it is determined whether writing protection data indicative of writing protection is set in the writing protection information recording area 110 of the recording medium 100 connected to the body of the electronic still video system. If it is determined in Step S4 of FIG. 11 that the writing protection data is not set in the writing protection information recording area 110, the operation of performing retrieval as to the state of recording in the recording medium is executed (Step S5 in FIG. 11).

The retrieval operation will be described later in detail.

If it is determined (Step S3 in FIG. 11) that the recording medium 100 is not connected to the body of the electronic still video system or if it is determined (Step S4 in FIG. 11) that the aforesaid writing protection data is set in the writing protection information recording area 110, the process proceeds to Step S8 of FIG. 11, where the system controlling circuit 50 causes the display device 54 to provide a warning display indicating that the recording medium 100 is not connected to the body or that the writing protection data is set in the writing protection information recording area 110.

Then, the system controlling circuit 50 causes the display device 54 to visually display the number of photographic pictures recorded on the recording medium 100, the date of photography and the associated shooting recording modes, on the basis of management data which is recorded in the management data recording area 102 of the recording medium 100 in the above-described manner, various kinds of modes which are selectively set by the switch group 56 and various kinds of modes which are selectively set according to the kind of the recording medium 100 connected to the body of the electronic still video system (Step S6 in FIG. 11). Then, if there is no recordable empty area in the information data recording area 104 of the recording medium 100 (Step S7 in FIG. 11), the display device 54 is made to provide a warning display indicating that there is no recordable empty area in the information data recording area 104 of the recording medium 100. Then, the process returns to Step S2.

Then, the system controlling circuit 50 detects the state of the distance-light measuring switch 62. If the distance-light measuring switch 62 is off, the process returns to Step S2 (Step S21 in FIG. 12). If the distance-light measuring switch 62 is on, the system controlling circuit 50 causes the distance measuring circuit 44 to measure the distance to a subject and then causes the lens controlling circuit 40 to drive the focusing lens of the photographic optical system 10 on the basis of the result of the distance measurement executed by the distance measuring circuit 44, thereby focusing the photographic optical system 10 onto the subject. Further, the system controlling circuit 50 causes the light measuring circuit 46 to measure the luminance of the subject and, on the basis of the result of the light measurement executed by the light measuring circuit 46, causes the exposure controlling circuit 42 to control the diaphragm mechanism or the shutter mechanism of the exposure controlling member 12 so that the subject optical image formed on the image pickup surface of the image pickup device 14 achieves an optimum amount of exposure, thereby determining the amount of exposure of the subject by means of the exposure controlling member 12 (Step S22 in FIG. 12).

Then, the system controlling circuit 50 detects the state of the recording starting switch 64, and the distance measuring operation and the light measuring operation of Step S22 are repeated until the recording starting switch 64 is turned on (Step S23 in FIG. 12). If it is determined that the recording starting switch 64 is turned on, the system controlling circuit 50 initiates a photographic operation, and causes the A/D conversion circuit 16 to digitize an analog image signal outputted from the image pickup device 14 and stores the obtained image data in the image memory 24 (Step S24 in FIG. 12).

The above-mentioned distance measuring operation, light measuring operation and photographic operation will be described later in greater detail.

Then, the system controlling circuit 50 detects the state of recording in the image memory 24 and determines whether a portion of the data recording area of the image memory 24 can be used for storing management data about the recording medium 100 (Step S31 in FIG. 12). If there is a portion which can be used, the system controlling circuit 50 sets the portion of the data recording area of the image memory 24 to an area for storing the management data (Step S32 in FIG. 12). If there is no portion which can be used, the system controlling circuit 50 cancels the operation of setting a portion of the data recording area of the image memory 24 to an area for storing the management data (Step S33 in FIG. 12).

After the photographic operation for one picture has been completed in the above-described manner, if the system controlling circuit 50 has set, in Step S32 of FIG. 12, a portion of the data recording area of the image memory 24 to the area for storing the management data, the system controlling circuit 50 executes the following operation when the image data stored in the image memory 24 is to be recorded in the information data recording area 104 of the recording medium 100. The system controlling circuit 50 reads the image data stored in the image memory 24 while storing management data, such as a FAT (file allocation table) representative of the state of use of each cluster corresponding to the unit of use of the information data recording area 104, in the portion of the data recording area of the image memory 24, which management data is to be recorded in the management data recording area 102 of the recording medium 100 together with the image data. Then, the system controlling circuit 50 records the read image data in the information data recording area 104 of the recording medium 100 through the interface 26 and the connector 30. After the completion of the photographic operation for one picture, if the system controlling circuit 50 has cancelled, in Step S33 of FIG. 12, the operation of setting a portion of the data recording area of the image memory 24 to an area for storing the management data, the system controlling circuit 50 executes the following operation when the image data stored in the image memory 24 is to be recorded in the information data recording area 104 of the recording medium 100. The system controlling circuit 50 reads the image data stored in the image memory 24 while storing the management data, such as the FAT, which is to be recorded in the management data recording area 102 of the recording medium 100 together with the image data, not in the portion of the data recording area of the image memory 24 but in the register of the system controlling circuit 50 or the control data memory 52. Then, the system controlling circuit 50 records the read image data in the information data recording area 104 of the recording medium 100 through the interface 26 and the connector 30 (Step S25 in FIG. 12).

If the system controlling circuit 50 has cancelled, in Step S33 of FIG. 12, the operation of setting a portion of the data recording area of the image memory 24 to an area for storing the management data, the amount of the management data, such as the FAT, which can be stored in the register of the system controlling circuit 50 or the control data memory 52 is limited since either of the register of the system controlling circuit 50 and the control data memory 52 has a small memory capacity. Accordingly, if the amount of information carried by the image data to be stored is excessively large, the system controlling circuit 50 needs to repeat the operation of temporarily interrupting the recording of the stored image data of the image memory 24 in the recording medium 100, recording the stored management data of the register of the system controlling circuit 50 or the control data memory 52 in the recording medium 100, and then restarting the recording of the image data in the recording medium 100. If the system controlling circuit 50 has set, in Step S32 of FIG. 12, a portion of the data recording area of the image memory 24 to an area for storing the management data, the portion of the data recording area of the image memory 24 can be used as the area for storing the management data so that the memory capacity for the management data is large compared to the register of the system controlling circuit 50 or the control data memory 52. Accordingly, the system controlling circuit 50 does not need to repeat the operation of temporarily interrupting the recording of the stored image data of the image memory 24 in the recording medium 100, recording the stored management data of the register of the system controlling circuit 50 or the control data memory 52 in the recording medium 100, and then restarting the recording of the image data in the recording medium 100. Accordingly, the image data stored in the image memory 24 can be recorded in the recording medium 100 without such a temporary interruption.

The above-described recording operation will be described below in greater detail.

If the C mode is set by the shooting-recording-mode selecting switch 66 to continuously perform a photographic operation, the process returns to Step S21 of FIG. 12, and the above-described processing operation is repeated. If a series of recording operations is completed, the process returns to Step S2 (Step S26 in FIG. 12).

Figure 4:
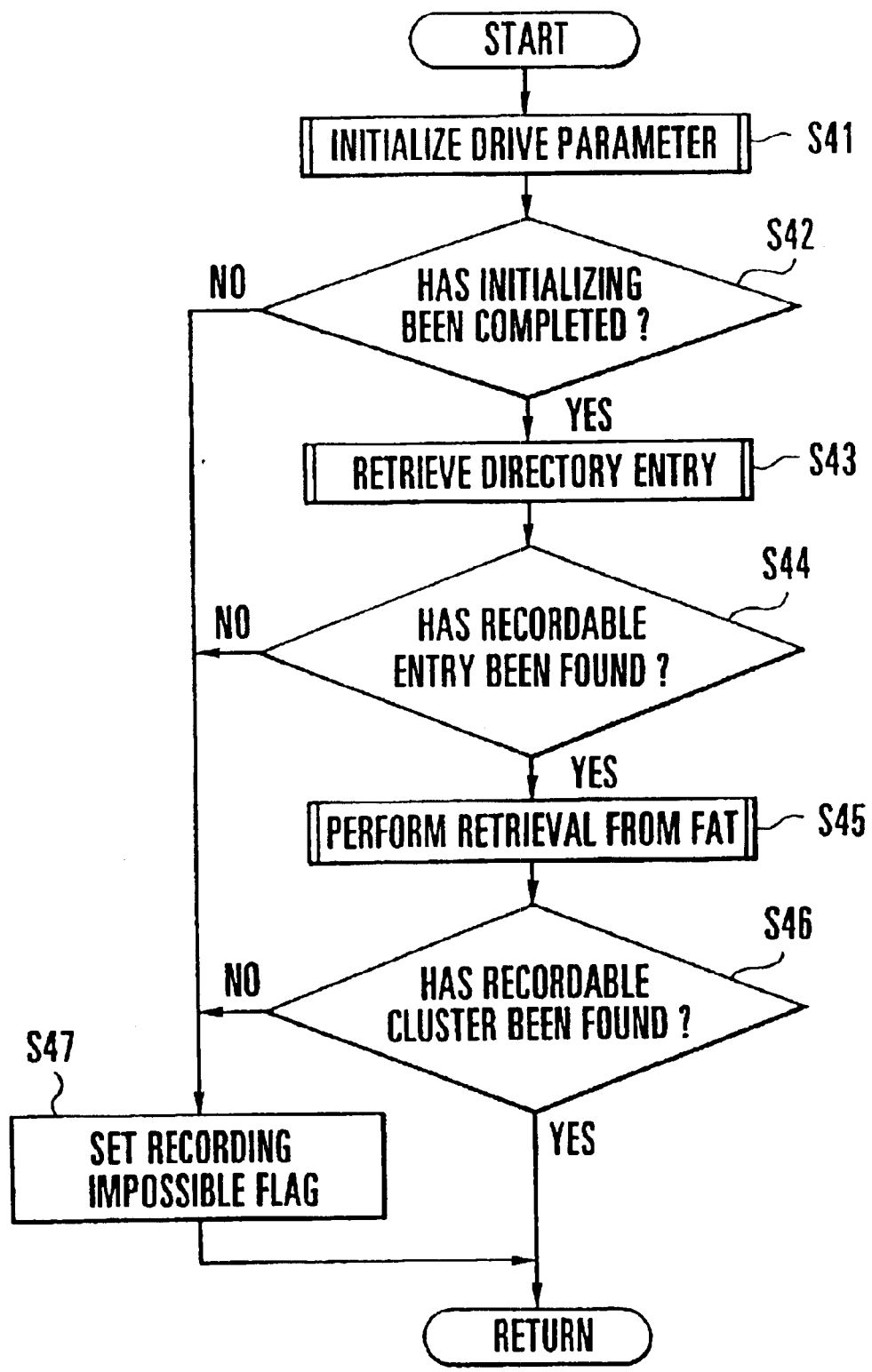
FIG. 4 is a flowchart which serves to explain in detail the retrieval operation routine executed in each of Step 5 of FIG. 2 and Step S5 of FIG. 11.

FIG. 4 is a flowchart which serves to explain in detail the retrieval operation executed in each of Step S5 of FIG. 2 and Step S5 of FIG. 11.

Referring to FIG. 4, the system controlling circuit 50 reads the management data indicative of various parameters, which are recorded in the management data recording area 102 of the recording medium 100 connected to the system body 200, through the interface 26 and the connector 30 of a system body 200 and the connector 108 and the interface 106 of the recording medium 100. The system controlling circuit 50 stores the read management data in the register of the system controlling circuit 50 or the control data memory 52 to initialize drive parameters which are used in performing data recording in the recording medium 100 (Step S41 in FIG. 4).

The drive parameters include data indicative of, for example, the leading sector of the FAT recorded in the management data recording area 102, the leading sector of each directory entry, the leading sector of the data recorded in the information data recording area 104, and the last allocation cluster indicative of the number of a cluster in which the last data is recorded.

The operation of initializing the aforesaid drive parameters will be described below in greater detail.

If the operation of initializing the drive parameters is completed (Step S42 in FIG. 4), retrieval is performed from data indicative of the directory entries, which are recorded in the management data recording area 102 of the recording medium 100 (Step S43 in FIG. 4).

The operation of performing retrieval from the data indicative of the directory entries will be described later in greater detail.

If a directory entry in which data recording is possible is detected by performing retrieval from the data indicative of the directory entries (Step S44 in FIG. 4), retrieval is performed from data indicative of the FAT recorded in the management data recording area 102 (Step S45 in FIG. 4).

The operation of performing retrieval from the data indicative of the FAT will be described later in greater detail.

If a cluster in the information data recording area 104 in which data recording is possible is detected by performing retrieval from the data indicative of the FAT, the process brings the retrieval routine to an end and returns to the main operating routine.

During the above-described retrieval routine, if it is determined in Step S42 of FIG. 4 that the operation of initializing the drive parameters has failed in Step S41, or if it is determined in Step S44 of FIG. 4 that no directory entry in which data recording is possible has been detected in Step S43 of FIG. 4, or if it is determined in Step S46 of FIG. 4 that no cluster in which data recording is possible has been retrieved from the data indicative of the FAT, the system controlling circuit 50 sets a recording-impossible flag (Step S47 in FIG. 4), and brings the retrieval routine to an end and returns to the main operating routine.

Figure 5:
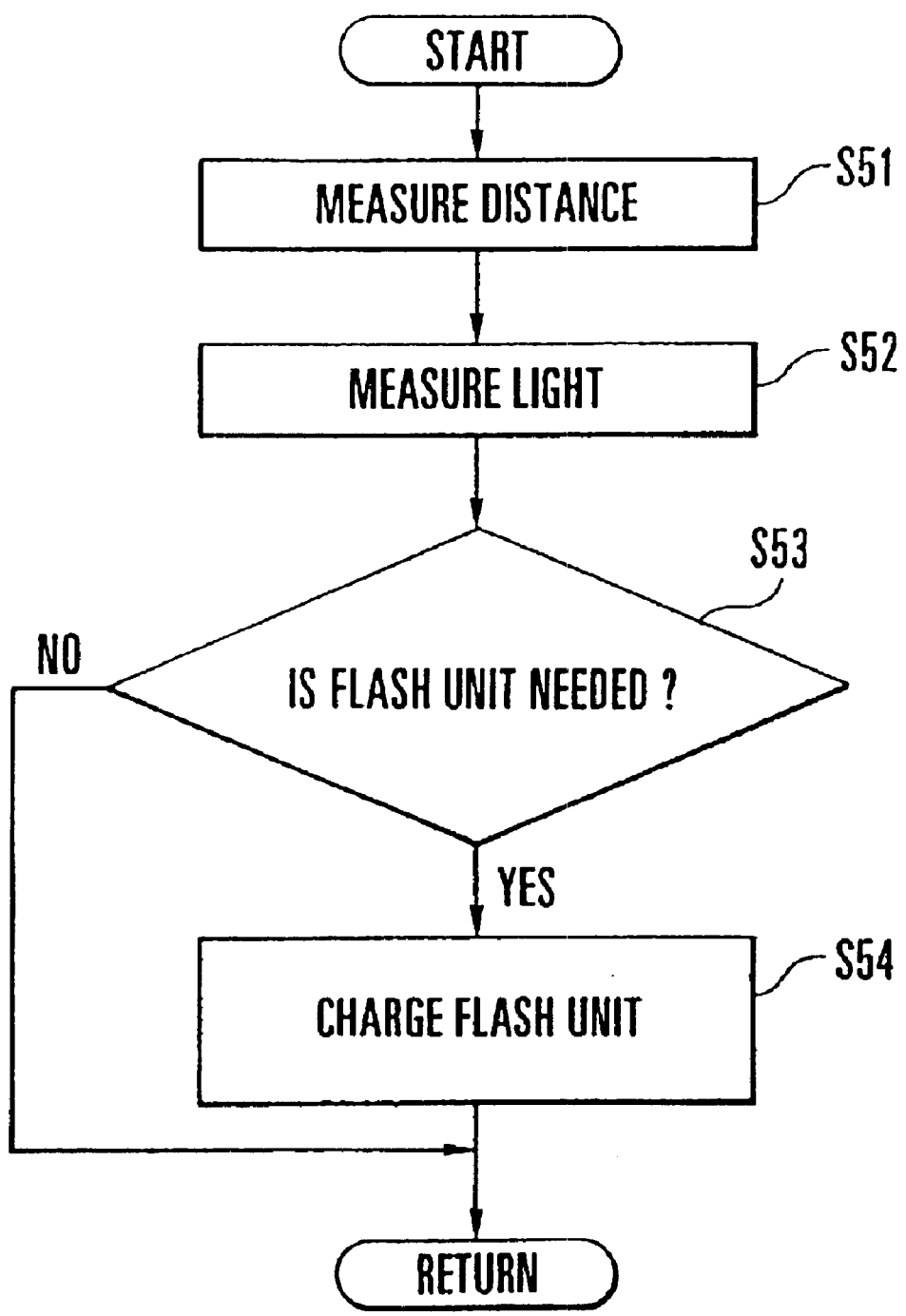
FIG. 5 is a flowchart which serves to explain in detail the distance·light measuring operation routine executed in each of Step S22 of FIG. 3 and Step S22 of FIG. 12.

FIG. 5 is a flowchart which serves to explain in detail the distance·light measuring routine executed in each of Step S22 of FIG. 3 and Step S22 of FIG. 12.

Referring to FIG. 5, the system controlling circuit 50 detects the state of the distance·light measuring switch 62. If the distance·light measuring switch 62 is on, the system controlling circuit 50 measures the distance to the subject and stores the measured-distance data obtained by the distance measurement in the control data memory 52 (Step S51 in FIG. 5). Then, the system controlling circuit 50 executes measurement of the luminance of the subject and stores the measured-light data obtained by the light measurement in the control data memory 52 (Step S52 in FIG. 5).

Further, the system controlling circuit 50 determines whether it is necessary to cause the flash unit 48 to flash, on the basis of the result of the light measurement (Step S53 in FIG. 5). If it is necessary to cause the flash unit 48 to flash, the system controlling circuit 50 sets a flash flag to start a charging operation for the flash unit 48 (Step S54 in FIG. 5).

Figure 6:
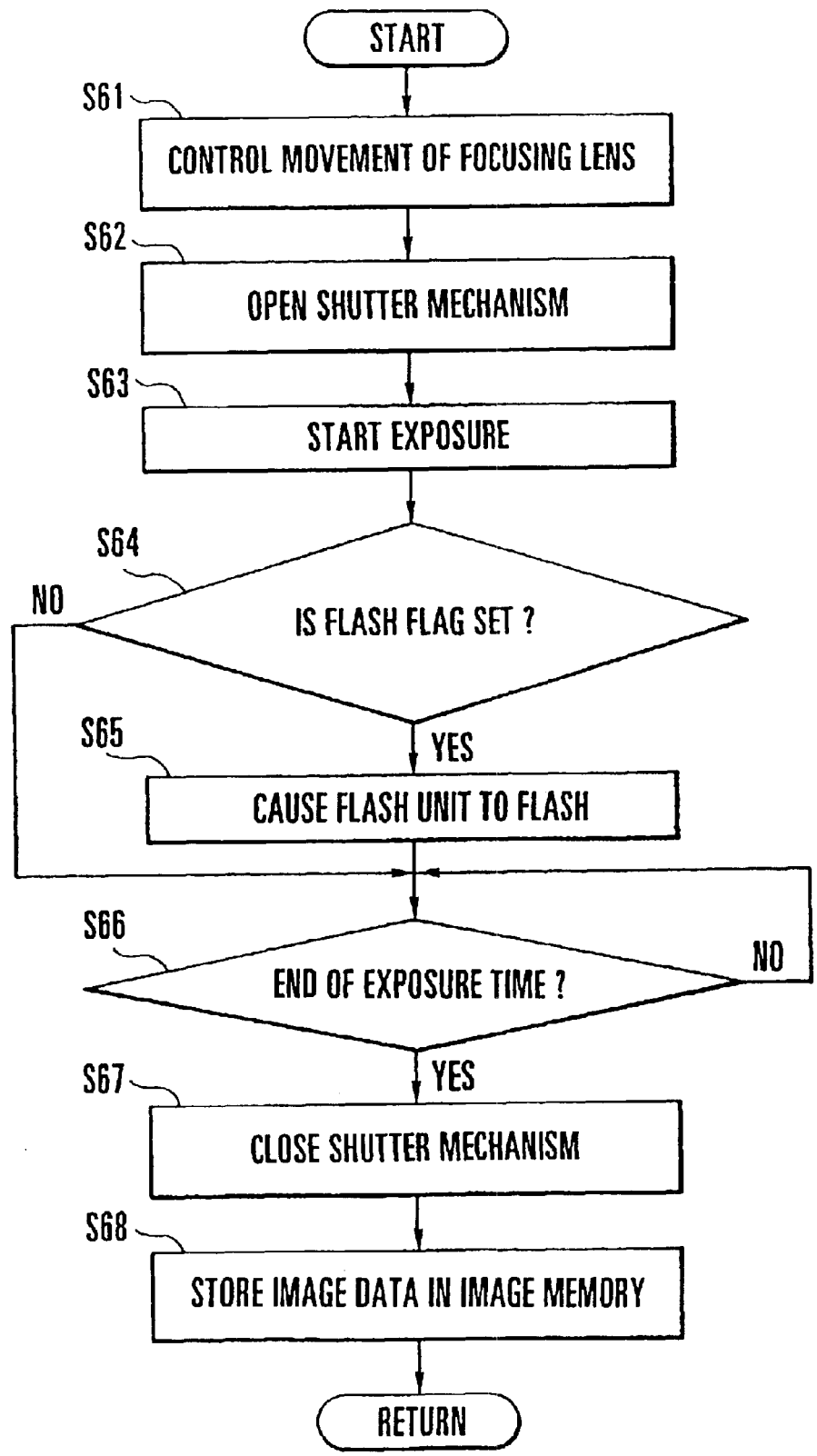
FIG. 6 is a flowchart which serves to explain in detail the photographic operation routine executed in each of Step S24 of FIG. 3 and Step S24 of FIG. 12.

FIG. 6 is a flowchart which serves to explain in detail the photographic operation executed in each of Step S24 of FIG. 3 and Step S24 of FIG. 12.

Referring to FIG. 6, the system controlling circuit 50 detects the state of the distance·light measuring switch 62, and if the distance·light measuring switch 62 is on, the system controlling circuit 50 reads the measured-distance data stored in the control data memory 52, and causes the lens controlling circuit 40 to control the movement of the focusing lens of the photographic optical system 10 on the basis of the read measured-distance data, thereby bringing the photographic optical system 10 into the in-focus state (Step S61 in FIG. 6). Then, the system controlling circuit 50 reads the measured-light data stored in the control data memory 52 and determines, on the basis of the read measured-light data, the amount of exposure of the subject by the shutter mechanism of the exposure controlling member 12 so that the subject optical image formed on the image pickup surface of the image pickup device 14 achieves an optimum amount of exposure. Then, the system controlling circuit 50 causes the exposure controlling circuit 42 to drive the shutter mechanism of the exposure controlling member 12 to maintain the open state of the shutter mechanism of the exposure controlling member 12 during a time interval corresponding to the determined amount of exposure, thereby exposing the image pickup surface of the image pickup device 14 to the photographed-subject optical image (Steps S62 and S63 in FIG. 6).

Then, the system controlling circuit 50 detects whether the flash flag is set which is to be set according to the result of the light measurement executed by the light measuring circuit 46 (Step S64 in FIG. 6). If the flash unit is set, the flash unit 48 is made to flash (Step S65 in FIG. 6).

If it is determined (Step S66 in FIG. 6) that the exposure time has elapsed which is set according to the determined amount of exposure for exposing the image pickup surface of the image pickup device 14 to the photographed-subject optical image by the shutter mechanism 12 of the exposure controlling member 12, the system controlling circuit 50 causes the exposure controlling circuit 42 to drive the shutter mechanism of the exposure controlling member 12 so as to close the shutter mechanism of the exposure controlling member 12, thereby completing the operation of exposing the image pickup surface of the image pickup device 14 to the photographed-subject optical image, (Step S67 in FIG. 6). Then, the system controlling circuit 50 causes the image pickup device 14 to output the charge signal stored therein, and digitizes the charge signal by means of the A/D conversion circuit 16. The data outputted from the A/D conversion circuit 16 is supplied to the image memory 24 via the memory controlling circuit 20, whereby data corresponding to an image for one photographic picture is temporarily stored in the image memory 24 (Step S68 in FIG. 6).

Figure 10:
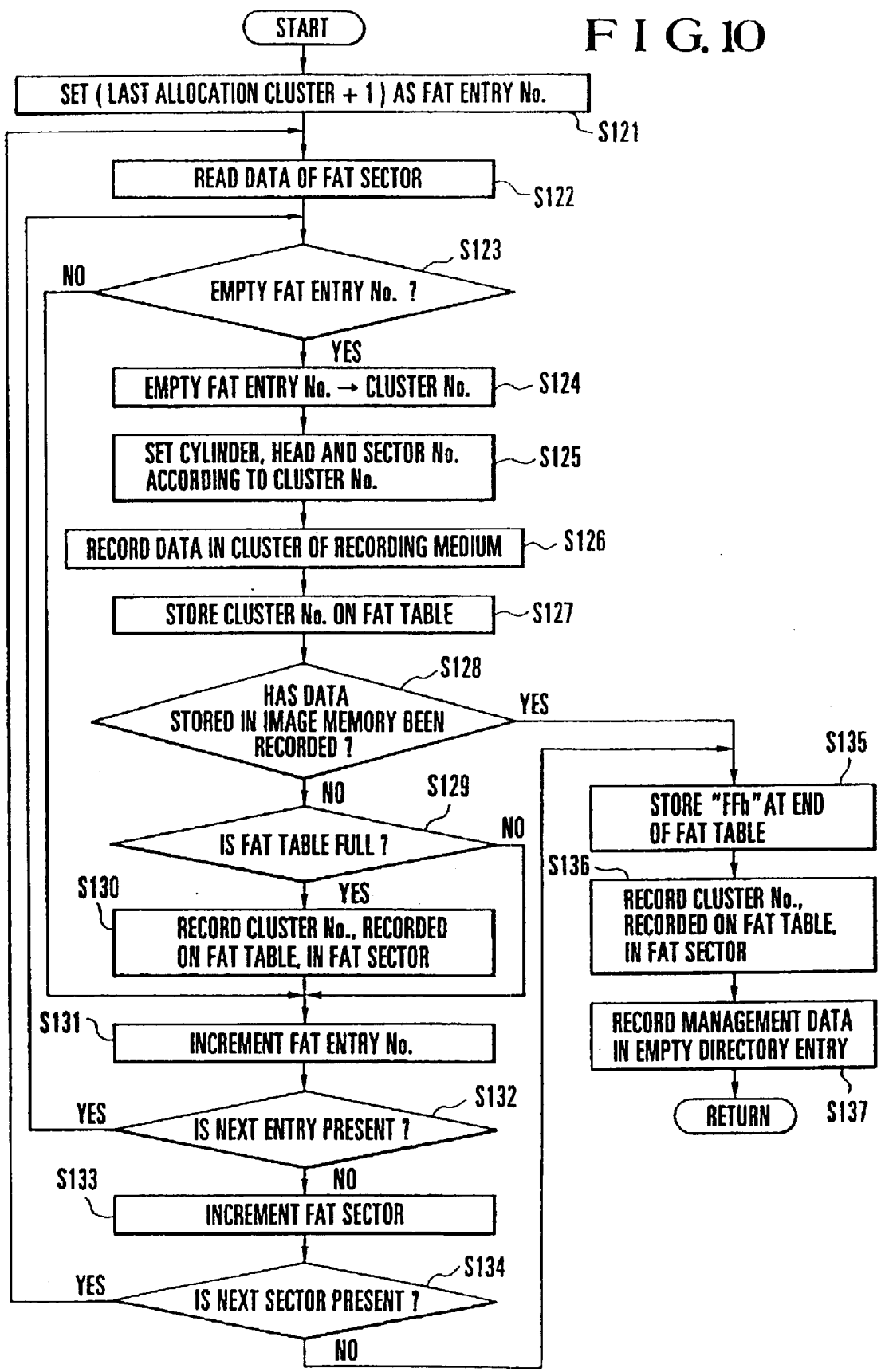
FIG. 10 is a flowchart which serves to explain in detail the recording operation routine executed in each of Step S25 of FIG. 3 and Step S25 of FIG. 12.

FIG. 10 is a flowchart which serves to explain in detail the recording routine executed in each of Step S25 of FIG. 3 and Step S25 of FIG. 12.

Referring to FIG. 10, the system controlling circuit 50 obtains a value as one of the drive parameters by adding "1" to an value indicated by the last allocation cluster stored in the register of the system controlling circuit 50 or the control data memory 52 and sets the number of a cluster corresponding to the obtained value in the register of the system controlling circuit 50 as the number of an entry of the FAT (Step S121 in FIG. 10).

Then, in Step S122 of FIG. 10, if the system controlling circuit 50 has set a portion of the data recording area of the image memory 24 to an area for storing the management data recorded in the management data recording area 102 of the recording medium 100, the data recorded in a sector which contains the number of the entry of the FAT which has been set in the register of the system controlling circuit 50 is read from the management data recording area 102 of the recording medium 100 and the read data is written from the management data recording area 102 set in the recording medium 100 into the data recording area of the image memory 24 through the interface 106 and the connector 108 of the recording medium 100 and the connector 30, the interface 26 and the memory controlling circuit 20 of the system body 200. In Step S122 of FIG. 12, if the system controlling circuit 50 has not set a portion of the data recording area of the image memory 24 to an area for storing the management data stored in the management data recording area 102 of the recording medium 100, the data recorded in a sector which contains the number of the entry of the FAT which has been set in the register of the system controlling circuit 50 is read from the management data recording area 102 of the recording medium 100 and the read data is written into the register of the system controlling circuit 50 or the control data memory 52 through the interface 106 and the connector 108 of the recording medium 100 and the connector 30 and the interface 26 of the system body 200.

Subsequently, the system controlling circuit 50 continues the retrieval operation until the number of an entry of an empty FAT indicative of a cluster in which data recording is possible is detected in the information data recording area 104 of the recording medium 100 (Step S123 in FIG. 10) or until the entry number of the FAT is incremented (Step S131 in FIG. 10) up to an entry number beyond which no entry number of the unretrieved FAT is detected in a sector from which data reading is being performed (Step S132 in FIG. 10).

If no entry number of the unretrieved FAT is detected in the sector from which data reading is being performed (Step S132 in FIG. 10), the number of the sector is incremented (Step S133 in FIG. 10). Thus, the retrieval operation is continued until the number of the last sector in the FAT from which data reading is being performed is reached (Step S134 in FIG. 10).

If the number of the entry of the empty FAT is detected in Step S123, the system controlling circuit 50 sets the number of the number of the detected empty FAT in the register of the system controlling circuit 50 as the number of a cluster (Step S124 in FIG. 10). If the recording medium 100 is a hard disk, the system controlling circuit 50 obtains a cylinder number, a head number and a sector number all of which correspond to the number of the cluster set in the register, and sets them in the interface 106 of the recording medium 100 (Step S125 in FIG. 10). Then, the image data stored in the image memory 24 is read by the memory controlling circuit 20, and the read image data is recorded in the cluster within the information data recording area 104 of the recording medium 100 which cluster corresponds to the cylinder number, the head number and the sector number all of which have been set in the interface 106 by the system controlling circuit 50, through the interface 26 and the connector 30 of the system body 200 and the connector 108 and the interface 106 of the recording medium 100 (Step S126 in FIG. 10).

In Step S127 of FIG. 10, if the system controlling circuit 50 has set a portion of the data recording area of the image memory 24 to an area for storing the management data recorded in the management data recording area 102 of the recording medium 100, the number of the cluster in the information data recording area 104 of the recording medium 100 in which the image data is recorded is stored on the FAT table provided in the data recording area which has been set as the management data storing area. Also, in Step S127 of FIG. 10, if the system controlling circuit 50 has not set a portion of the data recording area of the image memory 24 to an area for storing the management data recorded in the management data recording area 102 of the recording medium 100, the number of the cluster in the information data recording area 104 of the recording medium 100 in which the image data is recorded is stored on the FAT table provided in the register of the system controlling circuit 50 or the control data memory 52.

The above-described operation is continued until all image data stored in the image memory 24 are read and recorded in the recording medium 100 (Step S128 in FIG. 10).

If the data is fully stored on the FAT table (Step S129 in FIG. 10), a sequence of cluster numbers indicated by the data stored on the FAT table constitutes the values of a FAT chain to be written into a FAT entry, and the system controlling circuit 50 performs the following recording operations. If the system controlling circuit 50 has set a portion of the data recording area of the image memory 24 to an area for storing the management data recorded in the management data recording area 102 of the recording medium 100, the data stored on the FAT table provided in the data recording area which has been set as the area for storing the management data is recorded in the corresponding FAT sector in the management data recording area 102 of the recording medium 100, through the memory controlling circuit 20, the interface 26 and the connector 30 of the system body 200 and the connector 108 and the interface 106 of the recording medium 100. Also, if the system controlling circuit 50 has not set a portion of the data recording area of the image memory 24 to an area for storing the management data recorded in the management data recording area 102 of the recording medium 100, the data stored on the FAT table provided in the register of the system controlling circuit 50 or the control data memory 52 is recorded on the corresponding FAT sector through the interface 26 and the connector 30 of the system body 200 and the connector 108 and the interface 106 of the recording medium 100 (Step S130 in FIG. 10).

Then, if all the image data stored in the image memory 24 are read (Step S128 in FIG. 10), data "FFh" indicative of the end cluster of the FAT chain is written to the end of the FAT table (Step S135 in FIG. 10). Then, data indicative of the sequence of the cluster numbers stored on the FAT table are recorded in the corresponding FAT sector in the management data recording area 102 of the recording medium 100 as data indicative of the values of the numbers of FAT entries (Step S136 in FIG. 10). Then, the system controlling circuit 50 obtains management data corresponding to the image data recorded in the information data recording area 104 of the recording medium 100, and records the obtained management data in an empty directory entry in the management data recording area 102 of the recording medium 100 through the interface 26, the connector 30 of the system body 200 and the connector 108 and the interface 106 of the recording medium 100 (Step S137 in FIG. 10). The process returns to the main operating routine.

Figure 7:
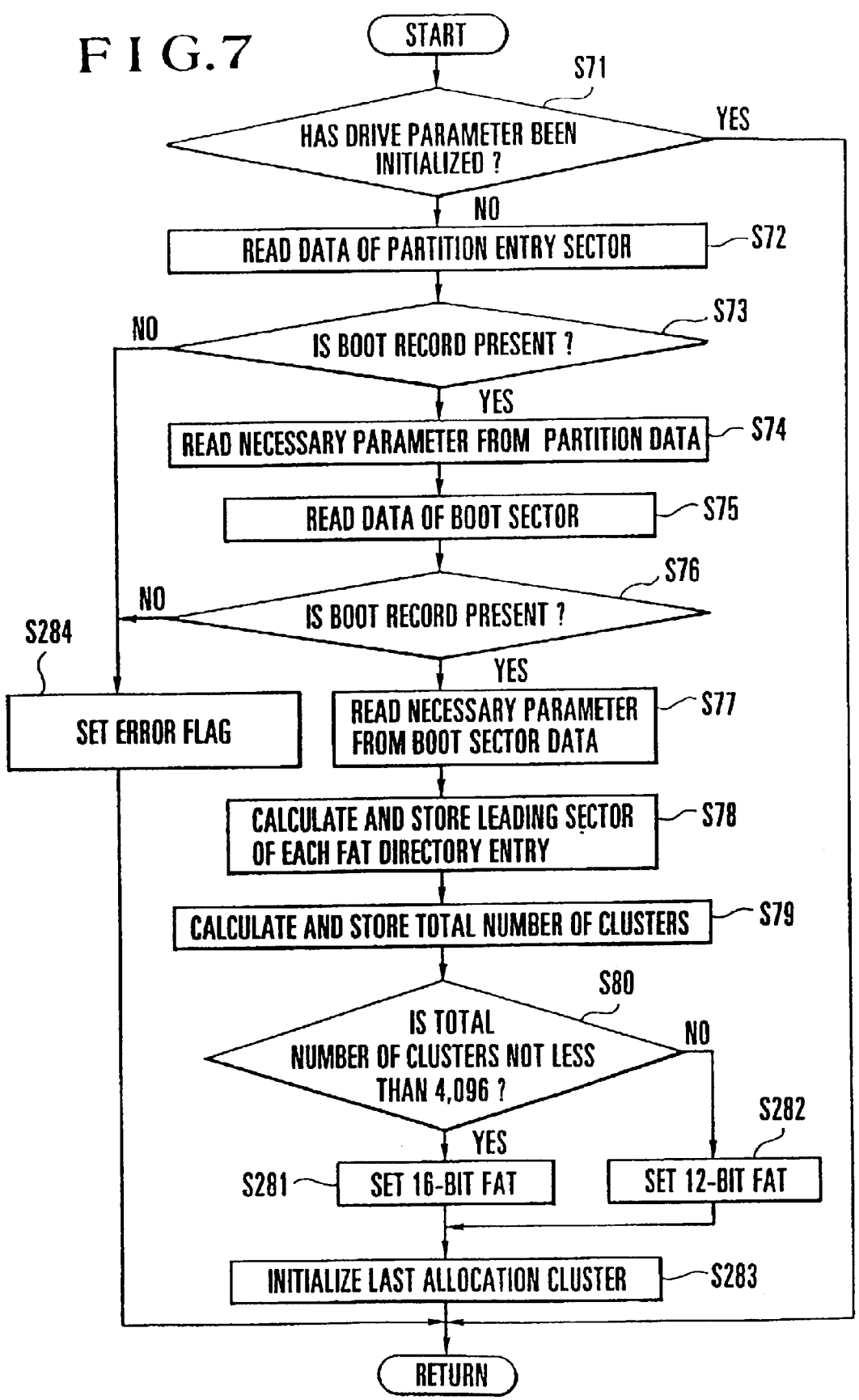
FIG. 7 is a flowchart which serves to explain in detail the drive-parameter initializing operation routine executed in Step S41 of FIG. 4.

FIG. 7 is a flowchart which serves to explain in detail the drive-parameter initializing routine executed in Step S41 of FIG. 4.

Referring to FIG. 7, if the system controlling circuit 50 has set a portion of the data recording area of the image memory 24 to an area for storing the management data recorded in the management data recording area 102 of the recording medium 100, the system controlling circuit 50 reads the management data indicative of various parameters, which are recorded in the management data recording area 102 of the recording medium 100, and writes the read management data into the data recording area set in the image memory 24 through the interface 106 and the connector 108 of the recording medium 100 and the connector 30, the interface 26 and the memory controlling circuit 20 of the system body 200. If the system controlling circuit 50 has not set a portion of the data recording area of the image memory 24 to an area for storing the management data recorded in the management data recording area 102 of the recording medium 100, the system controlling circuit 50 reads the management data indicative of various parameters, which are recorded in the management data recording area 102 of the recording medium 100, and writes the read management data into the register of the system controlling circuit 50 or the control data memory 52 through the interface 106 and the connector 108 of the recording medium 100 and the connector 30 and the interface 26 of the system body 200. In the above-described manner, the system controlling circuit 50 initializes the drive parameters which are used in performing data recording on the recording medium 100. However, if no initialization of the drive parameters has yet been completed (Step S71 in FIG. 7), the system controlling circuit 50 reads, from the management data recording area 102 of the recording medium 100, data recorded in a partition entry sector which data contains partition information indicative of the configuration of the management data recording area 102 and the information data recording area 104 of the recording medium 100, and writes the read data into the data recording area set in the image memory 24 or into the register of the system controlling circuit 50 or the control data memory 52 (Step S72 in FIG. 7).

Then, if it is confirmed that a boot record indicating that the data recorded in the partition entry sector represents correct information is present (Step S73 in FIG. 7), the system controlling circuit 50 writes the necessary parameters, which are selected from the partition data contained in the data read from the partition entry sector, into the data recording area set in the image memory 24 or into the register of the system controlling circuit 50 or the control data memory 52 (Step S74 in FIG. 7).

Then, on the basis of the detected parameters, the system controlling circuit 50 reads, from the management data recording area 102 of the recording medium 100, data recorded in a boot sector which data contains information indicative of the detailed configuration of the management data recording area 102 and the information data recording area 104 of the recording medium 100, and writes the read data into the data recording area set in the image memory 24 or into the register of the system controlling circuit 50 or the control data memory 52 (Step S75 in FIG. 7). If it is confirmed that a boot record indicating that the data recorded in the boot sector represents correct information is present (Step S76 in FIG. 7), the system controlling circuit 50 writes the necessary parameters, which are selected from the data read from the boot sector, into the data recording area set in the image memory 24 or into the register of the system controlling circuit 50 or the control data memory 52 (Step S77 in FIG. 7).

Then, the system controlling circuit 50 obtains, through a computation, the leading sector of the FAT recorded in the management data recording area 102, the leading sector of each of the directory entries, and the number of the leading sector of the data recorded in the information data recording area 104, and the like, and writes the obtained data into the data recording area set in the image memory 24 or into the register of the system controlling circuit 50 or the control data memory 52 (Step S78 in FIG. 7). Further, the system controlling circuit 50 obtains, through a computation, the number of clusters each of which corresponds to the unit of use of the information data recording area 104, and writes the obtained number into the data recording area set in the image memory 24 or into the register of the system controlling circuit 50 or the control data memory 52 (Step S79 in FIG. 7).

If the total number of the calculated and written clusters is not less than 4,096, the system controlling circuit 50 sets a 16-bit FAT so that the 16-bit FAT can be used (Steps S80 and S281 in FIG. 7). If the total number of the calculated and written clusters is less than 4,096, the system controlling circuit 50 sets a 12-bit FAT so that the 12-bit FAT can be used (Steps S80 and S282 in FIG. 7). Then, the system controlling circuit 50 initializes the last allocation cluster indicative of the number of a cluster in which the last data is recorded (Step S283 in FIG. 7). Then, the system controlling circuit 50 brings the drive parameter initializing routine to an end and returns the process to the main operating routine.

If it is not confirmed in Step S73 or S76 that a boot record is present in the data recorded in the partition entry sector or the boot sector, the system controlling circuit 50 sets an error flag (Step S284 in FIG. 7). Then, the system controlling circuit 50 brings the drive parameter initializing routine to an end and returns the process to the main operating routine.

Figure 8:
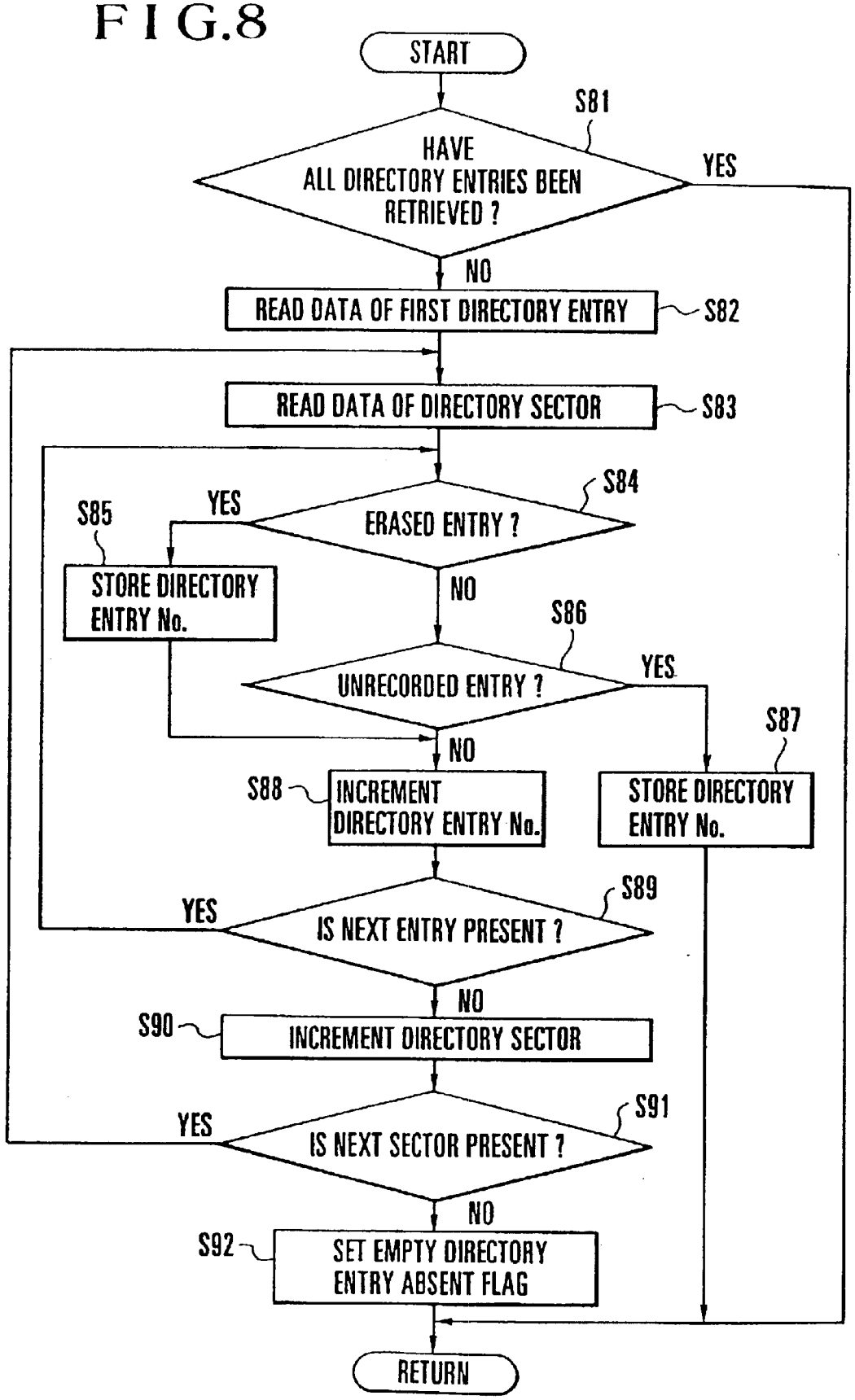
FIG. 8 is a flowchart which serves to explain in detail the directory entry retrieval operation routine executed in Step S43 of FIG. 4.

FIG. 8 is a flowchart which serves to explain in detail the directory entry retrieval routine executed in Step S43 of FIG. 4.

Referring to FIG. 8, if the system controlling circuit 50 has set a portion of the data recording area of the image memory 24 to an area for storing the management data recorded in the management data recording area 102 of the recording medium 100, the system controlling circuit 50 reads data indicative of the directory entries, which data are recorded in the management data recording area 102 of the recording medium 100, and writes the read data into the data recording area set in the image memory 24 through the interface 106 and the connector 108 of the recording medium 100 and the connector 30, the interface 26 and the memory controlling circuit 20 of the system body 200. If the system controlling circuit 50 has not set a portion of the data recording area of the image memory 24 to an area for storing the management data recorded in the management data recording area 102 of the recording medium 100, the system controlling circuit 50 reads data indicative of the directory entries, which data are recorded in the management data recording area 102 of the recording medium 100, and writes the read data into the register of the system controlling circuit 50 or the control data memory 52 through the interface 106 and the connector 108 of the recording medium 100 and the connector 30 and the interface 26 of the system body 200. In the above-described manner, the system controlling circuit 50 performing retrieval from the data indicative of the directory entries. However, if the operation of performing retrieval from the data indicative of the directory entries has not yet been completed (Step S81 in FIG. 8), the system controlling circuit 50 sets data indicative of the number of the first directory entry into the register of the system controlling circuit 50 (Step S82 in FIG. 8). Then, the system controlling circuit 50 reads the data recorded in a sector containing the number of the directory entry set in the register of the system controlling circuit 50, from among the data recorded in the management data recording area 102 of the recording medium 100 (Step S83 in FIG. 8). If a directory entry corresponding to the number set in the register of the system controlling circuit 50 shows an attribute indicating that data is erased (Step S84 in FIG. 8), the system controlling circuit 50 writes data indicative of the number of the directory entry into the data recording area set in the image memory 24 or into the register of the system controlling circuit 50 or the control data memory 52 (Step S85 in FIG. 8).

Then, until a directory entry showing an attribute indicating that no data is recorded is detected (Step S86 in FIG. 8), the number of the directory entry is incremented (Step S88 in FIG. 8). The retrieval operation is continued until the number of an unretrieved directory entry is not detected in the sector from which data reading is being performed (Step S89 in FIG. 8).

Then, if the number of an unretrieved directory entry is not detected in the sector from which data reading is being performed (Step S89 in FIG. 8), the number of the sector is incremented (Step S90 in FIG. 8). The retrieval operation is continued until the number of the sector of a directory entry from which to read data is not detected (Step S91 in FIG. 8). If the number of the sector of a directory entry from which to read data is not detected (Step S91 in FIG. 8), the system controlling circuit 50 writes an empty directory entry absent flag into the data recording area set in the image memory 24 or into the register of the system controlling circuit 50 or the control data memory 52 (Step S92 in FIG. 8). The system controlling circuit 50 brings the directory entry retrieval routine to an end and returns the process to the main operating routine.

In Step S86, if a directory entry indicative of an attribute indicating that no data is recorded is detected, the system controlling circuit 50 writes data indicative of the number of the directory entry into the data recording area set in the image memory 24 or into the register of the system controlling circuit 50 or the control data memory 52 (Step S87 in FIG. 8). Then, the system controlling circuit 50 brings the directory entry retrieval routine to an end and returns the process to the main operating routine.

Figure 9:
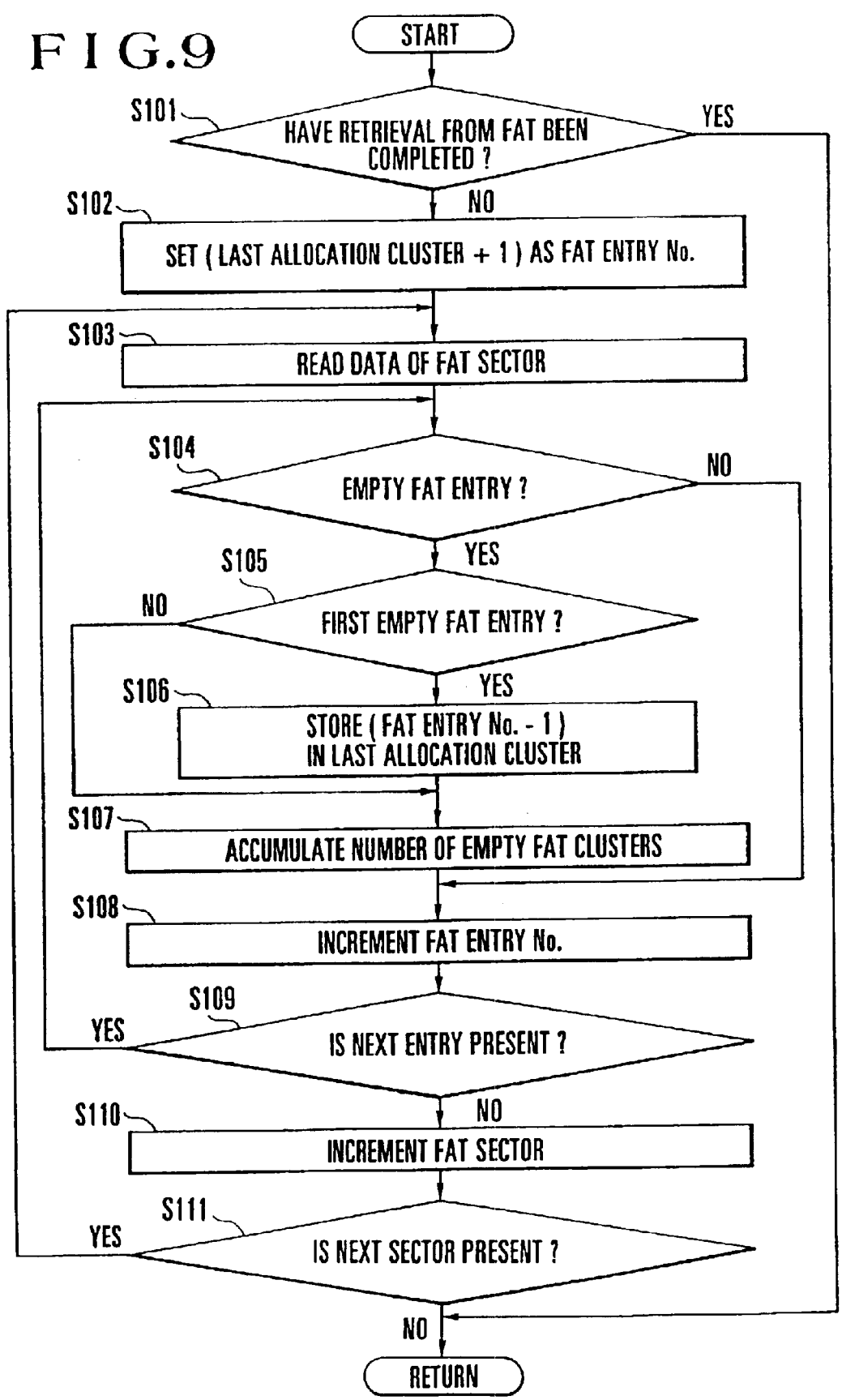
FIG. 9 is a flowchart which serves to explain in detail the file allocation table retrieval operation routine executed in Step S45 of FIG. 4.

FIG. 9 is a flowchart which serves to explain in detail the file allocation table (FAT) retrieval routine executed in Step S45 of FIG. 4.

Referring to FIG. 9, if the system controlling circuit 50 has set a portion of the data recording area of the image memory 24 to an area for storing the management data recorded in the management data recording area 102 of the recording medium 100, the data indicative of the FAT recorded in the management data recording area 102 of the recording medium 100 is read and the read data is written into the data recording area set in the image memory 24 through the interface 106 and the connector 108 of the recording medium 100 and the connector 30, the interface 26 and the memory controlling circuit 20 of the system body 200. If the system controlling circuit 50 has not set a portion of the data recording area of the image memory 24 to an area for storing the management data stored in the management data recording area 102 of the recording medium 100, the data indicative of the FAT recorded in the management data recording area 102 of the recording medium 100 is read and the read data is written into the register of the system controlling circuit 50 or the control data memory 52 through the interface 106 and the connector 108 of the recording medium 100 and the connector 30 and the interface 26 of the system body 200. In the above-described manner, the system controlling circuit 50 performs retrieval of the data indicative of the FAT. If no retrieval of the data indicative of the FAT has yet been completed (Step S101 in FIG. 9), the system controlling circuit 50 sets, as one of the drive parameters, a cluster number corresponding to a value obtained by adding "1" to a value indicated by the last allocation cluster, which cluster number is stored in the data recording area set in the image memory 24 or in the register of the system controlling circuit 50 or the control data memory 52, in the data recording area set in the image memory 24 or in the register of the system controlling circuit 50 or the control data memory 52 (Step S102 in FIG. 9). The data recorded in the sector which contains the cluster corresponding to the set number is read from the management data recording area 102 of the recording medium 100 (Step S103 in FIG. 9).

Then, if the number of an entry of an empty FAT which indicates a cluster in which data recording is possible is detected in the information data recording area 104 of the recording medium 100 (Step S104 in FIG. 9) and, further, if the detected number of the entry of the empty FAT corresponds to the first detected entry number (Step S105 in FIG. 9), the system controlling circuit 50 stores, as the last allocation cluster, the number of the entry of the FAT immediately before the detected number of the entry of the empty FAT in the data recording area set in the image memory 24 or in the register of the system controlling circuit 50 or the control data memory 52 (Step S106 in FIG. 9). Accordingly, it is possible to detect the number of the next cluster in which to record data, without newly performing retrieval.

Each time the entry of an empty FAT is detected, the system controlling circuit 50 accumulates the number of empty clusters (Step S107 in FIG. 9), whereby it is possible to detect the amount of data recordable in the information data recording area 104 of the recording medium 100, without newly performing retrieval.

Then, the system controlling circuit 50 increments the entry number of the FAT (Step S108 in FIG. 9), and continues the retrieval until no entry number of an unretrieved FAT is detected in the sector from which data reading is being performed (Step S109 in FIG. 9).

If no entry number of an unretrieved FAT is detected in the sector from which data reading is being performed (Step S109 in FIG. 9), the number of the sector is incremented (Step S110 in FIG. 9) and the retrieval operation is continued until the number of the sector of a FAT from to read data is not detected (Step S111 in FIG. 9). If the number of the sector of the FAT is not detected (Step S111 in FIG. 9), the system controlling circuit 50 brings the FAT entry retrieval routine to an end and returns the process to the main operating routine.

It is to be noted that, in the system according to either of the first and second embodiments, the recording medium 100 is not limited to a memory card or a hard disk unit, and may also be a micro DAT (digital audio tape) unit, an optomagneto disk unit, an optical disk unit or the like. In this case as well, it is possible to achieve advantages similar to those of the first and second embodiments.

In the system according to either of the first and second embodiments, the recording medium 100 may also be a composite recording medium in which a memory card and a hard disk unit are integrally assembled. The composite recording medium may also removably include the memory card or the hard disk unit so that the memory card or the hard disk unit can be arbitrarily connected to or separated from the body of the composite recording medium. Of course, the composite recording medium may be composed of two or more kinds of recording media selected from among the memory card, the hard disk unit, the micro DAT, the optomagneto disk unit, the optical disk unit and the like.

In the above description of the first and second embodiments, reference has been made to the arrangement in which the photographic optical system 10, such as the memory card or the hard disk unit, is removably connected to the system body 200 so that the photographic optical system 10 can be arbitrarily connected to and separated from the system body 200. However, two or more kinds of recording media may be connectable to the system body 200, or two or more kinds of recording media may be fixed to the system body 200. Otherwise, one of two or more kinds of recording media may be fixed to the system body 200, while another kind of recording medium may be removably connected to the system body 200 so that it can be arbitrarily connected to and separated from the system body 200.

As is apparent from the above description, in the electronic still video system according to either of the first and second embodiments, a portion of the data recording area of an image memory in which image data to be temporarily recorded can be set to an area used for storing management data, it is possible to record an image signal containing a large amount of information on a recording medium by means of a simple arrangement without decreasing the speed of recording, whereby it is possible to easily achieve reductions in the size, weight and cost of the system apparatus.

As is apparent from the above description, in accordance with either of the first and second embodiments, it is possible to provide an information signal processing apparatus which is capable of recording an image signal containing a large amount of information on a recording medium by means of a simple arrangement without decreasing the speed of recording, and which can be easily reduced in size, weight and cost.

Figure 13:
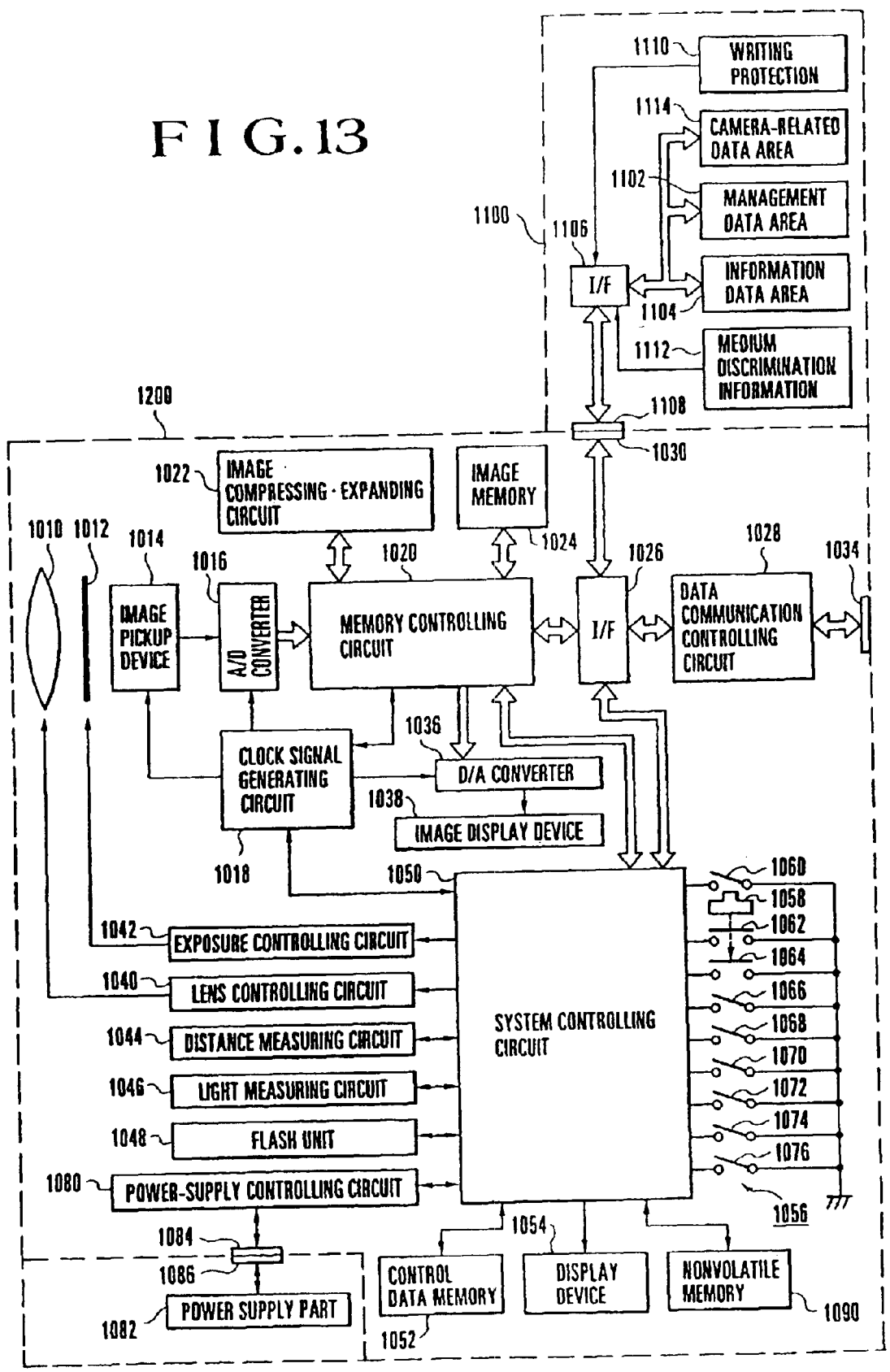
FIG. 13 is a block diagram schematically showing the arrangement of an electronic still video system to which the present invention is applied as a third embodiment thereof.

FIG. 13 is a block diagram schematically showing the arrangement of an electronic still video system to which the present invention is applied as a third embodiment thereof.

The electronic still video system shown in FIG. 13 includes a photographic optical system 1010 composed of a photographic lens, an exposure controlling member 1012 made up of a diaphragm mechanism, a shutter mechanism and associated elements, an image pickup device 1014 for converting a photographic optical image formed by the photographic optical system 1010 and the exposure controlling member 1012 into an image signal of electrical-signal form, an analog/digital (A/D) conversion circuit 1016 for digitizing an analog image signal outputted from the image pickup device 1014 and outputting image data, and a clock signal generating circuit 1018 for supplying various signals, such as a clock signal and a control signal, to the image pickup device 1014, the A/D conversion circuit 1016 and a memory controlling circuit 1020 which will be described later. The clock signal generating circuit 1018 is controlled by the memory controlling circuit 1020 as well as a system controlling circuit 1050 which will be described later.

The electronic still video system shown in FIG. 13 also includes an image compressing·expanding circuit 1022 for compressing or expanding image data by a compression/expansion method such as adaptive discrete cosine transform (ADCT), and an image memory 1024.

The memory controlling circuit 1020 is provided for controlling the clock signal generating circuit 1018, the image compressing-expanding circuit 1022 and the image memory 1024, and the image data outputted from the A/D conversion circuit 1016 is written into the image memory 1024 by the memory controlling circuit 1020.

In the process of compressing the image data, the image data which is written into the image memory 1024 in the above-described manner is read therefrom and the read image data is compressed by the image compressing-expanding circuit 1022. The compressed image data is written into the image memory 1024. In the process of expanding the image data, the compressed image data which is written into the image memory 1024 in the above-described manner is read therefrom and the read image data is expanded by the image compressing-expanding circuit 1022. The expanded image data is written into the image memory 1024.

The electronic still video system also includes a D/A converter 1036 and an image display device 1038 such as an electronic viewfinder, and the image data stored in the image memory 1024 is read by the memory controlling circuit 1020, and the read image data is converted into analog form by the D/A converter 1036 to form an image signal. The image signal can be visually displayed on the image display device 1038.

Although, in the third embodiment, the D/A converter 1036 and the image display device 1038 are incorporated in the system body 1200, the D/A converter 1036 and the image display device 1038 may be prepared as separate units which is removably attachable to the system body 1200. The image display device 1038 may be prepared as different kinds of display devices, such as high- and low-resolution display devices or color and monochrome display devices, which are selectively removably attachable to the system body 1200.

The electronic still video system also includes an interface 1026 for establishing communication with a recording medium 1100 (to be described later), such as a memory card or a hard disk unit, or with an external device, and a data communication controlling circuit 1028 for controlling communication of data with the external device or a communication line. The data communication controlling circuit 1028 is arranged to perform data communication control, conversion or restoration of data, or modulation or demodulation of data in accordance with a predetermined program, according to the kind of a connected external device or the protocol of a connected communication line.

The electronic still video system also includes a connector 1030 for permitting exchange of data or a control signal with the recording medium 1100, such as a memory card or a hard disk unit, and for permitting supply of electric power to the recording medium 1100, and a connector 1034 for permitting exchange of data or a control signal with the external device or the communication line. Data can be communicated with the external device directly or through the communication line by using the connector 1034.

If the recording medium 1100 is connected to the connector 1030, image data recorded in the recording medium 1100 can be read out and transmitted to the external device through the connector 1030, the interface 1026, the data communication controlling circuit 1028 and the connector 1034. If the recording medium 1100 is not connected to the connector 1030, image data stored in the image memory 1024 can be read out and transmitted to the external device through the memory controlling circuit 1020, the interface 1026, the data communication controlling circuit 1028 and the connector 1034.

Each of the connectors 1030 and 1034 is arranged so that transmission and reception of data or a control signal can be performed not only by a communication method using an electrical signal but also by mechanical, optical, acoustic or various other methods.

The shown electronic still video system also includes a lens controlling circuit 1040 for controlling the movement of a focusing lens provided in the photographic optical system 1010, an exposure controlling circuit 1042 for controlling a diaphragm mechanism and a shutter mechanism which are provided in the exposure controlling member 1012, a distance measuring circuit 1044 for measuring the distance to a subject, a light measuring circuit 1046 for measuring the luminance of the subject, and a flash unit 1048 for illuminating the subject.

The shown electronic still video system also includes the system controlling circuit 1050 for controlling the operation of the entire system, a control data memory 1052 in which are stored various constant data, various variable data, operating programs and the like for use in the control operation of the system controlling circuit 1050, and a display device 1054, such as a liquid-crystal display, for displaying the operational state and the like of the system. The display device 1054 may be provided at a location where a use can easily perform a visual confirmation, for example, in the vicinity of a switch group 1056 which will be described later, and/or at a location in an electronic viewfinder, such as the image display device 1038, where the use can easily perform a visual confirmation.

The display device 1054 also displays contents such as the amount of power remaining in a power supply part 1082 which will be described later, a shutter speed value, an aperture speed and an exposure compensation value which are set by the exposure controlling member 1012, the execution or nonexecution of a gain-up operation for increasing the image pickup sensitivity of the image pickup device 1014, the state of the remaining memory capacity of the image memory 1024, the execution or nonexecution of compression or expansion of image data in the image compressing-expanding circuit 1022, the number of photographic pictures recorded in the recording medium 1100 or the total capacity of the photographic pictures recorded in the recording medium 1100, the remaining number of photographic pictures recordable in the recording medium 1100 or the remaining capacity of the recording medium 1100 which is capable of recording photographic pictures. If the display device 1054 is provided not only at the location where the use can easily perform a visual confirmation, for example, in the vicinity of the switch group 1056, but also at the location in the electronic viewfinder, such as the image display device 1038, where the use can easily perform a visual confirmation, both the display devices may be arranged to display different kinds of contents at different display timings.

The shown electronic still video system also includes the switch group 1056 which is operated to input various operational instructions into the system controlling circuit 1050. The switch group 1056 includes, for example, a main switch 1060 for instructing the system to operate, a distance-light measuring switch 1062 arranged to be closed by a first stroke of a two-stroke release switch 1058 to instruct the distance measuring circuit 1044 to start a distance measuring operation as well as to instruct the light measuring circuit 1046 to start a light measuring operation, a recording starting switch 1064 arranged to be closed by a second stroke of the two-stoke release switch 1058 to input an instruction to start recording a picked-up image signal corresponding to a photographed subject image in the recording medium 1100, such as the memory card or the hard disk unit, a shooting-recording-mode selecting switch 1066 for selecting any recording mode from among the single-shooting recording (S) mode for executing photography and recording a field or frame image signal for one picture, the continuous-shooting recording (C) mode for continuously executing photography and recording field or frame image signals for a plurality of pictures, and a self-timer photography recording mode, a recording-condition setting switch 1068 for selecting various setting conditions associated with an image signal recording operation, such as the number of photographic pictures to be recorded as image signals, the discrimination between frame recording and field recording, the aspect ratio of an image signal obtained by photography, the pixel arrangement of an image obtained by photography, a data compression or expansion method, and the compression or expansion ratio at which data is compressed or expanded by the data compression or expansion method, an erase mode selecting switch 1070 for selecting an erase mode, an erasing operation starting switch 1072 for inputting an instruction to start an erasing operation, a transmission mode selecting switch 1074 for selecting a transmission mode of data, and a transmitting operation starting switch 1076 for inputting an instruction to start a data transmitting operation.

The electronic still video system also includes a power-supply controlling circuit 1080 which is made up of constituent elements, such as a detecting circuit for detecting the state of supply of electric power from the power supply part 1082 which will be described later, a DC-DC converter for converting a DC voltage supplied from the power supply part 1082 into a voltage suitable for application to each part, and a switch for selecting a circuit block to be supplied with the electric power. The power-supply controlling circuit 1080 serves to detect whether the power supply part 1082 is attached to the body of the electronic still video system, the kind of the attached power supply part 1082 or, if the power supply part 1082 is formed by a battery, the amount of power remaining in the attached battery and so on. On the basis of the result of the detection and an instruction supplied from the system controlling circuit 1050, the power supply part 1082 controls the DC-DC converter and supplies the required amount of electric power to each part at the required time interval. The power supply part 1082 is made from, for example, a rechargeable secondary battery. Connectors 1084 and 1086 serve to provide connection between the power supply part 1082 and the body of the electronic still video system.

The electronic still video system also includes a nonvolatile memory 1090, such as an EEPROM, which is electrically erasable and recordable.

The system controlling circuit 1050 causes the lens controlling circuit 1040 to control the movement of the focusing lens of the photographic optical system 1010 on the basis of a measurement result provided by the distance measuring circuit 1044, thereby bringing the photographic optical system 1010 into an in-focus state. Also, the system controlling circuit 1050 causes the exposure controlling circuit 1042 to execute exposure control using the exposure controlling member 1012 so that a subject optical image formed on the image pickup surface of the image pickup device 1014 achieves an optimum amount of exposure.

The recording medium 1100 has a management data recording area 1102, an information data recording area 1104, and a writing protection information recording area 1110 for recording writing protection (writing inhibition) information relative to a camera-related data recording area 1114. Writing and reading of the writing protection information are performed in such a manner that writing and reading of writing protection data from and to the outside are executed through an interface 1106 and a connector 1108.

The recording medium 1100 further has a recording-medium discrimination information recording area 1112 in which data indicative of recording-medium discrimination information representative of the kind, characteristics and the like of the recording medium 1100 are recorded. The system controlling circuit 1050 which will be described later is arranged to read the data recorded in the recording-medium discrimination information recording area 1112 through the interface 106 and the connector 108, and detects the kind and characteristics of the recording medium 1100 connected to the connector 1030 on the basis of information indicated by the read data.

The interface 1106 includes constituent elements, such as a control circuit such as a CPU or an MPU, a nonvolatile memory such as a ROM or an EEPROM, and a memory such as a RAM, and controls the operation of the recording medium 1100, such as the memory card or the hard disk unit, on the basis of a predetermined program.

The operation of the electronic still video system according to the third embodiment of the present invention will be described below with reference to the flowcharts shown in FIGS. 14, 15, 16, 17, 18 and 19.

Figure 14:
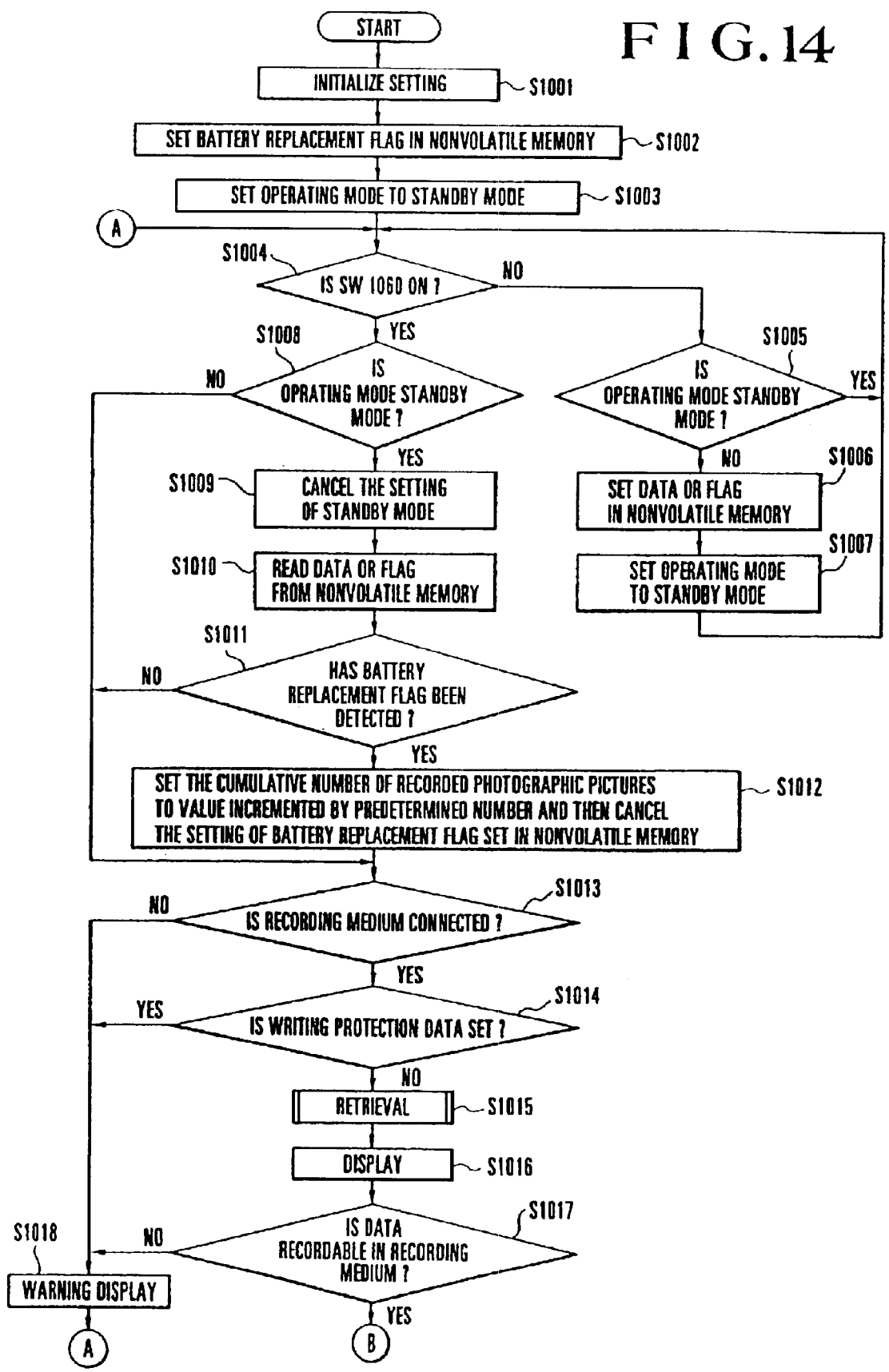
FIG. 14 is part of a flowchart showing the main operation routine of the electronic still video system shown in FIG. 13.
Figure 15:
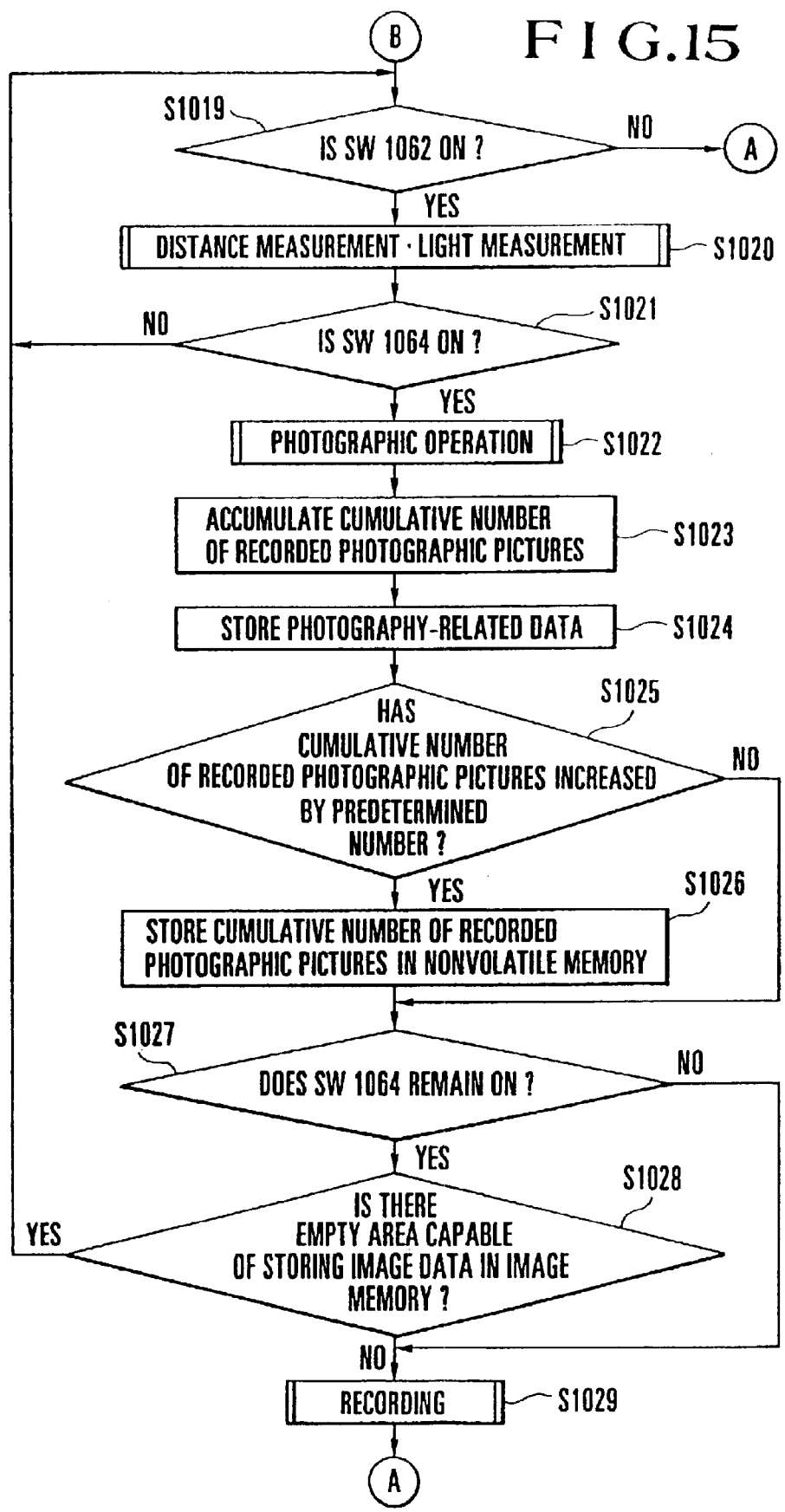
FIG. 15 is part of the flowchart showing the main operation routine of the electronic still video system shown in FIG. 13.

FIGS. 14 and 15 show in combination a flowchart of the main operating routine of the electronic still video system generally shown in FIG. 13.

Referring to FIGS. 14 and 15, when the power supply part 1082 is attached to the body of the electronic still video system, the system controlling circuit 1050 initializes various flags, control variables and the like (Step S1001 in FIG. 14), then sets a battery replacement flag in the nonvolatile memory 1090 (Step S1002 in FIG. 14), and then sets the operating mode of the system to a standby mode (Step S1003 in FIG. 14).

If the battery replacement flag is set in the nonvolatile memory 1090, the system controlling circuit 1050 determines that the battery of the power supply part 1082 has been replaced during the off state of the main switch 1060 which will be described later.

In a case where the operating mode of the system is set to the standby mode, the system controlling circuit 1050 turns off the display device 1054 as required, and causes the power-supply controlling circuit 1080 to stop the supply of electric power to each part as required, thereby preventing unnecessary power consumption.

Then, if the main switch 1060 is turned on (Step S1004 in FIG. 14) and if the operating mode of the system is the standby mode (Step S1008 in FIG. 14), the system controlling circuit 1050 cancels the standby mode (Step S1008 in FIG. 14), and causes the display device 1054 to provide display as required and causes the power-supply controlling circuit 1080 to supply the required amount of electric power to each part at the required time interval.

Then, the system controlling circuit 1050 reads, from the nonvolatile memory 1090, the required data or flag, such as the aforesaid battery replacement flag and data indicative of the cumulative number of photographic pictures recorded in the recording medium 1100 as image signals, and stores the read data or flag in the register of the system controlling circuit 1050 or the control data memory 1052 (Step S1010 in FIG. 14). If the battery replacement flag indicating that the battery of the power supply part 1082 has been replaced is detected (Step S1011 in FIG. 14), the system controlling circuit 1050 newly sets the value of the data indicative of the cumulative number of recorded photographic pictures to a value incremented by a predetermined number (for example, by one hundred pictures), and cancels the setting of the battery replacement flag in the nonvolatile memory 1090 (Step S1012 in FIG. 14).

Even if it is determined in Step S1004 that the main switch 1060 is on, if it is determined in Step S1008 that the operating mode of the system is not the standby mode or if it is determined in Step S1011 that no battery replacement flag is detected in the data or flag read from the nonvolatile memory 1090 and the battery of the power supply part 1082 has not been replaced, the process proceeds to Step S1013 which will be described later.

On the other hand, if it is determined in Step S1004 that the main switch 1060 is off, and if it is determined in Step S1005 that the operating mode of the system is not the standby mode, the system controlling circuit 1050 reads the required data or flag, such as the battery replacement flag and the data indicative of the cumulative number of photographic pictures recorded in the recording medium 1100 as image signals, from the register of the system controlling circuit 1050 or the control data memory 1052, and writes the read data or flag into the nonvolatile memory 1090 (Step S1006 in FIG. 14). After the system controlling circuit 1050 has set the operating mode of the system to the standby mode (Step S1007 in FIG. 14), the system controlling circuit 1050 returns the process to Step S1004 and waits for the main switch 1060 to be operated.

If it is determined in Step S1004 that the main switch 1060 is off, and if it is determined in Step S1005 that the operating mode of the system is the standby mode, the system controlling circuit 1050 returns the process to Step S1004 and waits for the main switch 1060 to be operated.

If it is determined (Step S1013 in FIG. 14) that the recording medium 1100, such as a memory card or a hard disk unit, is connected to the system body 1200, and if it is determined (Step S1014 in FIG. 14) that the writing protection data indicative of writing protection is set in the writing protection information recording area 1110 of the recording medium 1100 connected to the system body 1200, the process proceeds to Step S1015 of FIG. 14, where the system controlling circuit 1050 reads from the recording medium 1100 discrimination information data indicative of the kind of recording medium used as the recording medium 1100, the data-recordable capacity and the characteristics of the recording medium, as well as camera-related data, recording medium-related data, management data which were used to perform photography and create the image data recorded in the recording medium 1100. Then, the system controlling circuit 1050 performs retrieval as to the state of recording in the recording medium 1100 (Step S1015 in FIG. 14).

The retrieval operation will be described later in detail.

If it is determined (Step S1013 in FIG. 14) that the recording medium 1100 is not connected to the system body 1200 or if it is determined (Step S1014 in FIG. 14) that the writing protection data is set in the writing protection information recording area 1110, the process proceeds to Step S1018 of FIG. 14, where the system controlling circuit 1050 causes the display device 1054 to provide a warning display indicating that the recording medium 1100 is not connected to the system body 1200 or that the writing protection data is set in the writing protection information recording area 1110. Then, the process returns to Step S1004, where the system controlling circuit 1050 waits for the main switch 1060 to be operated.

Then, the system controlling circuit 1050 causes the display device 1054 to visually display the remaining recordable number of photographic pictures, the date of photography, a shooting mode, various messages and the like which are recorded in the recording medium 1100, on the basis of the aforementioned discrimination information data, camera-related data and recording medium-related data of the recording medium 1100, the management data recorded in the management data recording area 1102 of the recording medium 1100, various kinds of modes which are selectively set by the switch group 1056 and various kinds of modes which are selectively set according to the kind of the recording medium 1100 connected to the system body 1200 (Step S1016 in FIG. 14). If the recording medium 1100 is a recording medium which is unusable with the present system or if the information data recording area 1104 of the recording medium 1100 contains no empty area in which data recording is possible (Step S1017 in FIG. 14), the system controlling circuit 1050 causes the display device 1054 to provide a warning display indicating that the recording medium 1100 is a recording medium unusable with the present system or that the information data recording area 1104 of the recording medium 1100 contains no empty area in which data recording is possible (Step S1018 in FIG. 14). Then, the process returns to Step S1004, where the system controlling circuit 1050 waits for the main switch 1060 to be operated.

Then, the system controlling circuit 1050 detects the state of the distance-light measuring switch 1062. If the distance-light measuring switch 1062 is off, the process returns to Step S1004 (Step S1019 in FIG. 15). If the distance-light measuring switch 1062 is on, the system controlling circuit 1050 causes the distance measuring circuit 1044 to measure the distance to a subject and then moves the focusing lens of the photographic optical system 1010 on the basis of the result of the distance measurement executed by the distance measuring circuit 1044, thereby focusing the photographic optical system 1010 onto the subject. Further, the system controlling circuit 1050 causes the light measuring circuit 1046 to measure the luminance of the subject and, on the basis of the result of the light measurement executed by the light measuring circuit 1046, causes the exposure controlling circuit 1042 to control the diaphragm mechanism or the shutter mechanism of the exposure controlling member 1012 so that the subject optical image formed on the image pickup surface of the image pickup device 1014 achieves an optimum amount of exposure, thereby determining the amount of exposure of the subject by means of the exposure controlling member 1012 (Step S1020 in FIG. 15).

Then, the system controlling circuit 1050 detects the state of the recording starting switch 1064, and the distance measuring operation and the light measuring operation of Step S1020 are repeated until the recording starting switch 1064 is turned on (Step S1021 in FIG. 15). If it is determined that the recording starting switch 1064 is turned on, the system controlling circuit 1050 initiates a photographic operation, and causes the A/D conversion circuit 1016 to digitize an analog image signal outputted from the image pickup device 1014 and stores the obtained image data in the image memory 1024 (Step S1022 in FIG. 15).

The above-described distance measuring operation, light measuring operation and photographic operation will be described later in greater detail.

During the above-described photographic operation, each time a photographic image is recorded, the system controlling circuit 1050 counts the number of recorded photographic pictures and accumulates the count number, thereby updating data indicative of the cumulative number of the recorded photographic pictures. The system controlling circuit 1050 temporarily stores the updated data in the register of the system controlling circuit 1050 or the control data memory 1052 (Step S1023 in FIG. 15). Then, the system controlling circuit 1050 obtains photography-related data containing data indicative of a discrimination number peculiar to the recorded photographic image, from data indicative of a discrimination number peculiar to the system body 1200 and the data indicative of the cumulative number of the recorded photographic pictures, and the system controlling circuit 1050 stores the thus-obtained, photography-related data in the image memory 1024 via the memory controlling circuit 1020 (Step S1024 in FIG. 15).

The aforesaid photography-related data includes, in addition to the discrimination number peculiar to the recorded photographic image, data indicative of various information such as the class number and manufacturer's serial number of the system body 1200, the size and kind of the image pickup device 1014 provided in the system body 1200, the total number of pixels of the image pickup device 1014, the presence or absence of a color filter, the kind, configuration and characteristics of the color filter or the discrimination number thereof, the characteristics or discrimination number of an infrared cut filter, the characteristics or discrimination number of an optical low-pass filter, the class number and manufacturer's serial number of a photographic lens used for photography, the focal length, measured distance, aperture value, and shutter speed value of the photographic lens during photography, a continuous-shooting speed value selected during photography, the date and time of photography, a temperature at the time of photography, the type of white balance, a color temperature at the time of photography, the use or nonuse of a flash unit, and the class number and manufacturer's serial number of the flash unit.

Then, if the value of the data indicative of the cumulative number of the recorded photographic pictures, which is included in the photography-related data stored in the image memory 1024, has increased by a predetermined number of pictures (for example, by one hundred pictures) from the value of the data indicative of the cumulative number of the recorded photographic pictures stored in the nonvolatile memory 1090 (Step S1025 in FIG. 15), the system controlling circuit 1050 reads the data indicative of the cumulative number of the recorded photographic pictures from the register of the system controlling circuit 1050 or the control data memory 1052 together with another data and flag such as the battery replacement flag, and stores the read data in the nonvolatile memory 1090. Thus, the system controlling circuit 1050 updates the contents of the data and flag stored in the nonvolatile memory 1090 (Step S1026 in FIG. 15).

The present system may also be arranged so that, in the above-described operation, the contents of the data and the flag stored in the nonvolatile memory 1090 may be updated by reading only the data indicative of the cumulative number of the recorded photographic pictures from among the data and flag stored or set in the register of the system controlling circuit 1050 or the control data memory 1052.

On the other hand, if the value of the data indicative of the cumulative number of the recorded photographic pictures, which is included in the photography-related data stored in the image memory 1024, has not increased by the predetermined number of pictures (for example, by one hundred pictures) from the value of the data indicative of the cumulative number of the recorded photographic pictures stored in the nonvolatile memory 1090 (Step S1025 in FIG. 15), the process proceeds to Step S1027 which will be described later.

Then, if it is determined in Step S1027 that the recording starting switch 1064 remains on and that the system controlling circuit 1050 is instructed to continue a continuous-shooting operation, it is determined in Step S1028 of FIG. 15 whether the image memory 1024 has an empty area in which image data can be stored. If the image memory 1024 has an empty area in which image data can be stored, the process returns to Step S1019, and the above-described operation is repeated. On the other hand, if it is determined in Step S1027 that the recording starting switch 1064 is off and that the system controlling circuit 1050 is instructed to interrupt the continuous-shooting operation, or if it is determined in Step S1028 that since the image memory 1024 does not contain an empty area in which image data can be stored, no photographic operation can be performed, the system controlling circuit 1050 reads the image data and photography-related data stored in the image memory 1024 while storing management data, such as a FAT (file allocation table) representative of the state of use of each cluster corresponding to the unit of use of the information data recording area 1104, in a portion of the data recording area of the image memory 1024, which management data is to be recorded in the management data recording area 1102 of the recording medium 1100 together with the image data and the photography-related data. Then, the system controlling circuit 1050 records the read image data and photography-related data in the information data recording area 1104 of the recording medium 1100 through the memory controlling circuit 1020, the interface 1026, the connector 1030, the connector 1108 and the interface 1106. After that, the system controlling circuit 1050 reads the management data such as the FAT from the image memory 1024, and records the read management data in the management data recording area 1102 of the recording medium 1100 through the memory controlling circuit 1020, the interface 1026, the connector 1030, the connector 1108 and the interface 1106.

The above-described processing operation is performed on a plurality of photographic images on picture-by-picture basis, and is repeated by the number of times corresponding to the number of pictures which are respectively formed by the plurality of photographic images. When a series of processing operations comes to an end, the process returns to Step S1004 of FIG. 14, where the system controlling circuit 1050 waits for the main switch 1060 to be operated.

The aforementioned recording operation will be described below in detail.

The third embodiment has been described with reference to the example in which the contents of information indicated by the data or flag recorded in the nonvolatile memory 1090 include the data indicative of the cumulative number of the recorded photographic pictures which are respectively formed by the image signals recorded in the recording medium 1100, and the required data or flag, such as the battery replacement flag. However, the present system may also be arranged in such a manner that other data which will be described later, such as camera-related data, recording medium-related data and data indicative of the recording structure of data recorded in the recording medium 1100, may be stored in the nonvolatile memory 1090. Further, if the recording medium 1100 is a hard disk unit, data indicative of the number of start-up operations of the hard disk unit may be stored in the nonvolatile memory 1090.

If the present system is arranged in such a manner that data indicative of the recording structure of data recorded in the recording medium 1100 is stored in the nonvolatile memory 1090 as the contents of information indicated by the data or flag stored in the nonvolatile memory 1090, each time the operating mode of the system is set to the standby mode, the data indicative of the recording structure of data recorded in the recording medium 1100 is read from the register of the system controlling circuit 1050 or the control data memory 1052 and is then stored in the nonvolatile memory 1090. Each time the setting of the standby mode is cancelled, the data indicative of the recording structure of data recorded in the recording medium 1100 is read from the nonvolatile memory 1090 and is then written and stored in the register of the system controlling circuit 1050 or the control data memory 1052. According to the above-described arrangement, it is possible to record or reproduce file data on or from the recording medium 1100 without the need to start up the recording medium 1100 for the purpose of obtaining the data indicative of the recording structure of data recorded in the recording medium 1100.

If the recording medium 1100 is a hard disk unit, the data indicative of the recording structure of data recorded in the recording medium 1100 includes information such as the number of sectors required to form one track on each hard disk in the hard disk unit, the number of heads of the hard disk unit, the number of sectors required to form one cluster, the total number of clusters, position information about the leading sector of a first FAT, position information about the leading sector of a second FAT, position information about the leading sector of each directory entry, position information about the leading sector of the information data recording area 1104, a last allocation cluster indicating up to which cluster data are recorded, a next free cluster indicating from which cluster data can be recorded, the number of used clusters indicative of the number of clusters on which data are recorded, and the number of unused clusters indicative of the remaining number of recordable clusters.

The position information about each of the leading sectors includes data indicative of the cylinder number, head number, sector number and the like of the hard disk.

Figure 16:
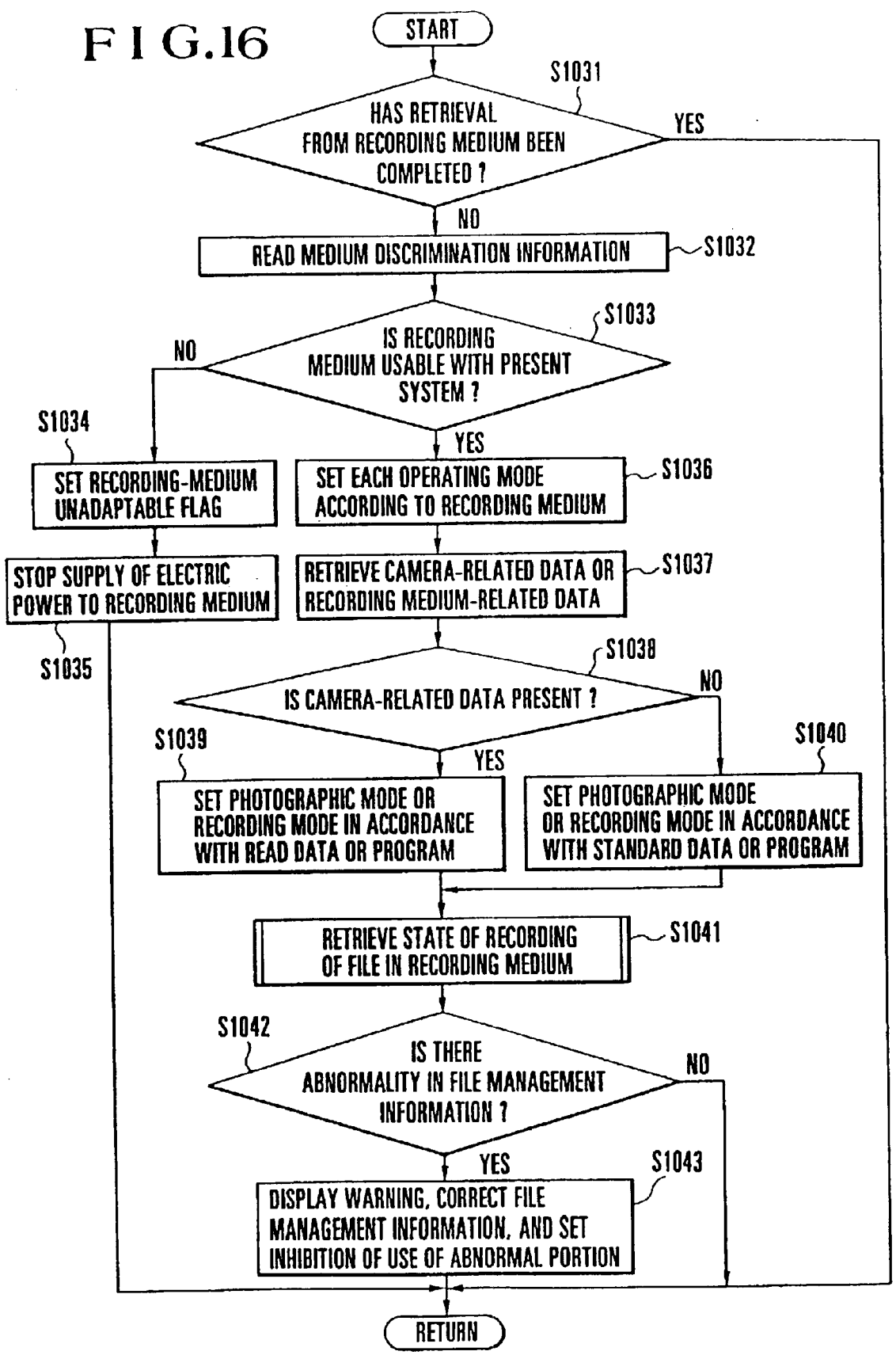
FIG. 16 is a flowchart which serves to explain in detail the retrieval operation routine executed in Step 1015 of FIG. 14.

FIG. 16 is a flowchart which serves to explain in detail the retrieval routine executed in Step S1015 of FIG. 14.

Referring to FIG. 16, if the operation of performing retrieval as to the state of recording in the recording medium 1100 has not yet been completed (Step S1031 in FIG. 16), the system controlling circuit 1050 reads data, such as the kind, characteristics, data-recordable capacity, discrimination number, and trademark usable as a discriminator, of the recording medium 1100, which are recorded in the recording-medium discrimination information recording area 1112 of the recording medium 1100, through the interface 1106, the connector 1108, the connector 1030 and the interface 1026 (Step S1032 in FIG. 16). If it is determined in Step S1033 of FIG. 16 that the recording medium 1100 connected to the system body 1200 is a recording medium which is usable with the present system, the process proceeds to Step S1036 of FIG. 16. In Step S1036, it is determined whether the recording medium 1100 is a memory card or a hard disk unit, and a check is made as to the kind of the memory card or the hard disk unit. According to the kind of the recording medium 1100, the operating modes of the respective photographing, recording, reproducing and transmitting operations are set so that transmission and reception of data between the system controlling circuit 1050 and the recording medium 1100 are optimized.

With the above-described processing operation, it is possible to optimally set the speeds of transmission and reception of data commands and the like between the system controlling circuit 1050 and the recording medium 1100 connected to the system body 1200. Particularly, it is possible to optimally set a continuous-shooting speed, the maximum recordable number of pictures and the like in the continuous-shooting recording mode.

The above-described discrimination operation of the recording medium 1100 is not limited to the above-described method in which the system controlling circuit 1050 directly reads the data recorded in the recording-medium discrimination information recording area 1112 of the recording medium 1100 and performs the aforesaid discrimination operation. For example, it is possible to adopt an arrangement in which the control circuit, such as the CPU or the MPU, which is contained in the interface 1106 within the recording medium 1100, reads such data and performs a discrimination operation and, on the basis of the result of the discrimination operation, a discrimination signal is transmitted from the control circuit, such as the CPU or the MPU, contained in the interface 1106 to the system controlling circuit 1050. It is also possible to adopt another arrangement in which, when the system controlling circuit 1050 is to read the data recorded in the recording-medium discrimination information recording area 1112 of the recording medium 1100, the data read from the recording-medium discrimination information recording area 1112 is temporarily written into a portion of the data recording area of the image memory 1024 via the memory controlling circuit 1020 and is read into the system controlling circuit 1050 via the memory controlling circuit 1020.

Of the data recorded in the recording-medium discrimination information recording area 1112, information relative to the data-recordable capacity of the recording medium 1100 includes information indicative of the total data-recordable capacity of the camera management data recording area 1114, the management data recording area 1102, the information data recording area 1104 and undefined recording areas, the data-recordable capacity of each of these areas and the recording position of each of the data recording areas. Accordingly, if a plurality of kinds of recording media having different data-recordable capacities are provided as the recording medium 1100 to be connected to the system body 1200, the system controlling circuit 1050 can recognize the total data-recordable capacity of the camera management data recording area 1114, the management data recording area 1102, the information data recording area 1104 and the undefined recording areas, the data-recordable capacity of each of these areas and the recording position of each of the data recording areas of each of the recording media.

Also, if the recording medium 1100 to be connected to the system body 1200 includes a plurality of recording media which differ from each other in kind, characteristic and data-recordable capacity, the system controlling circuit 1050 can recognize information relative to the kind, characteristics and data-recordable capacity of each of the recording media on the basis of the data recorded in the recording-medium discrimination information recording area 1112 of the recording medium 1100. Further, on the basis of the data recorded in the recording-medium discrimination information recording area 1112 of the recording medium 1100, the system controlling circuit 1050 can also recognize the camera-related date recorded in the camera-related data recording area 1114 of each of the recording media and information indicative of the recording position of the recording medium-related data.

If it is determined in Step S1033 from the data recorded in the recording-medium discrimination information recording area 1112 that, for example, the recording medium 1100 connected to the system body 1200 has a kind, a characteristic or a data-recordable capability unadaptable to the present system or a trademark or the like which can be used as a discrimination number or a discriminator unadaptable to the present system, the system controlling circuit 1050 determines that the recording medium 1100 connected to the system body 1200 is a recording medium unusable with the present system, and sets a recording-medium unadaptable flag in the register of the system controlling circuit 1050 or the control data memory 1052 (Step S1034 in FIG. 16). Then, the system controlling circuit 1050 causes the display device 1054 to provide a warning display indicating that the recording medium 1100 is a recording medium unusable with the present system, and stops the power supply part 1082 from supplying electric power to the recording medium 1100 (Step S1035 in FIG. 16).

Then, the system controlling circuit 1050 performs retrieval of camera-related data and recording medium-related data within the camera-related data recording area 1114 of the recording medium 1100 through the interface 1106, the connector 1108, the connector 1030 and the interface 1026 (Step S1037 in FIG. 16). If camera-related data or recording medium-related data is present in the camera-related data recording area 1114 (Step S1038 in FIG. 16), the system controlling circuit 1050 reads the camera-related data or the recording medium-related data from the camera-related data recording area 1114, and sets and executes a photographic mode or a recording mode in accordance with the read data or program (Step S1039 in FIG. 16).

The camera-related data include data indicative of information about the camera part of the present system, such as system discrimination data indicative of the kind and the manufacturer's serial number of the camera part, an adjustment value for balance adjustment in the camera part, an adjustment value for automatic focusing in the camera part, an adjustment value for automatic exposure in the camera part, the sensitivity variation and the compensation value of the image pickup device 1014 in the camera part, the temperature characteristics and the compensation value of each constituent part of the camera part, recording-medium discrimination data indicative of a recording medium usable with the present system, and a damaged portion of the recording medium, as well as a program for operating the system controlling circuit 1050. The recording medium-related data include data indicative of a recording-medium discrimination number peculiar to the recording medium such as the manufacturer's serial number of the recording medium 1100, and data indicative of the recording structure of data of the recording medium 1100. If the recording medium 1100 is a hard disk unit, the recording medium-related data further include data indicative of the number of start-up operations of the hard disk unit. If the recording medium 1100 is a memory card, the recording medium-related data further include data indicative of information such as the number of times of data erasure for each block of the data recording area of the memory card. In accordance with the above-described data and program, the system controlling circuit 1050 sets the numerical values and operating mode required for the operation of each part of the present system and for photographing and recording operations, and executes the required program.

Of the above-described recording medium-related data, the data indicative of the recording structure of data of the recording medium 1100 includes, if the recording medium 1100 is a hard disk unit, information such as the number of sectors required to form one track on each hard disk in the hard disk unit, the number of heads of the hard disk unit, the number of sectors required to form one cluster, the total number of clusters, position information about the leading sector of a first FAT, position information about the leading sector of a second FAT, position information about the leading sector of each directory entry, position information about the leading sector of the information data recording area 1104, a last allocation cluster indicating up to which cluster data are recorded, a next free cluster indicating from which cluster data can be recorded, the number of used clusters indicative of the number of clusters on which data are recorded, and the number of unused clusters indicative of the remaining number of recordable clusters.

The position information about each of the leading sectors includes data indicative of the cylinder number, head number, sector number and the like of the hard disk.

If it is determined in step S1038 that neither camera-related data nor recording medium-related data is present in the camera-related data recording area 1114 of the recording medium 1100, the system controlling circuit 1050 sets and executes a photographic mode or a recording mode in accordance with a standard program and data indicative of various standard values, both of which are stored in a ROM of the system controlling circuit 1050 or a ROM of the control data memory 1052 (Step S1040 in FIG. 16).

According to the above-described arrangement, the data and program required for operating the system are beforehand stored in the recording medium 1100 such as a memory card and a hard disk unit. During start-up of the system, the data and the program are read into the system controlling circuit 1050 and, during an operation of the system, the required numerical values and operating mode are set so that they can be executed.

The camera-related data and the recording medium-related data recorded in the camera-related data recording area 1114 may also be read into the system controlling circuit 1050 in such a way that the data recorded in the camera-related data recording area 1114 of the recording medium 1100 is written into a portion of the data recording area of the image memory 1024 through the interface 1106, the connector 1108, the connector 1030, the interface 1026 and the memory controlling circuit 1020 and the written data is then read into the system controlling circuit 1050 through the memory controlling circuit 1020.

Then, the system controlling circuit 1050 writes the management data recorded in the management data recording area 1102 of the recording medium 1100 into a portion of the data recording area of the image memory 1024 through the interface 1106, the connector 1108, the connector 1030, the interface 1026 and the memory controlling circuit 1020, and the written management data is then read into the memory controlling circuit 1020 through the memory controlling circuit 1020 to perform retrieval of the state of recording of files in the recording medium 1100 (Step S1041 in FIG. 16).

The file retrieving operation will be described later in greater detail.

Then, on the basis of the file retrieving operation executed in Step S1041, the system controlling circuit 1050 detects whether an abnormality is present in file management information such as a directory entry and a FAT (Step S1042 in FIG. 16). If there is no abnormality, the process returns to the main operating routine. If there is an abnormality, the system controlling circuit 1050 executes processing such as correction of the file management information, display of a warning indicative of the occurrence of the abnormality, and inhibition of use of an abnormal portion in the information data recording area 1104 (Step S1043 in FIG. 16).

The abnormality of the file management information occurs, for example, if a directory entry indicative of the leading end of the chain of clusters is not updated and hence absent in a file which normally has a structure formed by the chained clusters each constituting the recording unit of data. In this case, it will be impossible to perform retrieval from a link list indicative of the chain of the clusters and recorded in the FAT, or a file size indicated by the directory entry will differ from a file size obtained by performing retrieval from the link list indicative of the chain of the clusters and recorded in the FAT.

In the above-described case, an error occurs in data contained in either one or both of the directory entry and the link list recorded in the FAT, with the result that while the next data is being recorded or erased, the data may be destroyed.

Similarly, if part or the whole of the link list containing information recorded in the FAT and indicative of the chain of the clusters is indicated by another directory entry or if information indicated by the link list does not indicate the end of the chain of the clusters and terminates with information indicating that no data is recorded, data may be destroyed during the next data recording or erasing operation.

If the system controlling circuit 1050 detects the above-described abnormality in the file management information, the system controlling circuit 1050 provides a display indicative of a warning of the occurrence of the abnormality of the file management information and also executes processing, such as correction of file management information such as the directory entries and the link list recorded in the FAT, and setting for inhibition of use of the abnormal portion in the information data recording area 1104.

When the above-described file retrieving operation is completed, the retrieval routine is brought to an end and the process returns to the main operating routine.

Figure 17:
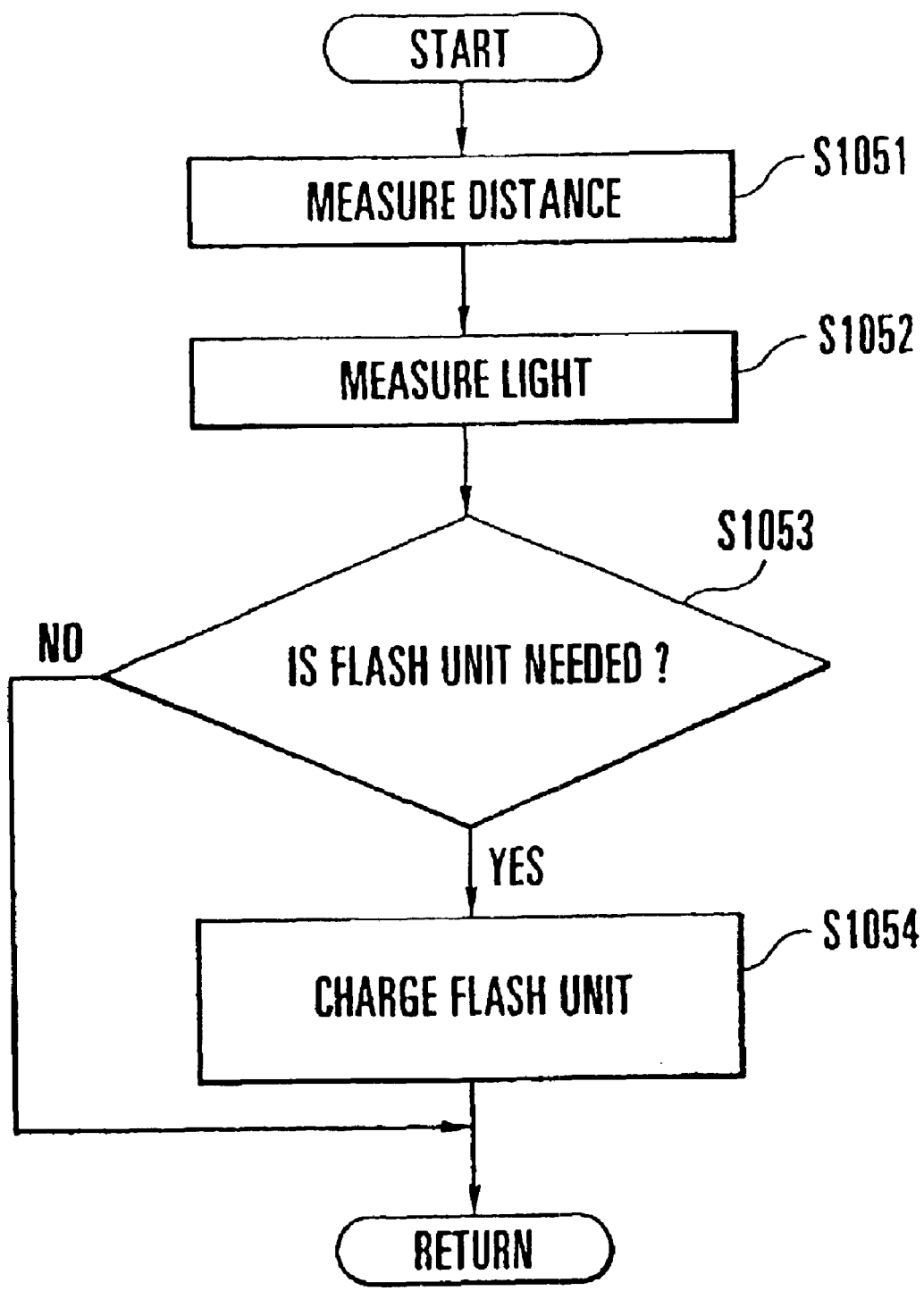
FIG. 17 is a flowchart which serves to explain in detail the distance·light measuring operation routine executed in Step S1020 of FIG. 15.

FIG. 17 is a flowchart which serves to explain in detail the distance-light measuring routine executed in Step S1020 of FIG. 15.

Referring to FIG. 17, if the distance-light measuring switch 1062 is on, the system controlling circuit 1050 measures the distance to a subject by means of the distance measuring circuit 1044, and stores measured-distance data indicative of the result of the distance measurement in the register of the system controlling circuit 1050 or the control data memory 1052 (Step S1051 in FIG. 17). Then, the system controlling circuit 1050 measures the luminance of the subject by means of the light measuring circuit 1046, and stores measured-light data indicative of the result of the light measurement in the register of the system controlling circuit 1050 or the control data memory 1052 (Step S1052 in FIG. 17).

Further, the system controlling circuit 1050 determines whether it is necessary to cause the flash unit 1048 to flash, on the basis of the result of the light measurement (Step S1053 in FIG. 17). If it is necessary to cause the flash unit 1048 to flash, the system controlling circuit 1050 sets a flash flag to start a charging operation for the flash unit 1048 (Step S1054 in FIG. 17).

Figure 18:
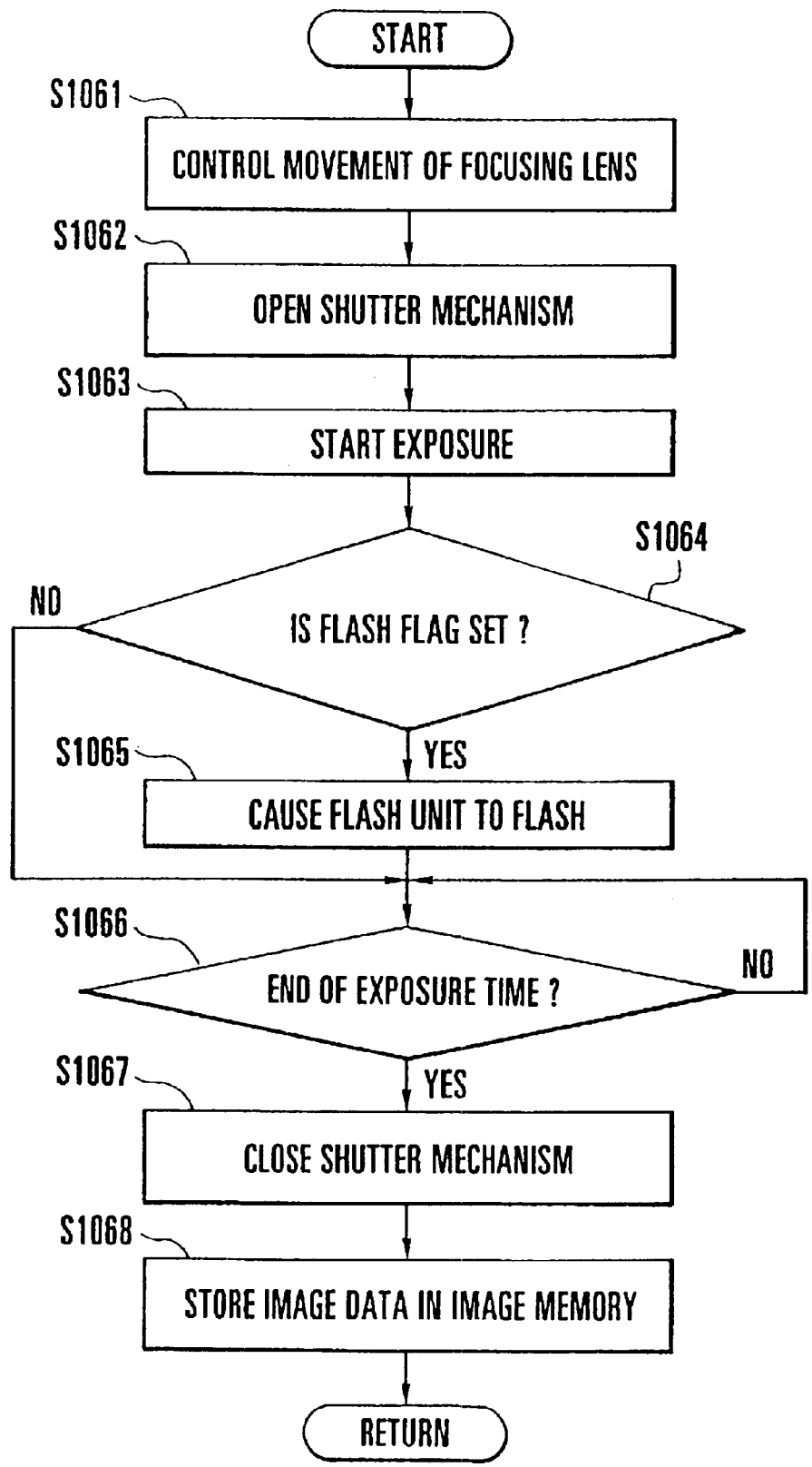
FIG. 18 is a flowchart which serves to explain in detail the photographic operation routine executed in Step S1022 of FIG. 15.

FIG. 18 is a flowchart which serves to explain in detail the photographic operation executed in Step S22 of FIG. 15.

Referring to FIG. 18, if the distance-light measuring switch 1062 is on, the system controlling circuit 1050 reads the measured-distance data stored in the register of the system controlling circuit 1050 or the control data memory 1052, and causes the lens controlling circuit 1040 to control the movement of the focusing lens of the photographic optical system 1010 on the basis of the read measured-distance data, thereby bringing the photographic optical system 1010 into the in-focus state (Step S1061 in FIG. 18). Then, the system controlling circuit 1050 reads the measured-light data stored in the register of the system controlling circuit 1050 or the control data memory 1052 and determines, on the basis of the read measured-light data, the amount of exposure of a subject image formed on the image pickup surface of the image pickup device 1014. Then, the system controlling circuit 1050 causes the exposure controlling circuit 1042 to drive the shutter mechanism of the exposure controlling member 1012 to maintain the open state of the shutter mechanism of the exposure controlling member 1012 during a time interval corresponding to the determined amount of exposure, thereby exposing the image pickup surface of the image pickup device 1014 to the photographed-subject optical image (Steps S1062 and S1063 in FIG. 18).

Then, the system controlling circuit 1050 detects whether the flash flag is set which is to be set according to the result of the light measurement executed by the light measuring circuit 1046 (Step S1064 in FIG. 18). If the flash unit is set, the flash unit 1048 is made to flash (Step S1065 in FIG. 18).

If it is determined (Step S1066 in FIG. 18) that the exposure time has elapsed which is set according to the determined amount of exposure for exposing the image pickup surface of the image pickup device 1014 to the photographed-subject optical image by the shutter mechanism 1012 of the exposure controlling member 1012, the system controlling circuit 50 causes the exposure controlling circuit 1042 to drive the shutter mechanism of the exposure controlling member 1012 so as to close the shutter mechanism of the exposure controlling member 1012, thereby completing the operation of exposing the image pickup surface of the image pickup device 1014 to the photographed-subject optical image, (Step S1067 in FIG. 18). Then, the system controlling circuit 1050 causes the image pickup device 1014 to output the charge signal stored therein, and digitizes the charge signal by means of the A/D conversion circuit 1016. The data outputted from the A/D conversion circuit 1016 is supplied to the image memory 1024 via the memory controlling circuit 1020, whereby data corresponding to an image for one photographic picture is temporarily stored in the image memory 1024 (Step S1068 in FIG. 18).

Figure 19:
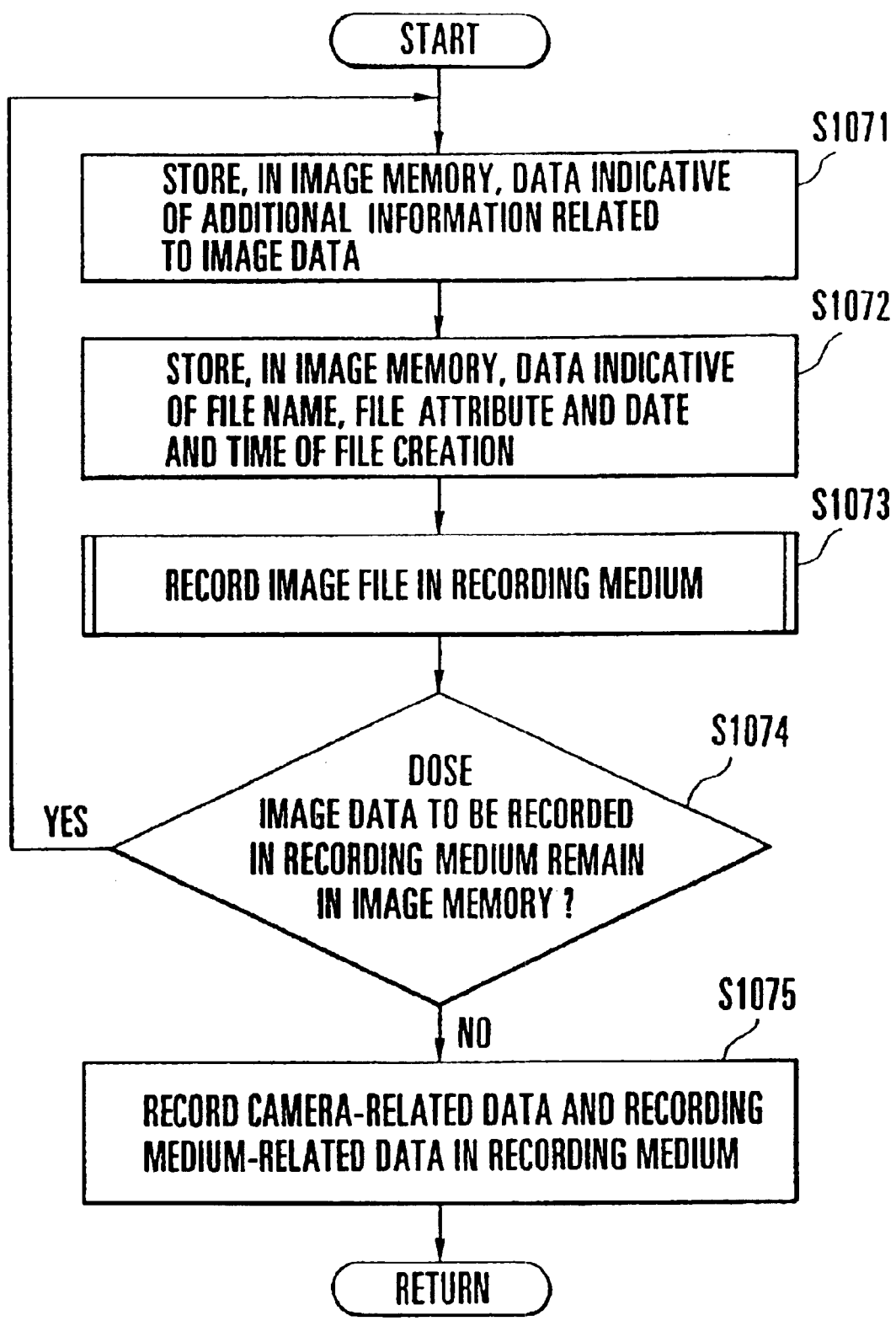
FIG. 19 is a flowchart which serves to explain in detail the recording operation routine executed in Step S1029 of FIG. 15.

FIG. 19 is a flowchart which serves to explain in detail the recording routine executed in Step S1029 of FIG. 15.

Referring to FIG. 19, the system controlling circuit 1050 stores data corresponding to information which can be arbitrarily set by an operator, such as a number and information indicative of a character, a sound, a pictorial pattern and the like, in the image memory 1024 via the memory controlling circuit 1020 as additional information relative to image data to be recorded in the recording medium 1100 (Step S1071 in FIG. 19).

The data corresponding to the additional information is supplied to the image memory 1024 from an additional-information generator for generating addtional-information data in accordance with the operation of an additional-information data input switch (not shown) provided in the switch group 1056. Otherwise, the data corresponding to the additional information is supplied from an audio input device (not shown) provided as an external device of the system to the image memory 1024 through the connector 1034, the data communication controlling circuit 1028 and the interface 1026.

Then, the system controlling circuit 1050 generates the data required for creating an image file formed by recording the image data in the recording medium 1100, such as a file name, a file attribute, the date of file creation and the time of file creation. The memory controlling circuit 1020 stores such data in a portion of the data recording area of the image memory 1024 via the memory controlling circuit 1020 (Step S1072 in FIG. 19).

Part or the whole of the data indicative of the file name corresponds to data indicative of a discrimination number or symbol peculiar to a recorded photographic image which data is formed by a discrimination number peculiar to the system, such as the manufacturer's serial number of the system body 1200, and the cumulative number of recorded photographic images which are recorded in the recording medium 1100 as image signals. Alternatively, part or the whole of the data indicative of the file name corresponds to data indicative of a discrimination number or symbol peculiar to a recorded photographic image which data is formed by a discrimination number peculiar to the recording medium 1100, such as the manufacturer's serial number of the recording medium 1100, and the cumulative number of recorded photographic images which are recorded in the recording medium 1100 as image signals. During creation of image files, by adding the data indicative of the aforesaid file name to each of the image files, it is possible to prevent occurrence of image files having the same name.

The photography-related data may also contain data indicative of a discrimination number peculiar to a recorded photographic image which data is formed by a discrimination number peculiar to the system, such as the manufacturer's serial number of the system body 1200, and the cumulative number of recorded photographic images which are recorded in the recording medium 1100 as image signals or by a discrimination number peculiar to the recording medium 1100, such as the manufacturer's serial number of the recording medium 1100, and the cumulative number of recorded photographic images which are recorded in the recording medium 1100 as image signals. Further, part or the whole of the data indicative of the file name may be formed as data corresponding to a discrimination number or symbol indicating that the photography-related data contains data corresponding to a discrimination signal peculiar to the recorded photographic image. During creation of image files, if the data indicative of the file name is added to each of the image files, since the data indicative of the file name serves as an index for retrieval of the photography-related data, it is possible to prevent occurrence of image files having the same name.

Then, the system controlling circuit 1050 reads, from the image memory 1024, the image data, the photography-related data containing data corresponding to the discrimination number peculiar to the recorded photographic image and data corresponding to the additional information, while storing the management data, such as a FAT representative of the state of use of each cluster corresponding to the unit of use of the information data recording area 1104, in a portion of the data recording area of the image memory 1024, which management data is to be recorded in the management data recording area 1102 of the recording medium 1100 together with the image data. Then, the system controlling circuit 1050 records the read image data in the information data recording area 1104 of the recording medium 1100 through the memory controlling circuit 1020, the interface 1026, the connector 1030, the connector 1108 and the interface 1106. Then, the system controlling circuit 1050 records the management data stored in the portion of the data recording area of the image memory 1024, such as the FAT representative of the state of use of each cluster corresponding to the unit of use of the information data recording area 1104, in the management data recording area 1102 of the recording medium 1100 through the memory controlling circuit 1020, the interface 1026, the connector 1030, the connector 1108 and the interface 1106. Further, the system controlling circuit 1050 records the data stored in the portion of the data recording area of the image memory 1024 and required for creating an image file, such as a file name, a file attribute, the date of file creation and the time of file creation, in the management data recording area 1102 of the recording medium 1100 through the memory controlling circuit 1020, the interface 1026, the connector 1030, the connector 1108 and the interface 1106 (Step S1073 in FIG. 19).

The above-described image file recording operation will be described later in greater detail.

The aforesaid photography-related data recorded together with the image data in the information data recording area 1104 of the recording medium 1100 during the image file recording operation executed in Step S1073 includes, in addition to the discrimination number peculiar to the recorded photographic image, data indicative of various information such as the class number and manufacturer's serial number of the system body 1200, the size and kind of the image pickup device 1014 provided in the system body 1200, the total number of pixels of the image pickup device 1014, the presence or absence of a color filter, the kind, configuration and characteristics of the color filter or the discrimination number thereof, the characteristics or discrimination number of an infrared cut filter, the characteristics or discrimination number of an optical low-pass filter, the class number and manufacturer's serial number of a photographic lens used for photography, the focal length, measured distance, aperture value, and shutter speed value of the photographic lens during photography, a continuous-shooting speed value selected during photography, the date and time of photography, a temperature at the time of photography, the type of white balance, a color temperature at the time of photography, the use or nonuse of a flash unit, and the class number and manufacturer's serial number of the flash unit.

Then, if image data to be recorded in the recording medium 1100 remains in the image memory 1024, the system controlling circuit 1050 returns to Step S1071 and repeats the above-described series of image file recording processing operations (Step S1074 in FIG. 19). If no image data to be recorded in the recording medium 1100 remains in the image memory 1024, the system controlling circuit 1050 records the camera-related data and the recording medium-related data in the camera-related data recording area 1114 of the recording medium 1100 through the interface 1026, the connector 1030, the connector 1108 and the interface 1106 (Step S1075 in FIG. 19). Then, the process returns to the main operating routine.

The camera-related data and the recording medium-related data may also be recorded in the recording medium 1100 in such a way that the camera-related data and the recording medium-related data generated from the system controlling circuit 1050 are stored in a portion of the data recording area of the image memory 1024 through the memory controlling circuit 1020 and the stored data are then recorded in the camera-related data recording area 1114 of the recording medium 1100 via the memory controlling circuit 1020, the interface 1026, the connector 1030, the connector 1108 and the interface 1106.

The camera-related data include data indicative of information about the camera part of the present system, such as system discrimination data indicative of the kind and the manufacturer's serial number of the camera part, an adjustment value for balance adjustment in the camera part, an adjustment value for automatic focusing in the camera part, an adjustment value for automatic exposure in the camera part, the sensitivity variation and the compensation value of the image pickup device 1014 in the camera part, the temperature characteristics and the compensation value of each constituent part of the camera part, recording-medium discrimination data indicative of a recording medium usable with the present system, and a damaged portion of the recording medium, as well as a program for operating the system controlling circuit 1050. The recording medium-related data include data indicative of a recording-medium discrimination number peculiar to the recording medium such as the manufacturer's serial number of the recording medium 1100, and data indicative of the recording structure of data of the recording medium 1100. If the recording medium 1100 is a hard disk unit, the recording medium-related data further include data indicative of the number of start-up operations of the hard disk unit. If the recording medium 1100 is a memory card, the recording medium-related data further include data indicative of information such as the number of times of data erasure for each block of the data recording area of the memory card.

Of the above-described recording medium-related data, the data indicative of the recording structure of data of the recording medium 1100 includes, if the recording medium 1100 is a hard disk unit, information such as the number of sectors required to form one track on each hard disk in the hard disk unit, the number of heads of the hard disk unit, the number of sectors required to form one cluster, the total number of clusters, position information about the leading sector of a first FAT, position information about the leading sector of a second FAT, position information about the leading sector of each directory entry, position information about the leading sector of the information data recording area 1104, a last allocation cluster indicating up to which cluster data are recorded, a next free cluster indicating from which cluster data can be recorded, the number of used clusters indicative of the number of clusters on which data are recorded, and the number of unused clusters indicative of the remaining number of recordable clusters.

The position information about each of the leading sectors includes data indicative of the cylinder number, head number, sector number and the like of the hard disk.

The system controlling circuit 1050 selects data or a program, whose contents are to be rewritten, from among data or a program which is recorded or to be recorded in the recording medium 1100 and which is contained in the data or the program set in the above-described camera-related data or recording medium-related data, and records the selected data or program in the camera-related data recording area 1114 of the recording medium 1100.

For example, if no camera-related data has been recorded in the camera-related data recording area 1114 of the recording medium 1100 attached to the system body 1200, the camera-related data generated from the system controlling circuit 1050 of the system body 1200 may be recorded. Also, each time recording, reproduction, erasure or the like of image data is performed, data may be updated, as required, such as data indicative of the recording structure of data of the recording medium 1100, or if the recording medium 1100 is a hard disk unit, data indicative of the number of start-up operations of the hard disk unit, or if the recording medium 1100 is a memory card, data indicative of the number of times of data erasure for each block of the data recording area of the memory card.

As described above, in the arrangement in which the data and program required for the operation of each part of the system or photographing and recording operations are beforehand recorded in the recording medium 1100 of the memory card or the hard disk unit, since the data and the program are updated as required, the system controlling circuit 1050 can read and execute the data or program recorded in the recording medium 1100 of the system controlling circuit 1050 during start-up of the system.

If the above-described series of processing operations has been completed, the image file recording operation is brought to an end.

The operation of an electronic still video system according to a fourth embodiment of the present invention will be described below with the flowcharts shown in FIGS. 14, 15, 17, 18, 20 and 21.

FIGS. 14 and 15 show in combination a flowchart of the main operating routine of the electronic still video system generally shown in FIG. 13.

Figure 20:
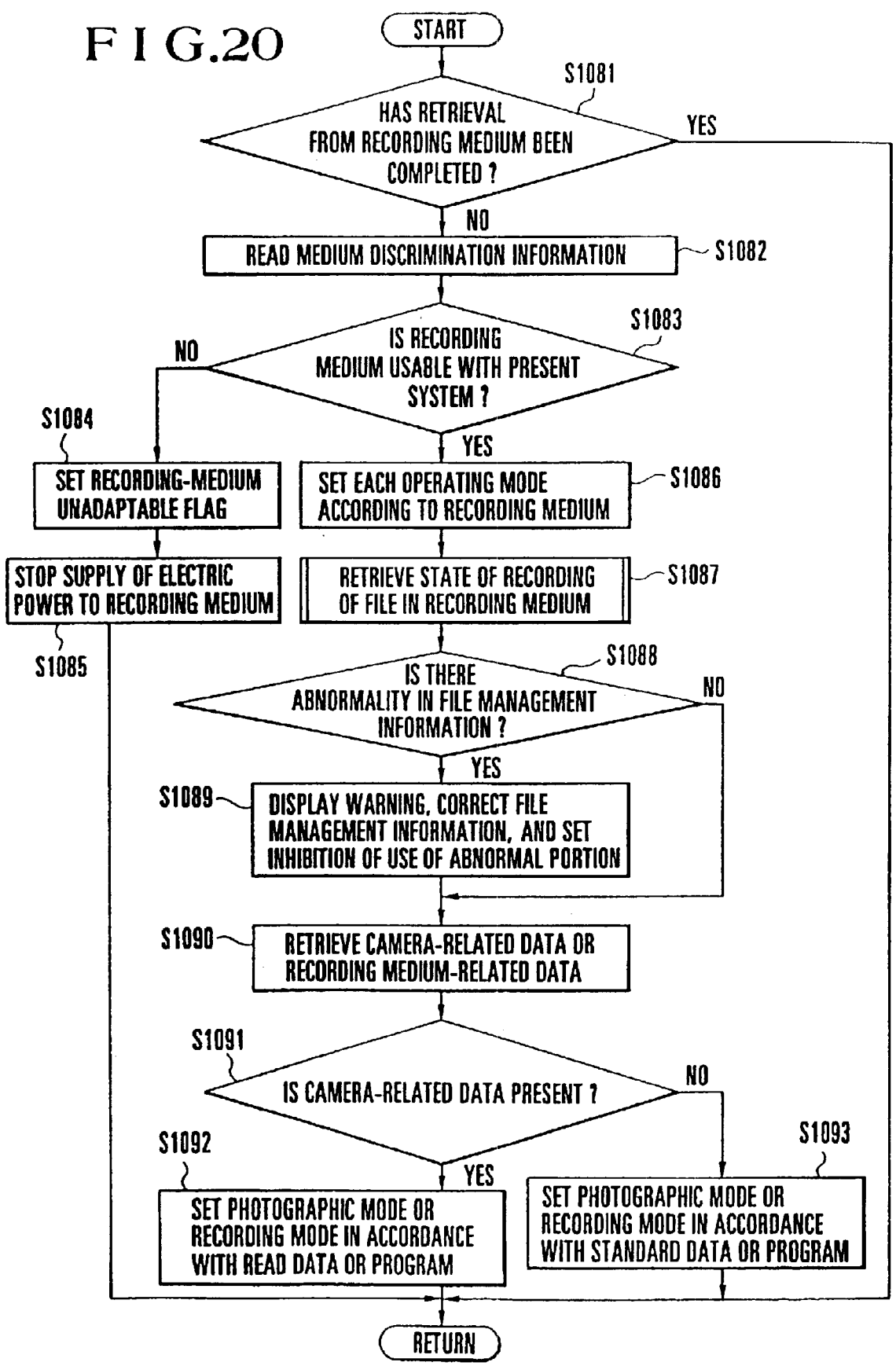
FIG. 20 shows a fourth embodiment of the present invention and is a flowchart which serves to explain in detail another retrieval operation routine executed in Step 1015 of FIG. 14.
Figure 21:
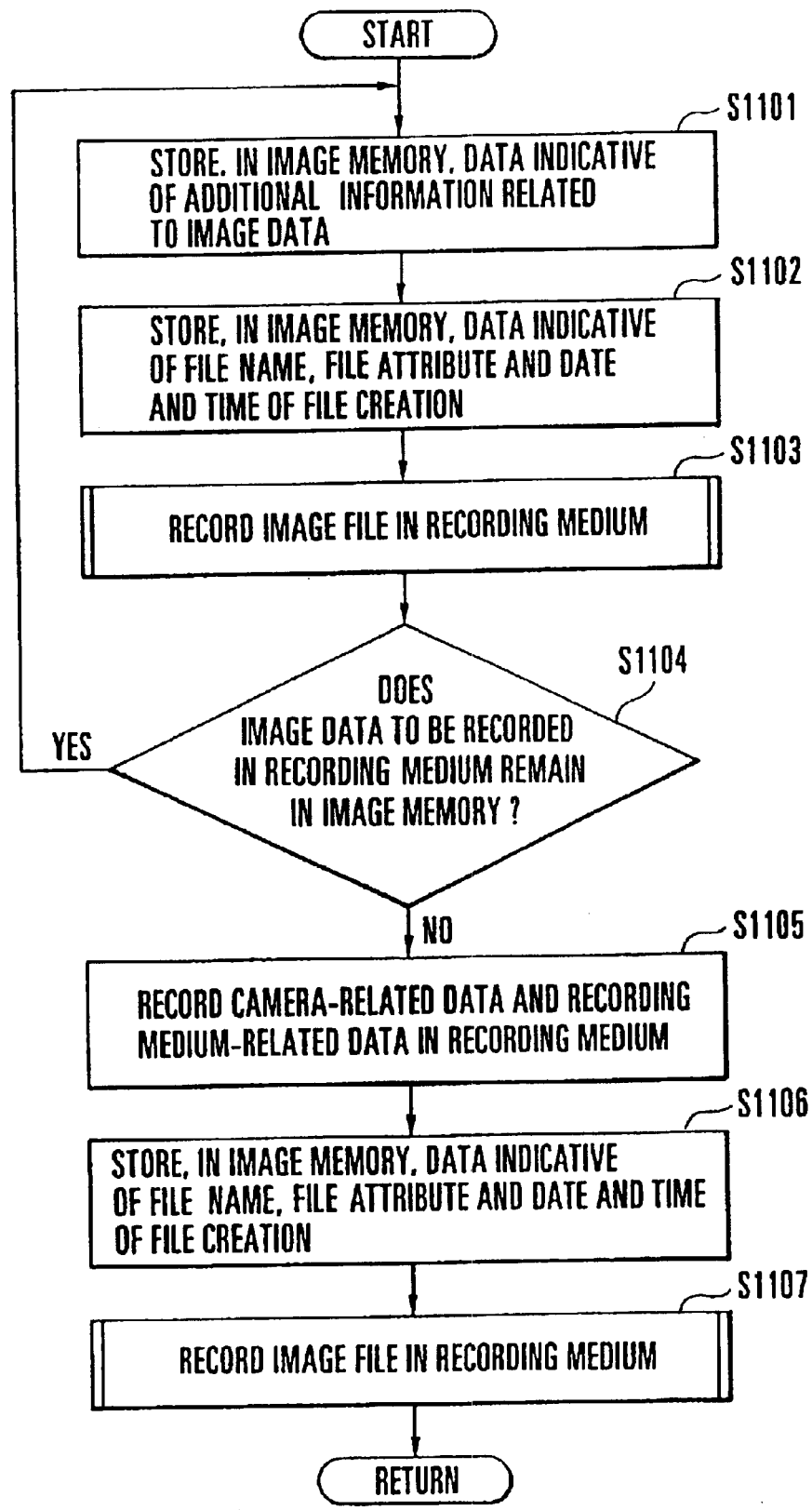
FIG. 21 shows a fourth embodiment of the present invention and is a flowchart which serves to explain in detail another retrieval operation routine executed in Step 1029 of FIG. 15.

In the electronic still video system according to the fourth embodiment of the present invention, the retrieval routine shown in FIG. 20 is employed in place of the retrieval routine of Step S1015 of FIG. 14, which is shown in FIG. 16 referred to in the description of the third embodiment, while the recording routine shown in FIG. 21 is employed in place of the recording routine of Step S1029 of FIG. 15, which is shown in FIG. 19 referred to in the description of the third embodiment. Since the other processing operations are substantially identical to those of the third embodiment, detailed description thereof is omitted, and the retrieval routine shown in FIG. 20 and the recording routine shown in FIG. 21 will be described in detail below.

FIG. 20 is a flowchart which serves to explain in detail the retrieval routine executed in Step S1015 of FIG. 14.

Referring to FIG. 20, if the operation of performing retrieval as to the state of recording in the recording medium 1100 has not yet been completed (Step S1081 in FIG. 20), the system controlling circuit 1050 reads data, such as the kind, characteristics, data-recordable capacity, discrimination number, and trademark usable as a discriminator, of the recording medium 1100, which are recorded in the recording-medium discrimination information recording area 1112 of the recording medium 1100, through the interface 1106, the connector 1108, the connector 1030 and the interface 1026 (Step S1082 in FIG. 20). If it is determined in Step S1083 of FIG. 20 that the recording medium 1100 connected to the system body 1200 is a recording medium which is usable with the present system, the process proceeds to Step S1086 of FIG. 20. In Step S1086, it is determined whether the recording medium 1100 is a memory card or a hard disk unit, and a check is made as to the kind of the memory card or the hard disk unit. According to the kind of the recording medium 1100, the operating modes of the respective photographing, recording, reproducing and transmitting operations are set so that transmission and reception of data between the system controlling circuit 1050 and the recording medium 1100 are optimized.

With the above-described processing operation, it is possible to optimally set the speeds of transmission and reception of data commands and the like between the system controlling circuit 1050 and the recording medium 1100 connected to the system body 1200. Particularly, it is possible to optimally set a continuous-shooting speed, the maximum number of pictures recordable and the like in the continuous-shooting recording mode.

The above-described discrimination operation of the recording medium 1100 is not limited to the above-described method in which the system controlling circuit 1050 directly reads the data recorded in the recording-medium discrimination information recording area 1112 of the recording medium 1100 and performs the aforesaid discrimination operation. For example, it is possible to adopt an arrangement in which the control circuit, such as the CPU or the MPU, which is contained in the interface 1106 within the recording medium 1100, reads such data and performs a discrimination operation and, on the basis of the result of the discrimination operation, a discrimination signal is transmitted from the control circuit, such as the CPU or the MPU, contained in the interface 1106 to the system controlling circuit 1050. It is also possible to adopt another arrangement in which, when the system controlling circuit 1050 is to read the data recorded in the recording-medium discrimination information recording area 1112 of the recording medium 1100, the data read from the recording-medium discrimination information recording area 1112 is temporarily written into a portion of the data recording area of the image memory 1024 via the memory controlling circuit 1020 and is read into the system controlling circuit 1050 via the memory controlling circuit 1020.

Of the data recorded in the recording-medium discrimination information recording area 1112, information relative to the data-recordable capacity of the recording medium 1100 includes information indicative of the total data-recordable capacity of the camera management data recording area 1114, the management data recording area 1102, the information data recording area 1104 and undefined recording areas, the data-recordable capacity of each of these areas and the recording position of each of the data recording areas. Accordingly, if a plurality of kinds of recording media having different data-recordable capacities are provided as the recording medium 1100 to be connected to the system body 1200, the system controlling circuit 1050 can recognize the total data-recordable capacity of the camera management data recording area 1114, the management data recording area 1102, the information data recording area 1104 and the undefined recording areas, the data-recordable capacity of each of these areas and the recording position of each of the data recording areas of each of the recording media.

Also, if the recording medium 1100 to be connected to the system body 1200 includes a plurality of recording media which differ from each other in kind, characteristic and data-recordable capacity, the system controlling circuit 1050 can recognize information relative to the kind, characteristics and data-recordable capacity of each of the recording media on the basis of the data recorded in the recording-medium discrimination information recording area 1112 of the recording medium 1100. Further, on the basis of the data recorded in the recording-medium discrimination information recording area 1112 of the recording medium 1100, the system controlling circuit 1050 can also recognize the camera-related date recorded in the camera-related data recording area 1114 of each of the recording media and information indicative of the recording position of the recording medium-related data.

If it is determined in Step S1083 from the data recorded in the recording-medium discrimination information recording area 1112 that, for example, the recording medium 1100 connected to the system body 1200 has a kind, a characteristic or a data-recordable capability unadaptable to the present system or a trademark or the like which can be used as a discrimination number or a discriminator unadaptable to the present system, the system controlling circuit 1050 determines that the recording medium 1100 connected to the system body 1200 is a recording medium unusable with the present system, and sets a recording-medium unadaptable flag in the register of the system controlling circuit 1050 or the control data memory 1052 (Step S1084 in FIG. 20). Then, the system controlling circuit 1050 causes the display device 1054 to provide a warning display indicating that the recording medium 1100 is a recording medium unusable with the present system, and stops the power supply part 1082 from supplying electric power to the recording medium 1100 (Step S1085 in FIG. 20).

Then, the system controlling circuit 1050 writes the management data recorded in the management data recording area 1102 of the recording medium 1100 into a portion of the data recording area of the image memory 1024 through the interface 1106, the connector 1108, the connector 1030, the interface 1026 and the memory controlling circuit 1020. After that, the system controlling circuit 1050 reads the written data into the memory controlling circuit 1020 by means of the memory controlling circuit 1020, and performs retrieval as to the state of recording in the recording medium 1100 (Step S1087 in FIG. 20).

The above-described file retrieving operation will be described later in greater detail.

Then, on the basis of the file retrieving operation executed in Step S1087, the system controlling circuit 1050 detects whether an abnormality is present in file management information such as a directory entry and a FAT (Step S1088 in FIG. 20). If there is no abnormality, the process returns to Step S1090 which will be described later. If there is an abnormality, the system controlling circuit 1050 executes processing such as correction of the file management information, display of a warning indicative of the occurrence of the abnormality, and inhibition of use of an abnormal portion in the information data recording area 1104 (Step S1089 in FIG. 20).

The abnormality of the file management information occurs, for example, if a directory entry indicative of the leading end of the chain of clusters is not updated and hence absent in a file which normally has a structure formed by the chained clusters each constituting the recording unit of data. In this case, it will be impossible to perform retrieval from a link list indicative of the chain of the clusters and recorded in the FAT, or a file size indicated by the directory entry will differ from a file size obtained by performing retrieval from the link list indicative of the chain of the clusters and recorded in the FAT.

In the above-described case, an error occurs in data contained in either one or both of the directory entry and the link list recorded in the FAT, with the result that while the next data is being recorded or erased, the data may be destroyed.

Similarly, if part or the whole of the link list containing information recorded in the FAT and indicative of the chain of the clusters is indicated by another directory entry or if information indicated by the link list does not indicate the end of the chain of the clusters and terminates with information indicating that no data is recorded, data may be destroyed during the next data recording or erasing operation.

If the system controlling circuit 1050 detects the above-described abnormality in the file management information, the system controlling circuit 1050 provides a display indicative of a warning of the occurrence of the abnormality of the file management information and also executes processing, such as correction of file management information such as the directory entries and the link list recorded in the FAT, and setting for inhibition of use of the abnormal portion in the information data recording area 1104.

Then, the system controlling circuit 1050 performs retrieval of the camera-related data and the recording medium-related data recorded in the information data recording area 1104 of the recording medium 1100 through the interface 1106, the connector 1108, the connector 1030 and the memory controlling circuit 1020 (Step S1090 in FIG. 20). If the camera-related data or the recording medium-related data is present in the information data recording area 1104 of the recording medium 1100 (Step S1091 in FIG. 20), the system controlling circuit 1050 reads the camera-related data or the recording medium-related data from the information data recording area 1104, and sets and executes a photographic mode or a recording mode in accordance with the read data or program (Step S1092 in FIG. 20).

The camera-related data include data indicative of information about the camera part of the present system, such as system discrimination data indicative of the kind and the manufacturer's serial number of the camera part, an adjustment value for balance adjustment in the camera part, an adjustment value for automatic focusing in the camera part, an adjustment value for automatic exposure in the camera part, the sensitivity variation and the compensation value of the image pickup device 1014 in the camera part, the temperature characteristics and the compensation value of each constituent part of the camera part, recording-medium discrimination data indicative of a recording medium usable with the present system, and a damaged portion of the recording medium, as well as a program for operating the system controlling circuit 1050. The recording medium-related data include data indicative of a recording-medium discrimination number peculiar to the recording medium such as the manufacturer's serial number of the recording medium 1100, and data indicative of the recording structure of data of the recording medium 1100. If the recording medium 1100 is a hard disk unit, the recording medium-related data further include data indicative of the number of start-up operations of the hard disk unit. If the recording medium 1100 is a memory card, the recording medium-related data further include data indicative of information such as the number of times of data erasure for each block of the data recording area of the memory card. In accordance with the above-described data and program, the system controlling circuit 1050 sets the numerical values and operating mode required for the operation of each part of the present system and for photographing and recording operations, and executes the required program.

Of the above-described recording medium-related data, the data indicative of the recording structure of data of the recording medium 1100 includes, if the recording medium 1100 is a hard disk unit, information such as the number of sectors required to form one track on each hard disk in the hard disk unit, the number of heads of the hard disk unit, the number of sectors required to form one cluster, the total number of clusters, position information about the leading sector of a first FAT, position information about the leading sector of a second FAT, position information about the leading sector of each directory entry, position information about the leading sector of the information data recording area 1104, a last allocation cluster indicating up to which cluster data are recorded, a next free cluster indicating from which cluster data can be recorded, the number of used clusters indicative of the number of clusters on which data are recorded, and the number of unused clusters indicative of the remaining number of recordable clusters.

The position information about each of the leading sectors includes data indicative of the cylinder number, head number, sector number and the like of the hard disk.

If it is determined in Step S1091 of FIG. 20 that neither camera-related data nor recording medium-related data is present in the information data recording area 1104 of the recording medium 1100, the system controlling circuit 1050 sets and executes a photographic mode or a recording mode in accordance with a standard program and data indicative of various standard values, both of which are stored in the ROM of the system controlling circuit 1050 or the ROM of the control data memory 1052 (Step S1093 in FIG. 20).

According to the above-described arrangement, the data and program required for operating the system are beforehand recorded in the recording medium 1100 such as a memory card and a hard disk unit. During start-up of the system, the data and the program are read into the system controlling circuit 1050 and, during an operation of the system, the required numerical values and operating mode are set so that they can be executed.

When the above-described setting and execution of the photographic mode and recording mode have been completed, the retrieval routine is brought to an end and the process returns to the main operating routine.

FIG. 21 is a flowchart which serves to explain in detail another example of the recording routine executed in Step S1029 of FIG. 15.

Referring to FIG. 21, the system controlling circuit 1050 stores data corresponding to information which can be arbitrarily set by an operator, such as a number and information indicative of a character, a sound, a pictorial pattern and the like, in the image memory 1024 via the memory controlling circuit 1020 as additional information relative to image data to be recorded in the recording medium 1100 (Step S1101 in FIG. 21).

The data corresponding to the additional information is supplied to the image memory 1024 from the additional-information generator for generating additional-information data in accordance with the operation of the additional-information data input switch (not shown) provided in the switch group 1056. Otherwise, the data corresponding to the additional information is supplied from an audio input device (not shown) provided as an external device of the system to the image memory 1024 through the connector 1034, the data communication controlling circuit 1028 and the interface 1026.

Then, the system controlling circuit 1050 generates the data required for creating an image file formed by recording the image data in the recording medium 1100, such as a file name, a file attribute, the date of file creation and the time of file creation. The memory controlling circuit 1020 stores such data in a portion of the data recording area of the image memory 1024 via the memory controlling circuit 1020 (Step S1102 in FIG. 21).

Part or the whole of the data indicative of the file name corresponds to data indicative of a discrimination number or symbol peculiar to a recorded photographic image which data is formed by a discrimination number peculiar to the system, such as the manufacturer's serial number of the system body 1200, and the cumulative number of recorded photographic images which are recorded in the recording medium 1100 as image signals. Alternatively, part or the whole of the data indicative of the file name corresponds to data indicative of a discrimination number or symbol peculiar to a recorded photographic image which data is formed by a discrimination number peculiar to the recording medium 1100, such as the manufacturer's serial number of the recording medium 1100, and the cumulative number of recorded photographic images which are recorded in the recording medium 1100 as image signals. During creation of image files, by adding the data indicative of the aforesaid file name to each of the image files, it is possible to prevent occurrence of image files having the same name.

The photography-related data may also contain data indicative of a discrimination number peculiar to a recorded photographic image which data is formed by a discrimination number peculiar to the system, such as the manufacturer's serial number of the system body 1200, and the cumulative number of recorded photographic images which are recorded in the recording medium 1100 as image signals or by a discrimination number peculiar to the recording medium 1100, such as the manufacturer's serial number of the recording medium 1100, and the cumulative number of recorded photographic images which are recorded in the recording medium 1100 as image signals. Further, part or the whole of the data indicative of the file name may be formed as data corresponding to a discrimination number or symbol indicating that the photography-related data contains data corresponding to a discrimination signal peculiar to the recorded photographic image. During creation of image files, if the data indicative of the file name is added to each of the image files, since the data indicative of the file name serves as an index for retrieval of the photography-related data, it is possible to prevent occurrence of image files having the same name.

Then, the system controlling circuit 1050 reads, from the image memory 1024, the image data, the photography-related data containing data corresponding to the discrimination number peculiar to the recorded photographic image and data corresponding to the additional information, while storing the management data, such as a FAT representative of the state of use of each cluster corresponding to the unit of use of the information data recording area 1104, in a portion of the data recording area of the image memory 1024, which management data is to be recorded in the management data recording area 1102 of the recording medium 1100 together with the image data. Then, the system controlling circuit 1050 records the read image data in the information data recording area 1104 of the recording medium 1100 through the memory controlling circuit 1020, the interface 1026, the connector 1030, the connector 1108 and the interface 1106. Then, the system controlling circuit 1050 records the management data stored in the portion of the data recording area of the image memory 1024, such as the FAT representative of the state of use of each cluster corresponding to the unit of use of the information data recording area 1104, in the management data recording area 1102 of the recording medium 1100 through the memory controlling circuit 1020, the interface 1026, the connector 1030, the connector 1108 and the interface 1106. Further, the system controlling circuit 1050 records the data stored in the portion of the data recording area of the image memory 1024 and required for creating an image file, such as a file name, a file attribute, the date of file creation and the time of file creation, into the management data recording area 1102 of the recording medium 1100 through the memory controlling circuit 1020, the interface 1026, the connector 1030, the connector 1108 and the interface 1106 (Step S1103 in FIG. 21).

The above-described image file recording operation will be described later in greater detail.

The aforesaid photography-related data recorded together with the image data in the information data recording area 1104 of the recording medium 1100 during the image file recording operation executed in Step S1103 includes, in addition to the discrimination number peculiar to the recorded photographic image, data indicative of various information such as the class number and manufacturer's serial number of the system body 1200, the size and kind of the image pickup device 1014 provided in the system body 1200, the total number of pixels of the image pickup device 1014, the presence or absence of a color filter, the kind, configuration and characteristics of the color filter or the discrimination number thereof, the characteristics or discrimination number of an infrared cut filter, the characteristics or discrimination number of an optical low-pass filter, the class number and manufacturer's serial number of a photographic lens used for photography, the focal length, measured distance, aperture value, and shutter speed value of the photographic lens during photography, a continuous-shooting speed value selected during photography, the date and time of photography, a temperature at the time of photography, the type of white balance, a color temperature at the time of photography, the use or nonuse of a flash unit, and the class number and manufacturer's serial number of the flash unit.

Then, if image data to be recorded in the recording medium 1100 remains in the image memory 1024, the system controlling circuit 1050 returns to Step S1101 and repeats the above-described series of image file recording processing operations (Step S1104 in FIG. 21). If no image data to be recorded in the recording medium 1100 remains in the image memory 1024, the system controlling circuit 1050 records the camera-related data and the recording medium-related data in the camera-related data recording area 1114 of the recording medium 1100 through the interface 1026, the connector 1030, the connector 1108 and the interface 1106 (Step S1105 in FIG. 21).

The above-described image file recording operation will be described later in greater detail.

The aforesaid photography-related data recorded together with the image data in the information data recording area 1104 of the recording medium 1100 during the image file recording operation executed in Step S1103 includes, in addition to the discrimination number peculiar to the recorded photographic image, data indicative of various information such as the class number and manufacturer's serial number of the system body 1200, the size and kind of the image pickup device 1014 provided in the system body 1200, the total number of pixels of the image pickup device 1014, the presence or absence of a color filter, the kind, configuration and characteristics of the color filter or the discrimination number thereof, the characteristics or discrimination number of an infrared cut filter, the characteristics or discrimination number of an optical low-pass filter, the class number and manufacturer's serial number of a photographic lens used for photography, the focal length, measured distance, aperture value, and shutter speed value of the photographic lens during photography, a continuous-shooting speed value selected during photography, the date and time of photography, a temperature at the time of photography, the type of white balance, a color temperature at the time of photography, the use or nonuse of a flash unit, and the class number and manufacturer's serial number of the flash unit.

Then, if image data to be recorded in the recording medium 1100 remains in the image memory 1024, the system controlling circuit 1050 returns to Step S1101 and repeats the above-described series of image file recording processing operations (Step S1104 in FIG. 21). If no image data to be recorded in the recording medium 1100 remains in the image memory 1024, the system controlling circuit 1050 records the camera-related data and the recording medium-related data in the camera-related data recording area 1114 of the recording medium 1100 through the interface 1026, the connector 1030, the connector 1108 and the interface 1106 (Step S1105 in FIG. 21).

Then, the system controlling circuit 1050 generates data such as a file name, a file attribute, the date of file creation and the time of file creation as the data required to record the camera-related data and the recording medium-related data in the recording medium 1100. The memory controlling circuit 1020 stores such data in a portion of the data recording area of the image memory 1024 via the memory controlling circuit 1020 (Step S1106 in FIG. 21).

Then, the system controlling circuit 1050 reads the image data, the camera-related data and the photography-related data from the image memory 1024, while storing the management data, such as a FAT representative of the state of use of each cluster corresponding to the unit of use of the information data recording area 1104, into a portion of the data recording area of the image memory 1024, which management data is to be recorded in the management data recording area 1102 of the recording medium 1100 together with the image data. Then, the system controlling circuit 1050 records the read image data in the information data recording area 1104 of the recording medium 1100 through the memory controlling circuit 1020, the interface 1026, the connector 1030, the connector 1108 and the interface 1106. Then, the system controlling circuit 1050 records the management data stored in the portion of the data recording area of the image memory 1024, such as the FAT representative of the state of use of each cluster corresponding to the unit of use of the information data recording area 1104, in the management data recording area 1102 of the recording medium 1100 through the memory controlling circuit 1020, the interface 1026, the connector 1030, the connector 1108 and the interface 1106. Further, the system controlling circuit 1050 records the data stored in the portion of the data recording area of the image memory 1024 and required to record the camera-related data and the recording medium-related data in the recording medium 1100, such as a file name, a file attribute, the date of file creation and the time of file creation, in the management data recording area 1102 of the recording medium 1100 through the memory controlling circuit 1020, the interface 1026, the connector 1030, the connector 1108 and the interface 1106 (Step S1107 in FIG. 21).

The above-described file recording operation will be described later in greater detail.

The aforesaid camera-related data include data indicative of information about the camera part of the present system, such as system discrimination data indicative of the kind and the manufacturer's serial number of the camera part, an adjustment value for balance adjustment in the camera part, an adjustment value for automatic focusing in the camera part, an adjustment value for automatic exposure in the camera part, the sensitivity variation and the compensation value of the image pickup device 1014 in the camera part, the temperature characteristics and the compensation value of each constituent part of the camera part, recording-medium discrimination data indicative of a recording medium usable with the present system, and a damaged portion of the recording medium, as well as a program for operating the system controlling circuit 1050. The recording medium-related data include data indicative of a recording-medium discrimination number peculiar to the recording medium such as the manufacturer's serial number of the recording medium 1100, and data indicative of the recording structure of data of the recording medium 1100. If the recording medium 1100 is a hard disk unit, the recording medium-related data further include data indicative of the number of start-up operations of the hard disk unit. If the recording medium 1100 is a memory card, the recording medium-related data further include data indicative of information such as the number of times of data erasure for each block of the data recording area of the memory card.

Of the above-described recording medium-related data, the data indicative of the recording structure of data of the recording medium 1100 includes, if the recording medium 1100 is a hard disk unit, information such as the number of sectors required to form one track on each hard disk in the hard disk unit, the number of heads of the hard disk unit, the number of sectors required to form one cluster, the total number of clusters, position information about the leading sector of a first FAT, position information about the leading sector of a second FAT, position information about the leading sector of each directory entry, position information about the leading sector of the information data recording area 1104, a last allocation cluster indicating up to which cluster data are recorded, a next free cluster indicating from which cluster data can be recorded, the number of used clusters indicative of the number of clusters on which data are recorded, and the number of unused clusters indicative of the remaining number of recordable clusters.

The position information about each of the leading sectors includes data indicative of the cylinder number, head number, sector number and the like of the hard disk.

The system controlling circuit 1050 selects data or a program, whose contents are to be rewritten, from among data or a program which is recorded or to be recorded in the recording medium 1100 and which is contained in the data or the program set in the above-described camera-related data or recording medium-related data, and records the selected data or program in the image memory 1024.

For example, if no camera-related data has been recorded in the camera-related data recording area 1114 of the recording medium 1100 attached to the system body 1200, the camera-related data generated from the system controlling circuit 1050 of the system body 1200 may be recorded. Also, each time recording, reproduction, erasure or the like of image data is performed, data may be updated, as required, such as data indicative of the recording structure of data of the recording medium 1100, or if the recording medium 1100 is a hard disk unit, data indicative of the number of start-up operations of the hard disk unit, or if the recording medium 1100 is a memory card, data indicative of the number of times of data erasure for each block of the data recording area of the memory card.

As described above, in the arrangement in which the data and program required for the operation of each part of the system or photographing and recording operations are beforehand recorded in the recording medium 1100 of the memory card or the hard disk unit, since the data and the program are updated as required, the system controlling circuit 1050 can read and execute the data or program recorded in the recording medium 1100 of the system controlling circuit 1050 during start-up of the system.

If the above-described series of processing operations has been completed, the image file recording operation is brought to an end.

The operation of the electronic still video system according to the fifth embodiment of the present invention will be described below with reference to the flowcharts shown in FIGS. 16, 17, 18, 19, 20, 21, 22 and 23.

Figure 22:
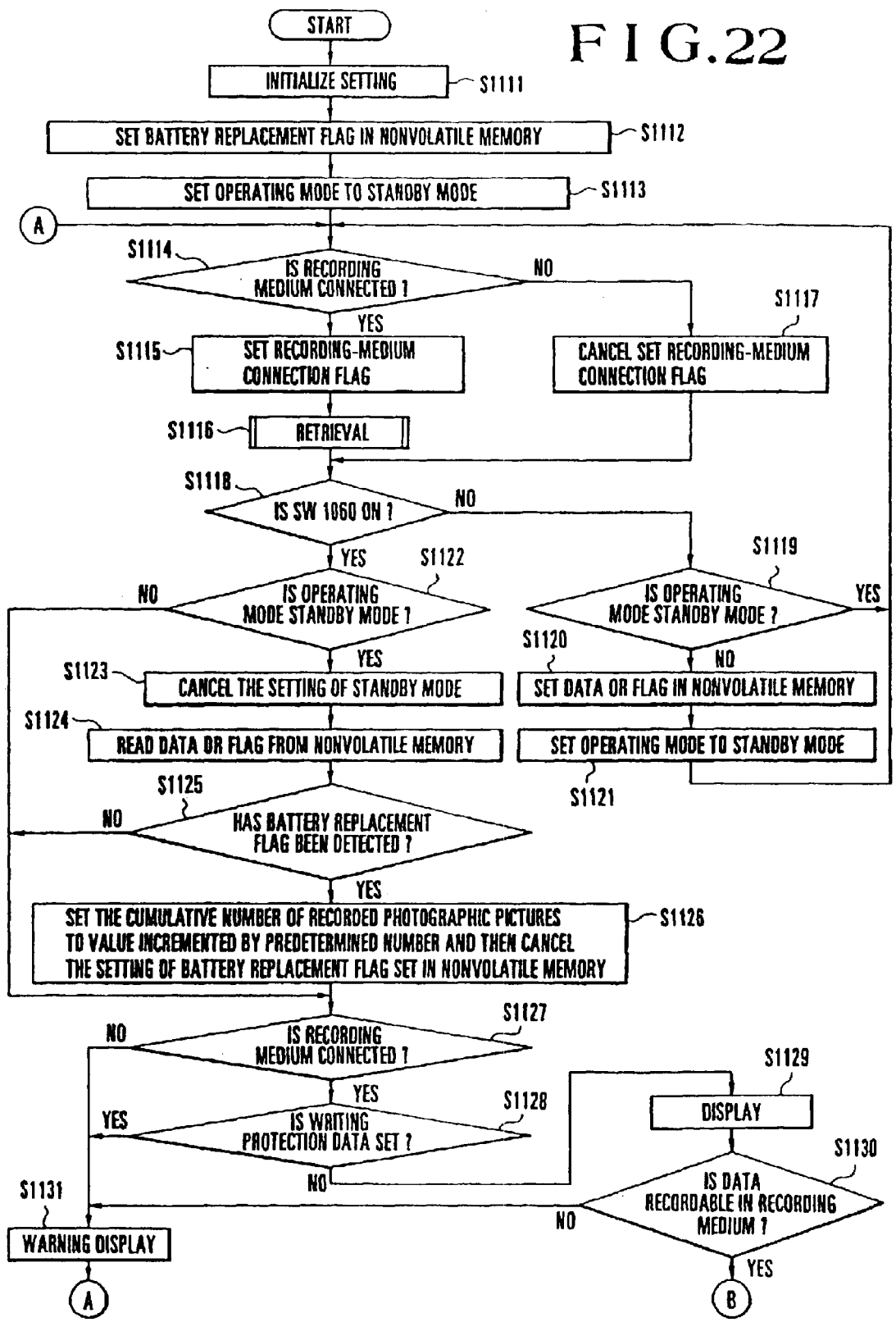
FIG. 22 shows a fifth embodiment of the present invention and is part of a flowchart showing the main operation routine of the electronic still video system shown in FIG. 13.
Figure 23:
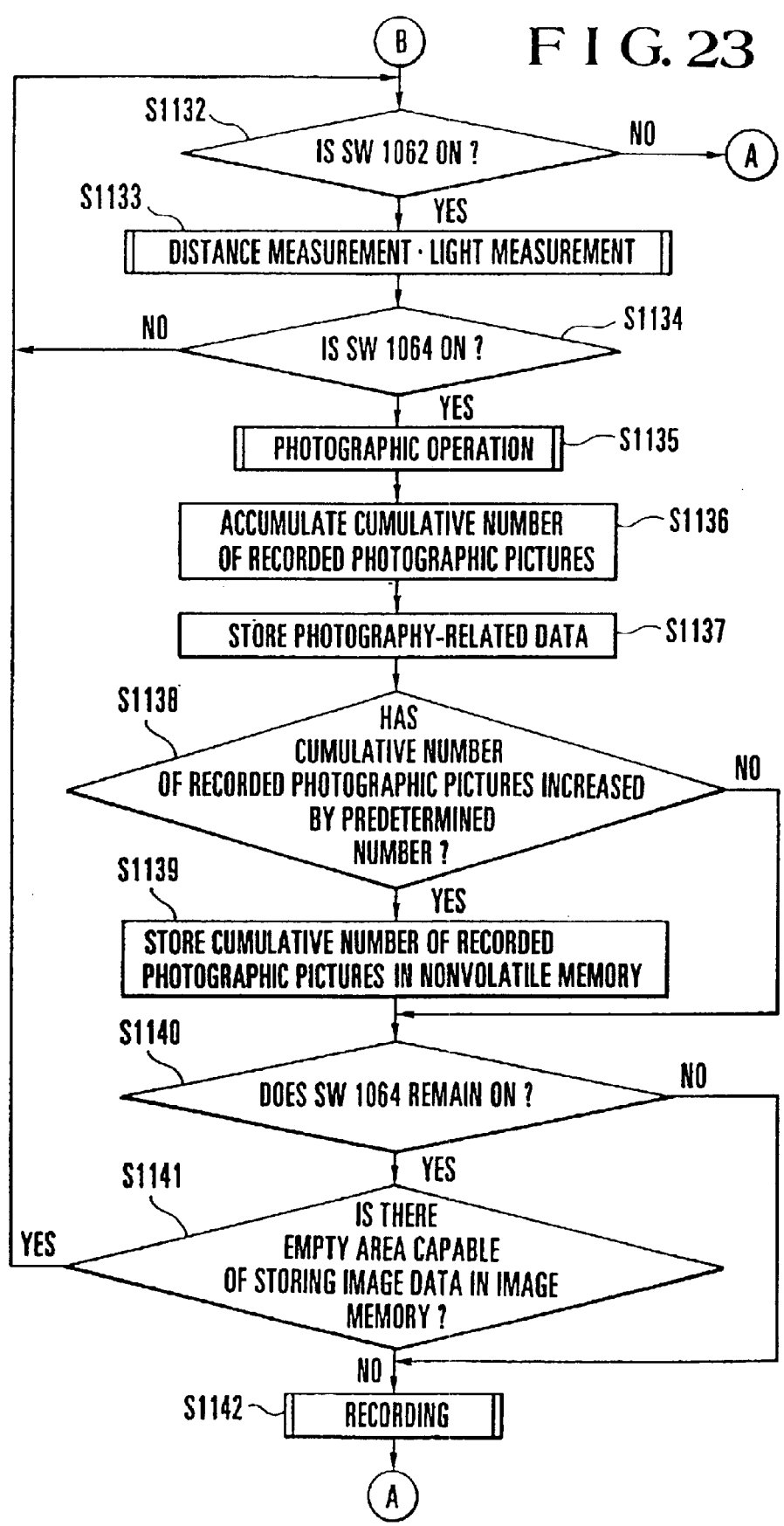
FIG. 23 shows the fifth embodiment of the present invention and is part of the flowchart showing the main operation routine of the electronic still video system shown in FIG. 13.

FIGS. 22 and 23 show in combination a flowchart of the main operating routine of the electronic still video system generally shown in FIG. 13.

Referring to FIGS. 22 and 23, when the power supply part 1082 is attached to the body of the electronic still video system, the system controlling circuit 1050 initializes various flags, control variables and the like (Step S1111 in FIG. 22), then sets a battery replacement flag in the nonvolatile memory 1090 (Step S1112 in FIG. 22), and then sets the operating mode of the system to the standby mode (Step S1113 in FIG. 22).

If the battery replacement flag is set in the nonvolatile memory 1090, the system controlling circuit 1050 determines that the battery of the power supply part 1082 has been replaced in the above-described manner.

In a case where the operating mode of the system is set to the standby mode, the system controlling circuit 1050 turns off the display device 1054 as required, and causes the power-supply controlling circuit 1080 to stop the supply of electric power to each part as required, thereby preventing unnecessary power consumption.

Then, the system controlling circuit 1050 determines whether the recording medium 1100, such as a memory card or a hard disk, is connected to the system body 1200 (Step S1114 in FIG. 22). If the system controlling circuit 1050 determines that the recording medium 1100 is not connected to the system body 1200 (Step S1117 in FIG. 22), the process proceeds to Step S1118 which will be described later. If the system controlling circuit 1050 determines that the recording medium 1100 is connected to the system body 1200, the system controlling circuit 1050 sets a recording-medium connection flag (Step S1115 in FIG. 22) and reads from the recording medium 1100 discrimination information data indicative of the kind of recording medium used as the recording medium 1100, the data-recordable capacity and the characteristics of the recording medium, as well as camera-related data, recording medium-related data, management data which were used to perform photography and record the image data in the recording medium 1100. Then, the system controlling circuit 1050 performs retrieval as to the state of recording in the recording medium 1100 (Step S1116 in FIG. 22).

Since the retrieval operations have respectively been described in detail in connection with the third embodiment with reference to FIG. 16 and in connection with the fourth embodiment with reference to FIG. 20, detailed description thereof is omitted.

In the previously-described manner, if the recording medium 1100 is connected to the system body 1200, the system controlling circuit 1050 starts up the recording medium 1100 and reads data indicative of the kind of recording medium, its data-recordable capacity and the like, as well as detects whether an abnormality is present in file management information. If there is an abnormality, the system controlling circuit 1050 executes processing such as correction of the file management information, display of a warning indicative of the occurrence of the abnormality, and setting of inhibition of use of an abnormal portion in the information data recording area 1104.

Then, if the main switch 1060 is turned on (Step S1118 in FIG. 22) and if the operating mode of the system is the standby mode (Step S1122 in FIG. 22), the system controlling circuit 1050 cancels the standby mode (Step S1123 in FIG. 22), and causes the display device 1054 to provide display as required and causes the power-supply controlling circuit 1080 to supply the required amount of electric power to each part at the required time interval.

Then, the system controlling circuit 1050 reads, from the nonvolatile memory 1090, the required data or flag, such as the aforesaid battery replacement flag and data indicative of the cumulative number of photographic pictures recorded in the recording medium 1100 as image signals, and stores the read data or flag in the register of the system controlling circuit 1050 or the control data memory 1052 (Step S1124 in FIG. 22). If the battery replacement flag indicating that the battery of the power supply part 1082 has been replaced is detected (Step S1125 in FIG. 22), the system controlling circuit 1050 newly sets the value of the data indicative of the cumulative number of recorded photographic pictures to a value incremented by a predetermined number (for example, by one hundred pictures), and cancels the setting of the battery replacement flag in the nonvolatile memory 1090 (Step S1126 in FIG. 22).

Even if it is determined in Step S1118 that the main switch 1060 is on, if it is determined in Step S1122 that the operating mode of the system is not the standby mode or if it is determined in Step S1125 that no battery replacement flag is detected in the data or flag read from the nonvolatile memory 1090 and the battery of the power supply part 1082 has not been replaced, the process proceeds to Step S1127 which will be described later.

On the other hand, if it is determined in Step S1118 that the main switch 1060 is off, and if it is determined in Step S1119 that the operating mode of the system is not the standby mode, the system controlling circuit 1050 reads the required data or flag, such as the battery replacement flag and the data indicative of the cumulative number of photographic pictures recorded in the recording medium 1100 as image signals, from the register of the system controlling circuit 1050 or the control data memory 1052, and writes the read data or flag into the nonvolatile memory 1090 (Step S1120 in FIG. 22). After the system controlling circuit 1050 has set the operating mode of the system to the standby mode (Step S1121 in FIG. 22), the system controlling circuit 1050 returns the process to Step S1114 to detect whether the recording medium 1100 is attached to the system body 1200.

If it is determined in Step S1118 that the main switch 1060 is off, and if it is determined in Step S1119 that the operating mode of the system is the standby mode, the system controlling circuit 1050 returns the process to Step S1114 to detect whether the recording medium 1100 is attached to the system body 1200.

Then, the system controlling circuit 1050 checks the presence or absence of setting of the aforesaid recording medium connection flag. If it is determined (Step S1127 in FIG. 22) that the recording medium 1100, such as a memory card or a hard disk unit, is connected to the system body 1200, and if it is determined (Step S1128 in FIG. 22) that the writing protection data indicative of writing protection is not set in the writing protection information recording area 1110 of the recording medium 1100 connected to the system body 1200, the process proceeds to Step S1129 of FIG. 22, where the system controlling circuit 1050 causes the display device 1054 to visually display the remaining recordable number of photographic pictures, the date of photography, a shooting mode, various messages and the like which are recorded in the recording medium 1100, on the basis of the aforementioned discrimination information data, camera-related data and recording medium-related data of the recording medium 1100, the management data recorded in the management data recording area 1102 of the recording medium 1100, various kinds of modes which are selectively set by the switch group 1056 and various kinds of modes which are selectively set according to the kind of the recording medium 1100 connected to the system body 1200 (Step S1129 in FIG. 22).

On the other hand, if the system controlling circuit 1050 checks the presence or absence of setting of the aforesaid recording medium connection flag and determines (Step S1127 in FIG. 22) that the recording medium 1100 is not connected to the system body 1200 or determines (Step S1128 in FIG. 22) that the writing protection data indicative of writing protection is set in the writing protection information recording area 1110 of the recording medium 1100, the process proceeds to Step S1131 of FIG. 22, where the system controlling circuit 1050 causes the display device 1054 to provide a warning display indicating that the recording medium 1100 is not connected or that the writing protection data is set. The process returns to Step S1114 to check the presence or absence of the attached recording medium 1100.

Then, the system controlling circuit 1050 checks the presence or absence of setting of the recording-medium unadaptable flag associated with the recording medium 1100 connected to the system body 1200. If the recording medium 1100 connected to the system body 1200 is a recording medium which is unusable with the present system or if the information data recording area 1104 of the recording medium 1100 contains no empty area in which data recording is possible (Step S1130 in FIG. 22), the system controlling circuit 1050 causes the display device 1054 to provide a warning display indicating that the recording medium 1100 is a recording medium unusable with the present system or that the information data recording area 1104 of the recording medium 1100 contains no empty area in which data recording is possible (Step S1131 in FIG. 22). Then, the process returns to Step S1114 to check the presence or absence of the attached recording medium 1100.

Then, the system controlling circuit 1050 detects the state of the distance·light measuring switch 1062. If the distance·light measuring switch 1062 is off, the process returns to Step S1114 (Step S1132 in FIG. 23). If the distance·light measuring switch 1062 is on, the system controlling circuit 1050 causes the distance measuring circuit 1044 to measure the distance to a subject and then moves the focusing lens of the photographic optical system 1010 on the basis of the result of the distance measurement executed by the distance measuring circuit 1044, thereby focusing the photographic optical system 1010 onto the subject. Further, the system controlling circuit 1050 causes the light measuring circuit 1046 to measure the luminance of the subject and, on the basis of the result of the light measurement executed by the light measuring circuit 1046, causes the exposure controlling circuit 1042 to control the diaphragm mechanism or the shutter mechanism of the exposure controlling member 1012 so that the subject optical image formed on the image pickup surface of the image pickup device 1014 achieves an optimum amount of exposure, thereby determining the amount of exposure of the subject by means of the exposure controlling member 1012 (Step S1133 in FIG. 23).

Then, the system controlling circuit 1050 detects the state of the recording starting switch 1064, and the distance measuring operation and the light measuring operation of Step S1133 are repeated until the recording starting switch 1064 is turned on (Step S1134 in FIG. 23). If it is determined that the recording starting switch 1064 is turned on, the system controlling circuit 1050 initiates photographing and recording operations, and causes the A/D conversion circuit 1016 to digitize an analog image signal outputted from the image pickup device 1014 and stores the obtained image data in the image memory 1024 (Step S1135 in FIG. 23).

Since the aforementioned distance measuring operation and light measuring operations have been described in detail in connection with the third embodiment with reference to FIG. 17 while the aforementioned photographic operation has been described in detail in connection with the third embodiment with reference to FIG. 18, detailed description thereof is omitted.

During the above-described photographic operation, each time a photographic image is recorded, the system controlling circuit 1050 counts the number of recorded photographic pictures and accumulates the count number, thereby updating data indicative of the cumulative number of the recorded photographic pictures. The system controlling circuit 1050 temporarily stores the updated data in the register of the system controlling circuit 1050 or the control data memory 1052 (Step S1136 in FIG. 23). Then, the system controlling circuit 1050 obtains photography-related data containing data indicative of a discrimination number peculiar to the recorded photographic image, from data indicative of a discrimination number peculiar to the system body 1200 and the data indicative of the cumulative number of the recorded photographic pictures, and the system controlling circuit 1050 stores the thus-obtained, photography-related data in the image memory 1024 via the memory controlling circuit 1020 (Step S1137 in FIG. 23).

The aforesaid photography-related data includes, in addition to the discrimination number peculiar to the recorded photographic image, data indicative of various information such as the class number and manufacturer's serial number of the system body 1200, the size and kind of the image pickup device 1014 provided in the system body 1200, the total number of pixels of the image pickup device 1014, the presence or absence of a color filter, the kind, configuration and characteristics of the color filter or the discrimination number thereof, the characteristics or discrimination number of an infrared cut filter, the characteristics or discrimination number of an optical low-pass filter, the class number and manufacturer's serial number of a photographic lens used for photography, the focal length, measured distance, aperture value, and shutter speed value of the photographic lens during photography, a continuous-shooting speed value selected during photography, the date and time of photography, a temperature at the time of photography, the type of white balance, a color temperature at the time of photography, the use or nonuse of a flash unit, and the class number and manufacturer's serial number of the flash unit.

Then, if the value of the data indicative of the cumulative number of the recorded photographic pictures, which is included in the photography-related data stored in the image memory 1024, has increased by a predetermined number of pictures (for example, by one hundred pictures) from the value of the data indicative of the cumulative number of the recorded photographic pictures stored in the nonvolatile memory 1090 (Step S1138 in FIG. 23), the system controlling circuit 1050 reads the data indicative of the cumulative number of the recorded photographic pictures from the register of the system controlling circuit 1050 or the control data memory 1052 together with another data and flag such as the battery replacement flag, and stores the read data in the nonvolatile memory 1090. Thus, the system controlling circuit 1050 updates the contents of the data and flag,stored in the nonvolatile memory 1090 (Step S1139 in FIG. 23).

The present system may also be arranged so that, in the above-described operation, the contents of the data and the flag stored in the nonvolatile memory 1090 may be updated by reading only the data indicative of the cumulative number of the recorded photographic pictures from among the data and flag stored or set in the register of the system controlling circuit 1050 or the control data memory 1052.

On the other hand, if the value of the data indicative of the cumulative number of the recorded photographic pictures, which is included in the photography-related data stored in the image memory 1024, has not increased by the predetermined number of pictures (for example, by one hundred pictures) from the value of the data indicative of the cumulative number of the recorded photographic pictures stored in the nonvolatile memory 1090 (Step S1138 in FIG. 23), the process proceeds to Step S1140 which will be described later.

Then, if it is determined in Step S1140 that the recording starting switch 1064 remains on and that the system controlling circuit 1050 is instructed to continue a continuous-shooting operation, it is determined in Step S1141 of FIG. 23 whether the image memory 1024 has an empty area in which image data can be stored. If the image memory 1024 has an empty area in which image data can be stored, the process returns to Step S1132, and the above-described operation is repeated. On the other hand, if it is determined in Step S1140 that the recording starting switch 1064 is off and that the system controlling circuit 1050 is instructed to interrupt the continuous-shooting operation, or if it is determined in Step S1141 that since the image memory 1024 does not contain an empty area in which image data can be stored, no photographic operation can be performed, the system controlling circuit 1050 reads the image data and photography-related data stored in the image memory 1024 while storing management data, such as a FAT (file allocation table) representative of the state of use of each cluster corresponding to the unit of use of the information data recording area 1104, in a portion of the data recording area of the image memory 1024, which management data is to be recorded in the management data recording area 1102 of the recording medium 1100 together with the image data and the photography-related data. Then, the system controlling circuit 1050 records the read image data and photography-related data in the information data recording area 1104 of the recording medium 1100 through the memory controlling circuit 1020, the interface 1026, the connector 1030, the connector 1108 and the interface 1106. After that, the system controlling circuit 1050 reads the management data such as the FAT from the image memory 1024, and records the read management data in the management data recording area 1102 of the recording medium 1100 through the memory controlling circuit 1020, the interface 1026, the connector 1030, the connector 1108 and the interface 1106.

The above-described processing operation is performed on a plurality of photographic images on picture-by-picture basis, and is repeated by the number of times corresponding to the number of pictures which are respectively formed by the plurality of photographic images. When a series of processing operations comes to an end, the process returns to Step S1114 of FIG. 22 to detect whether the recording medium 1100 is attached to the system body 1200.

Since the aforementioned recording operations have respectively been described in detail in connection with the third embodiment with reference to FIG. 19 and in connection with the fourth embodiment with reference to FIG. 21, detailed description thereof is omitted.

The fifth embodiment has been described with reference to the example in which the contents of information indicated by the data or flag recorded in the nonvolatile memory 1090 include the data indicative of the cumulative number of the recorded photographic pictures which are respectively formed by the image signals recorded in the recording medium 1100, and the required data or flag, such as the battery replacement flag. However, the present system may also be arranged in such a manner that other data which will be described later, such as camera-related data, recording medium-related data and data indicative of the recording structure of data recorded in the recording medium 1100, may be stored in the nonvolatile memory 1090. Further, if the recording medium 1100 is a hard disk unit, data indicative of the number of start-up operations of the hard disk unit may be stored in the nonvolatile memory 1090.

If the present system is arranged in such a manner that data indicative of the recording structure of data recorded in the recording medium 1100 is stored in the nonvolatile memory 1090 as the contents of information indicated by the data or flag stored in the nonvolatile memory 1090, each time the operating mode of the system is set to the standby mode, the data indicative of the recording structure of data recorded in the recording medium 1100 is read from the register of the system controlling circuit 1050 or the control data memory 1052 and is then stored in the nonvolatile memory 1090. Each time the setting of the standby mode is cancelled, the data indicative of the recording structure of data recorded in the recording medium 1100 is read from the nonvolatile memory 1090 and is then written and stored in the register of the system controlling circuit 1050 or the control data memory 1052. According to the above-described arrangement, it is possible to record or reproduce file data on or from the recording medium 1100 without the need to start up the recording medium 1100 for the purpose of obtaining the data indicative of the recording structure of data recorded in the recording medium 1100.

If the recording medium 1100 is a hard disk unit, the data indicative of the recording structure of data recorded in the recording medium 1100 includes information such as the number of sectors required to form one track on each hard disk in the hard disk unit, the number of heads of the hard disk unit, the number of sectors required to form one cluster, the total number of clusters, position information about the leading sector of a first FAT, position information about the leading sector of a second FAT, position information about the leading sector of each directory entry, position information about the leading sector of the information data recording area 1104, a last allocation cluster indicating up to which cluster data are recorded, a next free cluster indicating from which cluster data can be recorded, the number of used clusters indicative of the number of clusters on which data are recorded, and the number of unused clusters indicative of the remaining number of recordable clusters.

The position information abort each of the leading sectors includes data indicative of the cylinder number, head number, sector number and the like of the hard disk.

Figure 24:
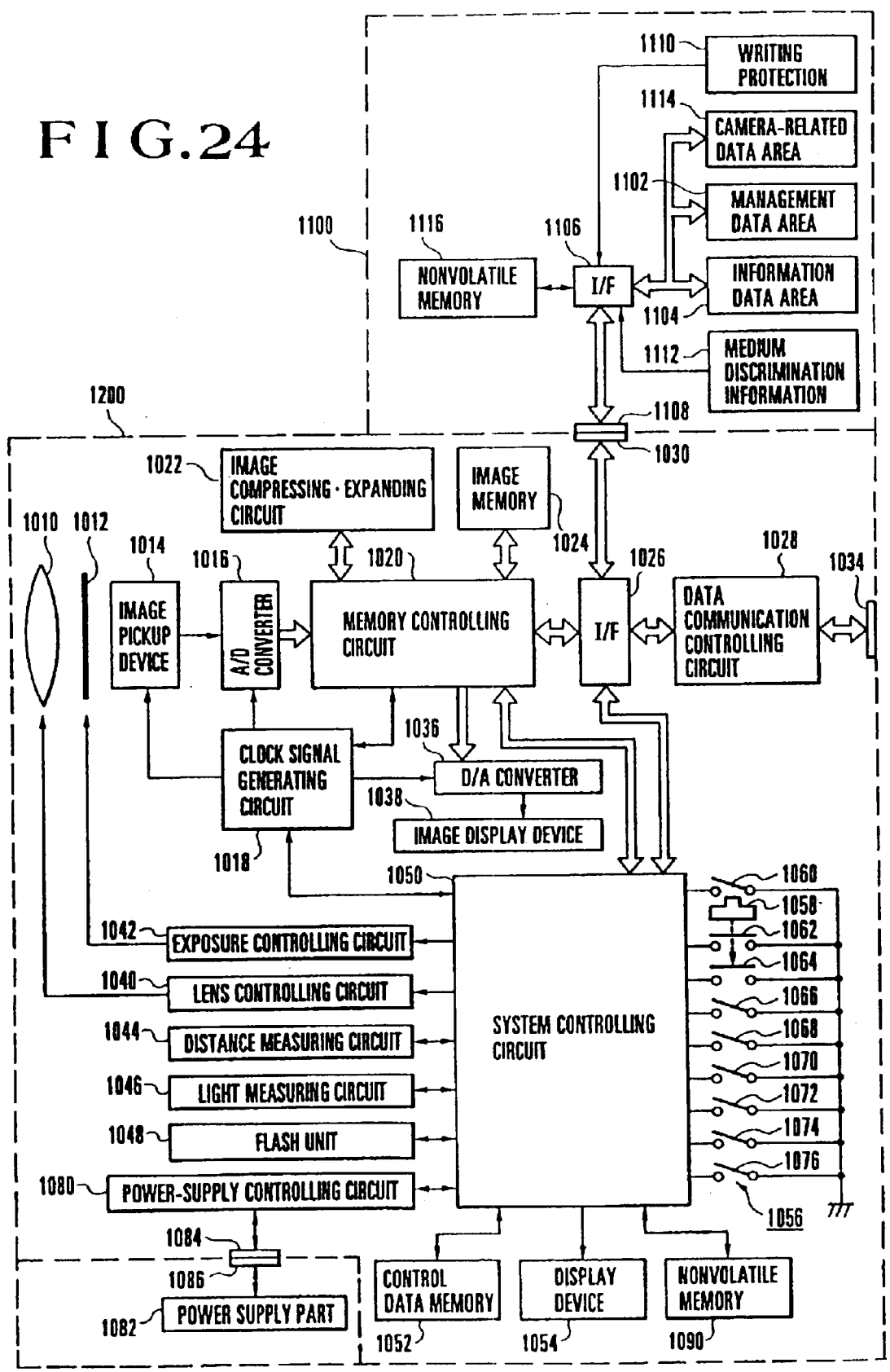
FIG. 24 is a block diagram schematically showing the arrangement of an electronic still video system to which the present invention is applied as a sixth embodiment thereof.

FIG. 24 is a block diagram schematically showing the arrangement of an electronic still video system to which the present invention is applied as a sixth embodiment thereof.

The operation of the electronic still video system according to the sixth embodiment of the present invention will be described below with reference to the flowcharts shown in FIGS. 16, 17, 18, 19, 20, 21, 25 and 26.

Figure 25:
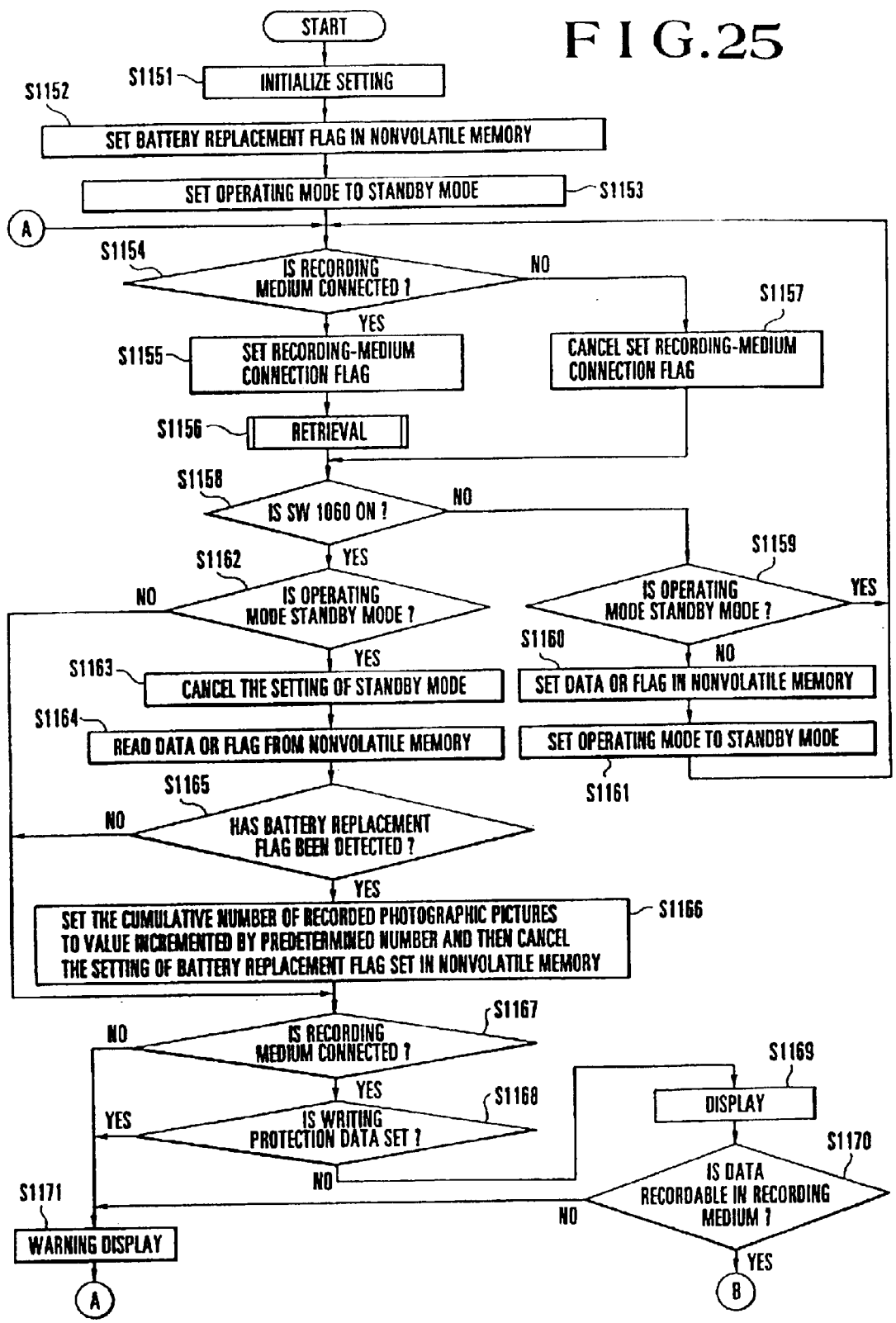
FIG. 25 is part of a flowchart showing the main operation routine of the electronic still video system shown in FIG. 24.
Figure 26:
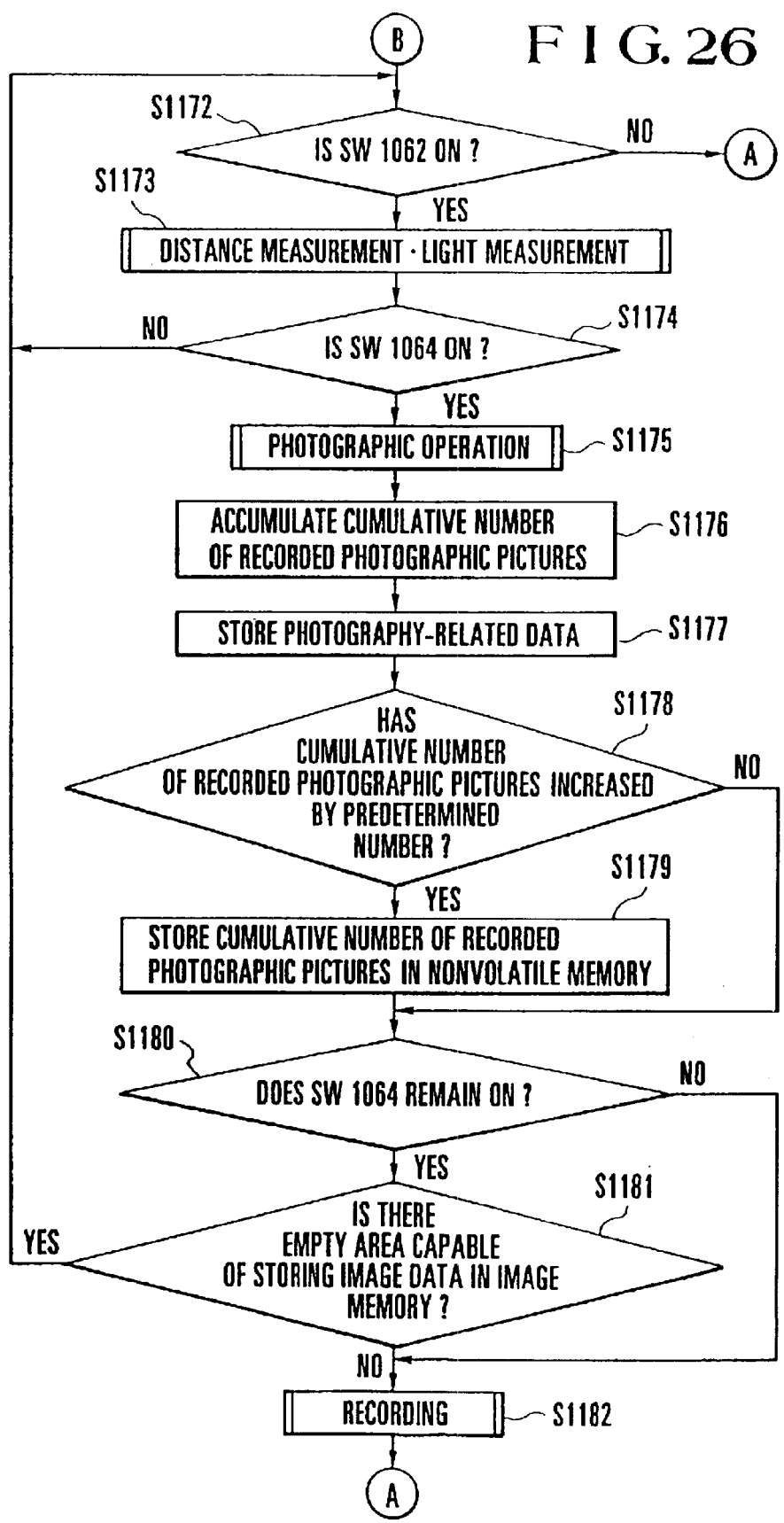
FIG. 26 is part of the flowchart showing the main operation routine of the electronic still video system shown in FIG. 24.

FIGS. 25 and 26 show in combination a flowchart of the main operating routine of the electronic still video system generally shown in FIG. 13.

Referring to FIGS. 25 and 26, when the power supply part 1082 is attached to the body of the electronic still video system, the system controlling circuit 1050 initializes various flags, control variables and the like (Step S1151 in FIG. 25), then sets a battery replacement flag in the nonvolatile memory 1090 (Step S1152 in FIG. 25), and then sets the operating mode of the system to the standby mode (Step S1153 in FIG. 25).

If the battery replacement flag is set in the nonvolatile memory 1090, the system controlling circuit 1050 determines that the battery of the power supply part 1082 has been replaced in the above-described manner.

Then, after the required processing has been executed, the battery replacement flag may be cancelled.

In a case where the operating mode of the system is set to the standby mode, the system controlling circuit 1050 turns off the display device 1054 as required, and causes the power-supply controlling circuit 1080 to stop the supply of electric power to each part as required, thereby preventing unnecessary power consumption.

Then, the system controlling circuit 1050 determines whether the recording medium 1100, such as a memory card or a hard disk, is connected to the system body 1200 (Step S1154 in FIG. 25). If the system controlling circuit 1050 determines that the recording medium 1100 is not connected to the system body 1200, the system controlling circuit 1050 cancels the recording-medium connection flag (Step S1157 in FIG. 25) and the process proceeds to Step S1158 which will be described later. If the system controlling circuit 1050 determines that the recording medium 1100 is connected to the system body 1200, the system controlling circuit 1050 sets the recording-medium connection flag (Step S1155 in FIG. 25) and reads from the recording medium 1100 discrimination information data indicative of the kind of recording medium used as the recording medium 1100, the data-recordable capacity and the characteristics of the recording medium, as well as camera-related data, recording medium-related data, management data which were used to perform photography and record the image data in the recording medium 1100. Then, the system controlling circuit 1050 performs retrieval as to the state of recording in the recording medium 1100 (Step S1156 in FIG. 25).

Since the retrieval operations have respectively been described in detail in connection with the third embodiment with reference to FIG. 16 and in connection with the fourth embodiment with reference to FIG. 20, detailed description thereof is omitted.

In the previously-described manner, if the recording medium 1100 is connected to the system body 1200, the system controlling circuit 1050 starts up the recording medium 1100 and reads data indicative of the kind of recording medium, its data-recordable capacity and the like, as well as detects whether an abnormality is present in file management information. If there is an abnormality, the system controlling circuit 1050 executes processing such as correction of the file management information, display of a warning indicative of the occurrence of the abnormality, and setting of inhibition of use of an abnormal portion in the information data recording area 1104.

Then, if the main switch 1060 is turned on (Step S1158 in FIG. 25) and if the operating mode of the system is the standby mode (Step S1162 in FIG. 25), the system controlling circuit 1050 cancels the standby mode (Step S1163 in FIG. 25), and causes the display device 1054 to provide display as required and causes the power-supply controlling circuit 1080 to supply the required amount of electric power to each part at the required time interval.

Then, the system controlling circuit 1050 reads, from a nonvolatile memory 1116, the required data or flag, such as the aforesaid battery replacement flag and data indicative of the cumulative number of photographic pictures recorded in the recording medium 1100 as image signals, and stores the read data or flag in the register of the system controlling circuit 1050 or the control data memory 1052 through the interface 1106, the connector 1108, the connector 1030 and the interface 1026 (Step S1164 in FIG. 25). If the battery replacement flag indicating that the battery of the power supply part 1082 has been replaced is detected (Step S1165 in FIG. 25), the system controlling circuit 1050 newly sets the value of the data indicative of the cumulative number of recorded photographic pictures to a value incremented by a predetermined number (for example, by one hundred pictures), and cancels the setting of the battery replacement flag in the nonvolatile memory 1116 (Step S1166 in FIG. 25).

Even if it is determined in Step S1158 that the main switch 1060 is on, if it is determined in Step S1162 that the operating mode of the system is not the standby mode or if it is determined in Step S1165 that no battery replacement flag is detected in the data or flag read from the nonvolatile memory 1116 and the battery of the power supply part 1082 has not been replaced, the process proceeds to Step S1167 which will be described later.

On the other hand, if it is determined in Step S1158 that the main switch 1060 is off, and if it is determined in Step S1159 that the operating mode of the system is not the standby mode, the system controlling circuit 1050 reads the required data or flag, such as the battery replacement flag and the data indicative of the cumulative number of photographic pictures recorded in the recording medium 1100 as image signals, from the register of the system controlling circuit 1050 or the control data memory 1052, and writes the read data or flag into the nonvolatile memory 1119 through the interface 1026, the connector 1030, the connector 1108 and the interface 1106 (Step S1160 in FIG. 25). After the system controlling circuit 1050 has set the operating mode of the system to the standby mode (Step S1161 in FIG. 25), the system controlling circuit 1050 returns the process to Step S1154 to detect whether the recording medium 1100 is attached to the system body 1200.

If it is determined in Step S1158 that the main switch 1060 is off, and if it is determined in Step S1159 that the operating mode of the system is the standby mode, the system controlling circuit 1050 returns the process to Step S1154 to detect whether the recording medium 1100 is attached to the system body 1200.

Then, the system controlling circuit 1050 checks the presence or absence of setting of the aforesaid recording medium connection flag. If it is determined (Step S1167 in FIG. 25) that the recording medium 1100 is connected to the system body 1200, and if it is determined (Step S1168 in FIG. 25) that the writing protection data indicative of writing protection is not set in the writing protection information recording area 1110 of the recording medium 1100 connected to the system body 1200, the process proceeds to Step S1169 of FIG. 25, where the system controlling circuit 1050 causes the display device 1054 to visually display the remaining recordable number of photographic pictures, the date of photography, a shooting mode, various messages and the like which are recorded in the recording medium 1100, on the basis of the aforementioned discrimination information data, camera-related data and recording medium-related data of the recording medium 1100, the management data recorded in the management data recording area 1102 of the recording medium 1100, various kinds of modes which are selectively set by the switch group 1056 and various kinds of modes which are selectively set according to the kind of the recording medium 1100 connected to the system body 1200 (Step S1169 in FIG. 25).

On the other hand, if the system controlling circuit 1050 checks the presence or absence of setting of the aforesaid recording medium connection flag and determines (Step S1167 in FIG. 25) that the recording medium 1100 is not connected to the system body 1200 or determines (Step S1168 in FIG. 25) that the writing protection data indicative of writing protection is set in the writing protection information recording area 1110 of the recording medium 1100, the process proceeds to Step S1171 of FIG. 25, where the system controlling circuit 1050 causes the display device 1054 to provide a warning display indicating that the recording medium 1100 is not connected or that the writing protection data is set. The process returns to Step S1154 to check the presence or absence of the attached recording medium 1100.

Then, the system controlling circuit 1050 checks the presence or absence of setting of the recording-medium unadaptable flag associated with the recording medium 1100 connected to the system body 1200. If the recording medium 1100 connected to the system body 1200 is a recording medium which is unusable with the present system or if the information data recording area 1104 of the recording medium 1100 contains no empty area in which data recording is possible (Step S1170 in FIG. 25), the system controlling circuit 1050 causes the display device 1054 to provide a warning display indicating that the recording medium 1100 is a recording medium unusable with the present system or that the information data recording area 1104 of the recording medium 1100 contains no empty area in which data recording is possible (Step S1171 in FIG. 25). Then, the process returns to Step S1154 to check the presence or absence of the attached recording medium 1100.

Then, the system controlling circuit 1050 detects the state of the distance·light measuring switch 1062. If the distance·light measuring switch 1062 is off, the process returns to Step S1154 (Step S1172 in FIG. 26). If the distance·light measuring switch 1062 is on, the system controlling circuit 1050 causes the distance measuring circuit 1044 to measure the distance to a subject and then moves the focusing lens of the photographic optical system 1010 on the basis of the result of the distance measurement executed by the distance measuring circuit 1044, thereby focusing the photographic optical system 1010 onto the subject. Further, the system controlling circuit 1050 causes the light measuring circuit 1046 to measure the luminance of the subject and, on the basis of the result of the light measurement executed by the light measuring circuit 1046, causes the exposure controlling circuit 1042 to control the diaphragm mechanism or the shutter mechanism of the exposure controlling member 1012 so that the subject optical image formed on the image pickup surface of the image pickup device 1014 achieves an optimum amount of exposure, thereby determining the amount of exposure of the subject by means of the exposure controlling member 1012 (Step S1173 in FIG. 26).

Then, the system controlling circuit 1050 detects the state of the recording starting switch 1064, and the distance measuring operation and the light measuring operation of Step S1173 are repeated until the recording starting switch 1064 is turned on (Step S1174 in FIG. 26). If it is determined that the recording starting switch 1064 is turned on, the system controlling circuit 1050 initiates photographing and recording operations, and causes the A/D conversion circuit 1016 to digitize an analog image signal outputted from the image pickup device 1014 and stores the obtained image data in the image memory 1024 (Step S1175 in FIG. 26).

Since the aforementioned distance measuring operation and light measuring operation have been described in detail in connection with the third embodiment with reference to FIG. 17 and in connection with the third embodiment with reference to FIG. 18, detailed description thereof is omitted.

During the above-described photographic operation, each time a photographic image is recorded, the system controlling circuit 1050 counts the number of recorded photographic pictures and accumulates the count number, thereby updating data indicative of the cumulative number of the recorded photographic pictures. The system controlling circuit 1050 temporarily stores the updated data in the register of the system controlling circuit 1050 or the control data memory 1052 (Step S1176 in FIG. 26). Then, the system controlling circuit 1050 obtains photography-related data containing data indicative of a discrimination number peculiar to the recorded photographic image, from data indicative of a discrimination number peculiar to the system body 1200 and the data indicative of the cumulative number of the recorded photographic pictures, and the system controlling circuit 1050 stores the thus-obtained, photography-related data in the image memory 1024 via the memory controlling circuit 1020 (Step S1177 in FIG. 26).

The aforesaid photography-related data includes, in addition to the discrimination number peculiar to the recorded photographic image, data indicative of various information such as the class number and manufacturer's serial number of the system body 1200, the size and kind of the image pickup device 1014 provided in the system body 1200, the total number of pixels of the image pickup device 1014, the presence or absence of a color filter, the kind, configuration and characteristics of the color filter or the discrimination number thereof, the characteristics or discrimination number of an infrared cut filter, the characteristics or discrimination number of an optical low-pass filter, the class number and manufacturer's serial number of a photographic lens used for photography, the focal length, measured distance, aperture value, and shutter speed value of the photographic lens during photography, a continuous-shooting speed value selected during photography, the date and time of photography, a temperature at the time of photography, the type of white balance, a color temperature at the time of photography, the use or nonuse of a flash unit, and the class number and manufacturer's serial number of the flash unit.

Then, if the value of the data indicative of the cumulative number of the recorded photographic pictures, which is included in the photography-related data stored in the image memory 1024, has increased by a predetermined number of pictures (for example, by one hundred pictures) from the value of the data indicative of the cumulative number of the recorded photographic pictures stored in the nonvolatile memory 1090 (Step S1178 in FIG. 26), the system controlling circuit 1050 reads the data indicative of the cumulative number of the recorded photographic pictures from the register of the system controlling circuit 1050 or the control data memory 1052 together with another data and flag such as the battery replacement flag, and stores the read data in the nonvolatile memory 1116 via the interface 1026, the connector 1030, the connector 1108 and the interface 1106. Thus, the system controlling circuit 1050 updates the contents of the data and flag stored in the nonvolatile memory 1116 (Step S1179 in FIG. 26).

The present system may also be arranged so that, in the above-described operation, the contents of the data and the flag stored in the nonvolatile memory 1116 may be updated by reading only the data indicative of the cumulative number of the recorded photographic pictures from among the data and flag stored or set in the register of the system controlling circuit 1050 or the control data memory 1052.

On the other hand, if the value of the data indicative of the cumulative number of the recorded photographic pictures, which is included in the photography-related data stored in the image memory 1024, has not increased by the predetermined number of pictures (for example, by one hundred pictures) from the value of the data indicative of the cumulative number of the recorded photographic pictures stored in the nonvolatile memory 1090 (Step S1178 in FIG. 26), the process proceeds to Step S1180 which will be described later.

Then, if it is determined in Step S1180 that the recording starting switch 1064 remains on and that the system controlling circuit 1050 is instructed to continue a continuous-shooting operation, it is determined in Step S1181 of FIG. 26 whether the image memory 1024 has an empty area in which image data can be stored. If the image memory 1024 has an empty area in which image data can be stored, the process returns to Step S1172, and the above-described operation is repeated. On the other hand, if it is determined in Step S1180 that the recording starting switch 1064 is off and that the system controlling circuit 1050 is instructed to interrupt the continuous-shooting operation, or if it is determined in Step S1181 that since the image memory 1024 does not contain an empty area in which image data can be stored, no photographic operation can be performed, the system controlling circuit 1050 reads the image data and photography-related data stored in the image memory 1024 while storing management data, such as a FAT representative of the state of use of each cluster corresponding to the unit of use of the information data recording area 1104, in a portion of the data recording area of the image memory 1024, which management data is to be recorded in the management data recording area 1102 of the recording medium 1100 together with the image data and the photography-related data. Then, the system controlling circuit 1050 records the read image data and photography-related data in the information data recording area 1104 of the recording medium 1100 through the memory controlling circuit 1020, the interface 1026, the connector 1030, the connector 1108 and the interface 1106. After that, the system controlling circuit 1050 reads the management data such as the FAT from the image memory 1024, and records the read management data in the management data recording area 1102 of the recording medium 1100 through the memory controlling circuit 1020, the interface 1026, the connector 1030, the connector 1108 and the interface 1106.

The above-described processing operation is performed on a plurality of photographic images on picture-by-picture basis and is repeated by the number of times corresponding to the number of pictures which are respectively formed by the plurality of photographic images. When a series of processing operations comes to an end, the process returns to Step S1154 of FIG. 25 to detect whether the recording medium 1100 is attached to the system body 1200 (Step S1182 of FIG. 26).

Since the aforementioned recording operation has been described in detail in connection with the third embodiment with reference to FIG. 19 and in connection with the fourth embodiment with reference to FIG. 21, detailed description thereof is omitted.

The sixth embodiment has been described with reference to the example in which the contents of information indicated by the data or flag recorded in the nonvolatile memory 1116 include the data indicative of the cumulative number of the recorded photographic pictures which are respectively formed by the image signals recorded in the recording medium 1100, and the required data or flag, such as the battery replacement flag. However, the present system may also be arranged in such a manner that other data which will be described later, such as camera-related data, recording medium-related data and data indicative of the recording structure of data recorded in the recording medium 1100, may be stored in the nonvolatile memory 1116. Further, if the recording medium 1100 is a hard disk unit, data indicative of the number of start-up operations of the hard disk unit may be stored in the nonvolatile memory 1116.

If the present system is arranged in such a manner that data indicative of the recording structure of data recorded in the recording medium 1100 is stored in the nonvolatile memory 1116 as the contents of information indicated by the data or flag stored in the nonvolatile memory 1116, each time the operating mode of the system is set to the standby mode, the data indicative of the recording structure of data recorded in the recording medium 1100 is read from the register of the system controlling circuit 1050 or the control data memory 1052 and is then stored in the nonvolatile memory 1116. Each time the setting of the standby mode is cancelled, the data indicative of the recording structure of data recorded in the recording medium 1100 is read from the nonvolatile memory 1116 and is then written and stored in the register of the system controlling circuit 1050 or the control data memory 1052. According to the above-described arrangement, it is possible to record or reproduce file data on or from the recording medium 1100 without the need to start up the recording medium 1100 for the purpose of obtaining the data indicative of the recording structure of data recorded in the recording medium 1100.

If the recording medium 1100 is a hard disk unit, the data indicative of the recording structure of data recorded in the recording medium 1100 includes information such as the number of sectors required to form one track on each hard disk in the hard disk unit, the number of heads of the hard disk unit, the number of sectors required to form one cluster, the total number of clusters, position information about the leading sector of a first FAT, position information about the leading sector of a second FAT, position information about the leading sector of each directory entry, position information about the leading sector of the information data recording area 1104, a last allocation cluster indicating up to which cluster data are recorded, a next free cluster indicating from which cluster data can be recorded, the number of used clusters indicative of the number of clusters on which data are recorded, and the number of unused clusters indicative of the remaining number of recordable clusters.

The position information about each of the leading sectors includes data indicative of the cylinder number, head number, sector number and the like of the hard disk.

Figure 27:
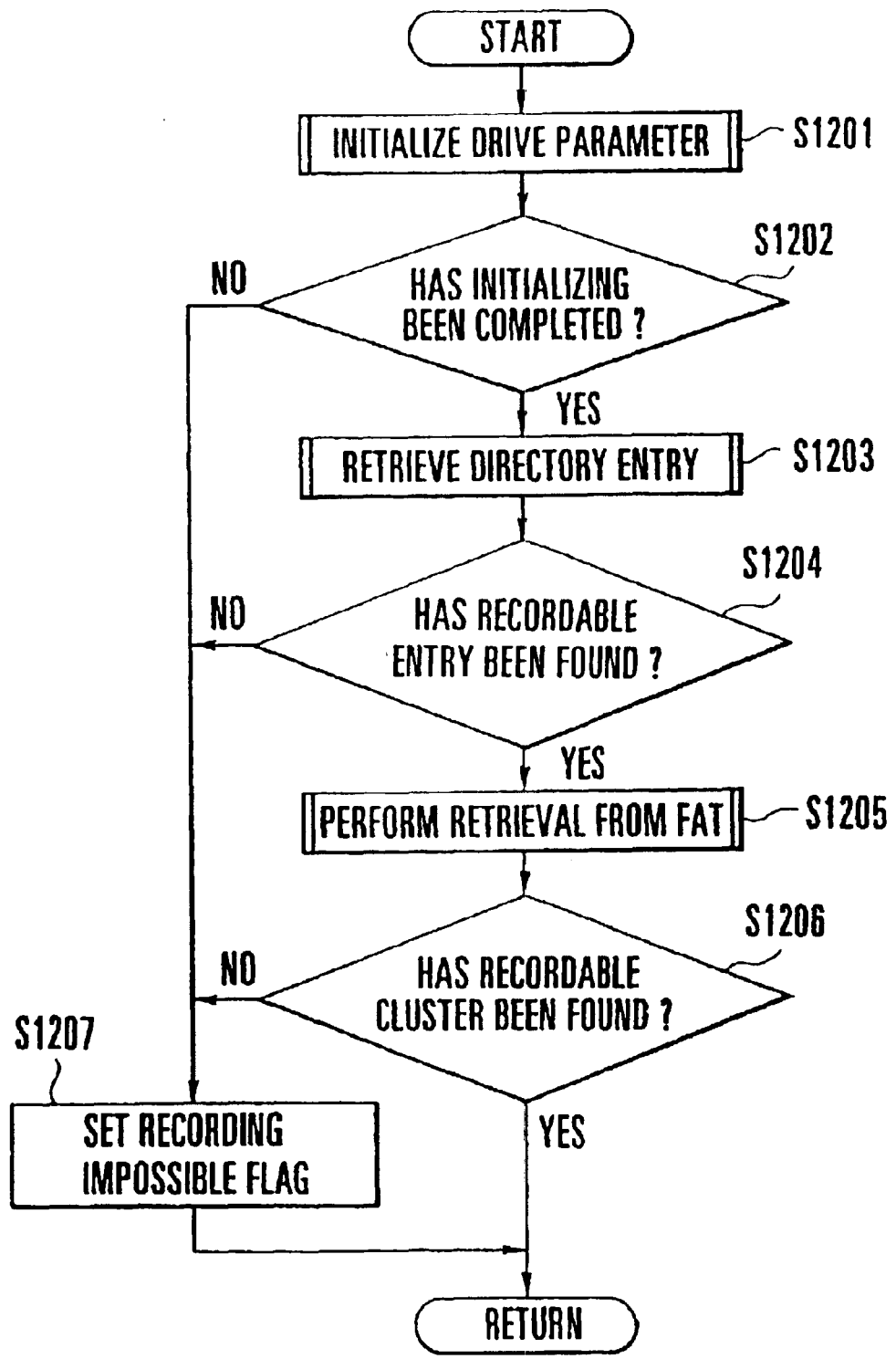
FIG. 27 is a flowchart which serves to explain in detail the retrieval operation routine executed in each of Step 1041 of FIG. 16 and Step S1087 of FIG. 20.

FIG. 27 is a flowchart which serves to explain in detail the file retrieval operation executed in each of Step S1041 of FIG. 16 and Step S1087 of FIG. 20.

Referring to FIG. 27, the system controlling circuit 1050 reads the management data indicative of various parameters which are recorded in the management data recording area 1102 of the recording medium 1100 connected to the system body 1200, and stores the read management data in a portion of the data recording area of the image memory 1024 through the interface 1106 and the connector 1108 of the recording medium 1100, the interface 1026 and the connector 1030 of the system body 1200 and the memory controlling circuit 1020. After that, the system controlling circuit 1050 reads the stored management data through the memory controlling circuit 1020 and stores the read management data in the register of the system controlling circuit 1050 or the control data memory 1052 to initialize drive parameters which are used in performing data recording in the recording medium 1100 (Step S1201 in FIG. 27).

The drive parameters include data indicative of, for example, the leading sector of the FAT recorded in the management data recording area 1102, the leading sector of each directory entry, the leading sector of the data recorded in the information data recording area 1104, and the last allocation cluster indicative of the number of a cluster in which the last data is recorded.

The operation of initializing the aforesaid drive parameters will be described below in greater detail.

If the operation of initializing the drive parameters is completed (Step S1202 in FIG. 27), retrieval is performed from data indicative of the directory entries, which are recorded in the management data recording area 1102 of the recording medium 1100 (Step S1203 in FIG. 27).

The operation of performing retrieval from the data indicative of the directory entries will be described later in greater detail.

If a directory entry in which data recording is possible is detected by performing retrieval from the data indicative of the directory entries (Step S1204 in FIG. 27), retrieval is performed from data indicative of the FAT recorded in the management data recording area 1102 (Step S1205 in FIG. 27).

The operation of performing retrieval from the data indicative of the FAT will be described later in greater detail.

If a cluster in the information data recording area 1104 in which data recording is possible is detected by performing retrieval from the data indicative of the FAT, the process brings the retrieval routine to an end and returns to the main operating routine.

During the above-described retrieval routine, if it is determined in Step S1202 of FIG. 27 that the operation of initializing the drive parameters has failed in Step S1201, or if it is determined in Step S1204 of FIG. 27 that no directory entry in which data recording is possible has been detected in Step S1203 of FIG. 27, or if it is determined in Step S1206 of FIG. 27 that no cluster in which data recording is possible has been retrieved from the data indicative of the FAT, the system controlling circuit 1050 sets a recording-impossible flag (Step S1207 in FIG. 27), and brings the retrieval routine to an end and returns to the main operating routine.

Figure 28:
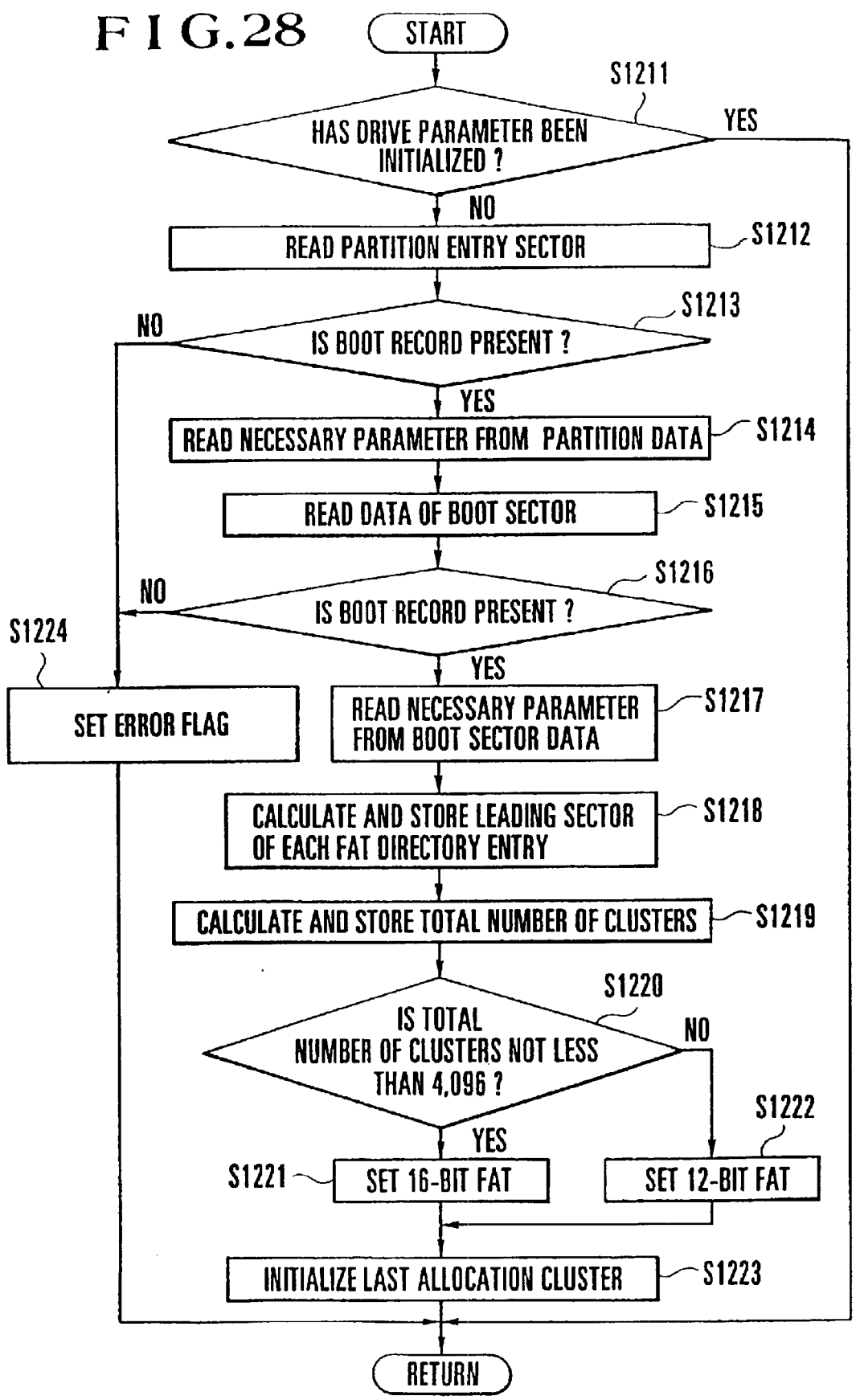
FIG. 28 is a flowchart which serves to explain in detail the drive-parameter initializing operation routine executed in Step S1201 of FIG. 27.

FIG. 28 is a flowchart which serves to explain in detail the drive-parameter initializing routine executed in Step S1201 of FIG. 27.

Referring to FIG. 28, the system controlling circuit 1050 reads the management data indicative of various parameters, which are recorded in the management data recording area 1102 of the recording medium 1100 connected to the system body 1200, and stores the read management data in a portion of the data recording area of the image memory 1024 through the interface 1106 and the connector 1108 of the recording medium 1100 and the connector 1030, the interface 1026 and the memory controlling circuit 1020 of the system body 1200. In the above-described manner, the system controlling circuit 1050 initializes the drive parameters which are used in performing data recording on the recording medium 1100. However, if no initialization of the drive parameters has yet been completed (Step S1211 in FIG. 28), the system controlling circuit 1050 reads, from the management data recording area 1102 of the recording medium 1100, data recorded in a partition entry sector which data contains partition information indicative of the configuration of the management data recording area 1102 and the information data recording area 1104 of the recording medium 1100, and stores the read data in a portion of the data recording area of the image memory 1024 (Step S1212 in FIG. 28).

Then, if it is confirmed that a boot record indicating that the data recorded in the partition entry sector represents correct information is present (Step S1213 in FIG. 28), the system controlling circuit 1050 temporarily stores the necessary parameters, which are selected from the partition data contained in the data read from the partition entry sector, in a portion of the data recording area of the image memory 1024. After that, the system controlling circuit 1050 stores such parameters in the register of the system controlling circuit 1050 or the control data memory 1052 (Step S1214 in FIG. 28).

Then, on the basis of the detected parameters, the system controlling circuit 1050 reads, from the management data recording area 1102 of the recording medium 1100, data recorded in a boot sector which data contains information indicative of the detailed configuration of the management data recording area 1102 and the information data recording area 1104 of the recording medium 1100, and stores the read data in a portion of the data recording area of the image memory 1024 (Step S1215 in FIG. 28). If it is confirmed that a boot record indicating that the data recorded in the boot sector represents correct information is present (Step S1216 in FIG. 28), the system controlling circuit 1050 temporarily stores the necessary parameters, which are selected from the data read from the boot sector, in a portion of the data recording area of the image memory 1024. After that, the system controlling circuit 1050 stores such parameters in the register of the system controlling circuit 1050 or the control data memory 1052 (Step S1217 in FIG. 28).

Then, the system controlling circuit 1050 obtains, through a computation, the leading sector of the FAT recorded in the management data recording area 1102, the leading sector of each of the directory entries, the number of the leading sector of the data recorded in the information data recording area 1104, and the like (Step S1218 in FIG. 28). Further, the system controlling circuit 1050 obtains, through a computation, the number of clusters each of which corresponds to the unit of use of the information data recording area 1104, and writes the obtained number into the register of the system controlling circuit 1050 or the control data memory 1052 (Step S1219 in FIG. 28).

If the total number of the calculated and stored clusters is not less than 4,096, the system controlling circuit 1050 sets a 16-bit FAT so that the 16-bit FAT can be used (Steps S1220 and S1221 in FIG. 28). If the total number of the calculated and written clusters is less than 4,096, the system controlling circuit 1050 sets a 12-bit FAT so that the 12-bit FAT can be used (Steps S1220 and S1222 in FIG. 28). Then, the system controlling circuit 1050 initializes the last allocation cluster indicative of the number of a cluster in which the last data is recorded (Step S1223 in FIG. 28). Then, the system controlling circuit 1050 brings the drive parameter initializing routine to an end and returns the process to the main operating routine.

If it is not confirmed in Step S1213 or S1216 that a boot record is present in the data recorded in the partition entry sector or the boot sector, the system controlling circuit 1050 sets an error flag (Step S1224 in FIG. 28). Then, the system controlling circuit 1050 brings the drive parameter initializing routine to an end and returns the process to the main operating routine.

Figure 29:
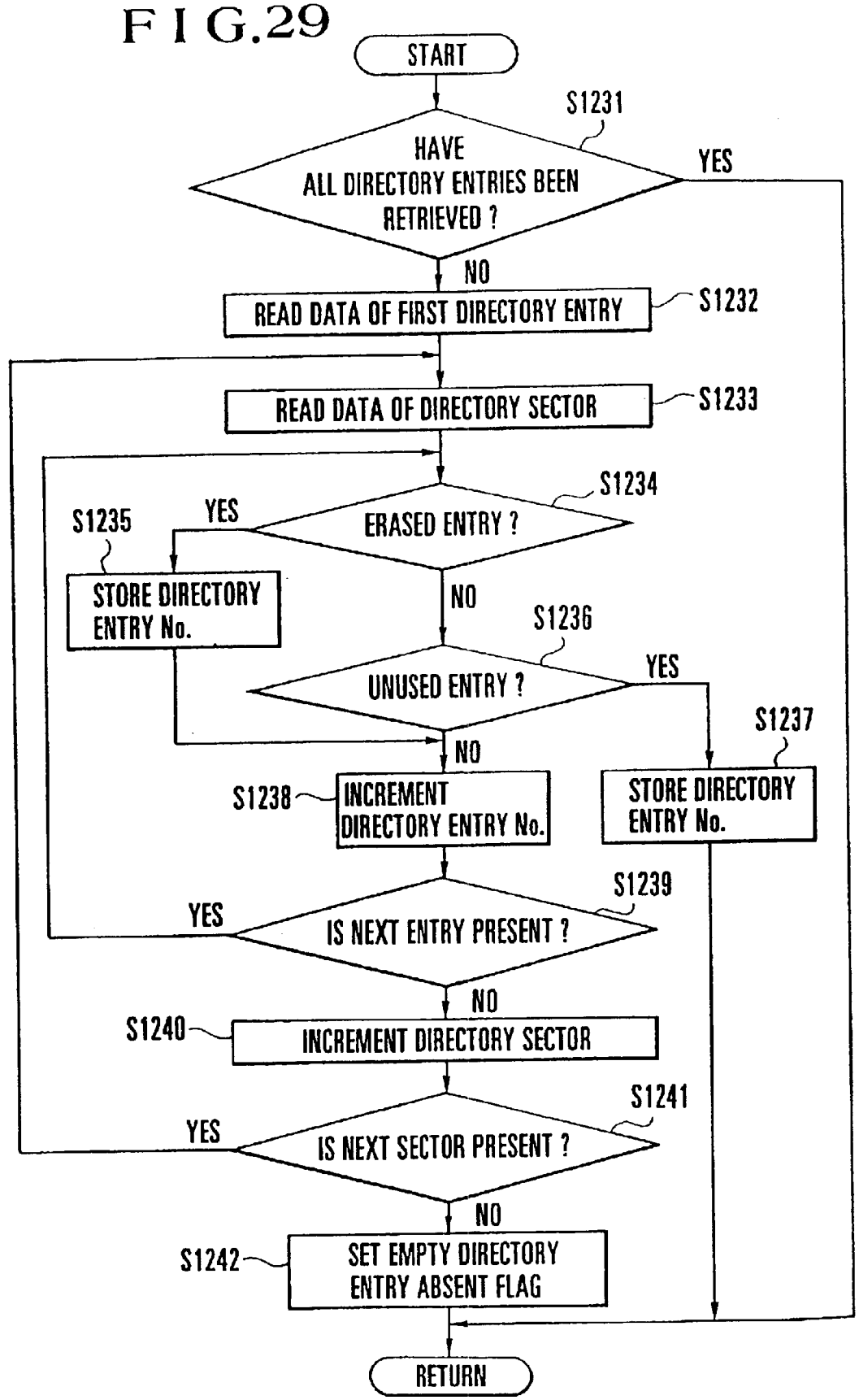
FIG. 29 is a flowchart which serves to explain in detail the directory entry retrieval operation routine executed in Step S1203 of FIG. 27.

FIG. 29 is a flowchart which serves to explain in detail the directory entry retrieval routine executed in Step S1203 of FIG. 27.

Referring to FIG. 29, the system controlling circuit 1050 reads data indicative of the directory entries, which data are recorded in the management data recording area 1102 of the recording medium 1100, and temporarily stores the read data in a portion of the data recording area of the image memory 1024 through the interface 1106 and the connector 1108 of the recording medium 1100 and the connector 1030, the interface 1026 and the memory controlling circuit 1020 of the system body 1200. In the above-described manner, the system controlling circuit 1050 performs retrieval from the data indicative of the directory entries. However, if the operation of performing retrieval from the data indicative of the directory entries has not yet been completed (Step S1231 in FIG. 29), the system controlling circuit 1050 sets data indicative of the number of the first directory entry in the register of the system controlling circuit 1050 (Step S1232 in FIG. 29). Then, the system controlling circuit 1050 reads the data recorded in a sector containing the number of the directory entry set in the register of the system controlling circuit 1050, from among the data recorded in the management data recording area 1102 of the recording medium 1100 (Step S1233 in FIG. 29). If a directory entry corresponding to the number set in the register of the system controlling circuit 1050 shows an attribute indicating that data is erased (Step S1234 in FIG. 29), the system controlling circuit 1050 writes data indicative of the number of the directory entry into the data recording area set in the image memory 1024 or into the register of the system controlling circuit 1050 or the control data memory 1052 (Step S1235 in FIG. 29).

Then, until a directory entry showing an attribute indicating that no data is recorded is detected (Step S1236 in FIG. 29), the number of the directory entry is incremented (Step S1238 in FIG. 29). The retrieval operation is continued until the number of an unretrieved directory entry is not detected in the sector from which data reading is being performed (Step S1239 in FIG. 29).

Then, if the number of an unretrieved directory entry is not detected in the sector from which data reading is being performed (Step S1239 in FIG. 29), the number of the sector is incremented (Step S1240 in FIG. 29). The retrieval operation is continued until the number of the sector of a directory entry from which to read data is not detected (Step S1241 in FIG. 29). If the number of the sector of a directory entry from which to read data is not detected (Step S1241 in FIG. 29), the system controlling circuit 1050 writes an empty directory entry absent flag into the data recording area set in the image memory 1024 or into the register of the system controlling circuit 1050 or the control data memory 1052 (Step S1242 in FIG. 29). The system controlling circuit 1050 brings the directory entry retrieval routine to an end and returns the process to the main operating routine.

In Step S1236, if a directory entry indicative of an attribute indicating that no data is recorded is detected, the system controlling circuit 1050 writes data indicative of the number of the directory entry into the data recording area set in the image memory 1024 or into the register of the system controlling circuit 1050 or the control data memory 1052 (Step S1237 in FIG. 29). Then, the system controlling circuit 1050 brings the directory entry retrieval routine to an end and returns the process to the main operating routine.

Figure 30:
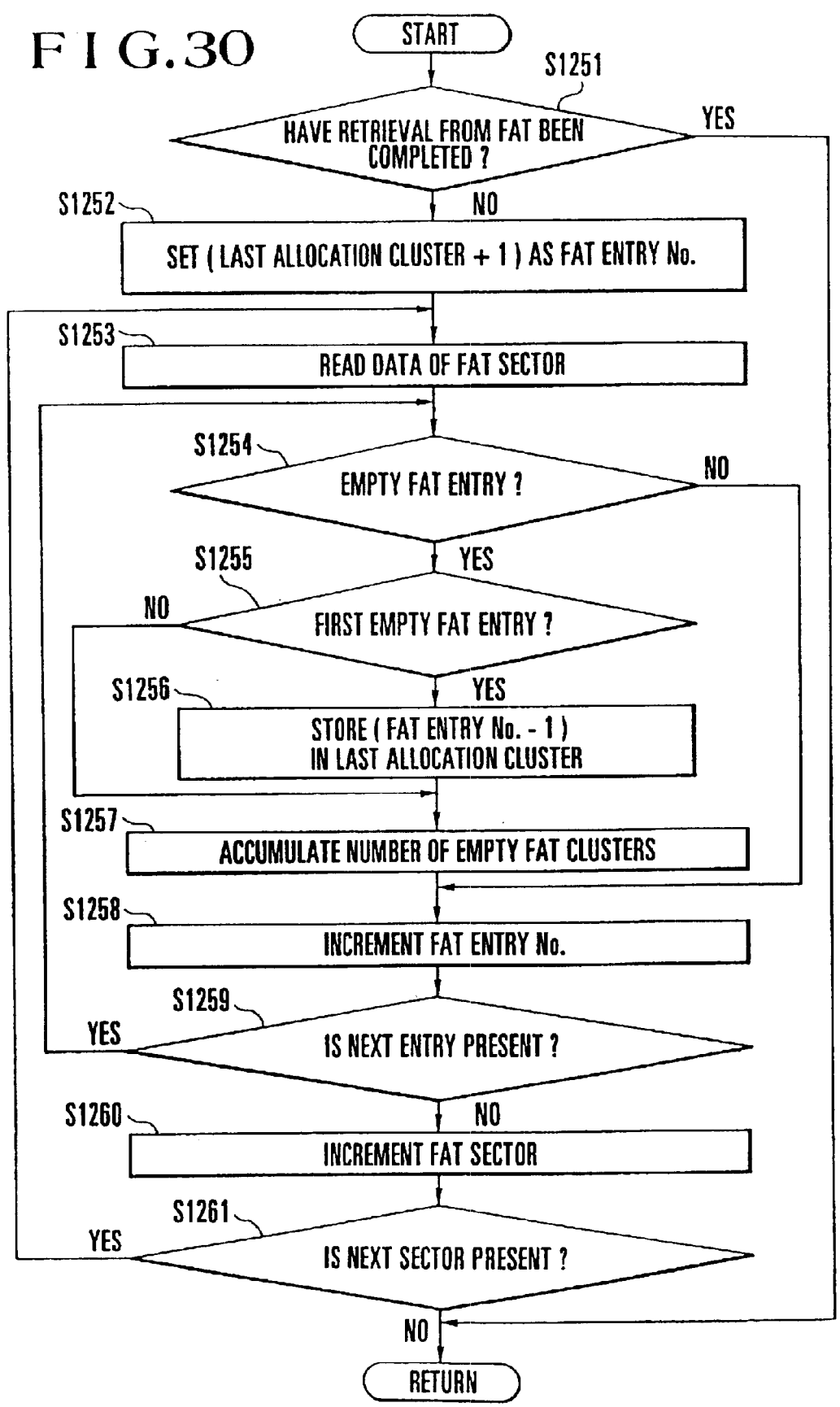
FIG. 30 is a flowchart which serves to explain in detail the file allocation table retrieval operation routine executed in Step S1205 of FIG. 27.

FIG. 30 is a flowchart which serves to explain in detail the file allocation table (FAT) retrieval routine executed in Step S1205 of FIG. 27.

Referring to FIG. 30, the system controlling circuit 1050 reads the management data recorded in the management data recording area 1102 of the recording medium 1100 and temporarily writes the read data into the data recording area set in the image memory 1024 through the interface 1106 and the connector 1108 of the recording medium 1100 and the connector 1030, the interface 1026 and the memory controlling circuit 1020 of the system body 1200. After that, the system controlling circuit 1050 reads the written data into the register of the system controlling circuit 1050 or the control data memory 1052. In the above-described manner, the system controlling circuit 1050 performs retrieval of the data indicative of the FAT. If no retrieval of the data indicative of the FAT has yet been completed (Step S1251 in FIG. 30), the system controlling circuit 1050 sets, as one of the drive parameters, a cluster number corresponding to a value obtained by adding "1" to a value indicated by the last allocation cluster, which cluster number is stored in the register of the system controlling circuit 1050 or the control data memory 1052, in the register of the system controlling circuit 1050 or the control data memory 1052 (Step S1252 in FIG. 30). The data recorded in the sector which contains the cluster corresponding to the set number is read from the management data recording area 1102 of the recording medium 1100 (Step S1253 in FIG. 30).

Then, if the number of an entry of an empty FAT which indicates a cluster in which data recording is possible is detected in the information data recording area 1104 of the recording medium 1100 (Step S1254 in FIG. 30) and, further, if the detected number of the entry of the empty FAT corresponds to the first detected entry number (Step S1255 in FIG. 30), the system controlling circuit 1050 stores, as the last allocation cluster, the number of the entry of the FAT immediately before the detected number of the entry of the empty FAT in the register of the system controlling circuit 1050 or the control data memory 1052 (Step S1256 in FIG. 30). Accordingly, it is possible to detect the number of the next cluster in which to record data, without newly performing retrieval.

Each time the entry of an empty FAT is detected, the system controlling circuit 1050 accumulates the number of empty clusters (Step S1257 in FIG. 30), whereby it is possible to detect the amount of data recordable in the information data recording area 1104 of the recording medium 1100, without newly performing retrieval.

Then, the system controlling circuit 1050 increments the entry number of the FAT (Step S1258 in FIG. 30), and continues the retrieval until no entry number of an unretrieved FAT is detected in the sector from which data reading is being performed (Step S1259 in FIG. 30).

If no entry number of an unretrieved FAT is detected in the sector from which data reading is being performed (Step S1259 in FIG. 30), the number of the sector is incremented (Step S1260 in FIG. 30) and the retrieval operation is continued until the number of the sector of a FAT from to read data is not detected (Step S1261 in FIG. 30). If the number of the sector of the FAT is not detected (Step S1261 in FIG. 30), the system controlling circuit 1050 brings the FAT entry retrieval routine to an end and returns the process to the main operating routine.

Figure 31:
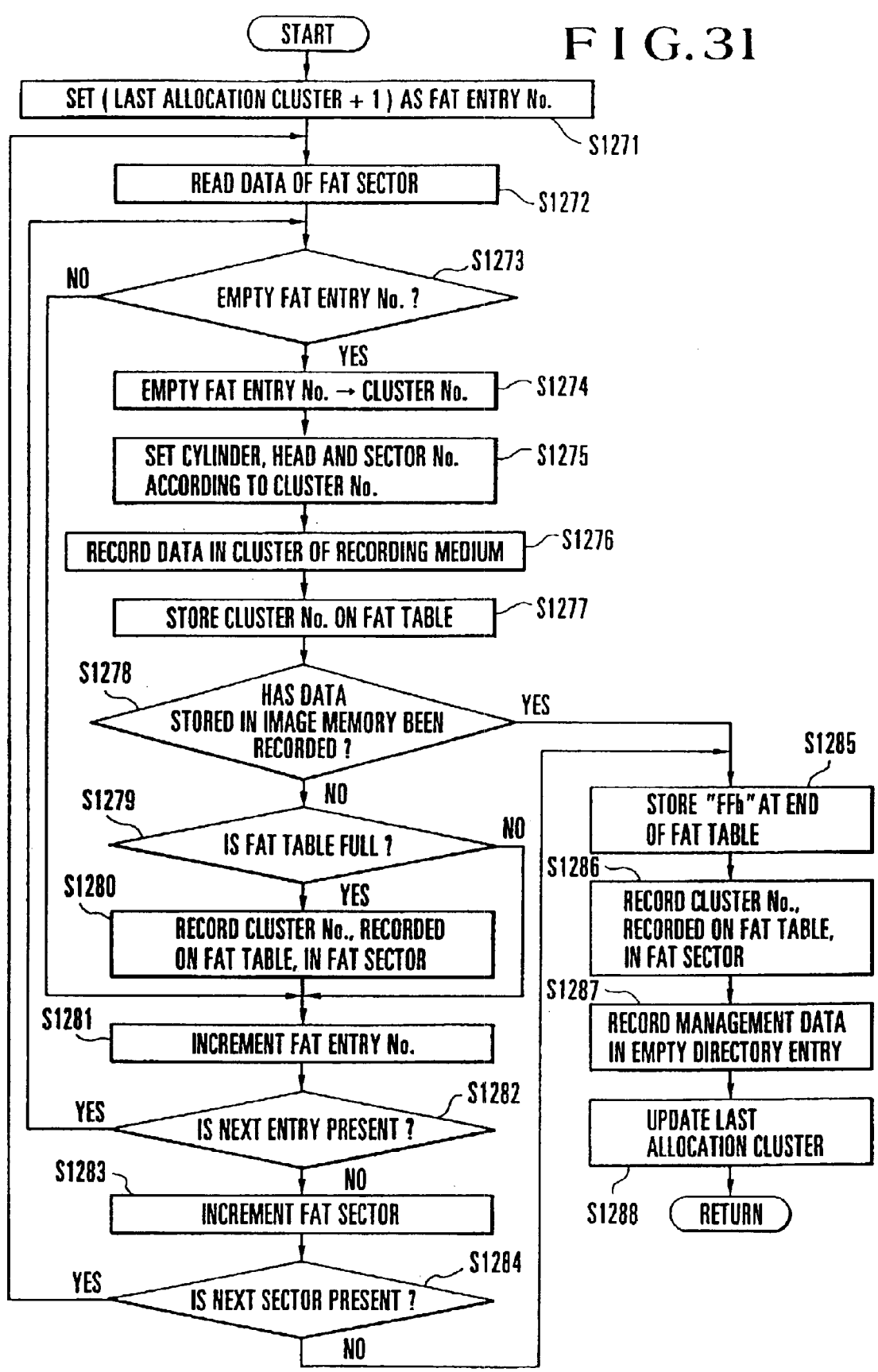
FIG. 31 is a flowchart which serves to explain in detail the file recording operation routine executed in each of Step S1073 of FIG. 19 and Steps S1103 and S1107 of FIG. 21.

FIG. 31 is a flowchart which serves to explain in detail the file recording operation routine executed in Step S1073 of FIG. 19 and in each of Steps S1103 and S1107 of FIG. 21.

Referring to FIG. 31, the system controlling circuit 1050 reads, as one of the drive parameters, a cluster number corresponding to a value obtained by adding "1" to the value of the last allocation cluster, which cluster number is stored in the register of the system controlling circuit 1050 or the control data memory 1052, and then sets the read cluster number in the register of the system controlling circuit 1050 as the number of an entry of data of the FAT (Step S1271 in FIG. 31). The data recorded in the sector which contains the set number of the entry of the FAT is read from the management data recording area 1102 of the recording medium 1100 and is then written from the management data recording area 1102 of the recording medium 1100 into the data recording area set in the image memory 1024 through the interface 1106 and the connector 1108 of the recording medium 1100 and the connector 1030, the interface 1026 and the memory controlling circuit 1020 of the memory controlling circuit 1020 (Step S1272 in FIG. 31).

Subsequently, the system controlling circuit 1050 continues the retrieval operation until the number of an entry of an empty FAT indicative of a cluster in which data recording is possible is detected in the information data recording area 1104 of the recording medium 1100 (Step S1273 in FIG. 31) or until the entry number of the FAT is incremented (Step S1281 in FIG. 31) up to an entry number beyond which no entry number of the unretrieved FAT is detected in a sector from which data reading is being performed (Step S1282 in FIG. 31).

If no entry number of the unretrieved FAT is detected in the sector from which data reading is being performed (Step S1282 in FIG. 31), the number of the sector is incremented (Step S1283 in FIG. 31). Thus, the retrieval operation is continued until the number of the last sector in the FAT from which data reading is being performed is reached (Step S1284 in FIG. 31).

If the number of the entry of the empty FAT is detected in Step S1273, the system controlling circuit 1050 sets the number of the number of the detected empty FAT in the register of the system controlling circuit 1050 as the number of a cluster (Step S1274 in FIG. 31). If the recording medium 1100 is a hard disk, the system controlling circuit 1050 obtains a cylinder number, a head number and a sector number all of which correspond to the number of the cluster set in the register, and sets them in the interface 1106 of the recording medium 1100 (Step S1275 in FIG. 31). Then, the image data stored in the image memory 1024 is read by the memory controlling circuit 1020, and the read image data is recorded in the cluster within the information data recording area 1104 of the recording medium 1100 which cluster corresponds to the cylinder number, the head number and the sector number all of which have been set in the interface 1106 by the system controlling circuit 1050, through the interface 1026 and the connector 1030 of the system body 1200 and the connector 1108 and the interface 1106 of the recording medium 1100 (Step S1276 in FIG. 31).

In Step S1277 of FIG. 31, the system controlling circuit 1050 stores the number of the cluster contained in the information data recording area 1104 of the recording medium 1100 in which the image data is recorded, on the FAT provided in a portion of the data recording area of the image memory 1024 which has been set as an area for storing the management data recorded in the management data recording area 1102 of the recording medium 1100.

The above-described recording operation is continued until all image data stored in the image memory 1024 are read and recorded in the recording medium 1100 (Step S1278 in FIG. 31).

If the data is fully stored on the FAT table (Step S1279 in FIG. 31), a sequence of cluster numbers indicated by the data stored on the FAT table constitutes the values of a FAT chain to be written into a FAT entry, and the system controlling circuit 1050 records the data stored on the FAT table provided in a portion of the data recording area, which has been set as the area for storing the management data recorded in the management data recording area 1102 of the recording medium 1100, in the FAT sector in the management data recording area 1102 of the recording medium 1100 through the memory controlling circuit 1020, the interface 1026 and the connector 1030 of the system body 1200 and the connector 1108 and the interface 1106 of the recording medium 1100 (Step S1280 of FIG. 31).

Then, if all the image data stored in the image memory 1024 are read (Step S1278 in FIG. 31), data "FFh" indicative of the end cluster of the FAT chain is written to the end of the FAT table (Step S1285 in FIG. 31). Then, data indicative of the sequence of the cluster numbers stored on the FAT table are recorded in the corresponding FAT sector in the management data recording area 1102 of the recording medium 1100 as data indicative of the values of the numbers of FAT entries (Step S1286 in FIG. 31). Then, the system controlling circuit 1050 obtains management data corresponding to the image data recorded in the information data recording area 1104 of the recording medium 1100, and records the obtained management data in an empty directory entry in the management data recording area 1102 of the recording medium 1100 through the interface 1026, the connector 1030 of the system body 1200 and the connector 1108 and the interface 1106 of the recording medium 1100 (Step S1287 in FIG. 31). To update the value of the last allocation cluster, the system controlling circuit 1050 writes data indicative of the value of the last allocation cluster which data is stored in the register of the system controlling circuit 1050 or the control data memory 1052 as one of the drive parameters, and causes the process to return to the main operating routine (Step S1288 in FIG. 31).

It is to be noted that, in the system according to any of the third to sixth embodiments, the recording medium 1100 is not limited to a memory card or a hard disk unit, and may also be a micro DAT (digital audio tape) unit, an optomagneto disk unit, an optical disk unit or the like. In this case as well, it is possible to achieve advantages similar to those of the third to sixth embodiments.

In the system according to any of the third to sixth embodiments, the recording medium 1100 may also be a composite recording medium in which a memory card and a hard disk unit are integrally assembled. The composite recording medium may also removably include the memory card or the hard disk unit so that the memory card or the hard disk unit can be arbitrarily connected to or separated from the body of the composite recording medium. of course, the composite recording medium may be composed of two or more kinds of recording media selected from among the memory card, the hard disk unit, the micro DAT, the optomagneto disk unit, the optical disk unit and the like.

In the above description of the third to sixth embodiments, reference has been made to the arrangement in which the recording medium 1100, such as the memory card or the hard disk unit, is removably connected to the system body 1200 so that the recording medium 1100 can be arbitrarily connected to and separated from the system body 1200. However, it is also possible to adopt an arrangement in which two or more kinds of recording media are connectable to the system body 1200 or an arrangement in which two or more kinds of recording media are fixed to the system body 1200. It is also possible to adopt an arrangement in which one of two or more kinds of recording media are fixed to the system body 1200 and another one is removably connected to the system body 1200 so that it can be arbitrarily connected to and separated from the system body 1200.

As described above, in the third to sixth embodiments, when image data indicative of an image is to be recorded in a recording medium such as a memory card or a hard disk unit, the number of recorded photographic pictures is counted and data indicative of the counted number is stored in a nonvolatile memory provided in a system body, and the data indicative of the counted number stored in the nonvolatile memory is recorded as a discrimination number together with the image data. Accordingly, when predetermined image data recorded in the recording medium is to be read out and transmitted to an external device, such as an external computer, a printer and a data transmission device, on file-by-file basis, for the purpose of executing various processing such as operational processing, printing processing or data transmission processing in the external device, it is possible to prevent a file having another image data from being erroneously read out together with the desired file. Otherwise, when a file having predetermined image data is to be erased, it is possible to prevent a file having another image data from being erroneously erased together with the desired file.

As described above, in the third to sixth embodiments, each time the number of photographic pictures recorded in the recording medium reaches a predetermined number, data indicative of the number of recorded photographic pictures is stored in the nonvolatile memory provided in the system body, so that it is possible to reduce the number of times of rewriting of data of the nonvolatile memory. Accordingly, it is possible to increase the lifetime of the nonvolatile memory.

Further, in the third to sixth embodiments, if the battery of the system body is removed and replaced, the contents of data indicative of the number of recorded photographic pictures, which data is stored in the nonvolatile memory provided in the system body, are updated by being increased by a predetermined number. Accordingly, it is possible to prevent a discrimination number added to an old file having image data recorded in the recording medium from being added to a file having image data to be newly recorded in the recording medium. When predetermined image data recorded in the recording medium is to be read out and transmitted to an external device, such as an external computer, a printer and a data transmission device, on file-by-file basis, for the purpose of executing various processing such as operational processing, printing processing or data transmission processing in the external device, it is possible to prevent a file having another image data from being erroneously read out together with the desired file. Otherwise, when a file having predetermined image data is to be erased, it is possible to prevent a file having another image data from being erroneously erased together with the desired file.

As described above, according to the third to sixth embodiments, it is possible to provide an information signal processing apparatus of good operability which is capable of preventing erroneous discrimination information from being added to an information signal when discrimination information which serves to discriminate among information signals to be recorded in a recording medium in predetermined units is to be added to the information signal, so that the information signal can be recorded in the recording medium with correct discrimination information added to the information signal. In such an information signal processing apparatus, it is possible to accurately read out the information signal recorded in the recording medium in the predetermined units so that the read information signal can be erased or subjected to various processings in the external device.

Figure 32:
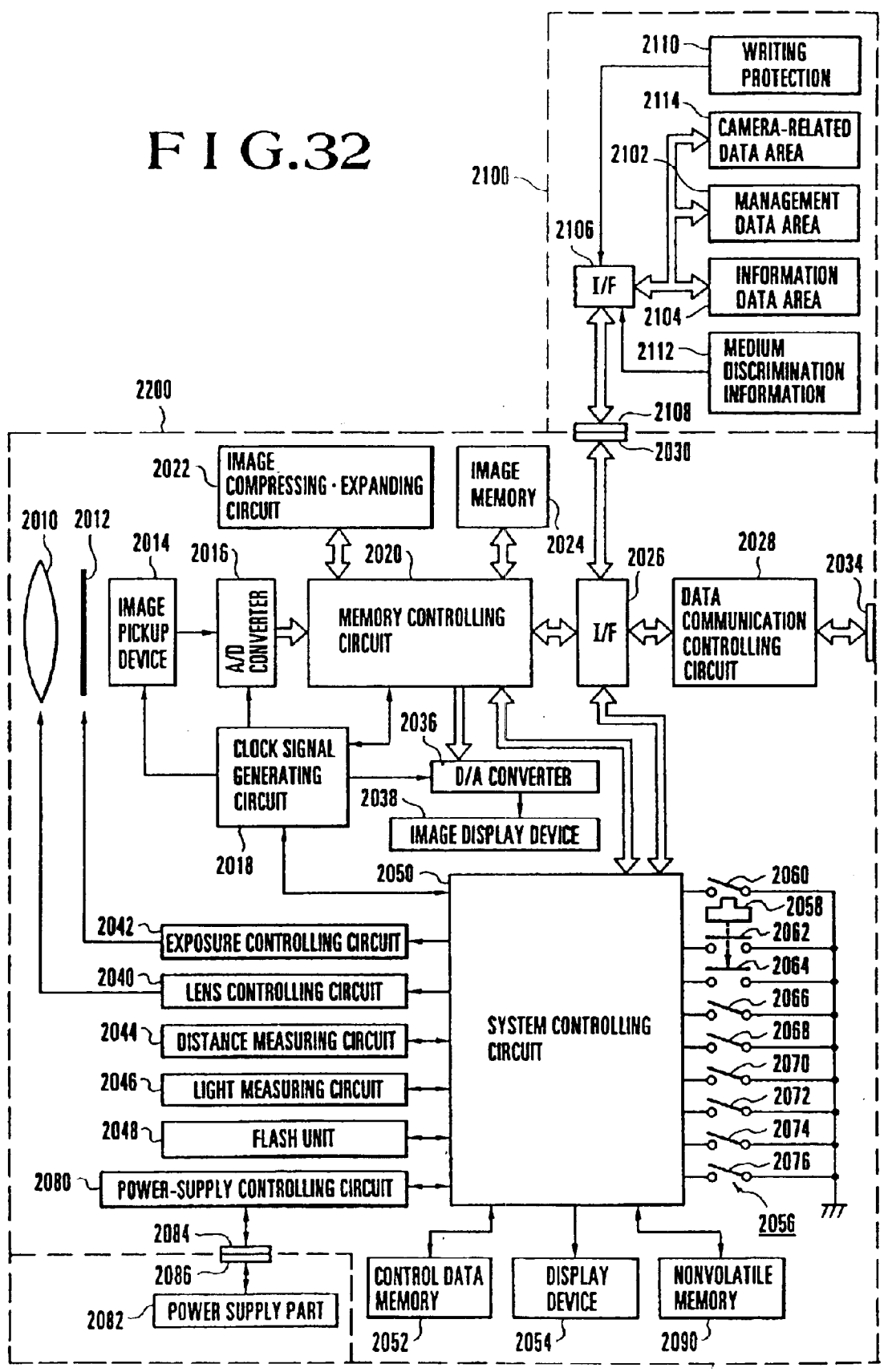
FIG. 32 is a block diagram schematically showing the arrangement of an electronic still video system to which the present invention is applied as a seventh embodiment thereof.

FIG. 32 is a block diagram schematically showing the arrangement of an electronic still video system to which the present invention is applied as a seventh embodiment thereof.

The electronic still video system shown in FIG. 32 includes a photographic optical system 2010 composed of a photographic lens, an exposure controlling member 2012 made up of a diaphragm mechanism, a shutter mechanism and associated elements, an image pickup device 2014 for converting a photographic optical image formed by the photographic optical system 2010 and the exposure controlling member 2012 into an image signal of electrical-signal form, an analog/digital (A/D) conversion circuit 2016 for digitizing an analog image signal outputted from the image pickup device 2014 and outputting image data, and a clock signal generating circuit 2018 for supplying various signals, such as a clock signal and a control signal, to the image pickup device 2014, the A/D conversion circuit 2016, a memory controlling circuit 2020 and a digital/analog (D/A) converter 2036 which will be described later. The clock signal generating circuit 2018 is controlled by the memory controlling circuit 2020 as well as a system controlling circuit 2050 which will be described later.

The electronic still video system shown in FIG. 32 also includes an image compressing-expanding circuit 2022 for compressing or expanding image data by a compression/expansion method such as adaptive discrete cosine transform (ADCT), and an image memory 2024.

The memory controlling circuit 2020 is provided for controlling the clock signal generating circuit 2018, the image compressing-expanding circuit 2022 and the image memory 2024, and the image data outputted from the A/D conversion circuit 2016 is written into the image memory 2024 by the memory controlling circuit 2020.

In the process of compressing the image data, the image data which is written into the image memory 2024 in the above-described manner is read therefrom and the read image data is compressed by the image compressing-expanding circuit 2022. The compressed image data is written into the image memory 2024. In the process of expanding the image data, the compressed image data which is written into the image memory 2024 in the above-described manner is read therefrom and the read image data is expanded by the image compressing-expanding circuit 2022. The expanded image data is written into the image memory 2024.

The electronic still video system also includes a D/A converter 2036 and an image display device 2038 such as an electronic viewfinder, and the image data stored in the image memory 2024 is read by the memory controlling circuit 2020, and the read image data is converted into analog form by the D/A converter 2036 to form an image signal. The image signal can be visually displayed on the image display device 2038.

Although, in the seventh embodiment, the D/A converter 2036 and the image display device 2038 are incorporated in the system body 2200, the D/A converter 2036 and the image display device 2038 may be prepared as separate units which is removably attachable to the system body 2200. The image display device 2038 may be prepared as different kinds of display devices, such as high- and low-resolution display devices or color and monochrome display devices, which are selectively removably attachable to the system body 2200.

The electronic still video system also includes an interface 2026 for establishing communication with a recording medium 2100 (to be described later), such as a memory card or a hard disk unit, or with an external device, and a data communication controlling circuit 2028 for controlling communication of data with the external device or a communication line. The data communication controlling circuit 2028 is arranged to perform data communication control, conversion or restoration of data, or modulation or demodulation of data in accordance with a predetermined program, according to the kind of a connected external device or the protocol of a connected communication line.

The electronic still video system also includes a connector 2030 for permitting exchange of data or a control signal with the recording medium 2100, such as a memory card or a hard disk unit, and for permitting supply of electric power to the recording medium 2100, and a connector 2034 for permitting exchange of data or a control signal with the external device or the communication line. Data can be communicated with the external device directly or through the communication line by using the connector 2034.

If the recording medium 2100 is connected to the connector 2030, image data recorded in the recording medium 2100 can be read out and transmitted to the external device through the connector 2030, the interface 2026, the data communication controlling circuit 2028 and the connector 2034. If the recording medium 2100 is not connected to the connector 2030, image data stored in the image memory 2024 can be read out and transmitted to the external device through the memory controlling circuit 2020, the interface 2026, the data communication controlling circuit 2028 and the connector 2034.

Each of the connectors 2030 and 2034 is arranged so that transmission and reception of data or a control signal can be performed not only by a communication method using an electrical signal but also by mechanical, optical, acoustic or various other methods.

If, for example, a SCSI interface is employed as each of the communication controlling circuit 2028 and the connector 2034, it is possible to transmit and receive data and a control signal to and from an external device such as a computer, a printer and a transmission device. The transmission and reception of the data and the control signal can be effected between such an external device and any of the system controlling circuit 2050, the recording medium 2100 and the memory controlling circuit 2020 through the interface 26, the data communication controlling circuit 2028 and the connector 2034.

The shown electronic still video system also includes a lens controlling circuit 2040 for controlling the movement of a focusing lens provided in the photographic optical system 2010, an exposure controlling circuit 2042 for controlling a diaphragm mechanism and a shutter mechanism which are provided in the exposure controlling member 2012, a distance measuring circuit 2044 for measuring the distance to a subject, a light measuring circuit 2046 for measuring the luminance of the subject, and a flash unit 2048 for illuminating the subject.

The shown electronic still video system also includes the system controlling circuit 2050 for controlling the operation of the entire system, a control data memory 2052 in which are stored various constant data, various variable data, operating programs and the like for use in the control operation of the system controlling circuit 2050, and a display device 2054, such as a liquid-crystal display, for displaying the operational state and the like of the system. The display device 2054 may be provided at a location where a use can easily perform a visual confirmation, for example, in the vicinity of a switch group 2056 which will be described later, and/or at a location in an electronic viewfinder, such as the image display device 2038, where the use can easily perform a visual confirmation.

The display device 2054 also displays contents such as the amount of power remaining in a power supply part 2082 which will be described later, a shutter speed value, an aperture speed and an exposure compensation value which are set by the exposure controlling member 2012, the execution or nonexecution of a gain-up operation for increasing the image pickup sensitivity of the image pickup device 2014, the state of the remaining memory capacity of the image memory 2024, the execution or nonexecution of compression or expansion of image data in the image compressing·expanding circuit 2022, the number or total capacity of photographic pictures recorded in the recording medium 2100, the remaining number of photographic pictures recordable in the recording medium 2100 or the remaining capacity of the recording medium 2100 which is capable of recording photographic pictures. If the display device 2054 is provided not only at the location where the use can easily perform a visual confirmation, for example, in the vicinity of the switch group 2056, but also at the location in the electronic viewfinder, such as the image display device 2038, where the use can easily perform a visual confirmation, both the display devices may be arranged to display different kinds of contents at different display timings.

The shown electronic still video system also includes the switch group 2056 which is operated to input various operational instructions into the system controlling circuit 2050. The switch group 2056 includes, for example, a main switch 2060 for instructing the system to operate, a distance·light measuring switch 2062 arranged to be closed by a first stroke of a two-stroke release switch 2058 to instruct the distance measuring circuit 2044 to start a distance measuring operation as well as to instruct the light measuring circuit 2046 to start a light measuring operation, a recording starting switch 2064 arranged to be closed by a second stroke of the two-stoke release switch 2058 to input an instruction to start recording a picked-up image signal corresponding to a photographed subject image in the recording medium 2100, such as the memory card or the hard disk unit, a shooting-recording-mode selecting switch 2066 for selecting any recording mode from among the single-shooting recording (S) mode for executing photography and recording a field or frame image signal for one picture, the continuous-shooting recording (C) mode for continuously executing photography and recording field or frame image signals for a plurality of pictures, and a self-timer photography recording mode, a recording-condition setting switch 2068 for selecting various setting conditions associated with an image signal recording operation, such as the number of photographic pictures to be recorded as image signals, the discrimination between frame recording and field recording, the aspect ratio of an image signal obtained by photography, the pixel arrangement of an image obtained by photography, a data compression or expansion method, and the compression or expansion ratio at which data is compressed or expanded by the data compression or expansion method, an erase mode selecting switch 2070 for selecting an erase mode, an erasing operation starting switch 2072 for inputting an instruction to start an erasing operation, a transmission mode selecting switch 2074 for selecting a transmission mode of data, and a transmitting operation starting switch 2076 for inputting an instruction to start a data transmitting operation.

The electronic still video system also includes a power-supply controlling circuit 2080 which is made up of constituent elements, such as a detecting circuit for detecting the state of supply of electric power from the power supply part 2082 which will be described later, a DC-DC converter for converting a DC voltage supplied from the power supply part 2082 into a voltage suitable for application to each part, and a switch for selecting a circuit block to be supplied with the electric power. The power-supply controlling circuit 2080 serves to detect whether the power supply part 2082 is attached to the body of the electronic still video system, the kind of the attached power supply part 2082 or, if the power supply part 2082 is formed by a battery, the amount of power remaining in the attached battery and so on. On the basis of the result of the detection and an instruction supplied from the system controlling circuit 2050, the power supply part 2082 controls the DC-DC converter and supplies the required amount of electric power to each part at the required time interval. The power supply part 2082 is made from, for example, a rechargeable secondary battery. Connectors 2084 and 2086 serve to provide connection between the power supply part 2082 and the body of the electronic still video system.

The electronic still video system also includes a nonvolatile memory 2090, such as an EEPROM, which is electrically erasable and recordable.

The system controlling circuit 2050 causes the lens controlling circuit 2040 to control the movement of the focusing lens of the photographic optical system 2010 on the basis of a measurement result provided by the distance measuring circuit 2044, thereby bringing the photographic optical system 2010 into an in-focus state. Also, the system controlling circuit 2050 causes the exposure controlling circuit 2042 to execute exposure control using the exposure controlling member 2012 so that a subject optical image formed on the image pickup surface of the image pickup device 2014 achieves an optimum amount of exposure.

The recording medium 2100 has a management data recording area 2102, an information data recording area 2104, and a writing protection information recording area 2110 for recording writing protection (writing inhibition) information relative to a camera-related data recording area 2114. Writing and reading of the writing protection information are performed in such a manner that writing and reading of writing protection data from and to the outside are executed through an interface 2106 and a connector 2108.

The recording medium 2100 further has a recording-medium discrimination information recording area 2112 in which data indicative of recording-medium discrimination information representative of the kind, characteristics and the like of the recording medium 2100 are recorded. The system controlling circuit 2050 which will be described later is arranged to read the data recorded in the recording-medium discrimination information recording area 2112 through the interface 206 and the connector 208, and detects the kind and characteristics of the recording medium 2100 connected to the connector 2030 on the basis of information indicated by the read data.

The interface 2106 includes constituent elements, such as a control circuit such as a CPU or an MPU, a nonvolatile memory such as a ROM or an EEPROM, and a memory such as a RAM, and controls the operation of the recording medium 2100, such as the memory card or the hard disk unit, on the basis of a predetermined program.

The operation of the electronic still video system according to the seventh embodiment of the present invention will be described below with reference to the flowcharts shown in FIGS. 33, 34, 35 and 36.

Figure 33:
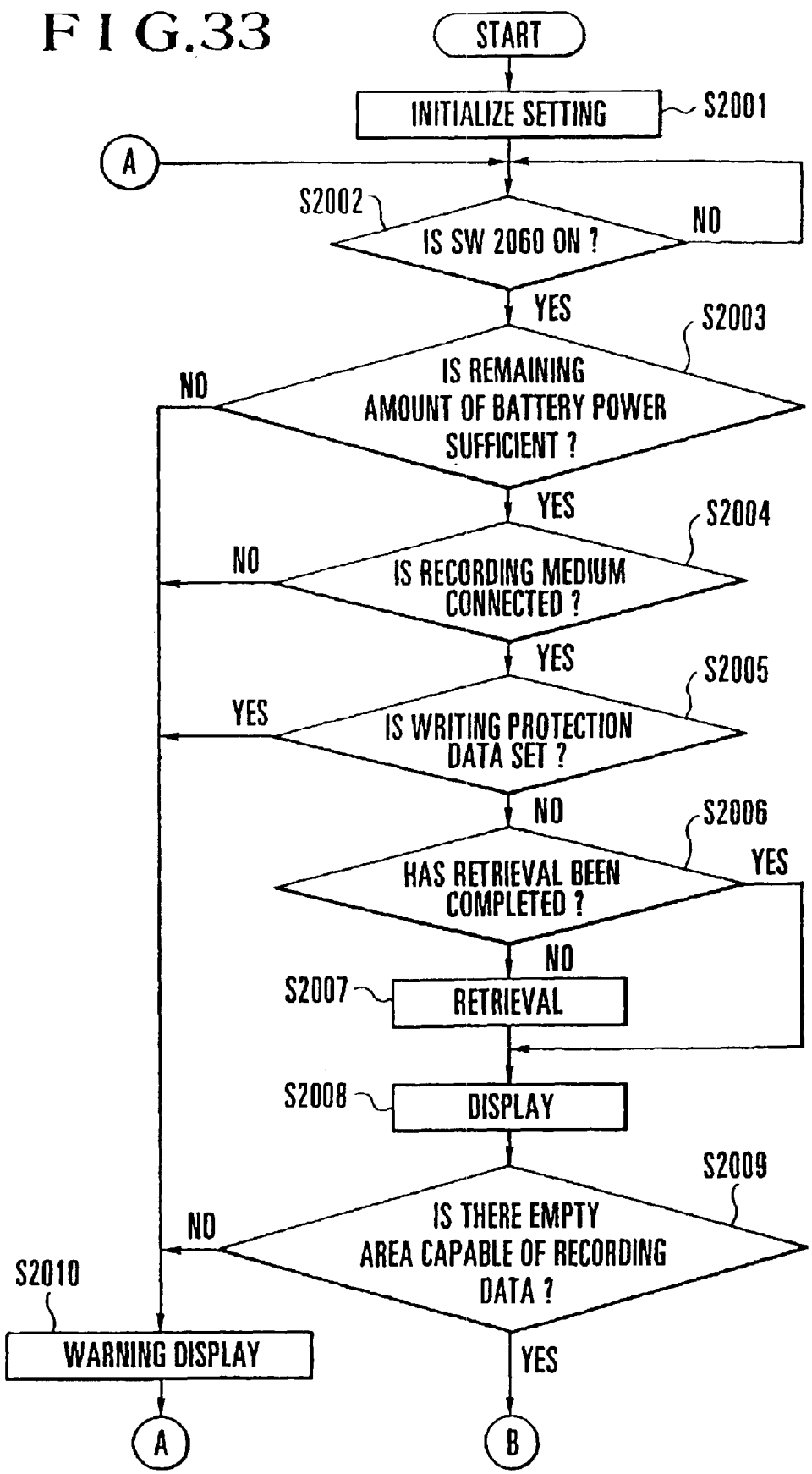
FIG. 33 is part of a flowchart showing the main operation routine of the electronic still video system shown in FIG. 32.
Figure 34:
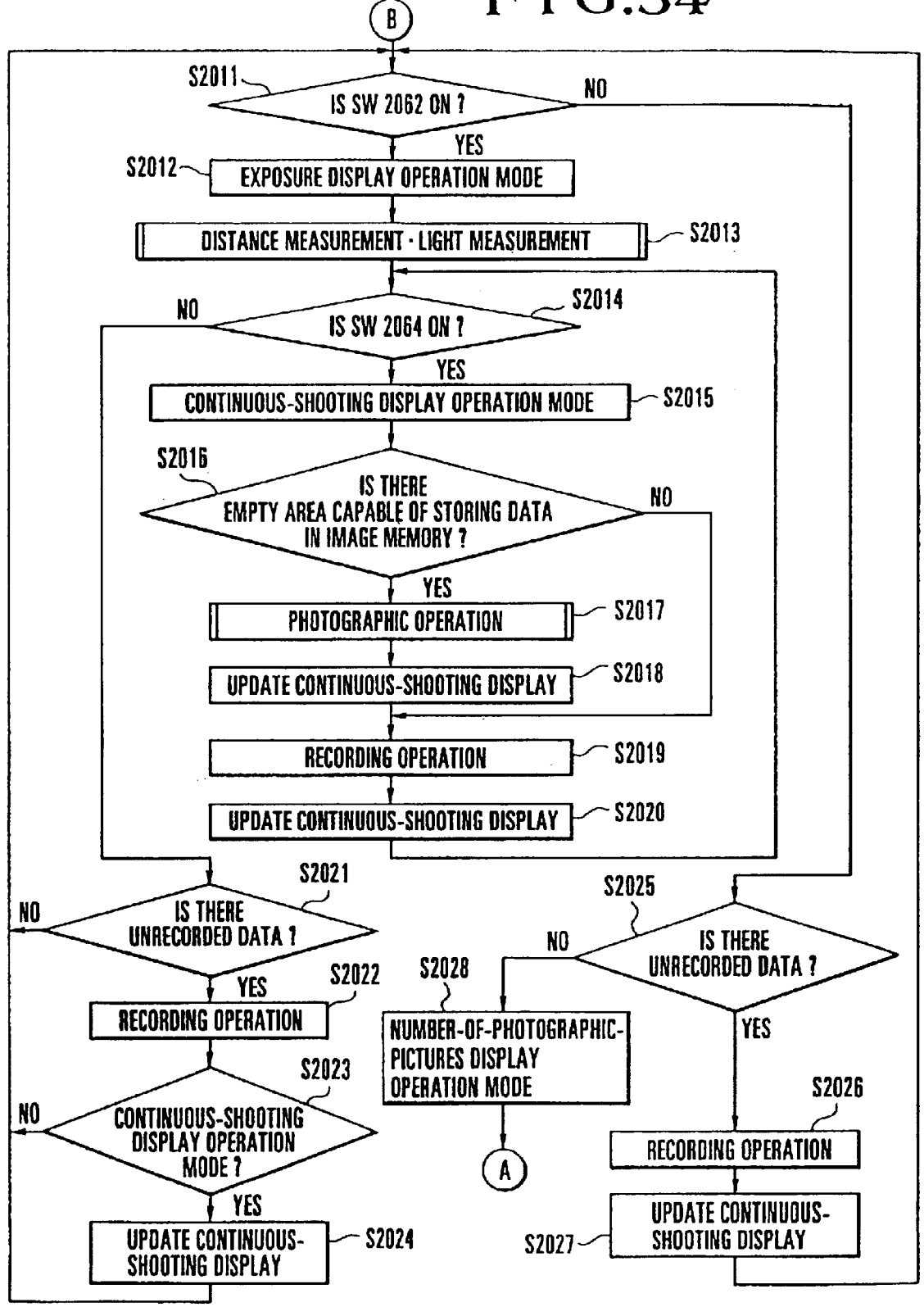
FIG. 34 is part of the flowchart showing the main operation routine of the electronic still video system shown in FIG. 32.

FIGS. 33 and 34 show in combination a flowchart of the main operating routine of the electronic still video system generally shown in FIG. 32.

Referring to FIGS. 33 and 34, when the power supply part 2082 is attached to the body of the electronic still video system, after the system controlling circuit 2050 initializes various flags, control variables and the like (Step S2001 in FIG. 33), the system controlling circuit 2050 is placed in a standby state until the main switch 2060 is turned on. If the main switch 2060 is turned on (Step S2002 in FIG. 33), it is determined whether the remaining amount of battery power in the power supply part 2082 is sufficient (Step S2003 in FIG. 33). If the remaining amount of battery power in the power supply part 2082 is sufficient, it is determined whether the recording medium 2100, such as a memory card or a hard disk unit, is connected to the system body 2200 (Step S2004 in FIG. 33). If the recording medium 2100 is connected to the system body 2200, it is determined (Step S2005 in FIG. 33) whether writing protection data indicative of writing protection is set in the writing protection information recording area 2110 of the recording medium 2100 connected to the system body 2200. If it is determined that no writing protection data indicative of writing protection is set in the writing protection information recording area 2110, the system controlling circuit 2050 reads from the recording medium 2100 discrimination information data indicative of the kind of recording medium used as the recording medium 2100, the data-recordable capacity and the characteristics of the recording medium, as well as camera-related data and recording medium-related data which were used to perform photography and create the image data recorded in the recording medium 2100. Then, the system controlling circuit 2050 performs retrieval as to the state of recording in the recording medium 2100 (Step S2015 in FIG. 33).

If the system controlling circuit 2050 determines that the remaining amount of battery power in the power supply part 2082 is not sufficient (Step S2003 in FIG. 33), or if it is determined that the recording medium 2100 is not connected (Step S2004 in FIG. 33), or if it is determined that the writing protection data is set (Step S2005 in FIG. 33), the system controlling circuit 2050 causes the display device 2054 to provide a warning display indicating that the remaining amount of battery power in the power supply part 2082 is not sufficient, or that the recording medium 2100 is not connected or that the writing protection data is set. After that, the system controlling circuit 2050 returns the process to Step S2002 (Step S2010 in FIG. 33).

If it is determined (Step S2013 in FIG. 33) that the recording medium 2100 is not connected to the system body 2200 or if it is determined (Step S2014 in FIG. 33) that the writing protection data is set in the writing protection information recording area 2110, the process proceeds to Step S2018 of FIG. 33, where the system controlling circuit 2050 causes the display device 2054 to provide a warning display indicating that the recording medium 2100 is not connected to the system body 2200 or that the writing protection data is set in the writing protection information recording area 2110. Then, the process returns to Step S2004, where the system controlling circuit 2050 waits for the main switch 2060 to be operated.

Then, the system controlling circuit 2050 causes the display device 2054 to visually display the remaining recordable number of photographic pictures or the remaining recordable capacity of photographic pictures, the remaining amount of battery power in the power supply part 2082, the date of photography, a shooting mode, various messages and the like which are recorded in the recording medium 2100, on the basis of the aforementioned discrimination information data, camera-related data and recording medium-related data of the recording medium 2100, the management data recorded in the management data recording area 2102 of the recording medium 2100, various kinds of modes which are selectively set by the switch group 2056 and various kinds of modes which are selectively set according to the kind of the recording medium 2100 connected to the system body 2200 (Step S2008 in FIG. 33). If the recording medium 2100 is a recording medium which is unusable with the present system or if the information data recording area 2104 of the recording medium 2100 contains no empty area in which data recording is possible (Step S2009 in FIG. 33), the system controlling circuit 2050 causes the display device 2054 to provide a warning display indicating that the recording medium 2100 is a recording medium unusable with the present system or that the information data recording area 2104 of the recording medium 2100 contains no empty area in which data recording is possible (Step S2010 in FIG. 33). Then, the process returns to Step S2002.

Then, the system controlling circuit 2050 detects the state of the distance·light measuring switch 2062. If the distance·light measuring switch 2062 is off, the process returns to Step S2025 (Step S2011 in FIG. 34). If the distance·light measuring switch 2062 is on, the system controlling circuit 2050 sets the display device 2054 to an exposure display operation mode for displaying the state of exposure compensation (Step S2012 in FIG. 34), and causes the distance measuring circuit 2044 to measure the distance to a subject and then moves the focusing lens of the photographic optical system 2010 on the basis of the result of the distance measurement executed by the distance measuring circuit 2044, thereby focusing the photographic optical system 2010 onto the subject. Further, the system controlling circuit 2050 causes the light measuring circuit 2046 to measure the luminance of the subject and, on the basis of the result of the light measurement executed by the light measuring circuit 2046, causes the exposure controlling circuit 2042 to control the diaphragm mechanism or the shutter mechanism of the exposure controlling member 2012 so that the subject optical image formed on the image pickup surface of the image pickup device 2014 achieves an optimum amount of exposure, thereby determining the amount of exposure of the subject by means of the exposure controlling member 2012 (Step S2013 in FIG. 34).

Then, the system controlling circuit 2050 detects the state of the recording starting switch 2064, and if the recording starting switch 2064 is turned on (Step S2014 in FIG. 34), the system controlling circuit 2050 causes the display device 2054 to provide display based on a continuous-shooting display operation mode for displaying the state of the recordable capacity of the image memory 2024 (Step S2015 in FIG. 34). If the image memory 2024 has an empty area in which image data can be stored (Step S2016 in FIG. 34), the system controlling circuit 2050 initiates a photographic operation and stores in the image memory 2024 image data obtained by digitizing an analog image signal outputted from the image pickup device 2014 by means of the A/D converter 2016 (Step S2017 in FIG. 34). Further, the system controlling circuit 2050 causes the display device 2054 to update the display based on the continuous-shooting display operation mode for displaying the state of the recordable capacity of the image memory 2024 (Step S2018 in FIG. 34).

The above-described distance measuring operation, light measuring operation and photographic operation will be described later in greater detail.

If it is determined in Step S2016 that the image memory 2024 contains no empty area in which image data can be stored and no photographic operation can be performed, the process proceeds to Step S2019, where the system controlling circuit 2050 reads the image data stored in the image memory 2024 and performs the recording operation of recording the read image data in the information data recording area 2104 of the recording medium 2100 through the memory controlling circuit 2020, the interface 2026, the connector 2030, the connector 2108 and the interface 2106 while recording management data associated with the image data in the management data recording area 2102 (Step S2019 in FIG. 34). The system controlling circuit 2050 causes the display device 2054 to update the display based on the continuous-shooting display operation mode for displaying the state of the recordable capacity of the image memory 2024 (Step S2020 in FIG. 34), and causes the process to return to Step S2014.

If it is determined in Step S2014 that the recording starting switch 2064 is off and image data which is not recorded in the recording medium 2100 remains in the image memory 2024 (Step S2021 in FIG. 34), a recording operation similar to that executed in Step S2019 is performed (Step S2022 in FIG. 34). If the display device 2054 is performing a display operation on the basis of the continuous-shooting display operation mode (Step S2023 in FIG. 34), the system controlling circuit 2050 causes the display device 2054 to update the display based on the continuous-shooting display operation mode for displaying the state of the recordable capacity of the image memory 2024 (Step S2024 in FIG. 34), and causes the process to return to Step S2011.

If it is determined in Step S2021 that image data which is not recorded in the recording medium 2100 does not remain in the image memory 2024 or if it is determined in Step 2023 that the display device 2054 is performing no display operation on the basis of the continuous-shooting display operation mode, the system controlling circuit 2050 returns the process to Step S2011 without updating the display provided on the display device 2054.

If it is determined in Step S2011 that the distance·light measuring switch 2062 is off and image data which is not recorded in the recording medium 2100 remains in the image memory 2024 (Step S2025 in FIG. 34), a recording operation similar to that executed in Step S2019 is performed (Step S2026 in FIG. 34). Then, the system controlling circuit 2050 causes the display device 2054 to update the display based on the continuous-shooting display operation mode for displaying the state of the recordable capacity of the image memory 2024 (Step S2027 in FIG. 34), and causes the process to return to Step S2011. If it is determined in Step S2025 that image data which is not recorded in the recording medium 2100 does not remain in the image memory 2024, the system controlling circuit 2050 sets the display device 2054 to a number-of-photographic-pictures display operation mode for displaying the number or capacity of photographic pictures recorded in the recording medium 2100 or the remaining recordable number or capacity of photographic pictures in the recording medium 2100 (Step S2028 in FIG. 34). After that, the process returns to Step S2002, where the system controlling circuit 2050 is placed in the standby state until the main switch 2060 is turned on.

Figure 41:
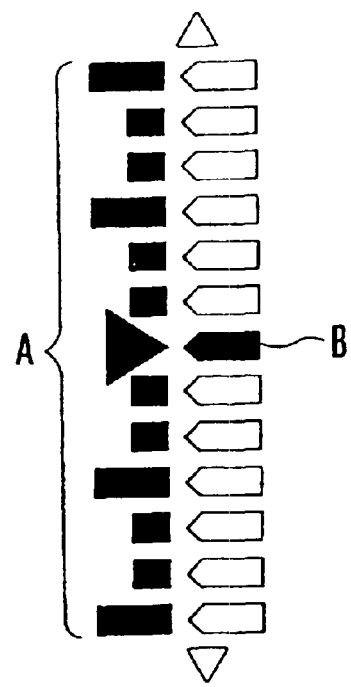
FIG. 41 is a view showing one display example provided by a display operation which is performed by a display device 2054 according to the ninth embodiment in an exposure display operation mode.

If the display device 2054 is performing, for example, a display operation based on the exposure display operation mode for displaying the state of exposure compensation, the display device 2054 displays an exposure scale as shown at A in FIG. 41 and an exposure value in "dot" form as shown at B in FIG. 41. If the display device 2054 is performing a display operation based on the continuous-shooting display operation mode for displaying the state of the capacity to record image data in the image memory 2024, the display device 2054 displays the data-storable area of the image memory 2024 as shown at C in FIG. 41 and also displays the amount of image data stored in the image memory 2024 by using a "bar" having a length according to the amount of data as shown at D in FIG. 41. Owing to the aforesaid difference in display form on the display device 2054, an operator can easily determine on the basis of which display operation mode the display device 2054 is performing the display operation, the exposure display operation mode or the continuous-display operation mode. Further, the operator can instantaneously read the exposure value displayed on the display device 2054 or the amount of image stored in the image memory 2024.

Figure 42:
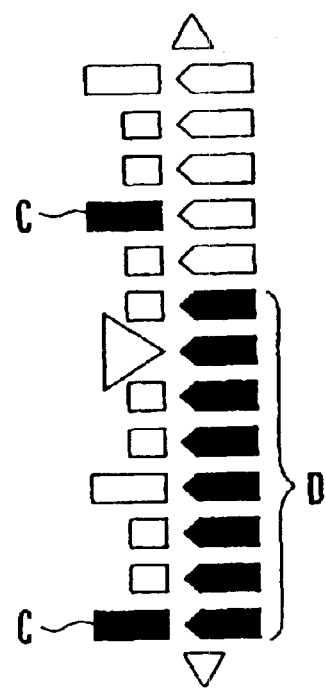
FIG. 42 is a view showing one display example provided by a display operation which is performed by the display device 2054 according to the ninth embodiment in an continuous-shooting operation mode.

In a case where either a display operation based on a remaining-amount-of-battery-power display operation mode for displaying the state of the remaining amount of battery power in the power supply part 2082 or a display operation based on a remaining-recordable-amount-of-data display operation mode for displaying the remaining amount of image data recordable in the recording medium 2100 is performed in a display form which is identical to the continuous-shooting display operation mode for displaying the state of the capacity to record image data in the image memory 2024 as shown in FIG. 42, the display color of the display device 2054 varies among the case where the display device 2054 is performing a display operation on the basis of the exposure display operation mode, the case where the display device 2054 is performing a display operation on the basis of the remaining-amount-of-battery-power display operation mode, and the case where the display device 2054 is performing a display operation on the basis of the remaining-recordable-amount-of-data display operation mode. Accordingly, the operator can easily identify each of the display operation modes owing to the aforesaid difference in the display color of the display device 2054, and can instantaneously read the value which is displayed on the display device 2054 on the basis of each of the display operation modes.

Figure 35:
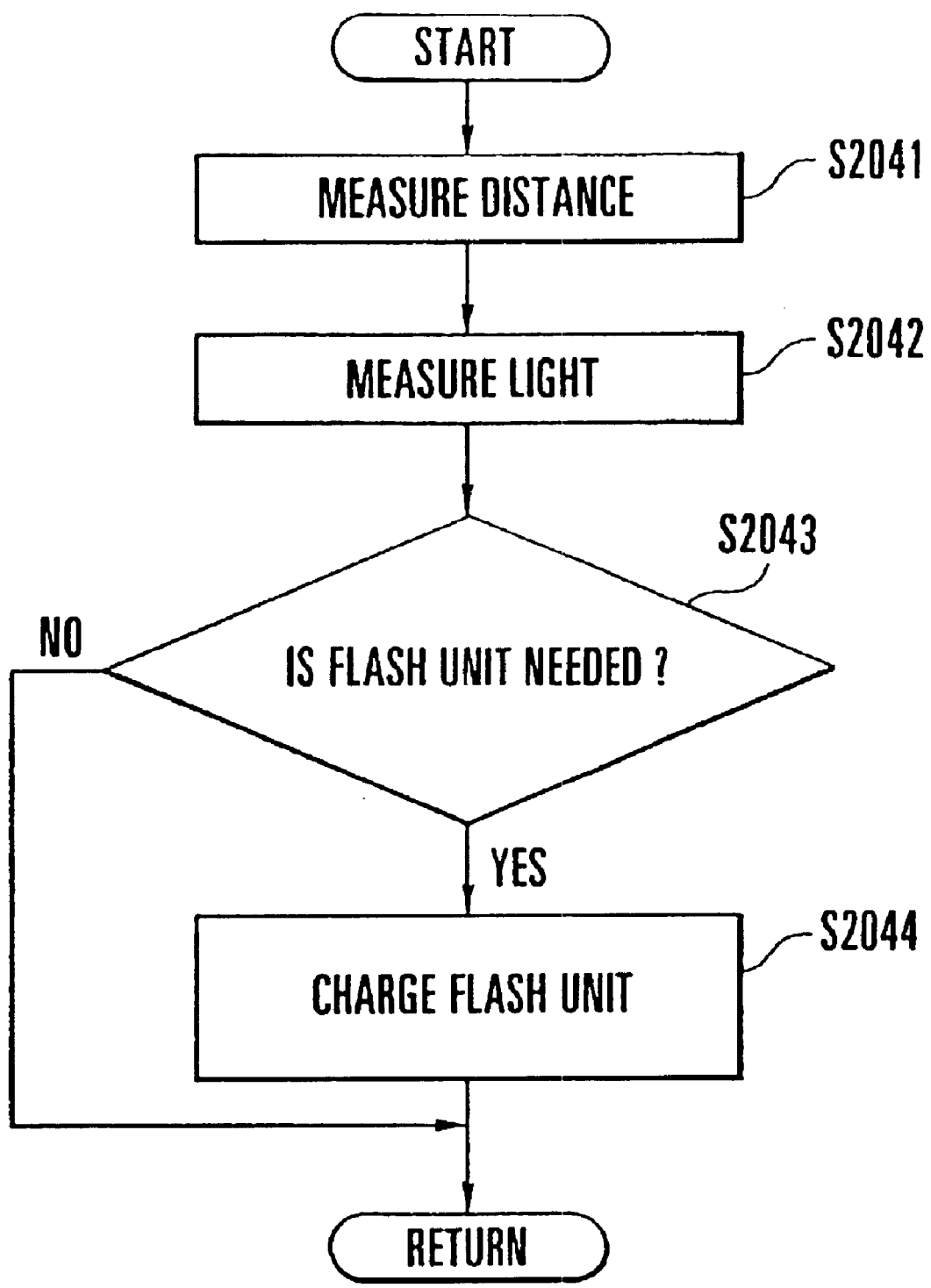
FIG. 35 is a flowchart which serves to explain in detail a distance·light measuring operation routine according to the seventh embodiment.

FIG. 35 is a flowchart which serves to explain in detail the distance-light measuring routine executed in Step S2130 of FIG. 34.

Referring to FIG. 35, if the distance-light measuring switch 2062 is on, the system controlling circuit 2050 measures the distance to a subject by means of the distance measuring circuit 2044, and stores measured-distance data indicative of the result of the distance measurement in the register of the system controlling circuit 2050 or the control data memory 2052 (Step S2041 in FIG. 35). Then, the system controlling circuit 2050 measures the luminance of the subject by means of the light measuring circuit 2046, and stores measured-light data indicative of the result of the light measurement in the register of the system controlling circuit 2050 or the control data memory 2052 (Step S2042 in FIG. 35).

Further, the system controlling circuit 2050 determines whether it is necessary to cause the flash unit 2048 to flash, on the basis of the result of the light measurement (Step S2043 in FIG. 35). If it is necessary to cause the flash unit 2048 to flash, the system controlling circuit 2050 sets a flash flag to start a charging operation for the flash unit 2048 (Step S2044 in FIG. 35).

Figure 36:
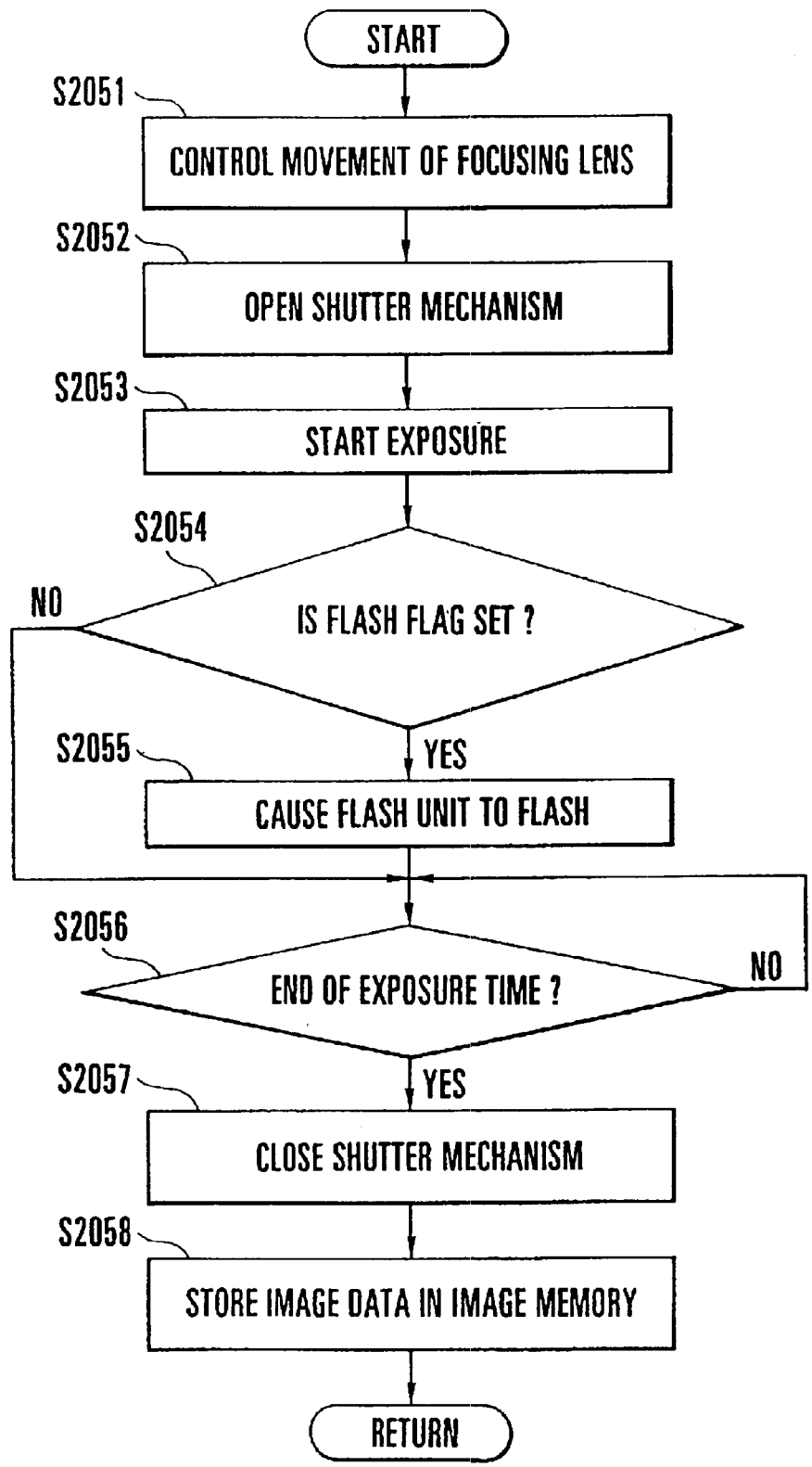
FIG. 36 is a flowchart which serves to explain in detail a photographic operation routine according to the seventh embodiment.

FIG. 36 is a flowchart which serves to explain in detail the photographic operation executed in Step S2017 of FIG. 34.

Referring to FIG. 36, if the distance-light measuring switch 2062 is on, the system controlling circuit 2050 reads the measured-distance data stored in the register of the system controlling circuit 2050 or the control data memory 2052, and causes the lens controlling circuit 2040 to control the movement of the focusing lens of the photographic optical system 2010 on the basis of the read measured-distance data, thereby bringing the photographic optical system 2010 into the in-focus state (Step S2051 in FIG. 36). Then, the system controlling circuit 2050 reads the measured-light data stored in the register of the system controlling circuit 2050 or the control data memory 2052 and determines, on the basis of the read measured-light data, the amount of exposure of a subject image formed on the image pickup surface of the image pickup device 2014. Then, the system controlling circuit 2050 causes the exposure controlling circuit 2042 to drive the shutter mechanism of the exposure controlling member 2012 to maintain the open state of the shutter mechanism of the exposure controlling member 2012 during a time interval corresponding to the determined amount of exposure, thereby exposing the image pickup surface of the image pickup device 2014 to the photographed-subject optical image (Steps S2052 and S2053 in FIG. 36).

Then, the system controlling circuit 2050 detects whether the flash flag is set which is to be set according to the result of the light measurement executed by the light measuring circuit 2046 (Step S2054 in FIG. 36). If the flash unit is set, the flash unit 2048 is made to flash (Step S2055 in FIG. 36).

If it is determined (Step S2056 in FIG. 36) that the exposure time has elapsed which is set according to the determined amount of exposure for exposing the image pickup surface of the image pickup device 2014 to the photographed-subject optical image by the shutter mechanism 2012 of the exposure controlling member 2012, the system controlling circuit 2050 causes the exposure controlling circuit 2042 to drive the shutter mechanism of the exposure controlling member 2012 so as to close the shutter mechanism of the exposure controlling member 2012, thereby completing the operation of exposing the image pickup surface of the image pickup device 2014 to the photographed-subject optical image, (Step S2057 in FIG. 36). Then, the system controlling circuit 2050 causes the image pickup device 2014 to output the charge signal stored therein, and digitizes the charge signal by means of the A/D conversion circuit 2016. The data outputted from the A/D conversion circuit 2016 is supplied to the image memory 2024 via the memory controlling circuit 2020, whereby data corresponding to an image for one photographic picture is temporarily stored in the image memory 2024 (Step S2058 in FIG. 36).

The operation of the electronic still video system according to an eighth embodiment of the present invention will be described below with reference to the flowcharts shown in FIGS. 37 and 38.

Figure 37:
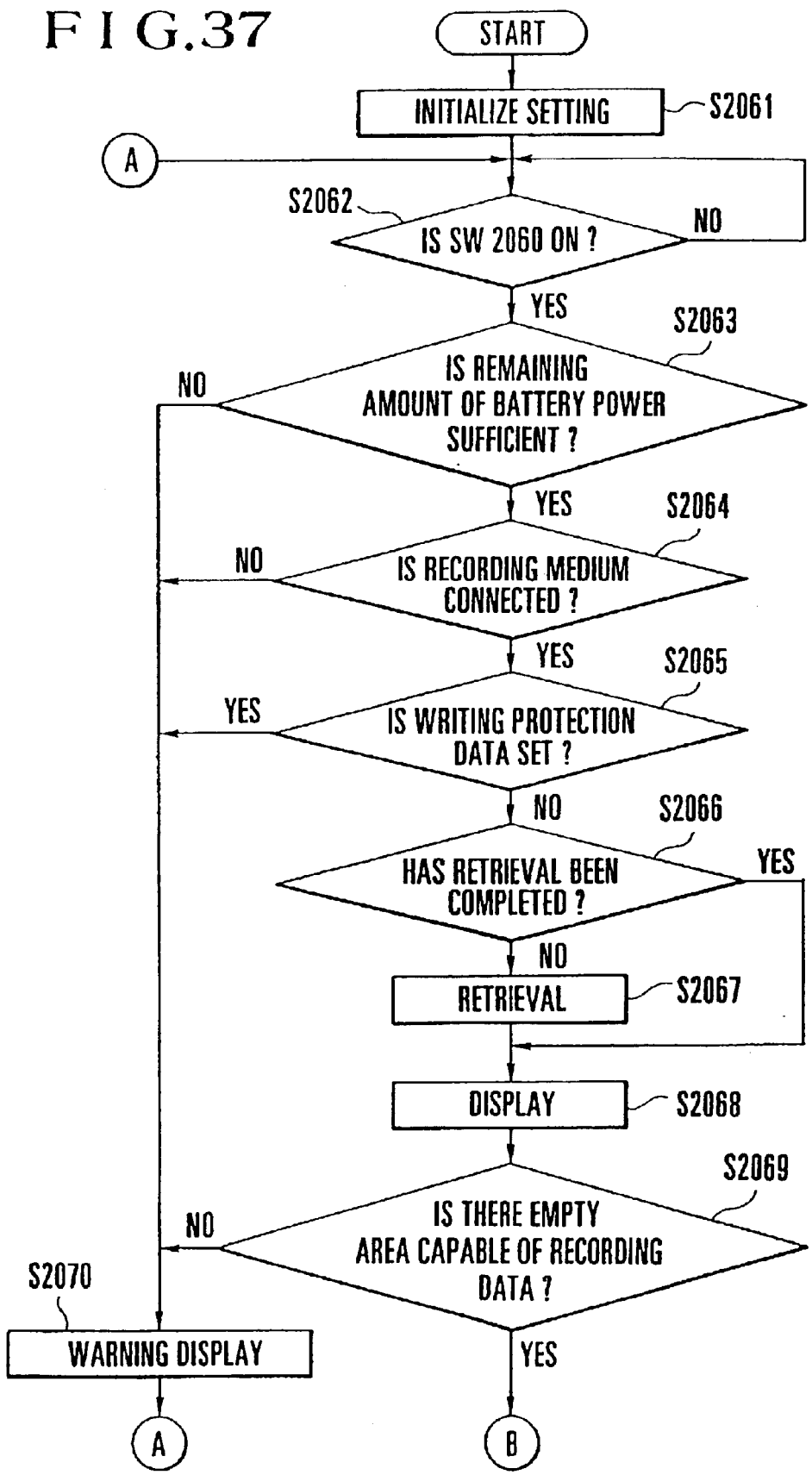
FIG. 37 shows an eighth embodiment of the present invention and is part of a flowchart showing the main operation routine of the electronic still video system shown in FIG. 32.
Figure 38:
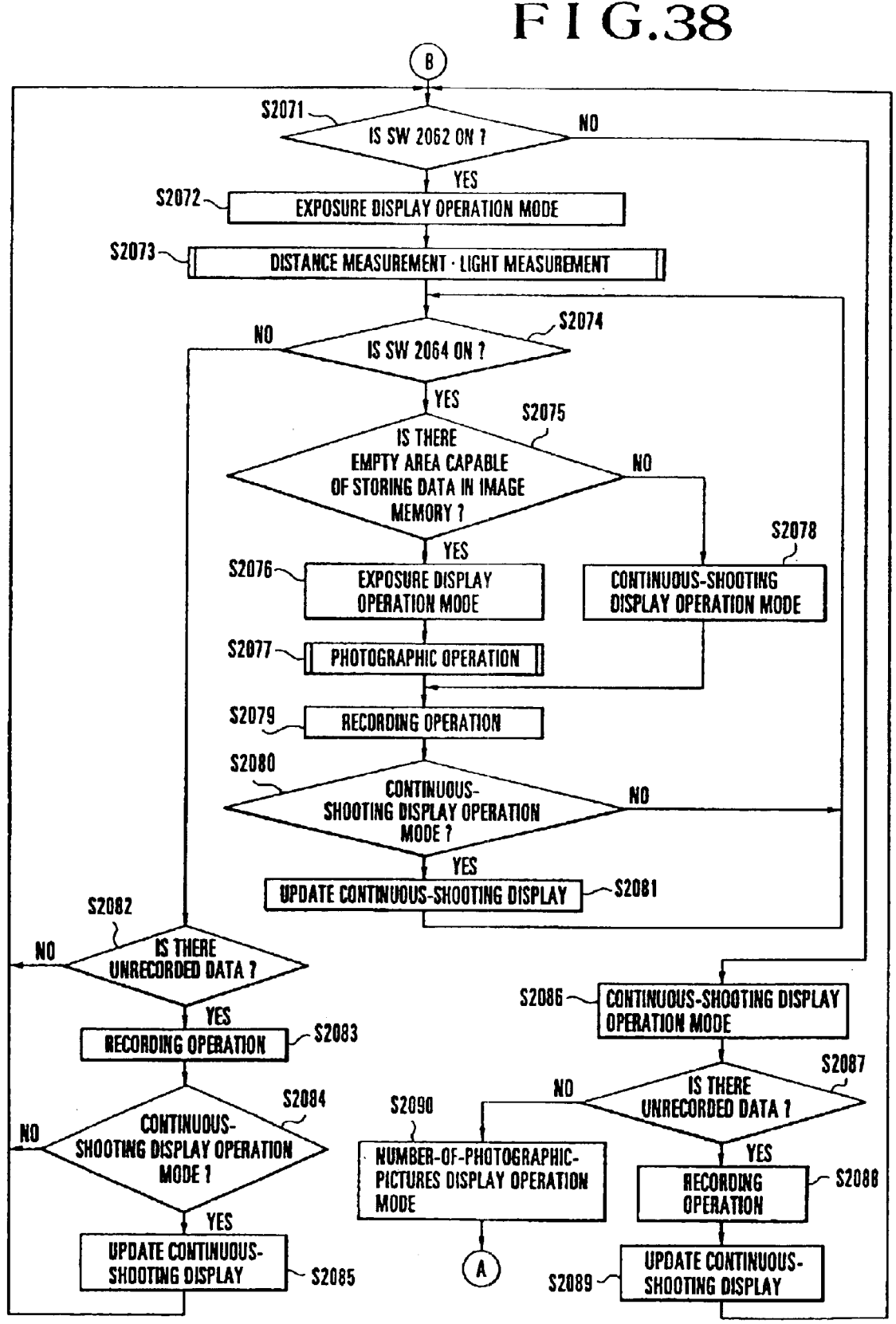
FIG. 38 shows the eighth embodiment of the present invention and is part of the flowchart showing the main operation routine of the electronic still video system shown in FIG. 32.

FIGS. 37 and 38 show in combination a flowchart of the main operating routine of the electronic still video system generally shown in FIG. 32.

Referring to FIGS. 37 and 38, when the power supply part 2082 is attached to the body of the electronic still video system, after the system controlling circuit 2050 initializes various flags, control variables and the like (Step S2061 in FIG. 37), the system controlling circuit 2050 is placed in a standby state until the main switch 2060 is turned on. If the main switch 2060 is turned on (Step S2062 in FIG. 37), it is determined whether the remaining amount of battery power in the power supply part 2082 is sufficient (Step S2063 in FIG. 37). If the remaining amount of battery power in the power supply part 2082 is sufficient, it is determined whether the recording medium 2100, such as a memory card or a hard disk unit, is connected to the system body 2200 (Step S2064 in FIG. 37). If the recording medium 2100 is connected to the system body 2200, it is determined (Step S2065 in FIG. 37) whether writing protection data indicative of writing protection is set in the writing protection information recording area 2110 of the recording medium 2100 connected to the system body 2200. If it is determined that no writing protection data indicative of writing protection is set in the writing protection information recording area 2110, the process proceeds to Step S2066 of FIG. 37. If it is determined in Step S2066 of FIG. 37 that no retrieval as to the state of recording in the recording medium 2100 has yet been completed, the system controlling circuit 2050 reads from the recording medium 2100 discrimination information data indicative of the kind of recording medium used as the recording medium 2100, the data-recordable capacity and the characteristics of the recording medium, as well as camera-related data and recording medium-related data which were used to perform photography and create the image data recorded in the recording medium 2100. Then, the system controlling circuit 2050 performs retrieval as to the state of recording in the recording medium 2100 (Step S2067 in FIG. 37).

If the system controlling circuit 2050 determines that the remaining amount of battery power in the power supply part 2082 is not sufficient (Step S2063 in FIG. 37), or if it is determined that the recording medium 2100 is not connected (Step S2064 in FIG. 37), or if it is determined that the writing protection data is set (Step S2065 in FIG. 37), the system controlling circuit 2050 causes the display device 2054 to provide a warning display indicating that the remaining amount of battery power in the power supply part 2082 is not sufficient, or that the recording medium 2100 is not connected or that the writing protection data is set. After that, the system controlling circuit 2050 returns the process to Step S2002 (Step S2070 in FIG. 37).

Then, the system controlling circuit 2050 causes the display device 2054 to visually display the remaining recordable number of photographic pictures or the remaining recordable capacity of photographic pictures, the remaining amount of battery power in the power supply part 2082, the date of photography, a shooting mode, various messages and the like which are recorded in the recording medium 2100, on the basis of the aforementioned discrimination information data, camera-related data and recording medium-related data of the recording medium 2100, the management data recorded in the management data recording area 2102 of the recording medium 2100, various kinds of modes which are selectively set by the switch group 2056 and various kinds of modes which are selectively set according to the kind of the recording medium 2100 connected to the system body 2200 (Step S2068 in FIG. 37). If the recording medium 2100 is a recording medium which is unusable with the present system or if the information data recording area 2104 of the recording medium 2100 contains no empty area in which data recording is possible (Step S2069 in FIG. 37), the system controlling circuit 2050 causes the display device 2054 to provide a warning display indicating that the recording medium 2100 is a recording medium unusable with the present system or that the information data recording area 2104 of the recording medium 2100 contains no empty area in which data recording is possible (Step S2070 in FIG. 37). Then, the process returns to Step S2002.

Then, the system controlling circuit 2050 detects the state of the distance-light measuring switch 2062. If the distance-light measuring switch 2062 is off, the process returns to Step S2085 which will be described later (Step S2071 in FIG. 38). If the distance-light measuring switch 2062 is on, the system controlling circuit 2050 sets the display device 2054 to the exposure display operation mode for displaying the state of exposure compensation (Step S2072 in FIG. 38), and causes the distance measuring circuit 2044 to measure the distance to a subject and then moves the focusing lens of the photographic optical system 2010 on the basis of the result of the distance measurement executed by the distance measuring circuit 2044, thereby focusing the photographic optical system 2010 onto the subject. Further, the system controlling circuit 2050 causes the light measuring circuit 2046 to measure the luminance of the subject and, on the basis of the result of the light measurement executed by the light measuring circuit 2046, causes the exposure controlling circuit 2042 to control the shutter mechanism of the exposure controlling member 2012 so that the subject optical image formed on the image pickup surface of the image pickup device 2014 achieves an optimum amount of exposure, thereby determining the amount of exposure of the subject by means of the exposure controlling member 2012 (Step S2073 in FIG. 38).

Then, the system controlling circuit 2050 detects the state of the recording starting switch 2064, and if the recording starting switch 2064 is turned on (Step S2074 in FIG. 38) and the image memory 2024 has an empty area in which image data can be stored (Step S2075 in FIG. 38), the system controlling circuit 2050 sets the display device 2054 to the exposure display operation mode for displaying the state of exposure compensation (Step S2076 in FIG. 38), and initiates a photographic operation and stores in the image memory 2024 image data obtained by digitizing an analog image signal outputted from the image pickup device 2014 by means of the A/D converter 2016 (Step S2077 in FIG. 38). If it is determined in Step S2075 that the image memory 2024 contains no empty area in which image data can be stored and no photographic operation can be performed, the process proceeds to Step S2078, where the system controlling circuit 2050 sets the continuous-shooting display operation mode for displaying the state of the recordable capacity of the image memory 2024. Then, the process proceeds to Step S2079.

The above-described embodiment is arranged so that even if the display device 2054 is set to the continuous-shooting display operation mode for displaying the state of the recordable capacity of the image memory 2024 in Step S2078, if it is determined in Step S2075 that the image memory 2024 has an empty area in which image data can be stored, the display device 2054 is set to the exposure display operation mode for displaying the state of exposure compensation in Step S2076. However, Step S2076 may be omitted and, in Step S2078, the display device 2054 may be held in the continuous-shooting display operation mode for displaying the state of the recordable capacity of the image memory 2024, until it is determined in Step S2074 that the recording starting switch 2064 is off and, in Step S2072, the display device 2054 is set to the exposure display operation mode for displaying the state of exposure compensation.

Since the aforementioned distance-light measuring operation and photographic operation are similar to those described previously, detailed description is omitted.

Then, in Step S2079, the system controlling circuit 2050 reads the image data stored in the image memory 2024 and performs the recording operation of recording the read image data in the information data recording area 2104 of the recording medium 2100 through the memory controlling circuit 2020, the interface 2026, the connector 2030, the connector 2108 and the interface 2106 while recording management data associated with the image data in the management data recording area 2102. If the display device 2054 is performing a display operation on the basis of the continuous-shooting display operation mode (Step S2080 in FIG. 38), the system controlling circuit 2050 causes the display device 2054 to update the display based on the continuous-shooting display operation mode for displaying the state of the recordable capacity of the image memory 2024 (Step S2081 in FIG. 38), and causes the process to return to Step S2074. If it is determined in Step S2080 that the display device 2054 is not performing a display operation on the basis of the continuous-shooting display operation mode, the system controlling circuit 2050 cause the process to return to Step S2074 without updating the display on the display device 2054.

If it is determined in Step S2074 that the recording starting switch 2064 is off and image data which is not recorded in the recording medium 2100 remains in the image memory 2024 (Step S2082 in FIG. 38), a recording operation similar to that executed in Step S2079 is performed (Step S2083 in FIG. 38). If the display device 2054 is performing a display operation on the basis of the continuous-shooting display operation mode (Step S2084 in FIG. 38), the system controlling circuit 2050 causes the display device 2054 to update the display based on the continuous-shooting display operation mode for displaying the state of the recordable capacity of the image memory 2024 (Step S2085 in FIG. 38), and causes the process to return to Step S2071.

If it is determined in Step S2082 that image data which is not recorded in the recording medium 2100 does not remain in the image memory 2024 or if it is determined in Step 2084 that the display device 2054 is performing no display operation on the basis of the continuous-shooting display operation mode, the system controlling circuit 2050 returns the process to Step S2071 without updating the display provided on the display device 2054.

If it is determined in Step S2071 that the distance-light measuring switch 2062 is off, the system controlling circuit 2050 sets the display device 2054 to the continuous-shooting display operation mode for displaying the state of the recordable capacity of the image memory 2024 (Step S2086 in FIG. 38). If it is determined in Step S2025 that image data which is not recorded in the recording medium 2100 remains in the image memory 2024 (Step S2087 in FIG. 38), a recording operation similar to that executed in Step S2079 is performed (Step S2088 in FIG. 38). Then, the system controlling circuit 2050 causes the display device 2054 to update the display based on the continuous-shooting display operation mode for displaying the state of the recordable capacity of the image memory 2024 (Step S2089 in FIG. 38), and causes the process to return to Step S2071. If it is determined in Step S2087 that image data which is not recorded in the recording medium 2100 does not remain in the image memory 2024, the system controlling circuit 2050 sets the display device 2054 to a number-of-photographic-pictures display operation mode for displaying the number or capacity of photographic pictures recorded in the recording medium 2100 or the remaining recordable number or capacity of photographic pictures in the recording medium 2100 (Step S2090 in FIG. 38). After that, the process returns to Step S2062, where the system controlling circuit 2050 is placed in the standby state until the main switch 2060 is turned on.

The operation of an electronic still video system according to a ninth embodiment of the present invention will be described below with reference to the flowcharts shown in FIGS. 39 and 40.

Figure 39:
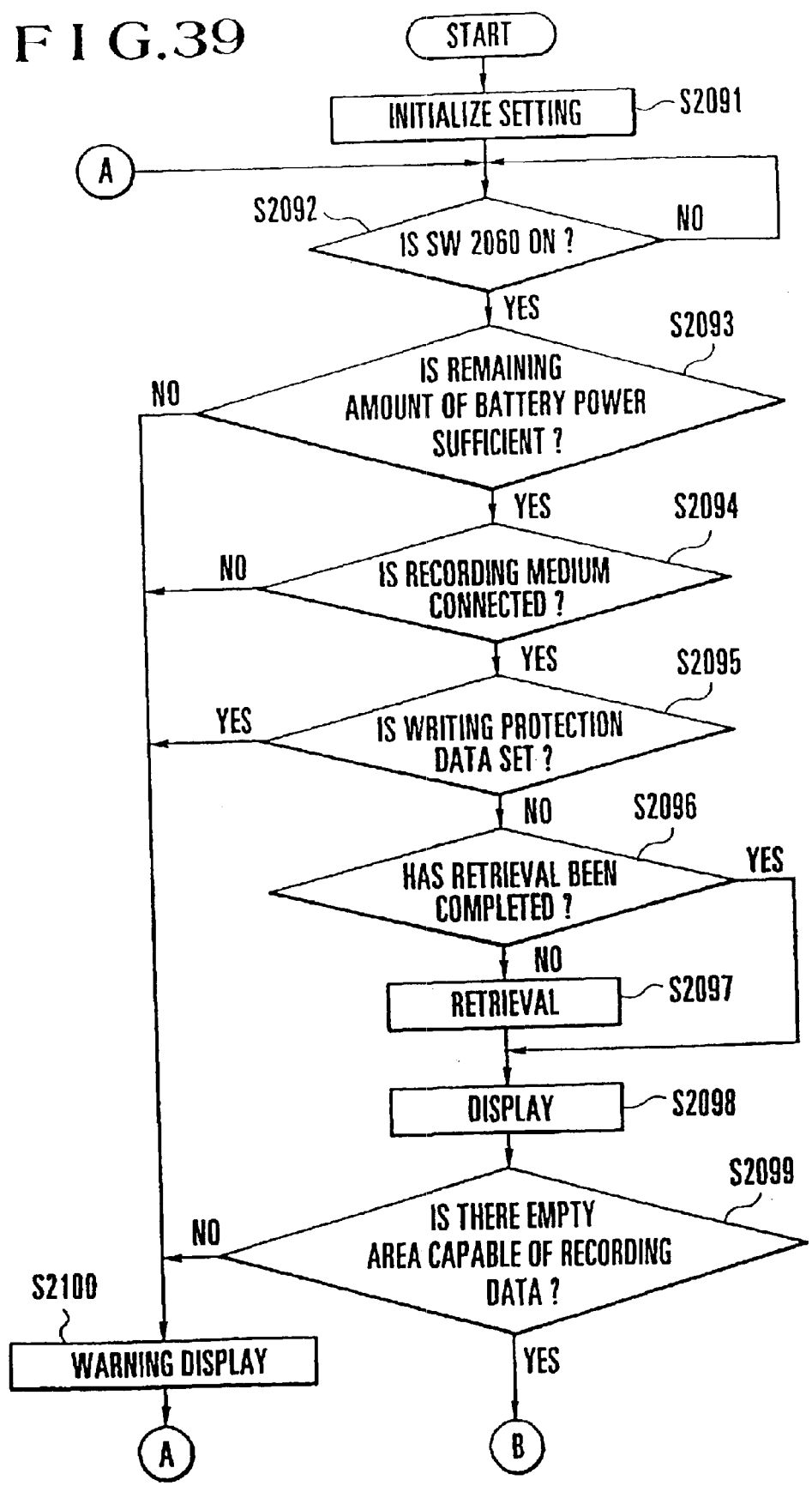
FIG. 39 shows a ninth embodiment of the present invention and is part of a flowchart showing the main operation routine of the electronic still video system shown in FIG. 32.
Figure 40:
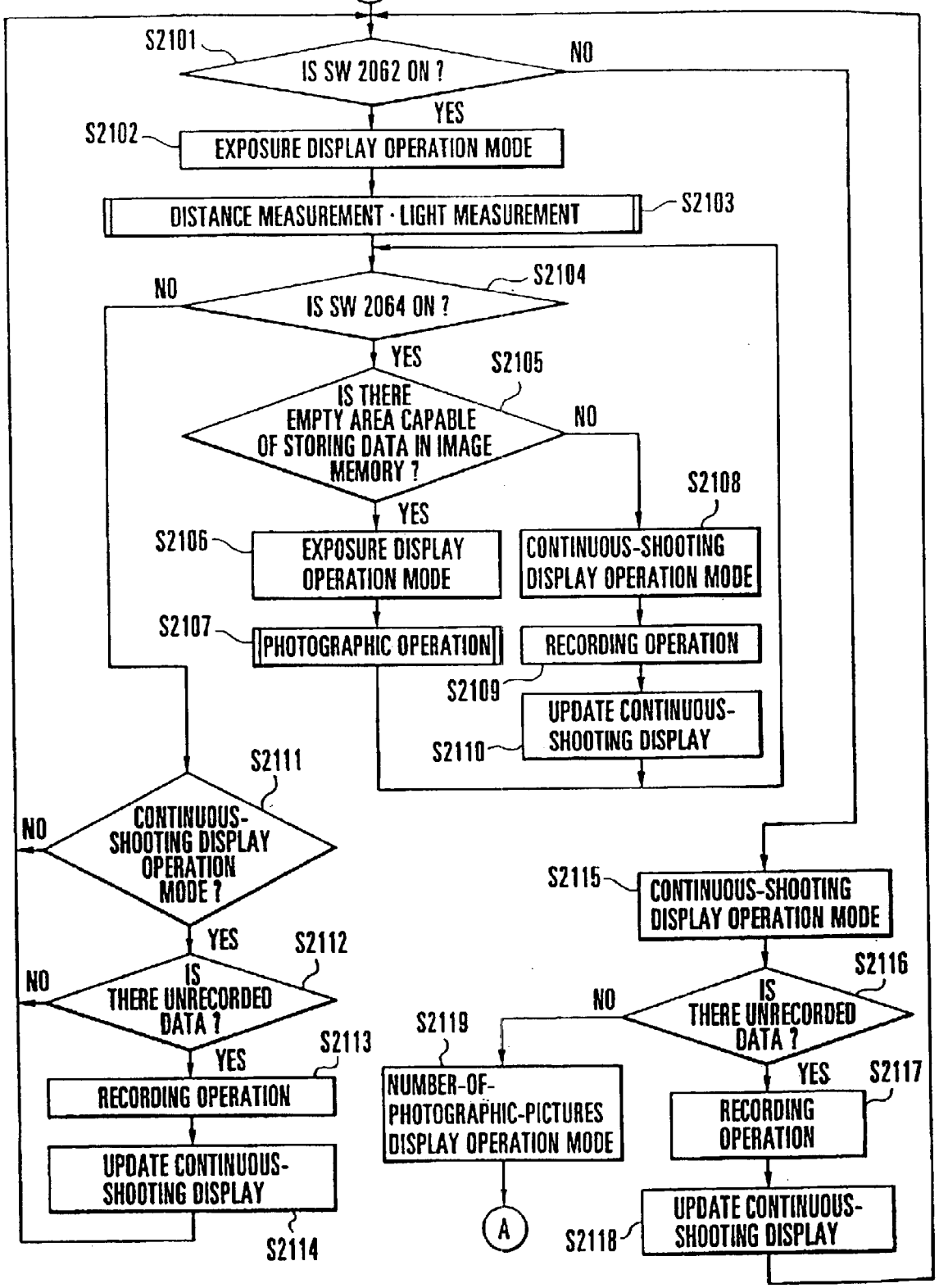
FIG. 40 shows the ninth embodiment of the present invention and is part of the flowchart showing the main operation routine of the electronic still video system shown in FIG. 32.

FIGS. 39 and 40 show in combination a flowchart of the main operating routine of the electronic still video system generally shown in FIG. 32.

Referring to FIGS. 39 and 40, when the power supply part 2082 is attached to the body of the electronic still video system, after the system controlling circuit 2050 initializes various flags, control variables and the like (Step S2091 in FIG. 39), the system controlling circuit 2050 is placed in a standby state until the main switch 2060 is turned on. If the main switch 2060 is turned on (Step S2092 in FIG. 39), it is determined whether the remaining amount of battery power in the power supply part 2082 is sufficient (Step S2093 in FIG. 39). If the remaining amount of battery power in the power supply part 2082 is sufficient, it is determined whether the recording medium 2100, such as a memory card or a hard disk unit, is connected to the system body 2200 (Step S2094 in FIG. 39). If the recording medium 2100 is connected to the system body 2200, it is determined (Step S2095 in FIG. 39) whether writing protection data indicative of writing protection is set in the writing protection information recording area 2110 of the recording medium 2100 connected to the system body 2200. If it is determined that no writing protection data indicative of writing protection is set in the writing protection information recording area 2110, the process proceeds to Step S2096 of FIG. 39. If it is determined in Step S2096 of FIG. 39 that no retrieval as to the state of recording in the recording medium 2100 has yet been completed, the system controlling circuit 2050 reads from the recording medium 2100 discrimination information data indicative of the kind of recording medium used as the recording medium 2100, the data-recordable capacity and the characteristics of the recording medium, as well as camera-related data and recording medium-related data which were used to perform photography and create the image data recorded in the recording medium 2100. Then, the system controlling circuit 2050 performs retrieval as to the state of recording in the recording medium 2100 (Step S2097 in FIG. 39).

If the system controlling circuit 2050 determines that the remaining amount of battery power in the power supply part 2082 is not sufficient (Step S2093 in FIG. 39), or if it is determined that the recording medium 2100 is not connected (Step S2094 in FIG. 39), or if it is determined that the writing protection data is set (Step S2095 in FIG. 39), the system controlling circuit 2050 causes the display device 2054 to provide a warning display indicating that the remaining amount of battery power in the power supply part 2082 is not sufficient, or that the recording medium 2100 is not connected or that the writing protection data is set. After that, the system controlling circuit 2050 returns the process to Step S2092 (Step S2100 in FIG. 39).

Then, the system controlling circuit 2050 causes the display device 2054 to visually display the remaining recordable number of photographic pictures or the remaining recordable capacity of photographic pictures, the remaining amount of battery power in the power supply part 2082, the date of photography, a shooting mode, various messages and the like which are recorded in the recording medium 2100, on the basis of the aforementioned discrimination information data, camera-related data and recording medium-related data of the recording medium 2100, the management data recorded in the management data recording area 2102 of the recording medium 2100, various kinds of modes which are selectively set by the switch group 2056 and various kinds of modes which are selectively set according to the kind of the recording medium 2100 connected to the system body 2200 (Step S2098 in FIG. 39). If the recording medium 2100 is a recording medium which is unusable with the present system or if the information data recording area 2104 of the recording medium 2100 contains no empty area in which data recording is possible (Step S2099 in FIG. 39), the system controlling circuit 2050 causes the display device 2054 to provide a warning display indicating that the recording medium 2100 is a recording medium unusable with the present system or that the information data recording area 2104 of the recording medium 2100 contains no empty area in which data recording is possible (Step S2100 in FIG. 39). Then, the process returns to Step S2092.

Then, the system controlling circuit 2050 detects the state of the distance·light measuring switch 2062. If the distance·light measuring switch 2062 is off, the process returns to Step S2115 which will be described later (Step S2101 in FIG. 40). If the distance·light measuring switch 2062 is on, the system controlling circuit 2050 sets the display device 2054 to the exposure display operation mode for displaying the state of exposure compensation (Step S2102 in FIG. 40), and causes the distance measuring circuit 2044 to measure the distance to a subject and then moves the focusing lens of the photographic optical system 2010 on the basis of the result of the distance measurement executed by the distance measuring circuit 2044, thereby focusing the photographic optical system 2010 onto the subject. Further, the system controlling circuit 2050 causes the light measuring circuit 2046 to measure the luminance of the subject and, on the basis of the result of the light measurement executed by the light measuring circuit 2046, causes the exposure controlling circuit 2042 to control the shutter mechanism of the exposure controlling member 2012 so that the subject optical image formed on the image pickup surface of the image pickup device 2014 achieves an optimum amount of exposure, thereby determining the amount of exposure of the subject by means of the exposure controlling member 2012 (Step S2103 in FIG. 40).

Then, the system controlling circuit 2050 detects the state of the recording starting switch 2064, and if the recording starting switch 2064 is turned on (Step S2104 in FIG. 40) and the image memory 2024 has an empty area in which image data can be stored (Step S2105 in FIG. 40), the system controlling circuit 2050 sets the display device 2054 to the exposure display operation mode for displaying the state of exposure compensation (Step S2106 in FIG. 40), and initiates a photographic operation and stores in the image memory 2024 image data obtained by digitizing an analog image signal outputted from the image pickup device 2014 by means of the A/D converter 2016 (Step S2107 in FIG. 40). Then, the process returns to Step S2104.

If it is determined in Step S2105 that the image memory 2024 contains no empty area in which image data can be stored and no photographic operation can be performed, the process proceeds to Step S2109, where the system controlling circuit 2050 sets the continuous-shooting display operation mode for displaying the state of the recordable capacity of the image memory 2024. The system controlling circuit 2050 reads the image data stored in the image memory 2024 and performs the recording operation of recording the read image data in the information data recording area 2104 of the recording medium 2100 through the memory controlling circuit 2020, the interface 2026, the connector 2030, the connector 2108 and the interface 2106 while recording management data associated with the image data in the management data recording area 2102. Then, the system controlling circuit 2050 causes the display device 2054 to update the display based on the continuous-shooting display operation mode for displaying the state of the recordable capacity of the image memory 2024 (Step S2110 in FIG. 40), and causes the process to return to Step S2104.

Since the aforementioned distance·light measuring operation and photographic operation are similar to those described previously, detailed description is omitted.

If it is determined in Step S2104 that the recording starting switch 2064 is off, the process proceeds to Step S2111. If it is determined in Step S2111 that the display device 2054 is performing a display operation on the basis of the continuous-shooting display operation mode, and if it is determined in Step S2112 that image data which is not recorded in the recording medium 2100 remains in the image memory 2024, a recording operation similar to that executed in Step S2109 is performed (Step S2113 in FIG. 40). Then, the system controlling circuit 2050 causes the display device 2054 to update the display based on the continuous-shooting display operation mode for displaying the state of the recordable capacity of the image memory 2024 (Step S2114 in FIG. 40), and causes the process to return to Step S2101.

If it is determined in Step S2111 that the display device 2054 is not performing a display operation on the basis of the continuous-shooting display operation mode, or even if the display device 2054 is performing a display operation on the basis of the continuous-shooting display operation mode, if it is determined in Step S2112 that image data which is not recorded in the recording medium 2100 does not remain in the image memory 2024, the process returns to Step S2101.

If it is determined in Step S2101 that the distance·light measuring switch 2062 is off, the system controlling circuit 2050 sets the display device 2054 to the continuous-shooting display operation mode for displaying the state of the recordable capacity of the image memory 2024 (Step S2115 in FIG. 40). If it is determined that image data which is not recorded in the recording medium 2100 remains in the image memory 2024 (Step S2116 in FIG. 40), a recording operation similar to that executed in Step S2109 is performed (Step S2117 in FIG. 40). Then, the system controlling circuit 2050 causes the display device 2054 to update the display based on the continuous-shooting display operation mode for displaying the state of the recordable capacity of the image memory 2024 (Step S2118 in FIG. 40), and causes the process to return to Step S2101. If it is determined in Step S2116 that image data which is not recorded in the recording medium 2100 does not remain in the image memory 2024, the system controlling circuit 2050 sets the display device 2054 to the number-of-photographic-pictures display operation mode for displaying the number or capacity of photographic pictures recorded in the recording medium 2100 or the remaining recordable number or capacity of photographic pictures in the recording medium 2100 (Step S2119 in FIG. 40). After that, the process returns to Step S2062, where the system controlling circuit 2050 is placed in the standby state until the main switch 2060 is turned on.

It is to be noted that, in the system according to any of the seventh to ninth embodiments, the recording medium 2100 is not limited to a memory card or a hard disk unit, and may also be a micro DAT (digital audio tape) unit, an optomagneto disk unit, an optical disk unit or the like. In this case as well, it is possible to achieve advantages similar to those of the seventh to ninth embodiments.

In the system according to any of the seventh to ninth embodiments, the recording medium 1100 may also be a composite recording medium in which a memory card and a hard disk unit are integrally assembled. The composite recording medium may also removably include the memory card or the hard disk unit so that the memory card or the hard disk unit can be arbitrarily connected to or separated from the body of the composite recording medium. Of course, the composite recording medium may be composed of two or more kinds of recording media selected from among the memory card, the hard disk unit, the micro DAT, the optomagneto disk unit, the optical disk unit and the like.

In the above description of the seventh to ninth embodiments, reference has been made to the arrangement in which the recording medium 2100, such as the memory card or the hard disk unit, is removably connected to the system body 2200 so that the recording medium 2100 can be arbitrarily connected to and separated from the system body 2200. However, it is also possible to adopt an arrangement in which two or more kinds of recording media are connectable to the system body 2200 or an arrangement in which two or more kinds of recording media are fixed to the system body 2200. It is also possible to adopt an arrangement in which one of two or more kinds of recording media are fixed to the system body 2200 and another one is removably connected to the system body 2200 so that it can be arbitrarily connected to and separated from the system body 2200.

As described above, the electronic still video system according to the seventh to ninth embodiments is arranged in such a manner that an input image signal is temporarily stored in an image memory and when the image signal is to be recorded in a recording medium, a display device is made to display the amount by which the image signal can be stored in the image memory. Accordingly, when an image signal is to be continuously recorded in a recording medium, an operator can easily visually confirm the timing at which the image signal is recordable, owing to a display provided on a display device. Therefore, by using a simple arrangment, it is possible to record the required image signal in the recording medium at the desired timing and prevent erroneous recording of an unnecessary image signal, thereby improving the operability of the electronic still video system.

In the electronic still video system according to the seventh to ninth embodiments, a display device for displaying the state of exposure compensation is arranged in such a manner that a display indicative of the state of exposure compensation and a display indicative of the amount by which an image signal can be stored are switchably detected. Accordingly, since it is not necessary to newly provide a display, it is possible to simplify the arrangement of the system and reduce the cost thereof.

As described above, according to the seventh to ninth embodiments, it is possible to provide an information signal processing apparatus of good operability which is arranged so that when an image signal is to be recorded in a recording medium, an operator can easily make a judgement as to the recording timing of the image signal to record the necessary information in a recording medium at the desired timing by means of a simple arrangement, whereby it is possible to prevent erroneous recording of an unnecessary information signal.

Figure 43:
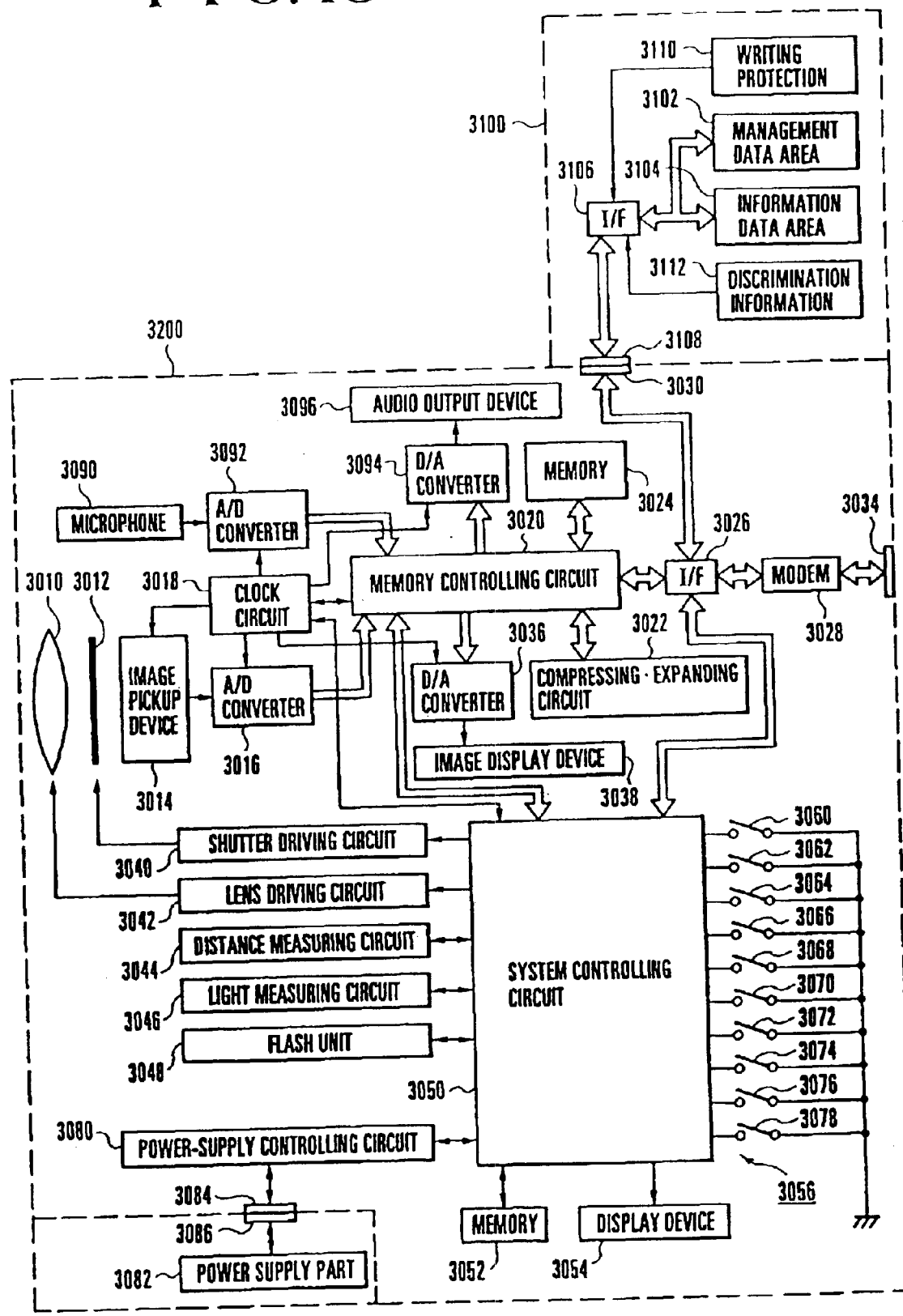
FIG. 43 is a block diagram schematically showing the arrangement of an electronic still video system to which a tenth embodiment of the present invention is applied.

FIG. 43 is a block diagram schematically showing the arrangement of an electronic still camera to which a tenth embodiment of the present invention is applied. An electronic still camera 3200 is arranged to employ a system controlling circuit 3050 as a primary control circuit to execute predetermined processing such as photographic processing, sound inputting processing, processing for recording and storing photographic image data or input sound data in a recording medium 3100, processing for reproducing recorded image data or sound data or processing for transmitting the reproduced image or sound data. Memory accesses for recording and reproduction are executed under the control of a memory controlling circuit 3020 on the basis of an instruction supplied from the system controlling circuit 3050. The processing for recording and storing photographic image data or input sound data in the recording medium 3100 is executed under the control of an interface 3026 on the basis of an instruction supplied from the system controlling circuit 3050. The processing for transmitting data between the electronic still camera 3200 and an external device such as a personal computer or a printer is executed by means of a modem 3028 under the control of the interface 3026 on the basis of an instruction supplied from the system controlling circuit 3050.

The electronic still camera 3200 includes a photographic lens 3010, a shutter 3012 having a diaphragm function, an image pickup device 3014, such as a CCD, for converting an optical image into an electrical signal, an A/D converter 3016 for converting analog image data obtained from photoelectric conversion by the image pickup device 3014 into digital data, a clock circuit 3018 for supplying a clock signal or a control signal to the image pickup device 3014, the A/D converter 3016, an A/D converter 3092, a memory controlling circuit 3020, a D/A converter 1036 and a D/A converter 3094 under the control of the system controlling circuit 3050, an image·sound memory 3024 for temporarily storing image data or sound data, a microphone 3090 for converting sound into an electrical signal, and the A/D converter 3092 for converting analog sound data supplied from the microphone 3090 into digital data.

The memory controlling circuit 3020 writes the image data inputted from the image pickup device 3014 and the A/D converter 3016 and the sound data inputted from the microphone 3090 and the A/D converter 3092 into the image·sound memory 3024. The memory controlling circuit 3020 also reads the written image data and sound data from the image·sound memory 3024 so that the image data and the sound data are outputted to the recording medium 3100, the image display device 1038 or an external device (not shown) such as a personal computer.

The electronic still camera 3200 also includes a compressing·expanding circuit 3022 for compressing or expanding the image data or the sound data by a method such as adaptive discrete cosine transform (ADCT) or adaptive predictive PCT coding (ADPCM), and the image·sound memory for temporarily storing the image data or the sound data. During compression·expansion of the image data or the sound data, the compressing·expanding circuit 3022 reads the image data or the sound data from the image·sound memory 3024 and performs compression or expansion of the read image or sound data, and writes the compressed or expanded data into the image·sound memory 3024.

The electronic still camera 3200 also includes an image display device 3038. Under the control of the memory controlling circuit 3020, when the image data is read from the image·sound memory 3024 and analog image data obtained from D/A conversion by the D/A converter 3036 is inputted into the image display device 3038, the image display device 3038 performs predetermined image reproduction processing and displays a reproduced image.

The electronic still camera 3200 also includes an audio output device 3096. Under the control of the memory controlling circuit 3020, when the sound data is read from the image·sound memory 3024 and analog sound data obtained from D/A conversion executed by the D/A converter 3094 is inputted into the D/A converter 3094, the D/A converter 3094 performs predetermined sound reproduction processing and outputs a reproduced sound.

The electronic still camera 3200 includes a connector 3030 for permitting transmission and reception of a data signal or a control signal to and from the recording medium 3100 such as a memory card or a hard disk unit, and a connector 3034 for permitting transmission and reception of a data signal or a control signal to and from the external device. Each of the connectors 3030 and 3034 can be used for transmission and reception of not only an electrical signal but also various signals such as a light wave signal and a sound wave signal.

The recording medium 3100 such as a memory card or a hard disk unit has a recording area formed by a management data area 3102 and an information data area 3104, and data is written into and read from each of the management data area 3102 and the information data area 3104 through an interface 3106 and a connector 3108. Information from a writing protection 3110 and recording-medium discrimination information 3112 are also read to the outside through the interface 3106 and the connector 3108. The recording-medium discrimination information 3112 indicates the kind, characteristics and the like of the recording medium 3100, and the system controlling circuit 3050 recognizes the kind, characteristics and the like of a recording medium connected to the connector 3030 on the basis of the recording-medium discrimination information 3112. The interface 3106 includes a control circuit such as a CPU or an MPU, a nonvolatile memory such as a ROM or an EEPROM, a nonvolatile memory such as a RAM, and other associated circuit elements, and performs control of the recording medium 3100 on the basis of a predetermined program.

The electronic still camera 3200 also includes a lens driving circuit 3040 for driving the focusing lens provided in the photographic lens 3010, a lens driving circuit 3042 for opening and closing the shutter 3012, a distance measuring circuit 3044 for measuring the distance to a subject, a light measuring circuit 3046 for measuring the luminance of the subject, and a flash unit 3048 for electrically emitting light.

The system controlling circuit 3050 causes the lens controlling circuit 3040 to drive the focusing lens of the photographic lens 3010 on the basis of the result of a distance measurement executed by the distance measuring circuit 3044, thereby bringing the photographic lens 3010 into focus. On the basis of the subject luminance measured by the light measuring circuit 3046, the system controlling circuit 3050 further determines the shutter opening time of the shutter 3012 driven by the lens driving circuit 3042 so that an optimum amount of exposure can be achieved.

The system controlling circuit 3050 also includes a memory 3052 for storing constants and variables for use in the operation of the system controlling circuit 3050 and other information such as the time of photography. The system controlling circuit 3050 includes a display device 3054, such as a liquid-crystal display, for displaying the state of operation.

The electronic still camera 3050 includes a switch group 3056 which is operated to input various operational instructions into the system controlling circuit 3050. The switch group 3056 includes various switches, such as a main switch 3060, a distance·light measuring switch 3062 for specifying execution of a distance measurement by the distance measuring circuit 3044 and execution of a light measurement by the light measuring circuit 3046, a release switch 3064 for inputting an instruction to start a photographic operation and an instruction to record photographic image data in the recording medium 3100, a mode switch 3066 for switchably setting a single-shooting mode for executing one or one set of photographic operations, a continuous-shooting mode for continuously executing photography for a plurality of photographic images, and a self-timer photography mode, an image mode switch 3068 for setting a image recording format such as the number of images to be recorded, a discrimination between frame recording and field recording, an aspect ratio, the arrangement of pixels, a compression method and a compression ratio, an erase mode switch 3070 for setting an erase mode, an erase switch 3072 for inputting an instruction to execute an erasure, a main mode switch 3074 for selecting a desired mode from among modes such as a recording mode, a reproduction mode and a transmission mode, a sound mode switch 3076 for setting sound recording methods, such as on/off of sound recording, the time period of sound recording, the number of channels used in a recording method such as stereophonic recording/bilingual recording/monaural recording, a compression method and a compression ratio, and a sound start switch 3078 for inputting an instruction to execute sound recording or sound reproduction.

The system controlling circuit 3050 also includes a power supply circuit 3080, a battery 3082, a connector 3084 and a connector 3086. The power supply circuit 3080 is made up of constituent elements such as a battery detecting circuit, a DC-DC converter and a switch for selecting a block to be energized, The power supply circuit 3080 detects the presence or absence of an attached battery, the kind of the attached battery and the remaining amount of battery power, and controls the DC-DC converter on the basis of the result of the detection and an instruction supplied from the system controlling circuit 3050, thereby supplying the required voltage to each part at the required time interval.

The operation of the electronic still camera according to the tenth embodiment will be described below with reference to the flowcharts shown in FIGS. 44 to 58.

Figure 44:
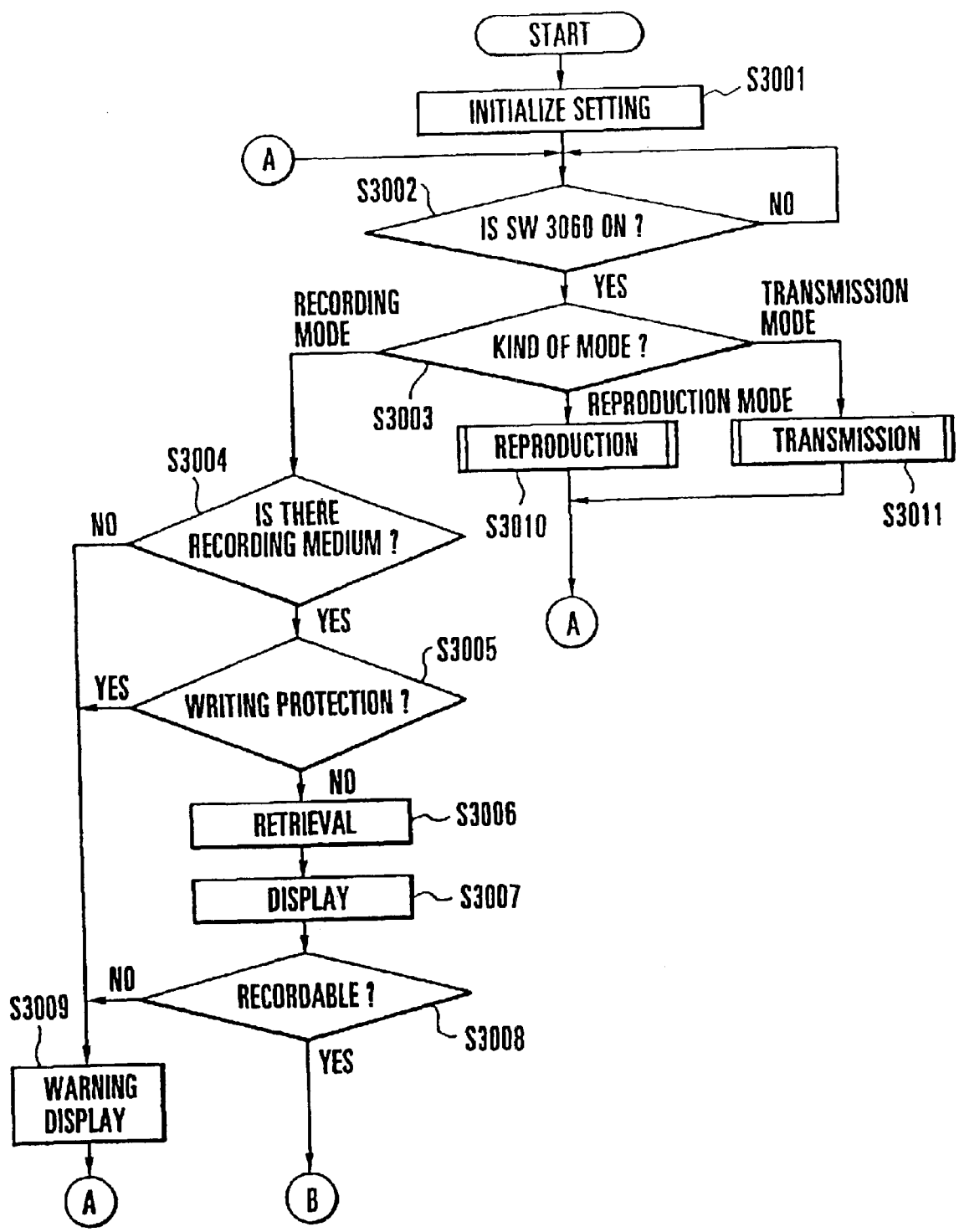
FIG. 44 is part of a flowchart showing the main operation routine of the electronic still video system shown in FIG. 43.
Figure 45:
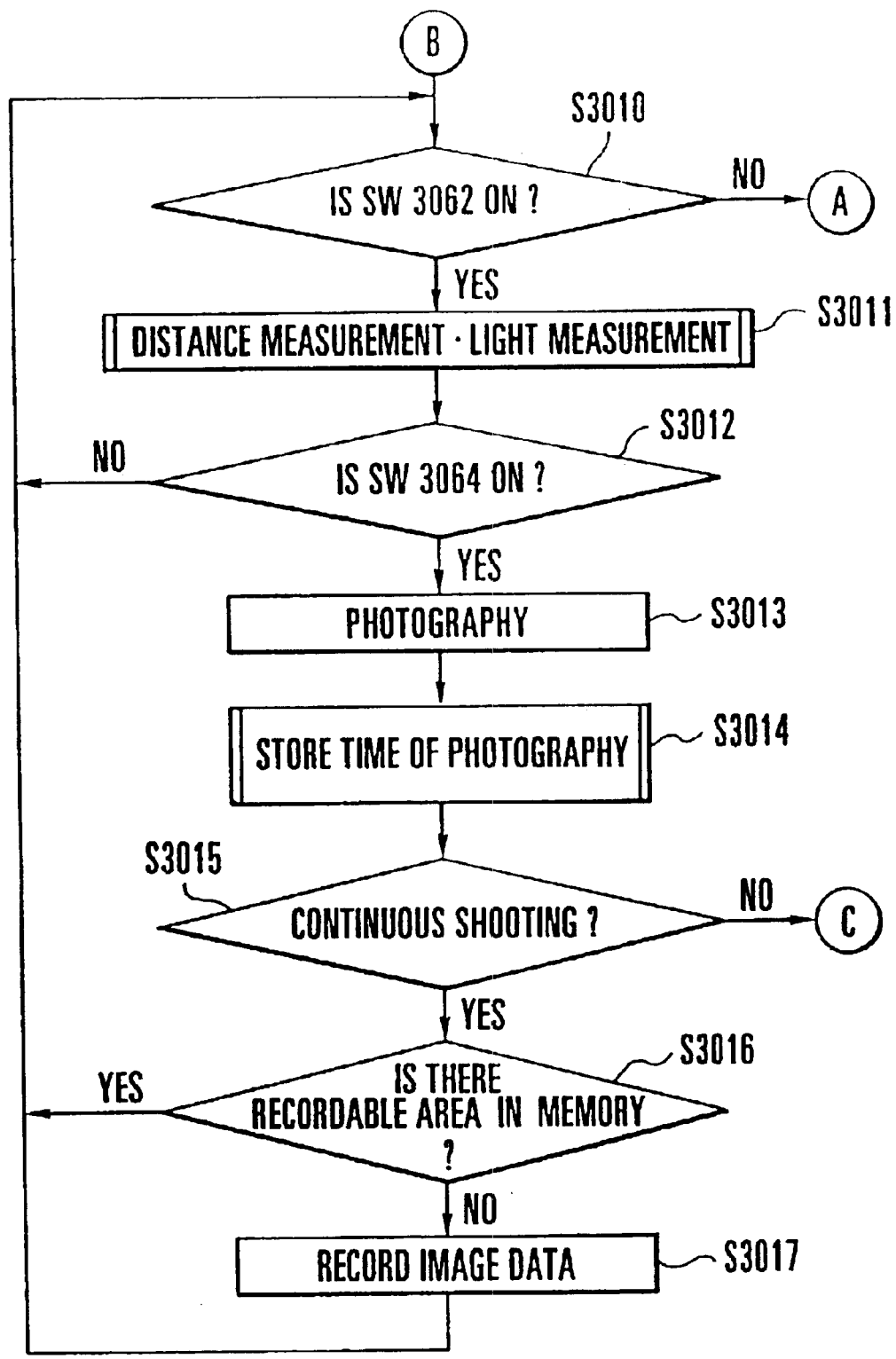
FIG. 45 is part of the flowchart showing the main operation routine of the electronic still video system shown in FIG. 43.
Figure 46:
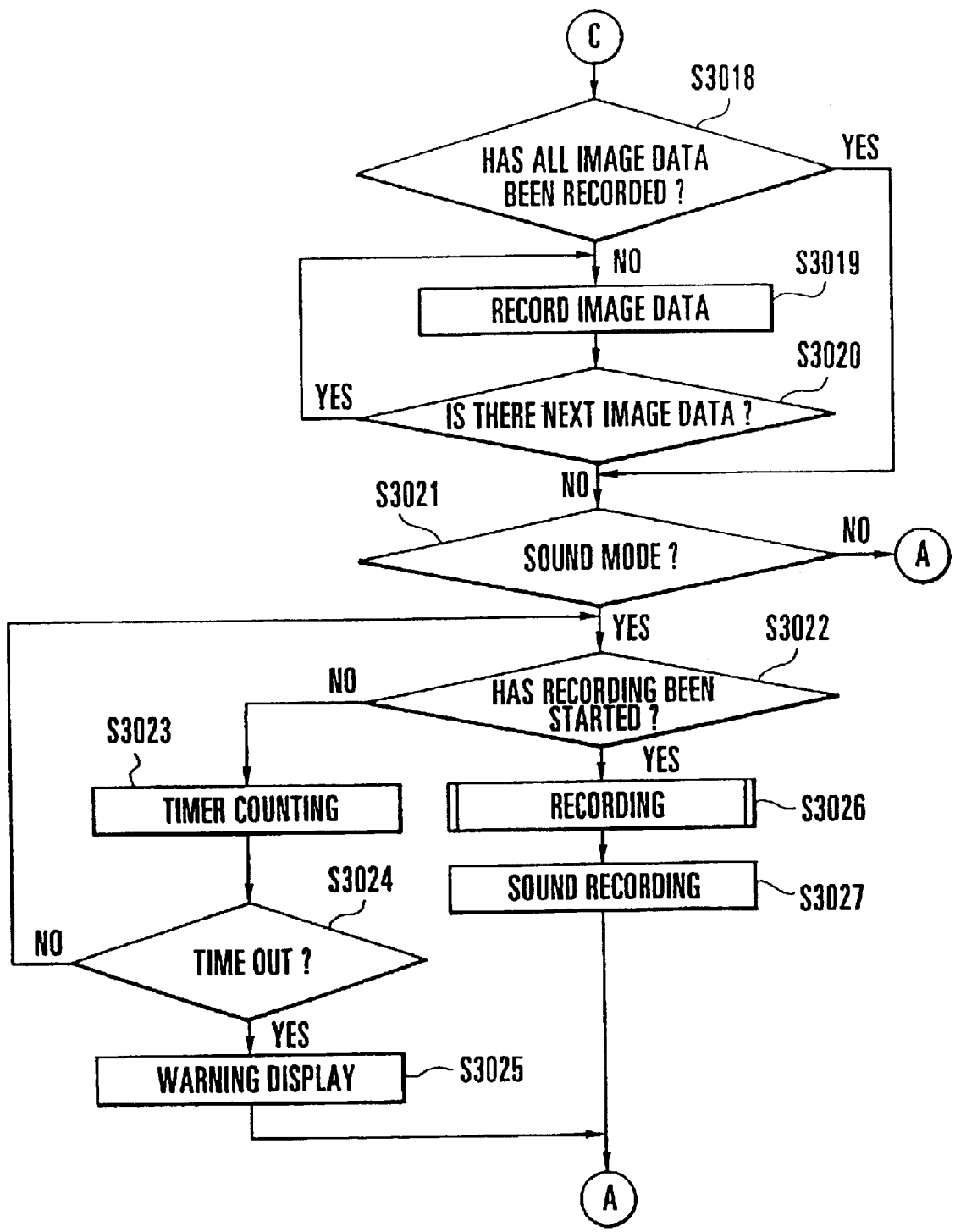
FIG. 46 is part of the flowchart showing the main operation routine of the electronic still video system shown in FIG. 43.

FIGS. 44 to 46 show in combination the flowchart of the main routine of the tenth embodiment.

Referring to FIG. 44, when the power supply circuit 3080 is turned on, the system controlling circuit 3050 initializes various flags and control variables (Step S3001). If the main switch 3060 is turned on (Step S3002), a decision is made as to the kind of mode selected by the main mode switch 3074 (Step S3003). If the reproduction mode is selected, predetermined reproduction processing for the reproduction mode is executed (Step S3010). If the transmission mode is selected, predetermined transmission processing for the transmission mode is executed (Step S3011) and the process returns to Step S3002. The reproduction processing and the transmission processing will be described later.

If the recording mode is selected, it is determined whether the storage recording medium 3100, such as a memory card or a hard disk unit, is connected to the electronic still camera 3200 (Step S3004). If the storage recording medium 3100 is connected to the electronic still camera 3200, it is determined whether the writing protection 3110 of the connected storage recording medium 3100 is cancelled (Step S3005). If it is determined that the writing protection 3110 of the connected storage recording medium 3100 is cancelled, retrieval is performed as to the state of recording in the management data area 3102, the information data area 3104 and the like of the storage recording medium 3100 (Step S3006). On the basis of the management data of the management data area 3102, each of the modes set by the switch group 3056 and the mode selected according to the kind of the connected storage recording medium 3100, the display device 3054 is made to display information such as exposure number, date and operation mode (Step S3007). If there is a recordable empty area in the management data area 3102 (Step S3008), the process proceeds to Step S3010.

If the storage recording medium 3100, such as a hard disk unit or a memory card, is not connected to the electronic still camera 3200 (Step S3004), or if the writing protection 3110 of the connected storage recording medium 3100 is set (Step S3005), or if there is no recordable empty area in the management data area 3102 (Step S3008), the display device 3054 is made to provide an associated warning display (Step S3009). Subsequently, the process waits for the main switch 3060 is operated (Step S3002).

In Step S3010, it is determined whether the distance·light measuring switch 3062 has been turned on. If the distance·light measuring switch 3062 has not been turned on, the process returns to Step S3002. If the distance·light measuring switch 3062 has been turned on, the distance measuring circuit 3044 and the light measuring circuit 3046 are made to perform distance measurement and light measurement, respectively. Then, the photographic lens 3010 is focused on a subject by the lens driving circuit 3042 and a shutter time is determined (Step S3011). The distance·light measuring operation will be described later in detail. The distance·light measuring operation is repeated until the release switch 3064 is turned on after the distance·light measuring switch 3062 is turned on (Steps S3010 to S3012). If the release switch 3064 is turned on, a photographic operation is executed and the obtained image data is written into the image·sound memory 3024 (Step S3013). The system controlling circuit 3050 disables the respective functions of the sound mode switch 3076 and the sound start switch 3078 to reject a sound recording instruction from the time when the photographic operation is started until the end of image recording on the recording medium 3100, thereby preventing recording of a mechanical noise due to an operation of the shutter 3012, the flash unit 3048, the recording medium 3100 (hard disk unit) or the like. The aforementioned photographic operation will be described later in detail. If the photographic operation up to the image recording is completed, the time of photography associated with the image is stored in the memory 3052 (Step S3014).

If the photographic operation is to be continued in the continuous-shooting mode (Step S3015), the process proceeds to Step S3016. If it is determined in Step S3016 that there is a recordable area in the image·sound memory 3024, the process returns to Step S3010 and a similar operation is repeated. If it is determined in Step S3016 that there is no recordable area in the image·sound memory 3024, image data and the time of photography associated with the image data are respectively read from the image·sound memory 3024 and the memory 3052 under the control of the memory controlling circuit 3020. The image data is recorded in file form in the information data area 3104 of the recording medium 3100 through the interface 3026 and the connector 3030, while management information about the image data, such as the time of photography and the time of image-file creation, is recorded in the management data area 3102 through the interface 3026 and the connector 3030 (Step S3017). Then, the process returns to Step S3010 and similar processing is repeated.

If the continuous-shooting mode (or the single-shooting mode) is not to be continued (Step S3015), the process proceeds to Step S3018. If it is determined in Step S3018 that image data which is not recorded in the image·sound memory 3024 remains in the image·sound memory 3024 (Step S3018), the image data and the time of photography associated with the image data are respectively read from the image·sound memory 3024 and the memory 3052 under the control of the memory controlling circuit 3020. The image data is recorded in file form in the information data area 3104 of the recording medium 3100 through the interface 3026 and the connector 3030, while management information about the image data, such as the time of photography and the time of image-file creation, is recorded in the management data area 3102 through the interface 3026 and the connector 3030 (Step S3019). Both the time of photography and the time of image-file creation recorded in the management data area 3102 may have the form of year/month/day/hour/minute/second, or only the time of photography may have the abbreviated form of year/month/day/hour/minute in which "second" is omitted. The image recording operation of Step S3019 is repeated by the amount of the image data stored in the image·sound memory 3024 (Steps S3019 to S3020).

When the recording of the image data on the recording medium 3100 is completed in the above-described manner, the system controlling circuit 3050 cancels the inhibition of sound recording and enables sound recording. By the sound recording, it is possible to realize the "sound memo" function of adding sound to photographic image data.

More specifically, if a sound mode is set by the sound mode switch 3076 (Step S3021) and the sound start switch 3078 is turned on (Step S3022), recording of sound data which is inputted from the microphone 3090 and A/D converted by the A/D converter 3092 is performed by writing the sound data into the image·sound memory 3024 under the control of the memory controlling circuit 3020 (Step S3026). During this recording, the system controlling circuit 3050 stores the recording time period of the sound data and the elapsed time between the completion of photography and the start of the sound recording, in an internal register of the system controlling circuit 3050 or the memory 3052. This recording operation will be described later in detail.

During the execution of the sound recording, the system controlling circuit 3050 disables the photography executing function of the release switch 3064, thereby rejecting a photography starting instruction. If the recording medium 3100 is provided with a mechanical driving mechanism, as in the case of a hard disk unit or the like, the system controlling circuit 3050 stops the rotation of the hard disk unit or the like prior to initiation of the sound recording and inhibits any access accompanied by a head travel, thereby preventing recording of a mechanical noise due to an operation of the shutter 3012, the flash unit 3048, the recording medium 3100 (hard disk unit) or the like. If the recording medium 3100 does not have a mechanical driving mechanism, as in the case of a memory card or the like, no access is inhibited.

When the above-described sound recording is completed, the sound data and the time of the recording of the sound data and the elapsed time between the end of the photography and the start of the sound recording are respectively read from the image-sound memory 3024 and the memory 3052 (or the internal register). The sound data is recorded in file form in the information data area 3104 of the recording medium 3100 through the interface 3026 and the connector 3030, while management information about the sound data, such as the time of the sound recording and the time of sound-file creation, is recorded in the management data area 3102 through the interface 3026 and the connector 3030 (Step S3027). In the above-described case, if the recording medium 3100 is provided with a mechanical driving mechanism, as in the case of a hard disk unit or the like, the system controlling circuit 3050 starts up the hard disk unit or the like prior to initiation of the sound recording and cancels the inhibition of access accompanied by a head travel. If the sound recording is completed, the system controlling circuit 3050 cancels the state of inhibiting photography from being executed in response to the release switch 3064.

If the sound start switch 3078 is not turned on within a predetermined sound recording start permission interval (Steps S3022 to S3024), the display device 3054 is made to provide a warning display indicating that the sound recording start permission interval is over (Step S3025). The process returns to Step S3002, where the process waits for the main switch 3060 to be operated. In the sound recording of Step S3027, the sound recording start permission interval is also recorded in the management data area 3102.

Figure 47:
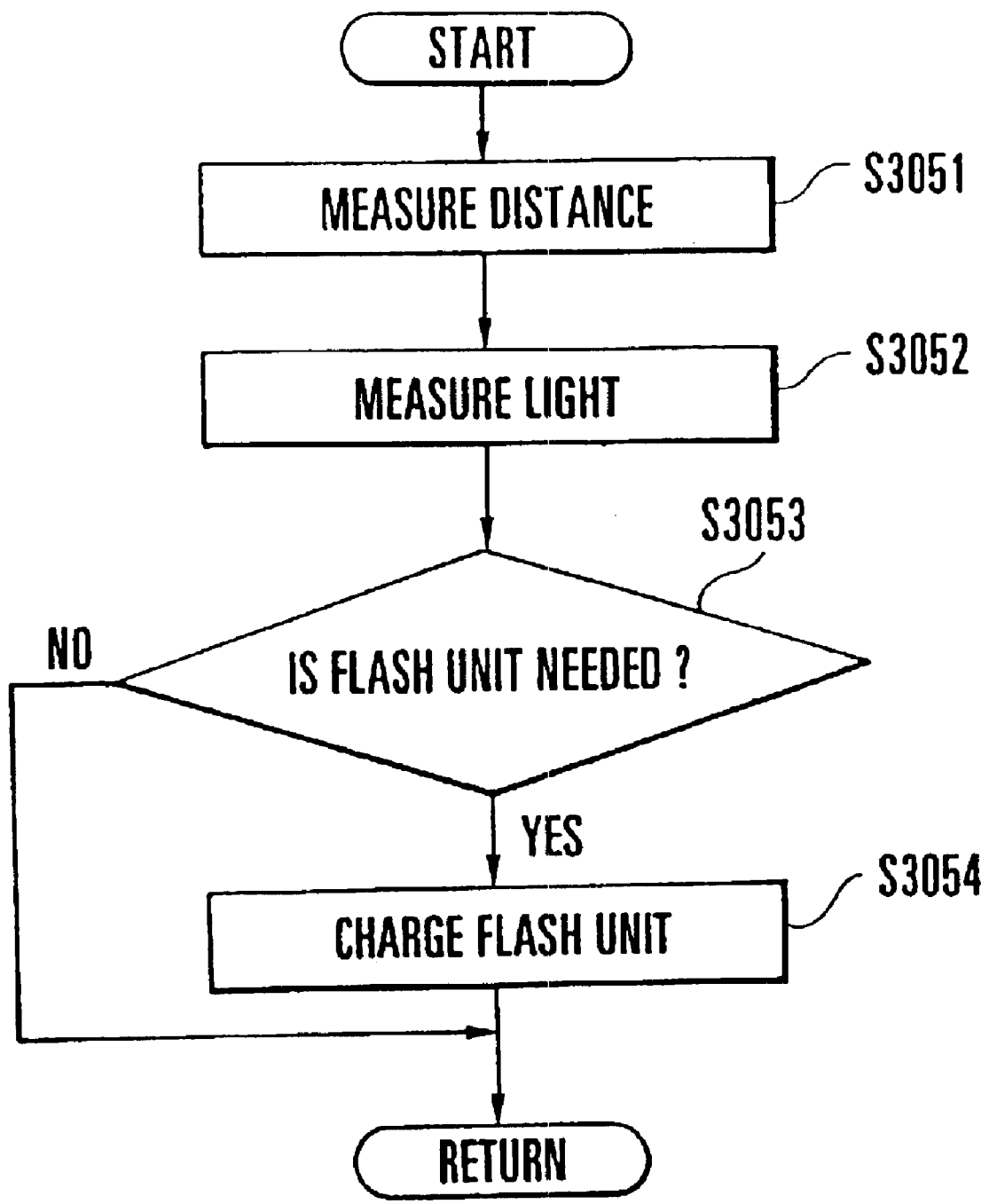
FIG. 47 is a flowchart which serves to explain in detail a distance·light measuring operation according to the tenth embodiment of the present invention.

FIG. 47 is a flowchart showing in detail the distance-light measuring operation executed in Step S3011 of FIG. 45. The distance to the subject is measured by the distance measuring circuit 3044 and the subject distance is stored in the memory 3052 (Step S3051). Then, the luminance of the subject is measured by the light measuring circuit 3046 and the subject luminance is stored in the memory 3052 (Step S3052). It is then determined whether it is necessary to use the flash unit 3048, on the basis of the subject luminance measured by the light measuring circuit 3046 (Step S3053). If it is necessary to use the flash unit 3048, a flash flag is set and the flash unit 3048 is charged (Step S3054), and the process returns to the main routine. If it is not necessary to use the flash unit 3048, the process skips Step S3054 and returns to the main routine.

Figure 48:
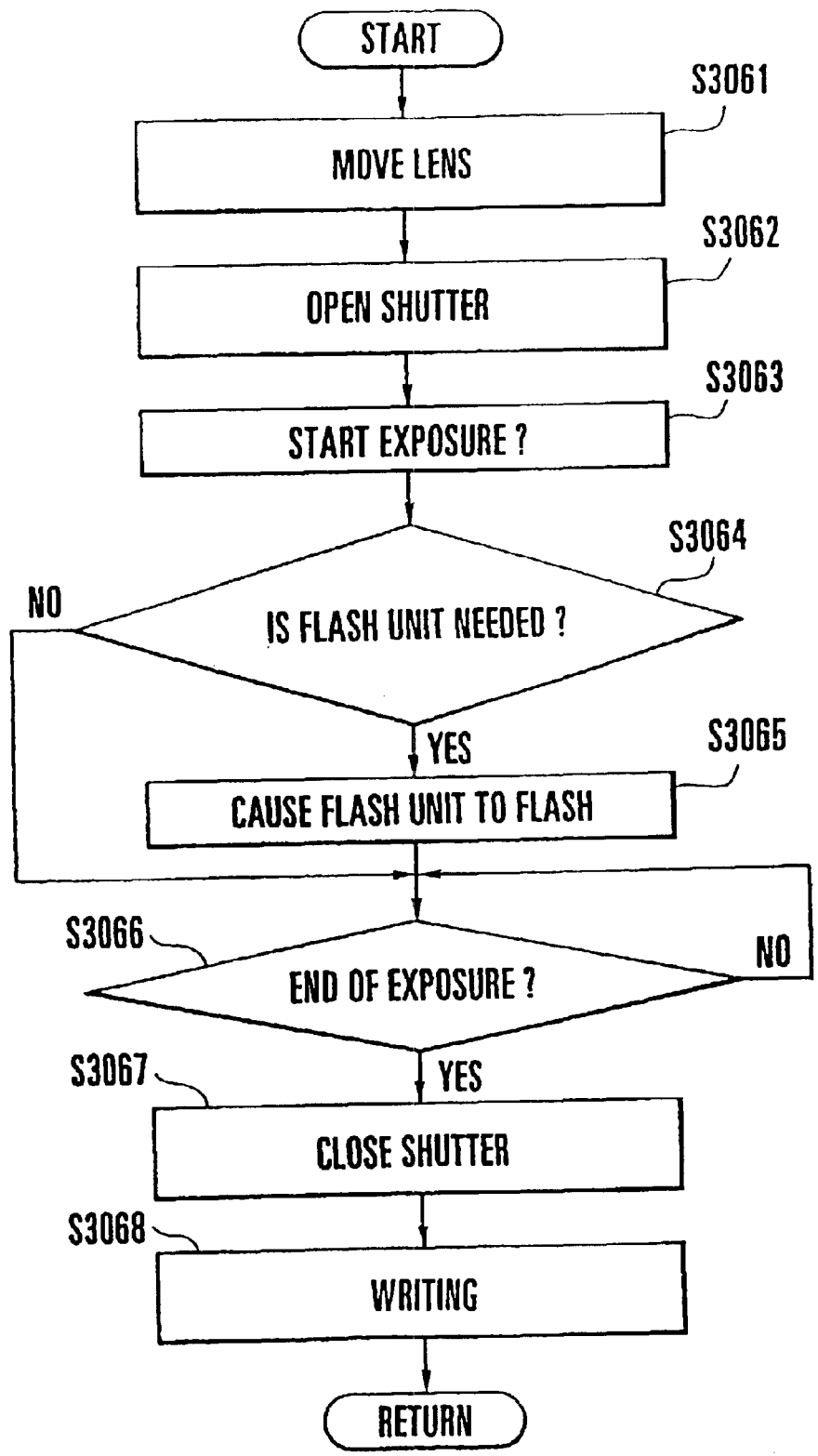
FIG. 48 is a flowchart which serves to explain in detail a photographic operation according to the tenth embodiment of the present invention.

FIG. 48 is a flowchart showing in detail the photographic operation executed in Step S3013 of FIG. 45. The system controlling circuit 3050 reads the subject distance stored in the memory 3052 and causes the lens controlling circuit 3040 to drive the focusing lens of the photographic lens 3010 on the basis of the subject distance, thereby focusing the photographic lens 3010 on the subject (Step S3061). Then, the lens driving circuit 3042 opens the shutter 3012 by the shutter time determined on the basis of the subject luminance, thereby exposing the image pickup device 3041 (Steps S3062 to S3063).

Then, it is determined whether it is necessary to use the flash unit 3048, on the basis of the flash flag (Step S3064). If it is necessary to use the flash unit 3048, the flash unit 3048 is made to flash (Step S3065), and the process waits for the end of the exposure of the image pickup device 3041 (Step S3066). If the flash unit 3048 is not needed, the process proceeds to Step S3066 without causing the flash unit 3048 to flash, and waits for the end of the exposure of the image pickup device 3041. If the exposure of the image pickup device 3041 comes to an end, the shutter 3012 is closed (Step S3067). A charge signal (image data) which reflects a photographic image is read from the image pickup device 3041, and the image data is written into the image-sound memory 3024 through the A/D converter 3016 and the memory controlling circuit 3020 (Step S3068). Then, the process returns to the main routine.

Figure 49:
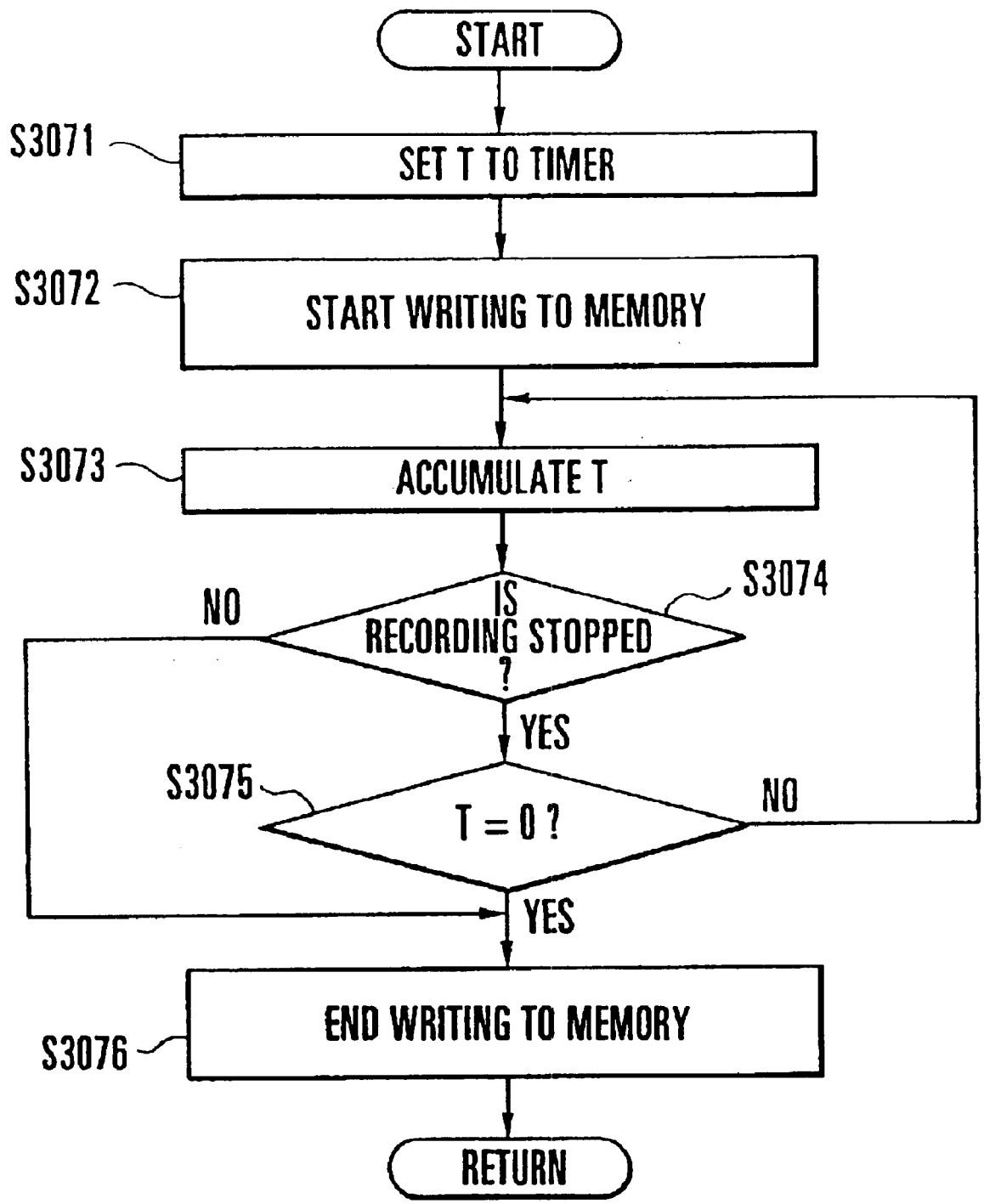
FIG. 49 is a flowchart which serves to explain in detail a sound recording operation according to the tenth embodiment of the present invention.

FIG. 49 is a flowchart showing in detail the sound recording operation executed in Step S3026 of FIG. 46. A sound recording time T is set in a sound recording timer (Step S3071), and the sound data inputted from the microphone 3090 and the A/D converter 3092 starts to be written into the image-sound memory 3024 under the control of the memory controlling circuit 3020 (Step S3072). The sound recording time T of the sound recording timer is accumulated (Step S3073). This accumulation is performed by counting down the sound recording time T of the sound recording timer.

If the sound recording is forcedly stopped or the sound recording timer counts down the sound recording time T to "0", the writing of the sound data is brought to an end (Steps S3074 to S3076), and the process returns to the main routine.

Figure 50:
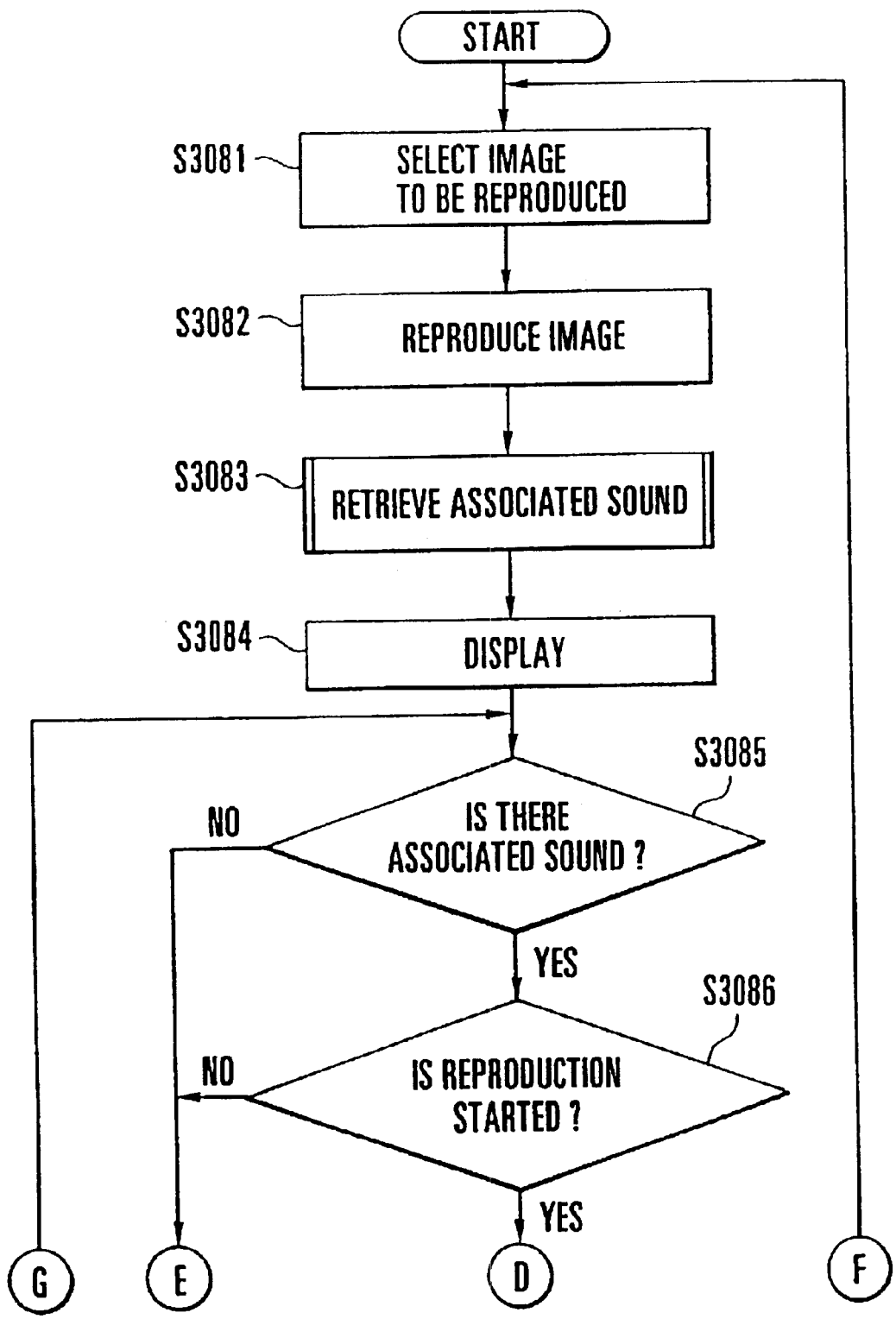
FIG. 50 is part of a flowchart which serves to explain in detail a reproducing operation according to the tenth embodiment of the present invention.
Figure 51:
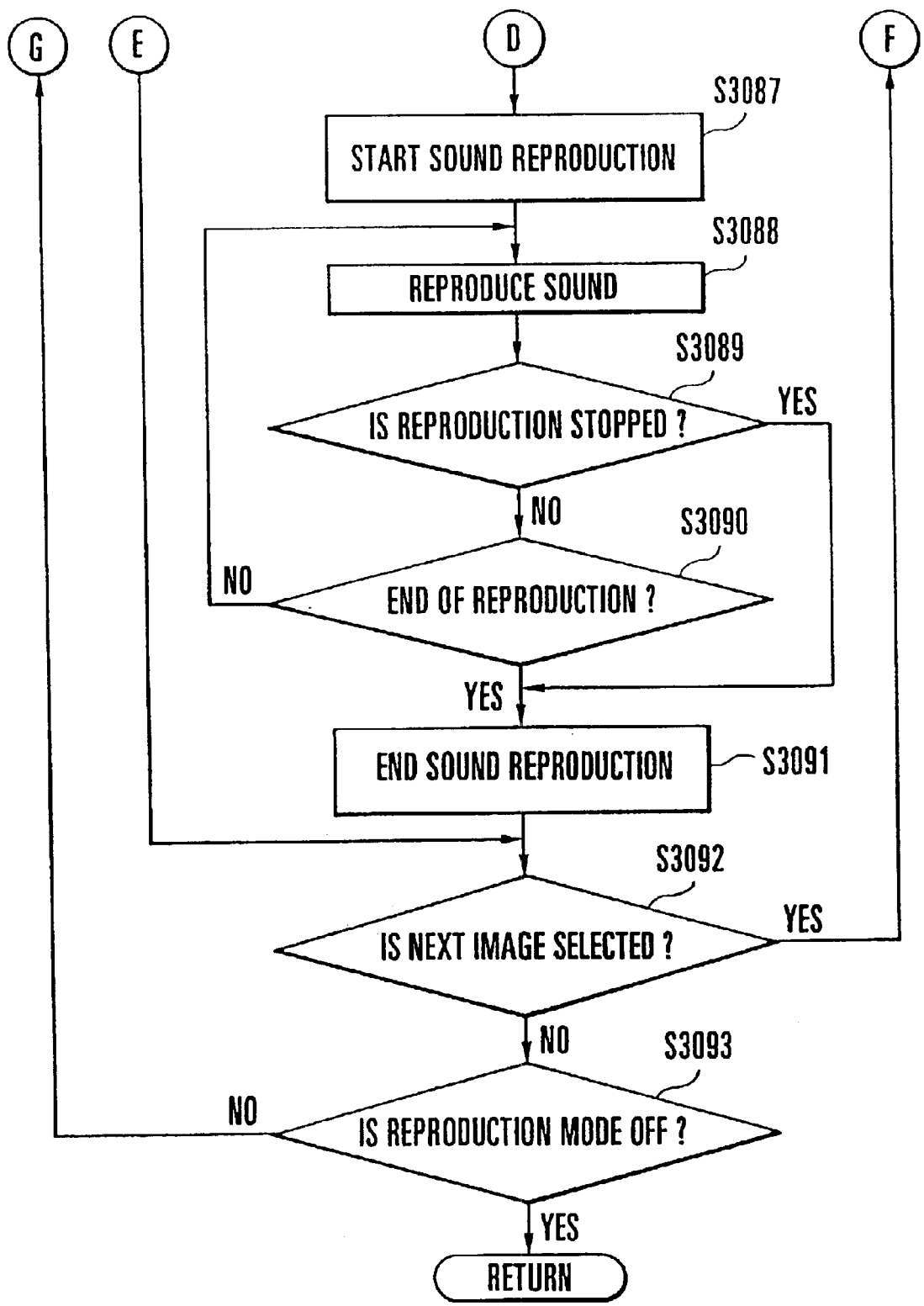
FIG. 51 is part of the flowchart which serves to explain in detail the reproducing operation according to the tenth embodiment of the present invention.

FIG. 50 is a flowchart showing in detail the reproducing operation executed in Step S3010 of FIG. 44. If an image to be reproduced is selected by setting an input button (not shown) or an input dial (not shown) or by external communication (Step S3081), the system controlling circuit 3050 reads out the necessary management information containing the time of photography by performing retrieval from the management data area 3102 of the recording medium 3100. On the basis of the read necessary management information, the corresponding image data is read from the information data area 3104, and is written into the image-sound memory 3024 through the connector 3030, the interface 3026 and the memory controlling circuit 3020. At this time, the read necessary management information containing the time of photography is stored in the memory 3052. Then, the image data is read from the image-sound memory 3024 through the memory controlling circuit 3020, and the read image data is subjected to D/A conversion in the D/A converter 3036. The analog image data is visually displayed on the image display device 3038 (Step S3082). At this time, if necessary, the image data is expanded by the compressing-expanding circuit 3022. If it is necessary to compress the image data to a signal suitable for display on the image display device 3038, as by reducing the number of pixels, the image data is compressed by the compressing-expanding circuit 3022.

Then, retrieval is performed from the management data area 3102 of the recording medium 3100 to retrieve associated sound data to be combined with the selected image (Step S3083). The retrieval of the associated sound is performed by comparing the time of photography of the selected image stored in the memory 3052 with the time of recording of the sound, which is read from the recording medium 3100. Such a retrieval operation will be described later in detail. The result of the retrieval (retrieved combination information or the absence of sound data to be combined) is displayed on the display device 3054 and on the image display device 3038 (Step S3084).

Then, if sound data associated with the selected image is present (Step S3085) and if the sound start switch 3078 is turned on (Step S3086), reproduction of the associated sound data is started (Step S3087). The reproduction of the associated sound data is performed in the following manner. The management information is read out by performing retrieval from the management data area 3102 of the recording medium 3100, and the corresponding sound data is read from the information data area 3104 on the basis of the management information and is written into the image-sound memory 3024 through the connector 3030, the interface 3026 and the memory controlling circuit 3020. Then, the sound data is read from the image-sound memory 3024 through the memory controlling circuit 3020 and the read sound data is subjected to D/A conversion in the D/A converter 3094, and the audio output device 3096 produces an audio output. At this time, if necessary, the sound data is expanded by the compressing-expanding circuit 3022 (Step S3088).

If the sound recording is forcedly stopped (Step S3089) or if all the sound data associated with the selected image are outputted (Step S3090), the reproduction and outputting of sound data is brought to an end (Step S3091).

Then if the next image is selected (Step S3092), the process returns to Step S3081, and similar processing is repeated in connection with the selected image. If the next image is not selected and if the main mode switch 3074 is not switched and the reproducing mode has not been turned off (Step S3093), the process returns to Step S3085 and the reproduction and outputting of sound data associated with the selected image is repeated. If the main mode switch 3074 is switched and the reproducing mode is turned off (Step S3093), the process returns to the main routine and the reproducing operation is thus brought to an end.

Figure 52:
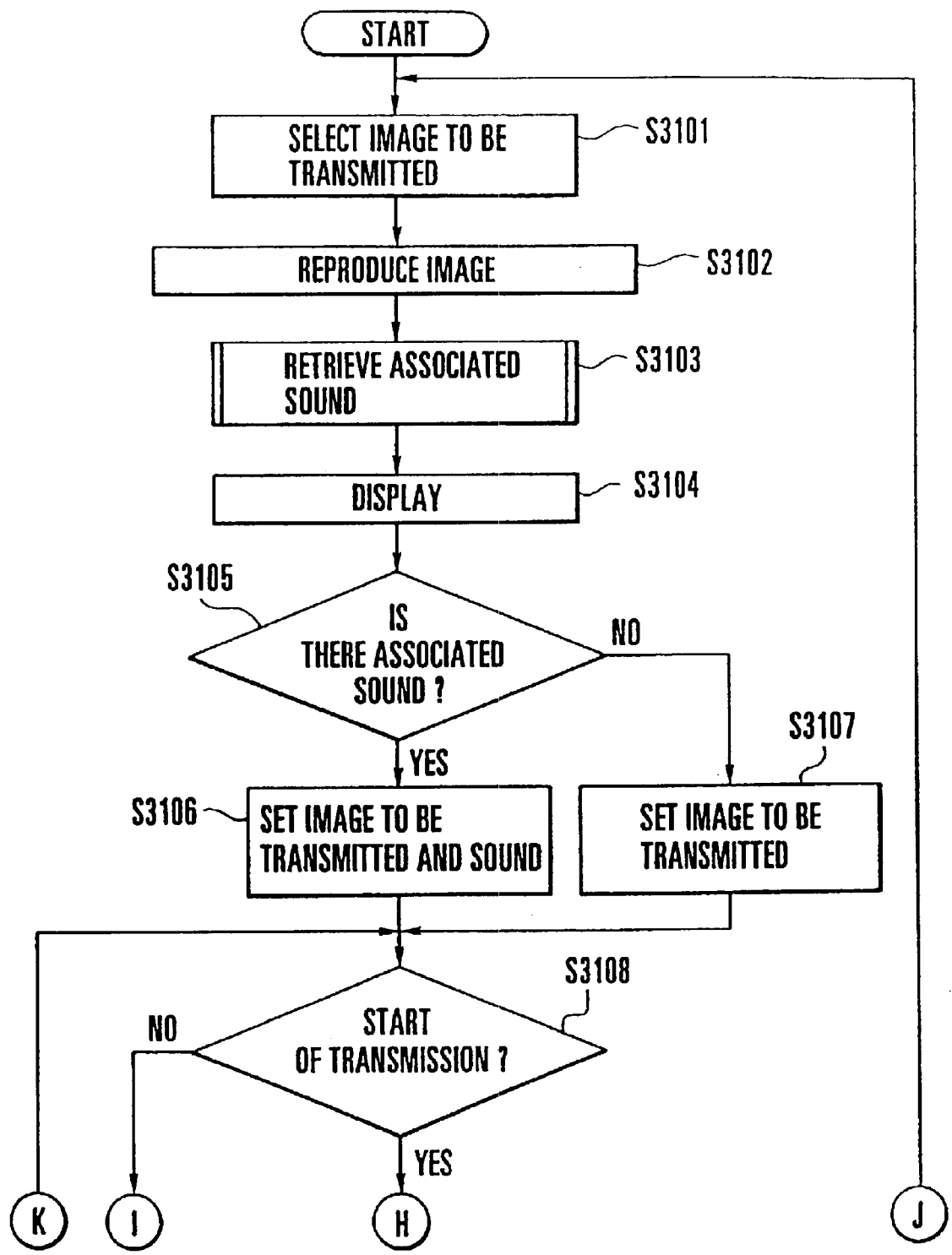
FIG. 52 is part of a flowchart showing in detail a transmission operation according to the tenth embodiment of the present invention.
Figure 53:
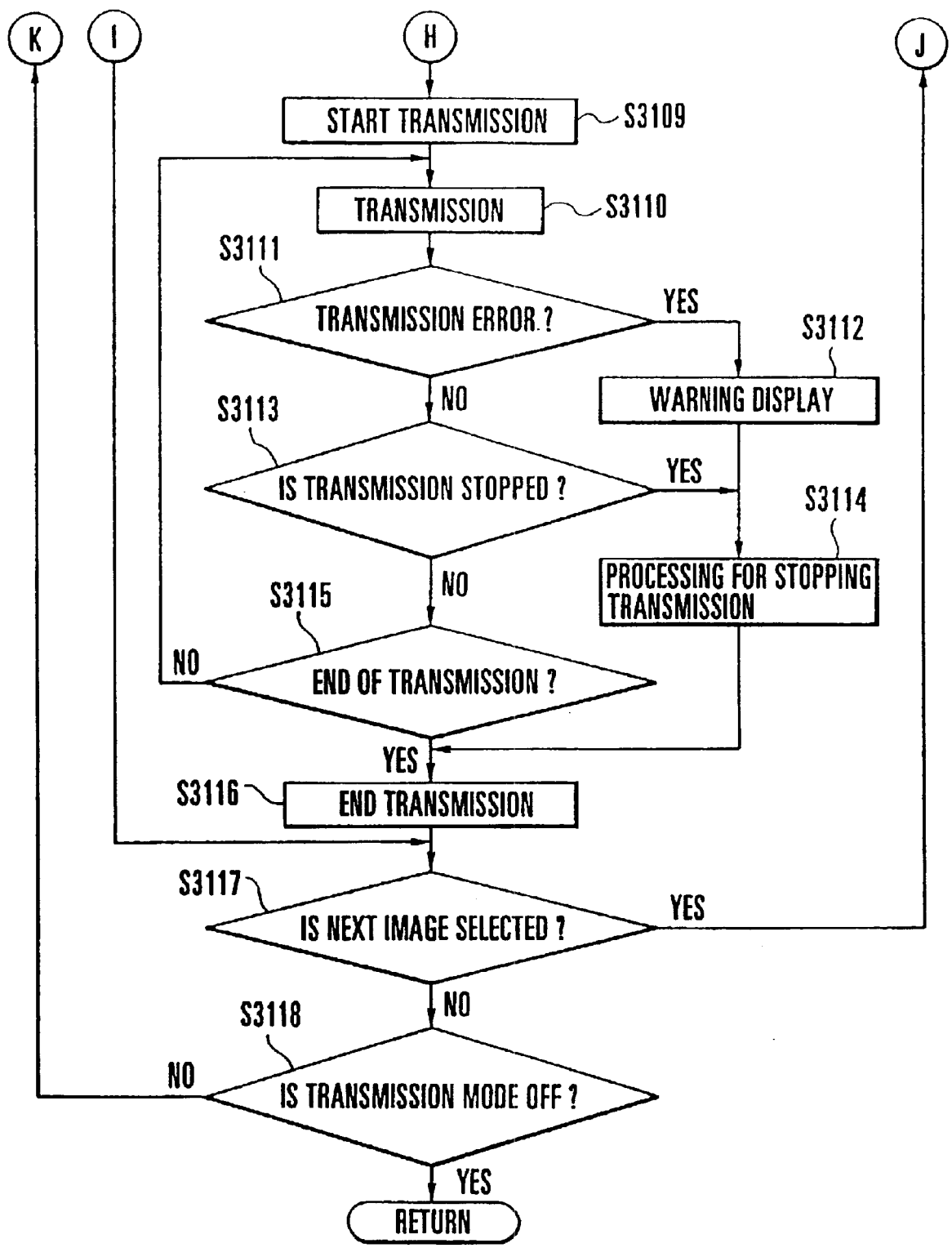
FIG. 53 is part of the flowchart showing in detail the transmission operation according to the tenth embodiment of the present invention.

FIGS. 52 to 53 are flowcharts showing in combination the details of the transmission operation executed in Step S3011 of FIG. 44. If an image to be transmitted is selected by setting an input button (not shown) or an input dial (not shown) or by external communication (Step S3101), the system controlling circuit 3050 reads out the necessary management information containing the time of photography by performing retrieval from the management data area 3102 of the recording medium 3100. On the basis of the read necessary management information, the corresponding image data is read from the information data area 3104, and is written into the image-sound memory 3024 through the connector 3030, the interface 3026 and the memory controlling circuit 3020. At this time, the read necessary management information containing the time of photography is written into the memory 3052. Then, the image data is read from the image-sound memory 3024 through the memory controlling circuit 3020, and the read image data is subjected to D/A conversion in the D/A converter 3036. The analog image data is visually displayed on the image display device 3038 (Step S3102). At this time, if necessary, the image data is expanded by the compressing-expanding circuit 3022. If it is necessary to compress the image data to a signal suitable for display on the image display device 3038, as by reducing the number of pixels, the image data is compressed by the compressing-expanding circuit 3022.

Then, retrieval is performed from the management data area 3102 of the recording medium 3100 to retrieve associated sound data to be combined with the selected image (Step S3103). The retrieval of the associated sound is performed by comparing the time of photography of the selected image stored in the memory 3052 with the time of recording of the sound, which is read from the recording medium 3100. Such a retrieval operation will be described later in detail. The result of the retrieval (retrieved combination information or the absence of sound data to be combined) is displayed on the display device 3054 and on the image display device 3038 (Step S3104).

Then, if sound data associated with the selected image is present (Step S3105), a combination of the selected image data and the associated sound data is set on the table of a file to be transmitted, which file is prepared in the memory 3052 (Step S3106). If sound data associated with the selected image is absent, only the selected image data is set on the table of the file to be transmitted, which file is prepared in the memory 3052 (Step S3107).

Then, if a transmission start switch (not shown) is turned on (Step S3108), connection with a line is established and transmission of the file contents set on the table is started (Step S3109). The transmission of an image file and a sound file is performed in the following manner. The necessary management information is read out by performing retrieval from the management data area 3102 of the recording medium 3100, and the corresponding image data and sound data are read from the information data area 3104 on the basis of the management information and are written into the image-sound memory 3024 through the connector 3030, the interface 3026 and the memory controlling circuit 3020. Then, the image data and the sound data are read from the image-sound memory 3024 through the memory controlling circuit 3020 and the read image data and sound data are transmitted to an external device (not shown), such as a personal computer or a printer, through the interface 3026, the modem 3028, the connector 3034 and a cable (not shown) (Step S3110). At this time, if necessary, the image data and the sound data are expanded by the compressing-expanding circuit 3022 before transmission.

If an error occurs during the transmission (Step S3111), each of the display device 3054 and the image display device 3038 is made to provide a warning display (Step S3112). The processing of stopping the transmission is performed (Step S3114), and the connection with the line is cancelled to bring the transmission to an end (Step S3116).

If the transmission is forcedly stopped (Step S3113) or if all the desired data are transmitted (Step S3115), the connection with the line is cancelled to bring the transmission to an end (Step S3116).

Then, if the next image is selected (Step S3117), the process returns to Step S3101, and similar processing is repeated in connection with the selected image. If the next image is not selected and if the main mode switch 3074 is not switched and the transmission mode has not been turned off (Step S3118), the process returns to Step S3108 and the transmission of the image data and the sound data is repeated. If the main mode switch 3074 is switched and the transmission mode is turned off (Step S3118), the process returns to the main routine and the transmission[]operation is thus brought to an end.

Figure 54:
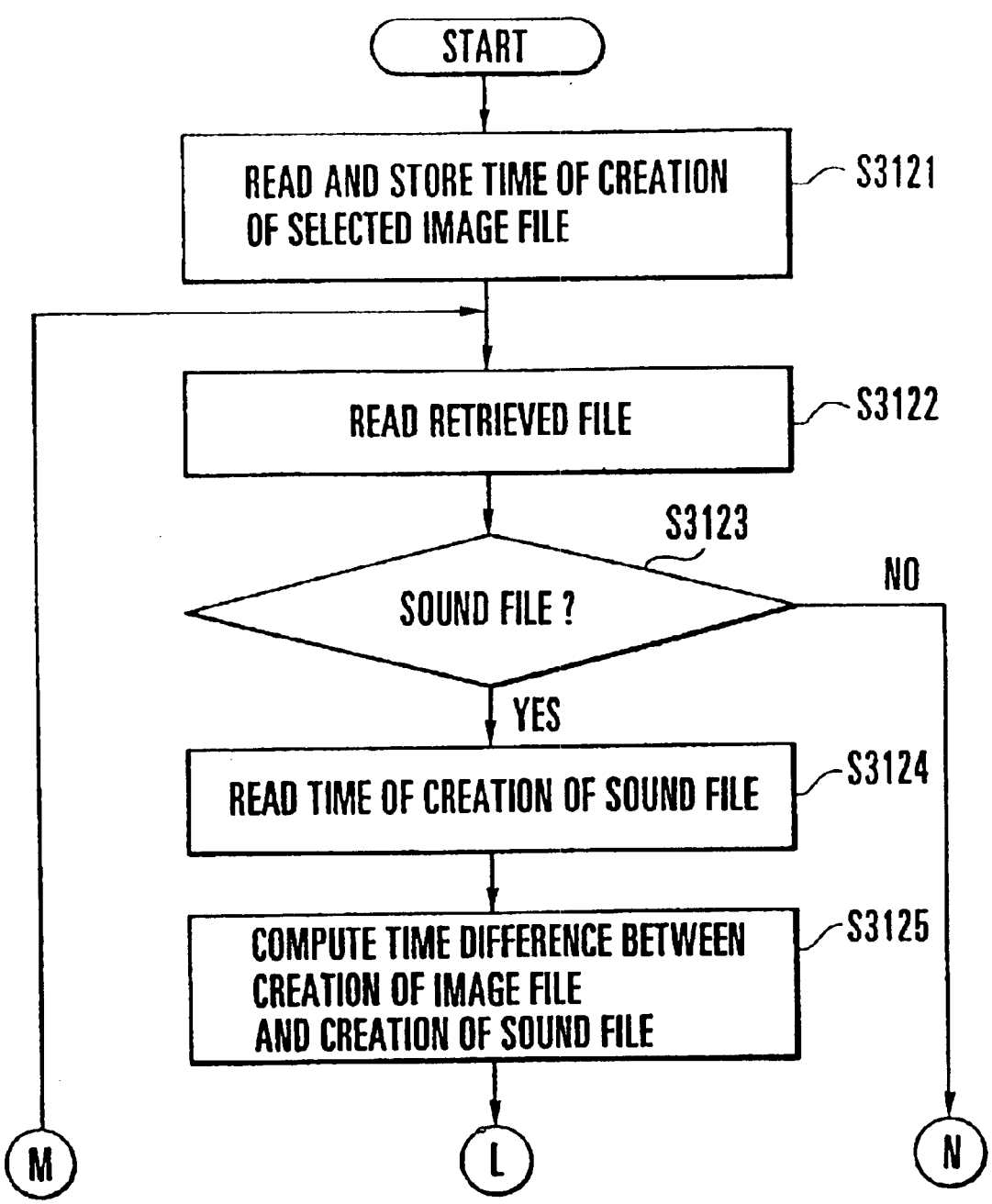
FIG. 54 is part of a flowchart showing in detail one example of an associated-sound retrieval operation according to the tenth embodiment of the present invention.
Figure 55:
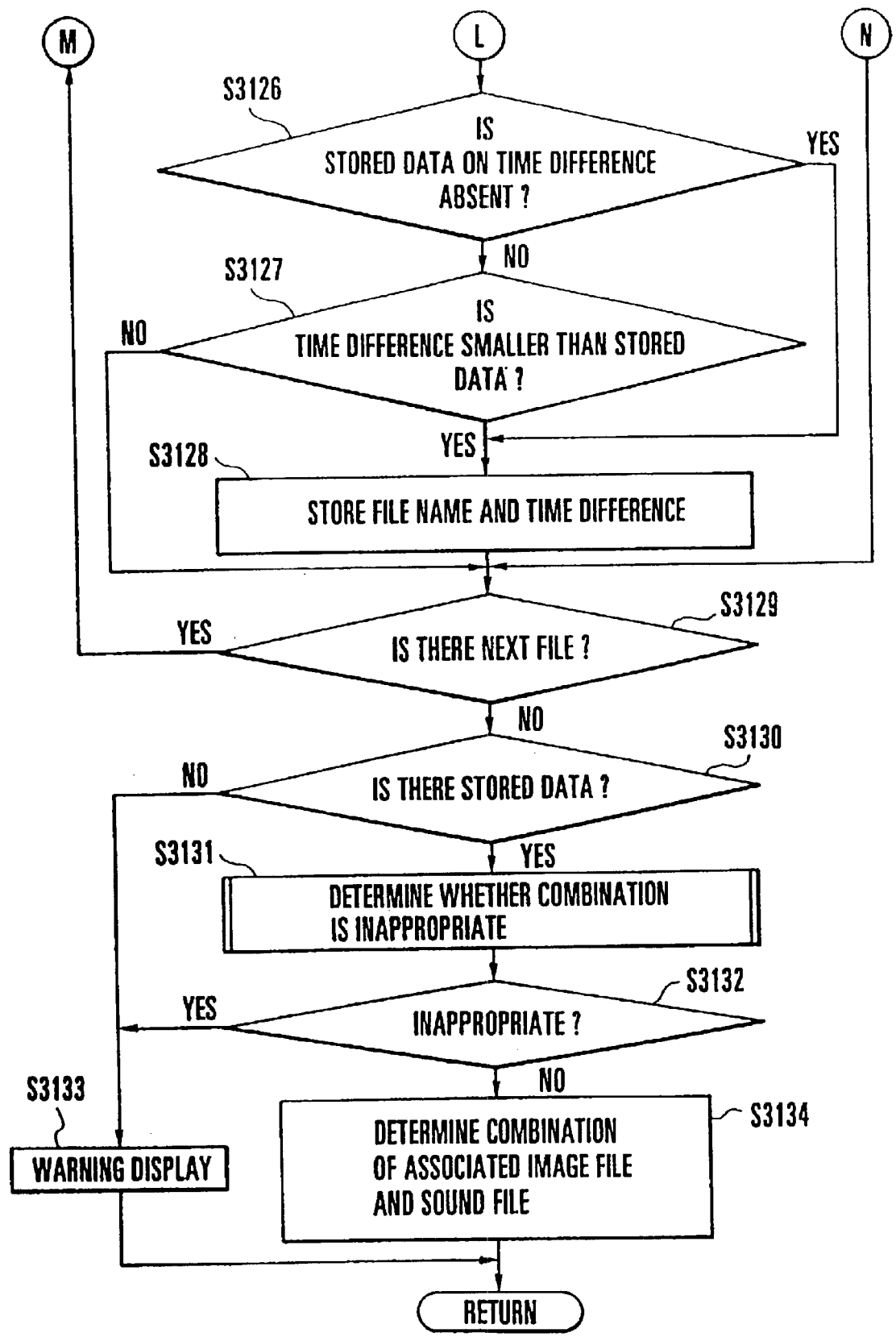
FIG. 55 is part of the flowchart showing in detail the one example of the associated-sound retrieval operation according to the tenth embodiment of the present invention.

FIGS. 54 to 55 are flowcharts showing in combination an operational example, proper to the tenth embodiment, of the associated-sound retrieving operation executed in Step S3083 of FIG. 50 and in Step S3101 of FIG. 52. The system controlling circuit 3050 first reads management data, such as file name, file-creation time and file attribute, about a selected image file from the management data area 3102 of the recording medium 3100, and stores the read management data in the internal register or the memory 3052 (Step S3121). This storing operation is performed in the following manner. The necessary data is read from the management data area 3102 or the information data area 3104 and is written into the image-sound memory 3024 through the interface 3106, the connector 3108, the connector 3030, the interface 3026 and the memory controlling circuit 3020. After that, the written data is stored in the internal register of the system controlling circuit 3050 or the memory 3052 through the memory controlling circuit 3020.

Then, all the management data are sequentially read from the management data area 3102 (Step S3122), and if the read data is a sound file (Step S3123), the time of the creation of the sound file is read (Step S3124) and a time difference between the time of the creation of the sound file and the time of the creation of the image file stored in the memory 3052 is computed (Step S3125). If the read data is not a sound file, the process proceeds to Step S3129.

Then, if the time difference in file creation has not yet been stored (Step S3126), the presently computed time difference in file creation and the file name of the associated sound file are stored in the internal register or the memory 3052 (Step S3128). If the time difference in file creation has been stored (Step S3126), the presently stored time difference in file creation and the presently computed time difference in file creation are compared with each other. If the presently computed time difference in file creation is small compared to the presently stored time difference in file creation (Step S3127), the presently computed time difference in file creation is stored in the internal register or the memory 3052 (Step S3128). If the presently computed time difference in file creation is large compared to the presently stored time difference in file creation (Step S3127), the process skips Step S3128 and proceeds to Step S3129. In other words, the file name and the time difference in file creation of a sound file which shows the smallest time difference in file creation with respect to the selected image file are stored.

If management data which has not yet been read from the management data area 3102 (particularly, a sound file) is present (Step S3129), the process returns to Step S3122 and reading of the management data is continued and similar processing is performed on the read sound file.

If the stored data indicative of the time difference in file creation is absent (Step S3130), for example, if no sound file is present in the management data area 3102, each of the display device 3054 and the image display device 3038 is made to provide a warning display (Step S3133). The process returns to the main routine and the associated-sound retrieving operation is thus brought to an end.

If the stored data indicative of the time difference in file creation is present (Step S3130), it is determined whether the combination of the image file and the sound file is inappropriate, on the basis of the time difference in file creation indicated by the stored data, i.e., on the basis of the time difference in file creation between the selected image file and the sound file selected by retrieval and computation (Step S3131). The operation of determining whether such combination is inappropriate will be described later in detail. If it is determined that such combination is inappropriate, each of the display device 3054 and the image display device 3038 is made to provide a warning display (Step S3133).

The process returns to the main routine and the associated-sound retrieving operation is thur brought to an end. On the other hand, if it is determined that such combination is appropriate, the process makes a decision to select the combination of the selected image file and the sound file corresponding to the stored smallest time difference in file creation (Step S3134), and the process returns to the main routine and the associated-sound retrieving operation is thur brought to an end.

Figure 57:
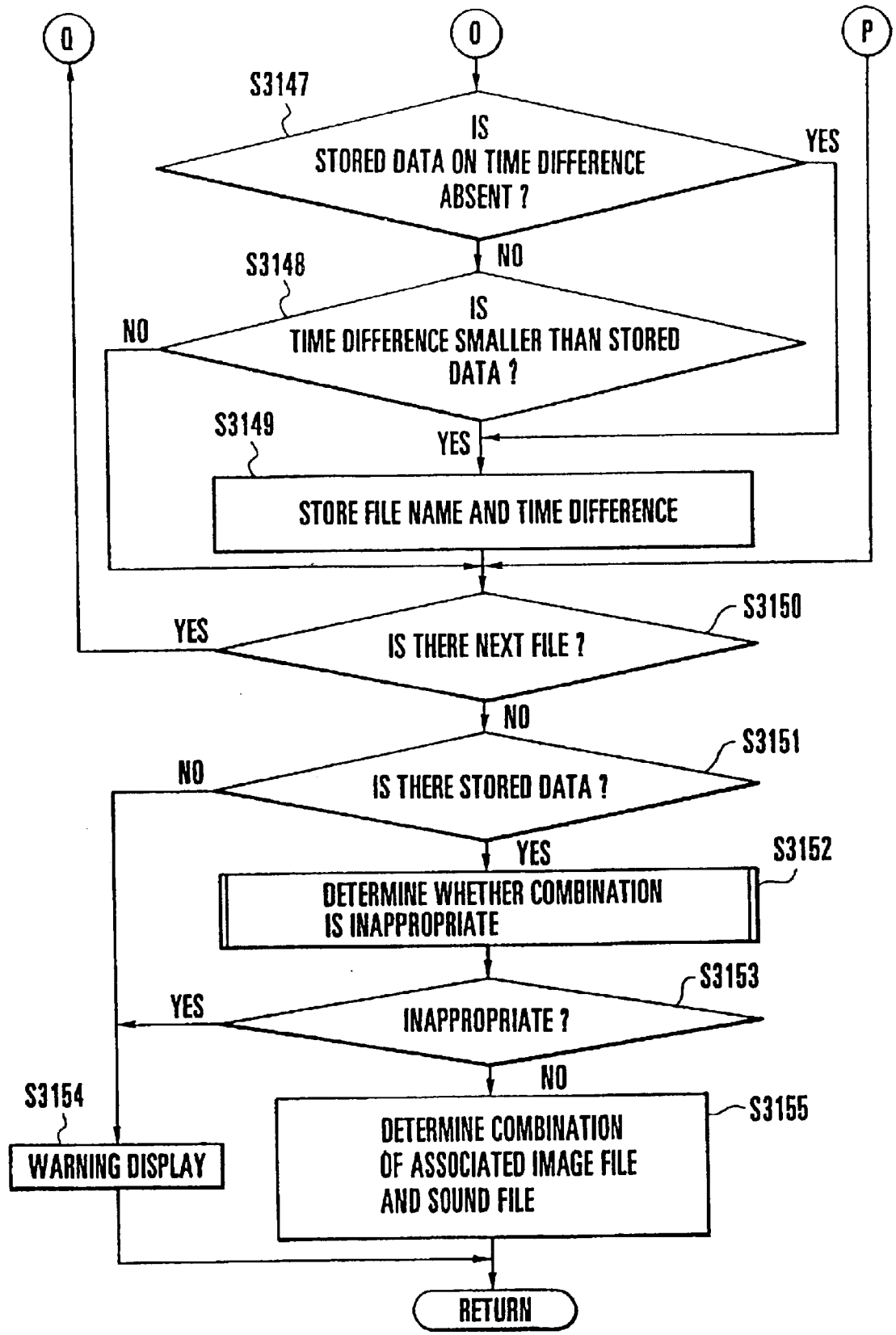
FIG. 57 is part of the flowchart showing in detail the above example of the associated-sound retrieval operation according to the tenth embodiment of the present invention.

FIGS. 56 to 57 are flowcharts showing in combination another operational example, proper to the tenth embodiment, of the associated-sound retrieving operation executed in Step S3083 of FIG. 50 and in Step S3103 of FIG. 52. The system controlling circuit 3050 first reads management data, such as file name, file-creation time and file attribute, about a selected image file from the management data area 3102 of the recording medium 3100, and stores the read management data in the internal register or the memory 3052 (Step S3141). This storing operation is performed in the following manner. The necessary data is read from the management data area 3102 or the information data area 3104 and is written into the image-sound memory 3024 through the interface 3106, the connector 3108, the connector 3030, the interface 3026 and the memory controlling circuit 3020. After that, the written data is stored in the internal register of the system controlling circuit 3050 or the memory 3052 through the memory controlling circuit 3020.

Then, all the management data are sequentially read from the management data area 3102 (Step S3142), and if the read data is a sound file (Step S3143), the time of the creation of the sound file is read (Step S3144). If the time of the creation of the sound file is later than the time of the creation of the image file (Step S3145), the time difference in file creation between the sound file and the image file stored in the memory 3052 is computed (Step S3146). If the time of the creation of the sound file is earlier than the time of the creation of the image file (Step S3145) and if the read data is a sound file, the process proceeds to Step S3150.

Then, if the time difference in file creation has not yet been stored (Step S3147), the time difference in file creation associated with the selected image file is stored in the internal register or the memory 3052 (Step S3149). If the time difference in file creation has been stored (Step S3147), the presently stored time difference in file creation and the presently computed time difference in file creation are compared with each other. If the presently computed time difference in file creation is small compared to the presently stored time difference in file creation (Step S3148), the presently computed time difference in file creation and the associated sound file are stored in the internal register or the memory 3052 (Step S3149). If the presently computed time difference in file creation is large compared to the presently stored time difference in file creation (Step S3148), the process skips Step S3149 and proceeds to Step S3150. In other words, the file name and the time difference in file creation of a sound file which shows the smallest time difference in file creation with respect to the selected image file are stored.

If management data which has not yet been read from the management data area 3102 (particularly, a sound file) is present (Step S3150), the process returns to Step S3142 and reading of the management data is continued and similar processing is performed on the read sound file.

If the stored data indicative of the time difference in file creation is absent (Step S3151), for example, if no sound file is present in the management data area 3102, each of the display device 3054 and the image display device 3038 is made to provide a warning display (Step S3154). The process returns to the main routine and the associated-sound retrieving operation is thus brought to an end.

If the stored data indicative of the time difference in file creation is present (Step S3151), it is determined whether the combination of the image file and the sound file is inappropriate, on the basis of the time difference in file creation indicated by the stored data, i.e., on the basis of the time difference in file creation between the selected image file and the sound file selected by retrieval and computation (Step S3152). The operation of determining whether such combination is inappropriate will be described later in detail. If it is determined that such combination is inappropriate, each of the display device 3054 and the image display device 3038 is made to provide a warning display (Step S3154). The process returns to the main routine and the associated-sound retrieving operation is thur brought to an end. On the other hand, if it is determined that such combination is appropriate, the process make a decision to select the combination of the selected image file and the sound file corresponding to the (stored) smallest time difference in file creation, which sound file is created subsequently to the selected image file (Step S3155). Then, the process returns to the main routine and the associated-sound retrieving operation is thus brought to an end.

Figure 58:
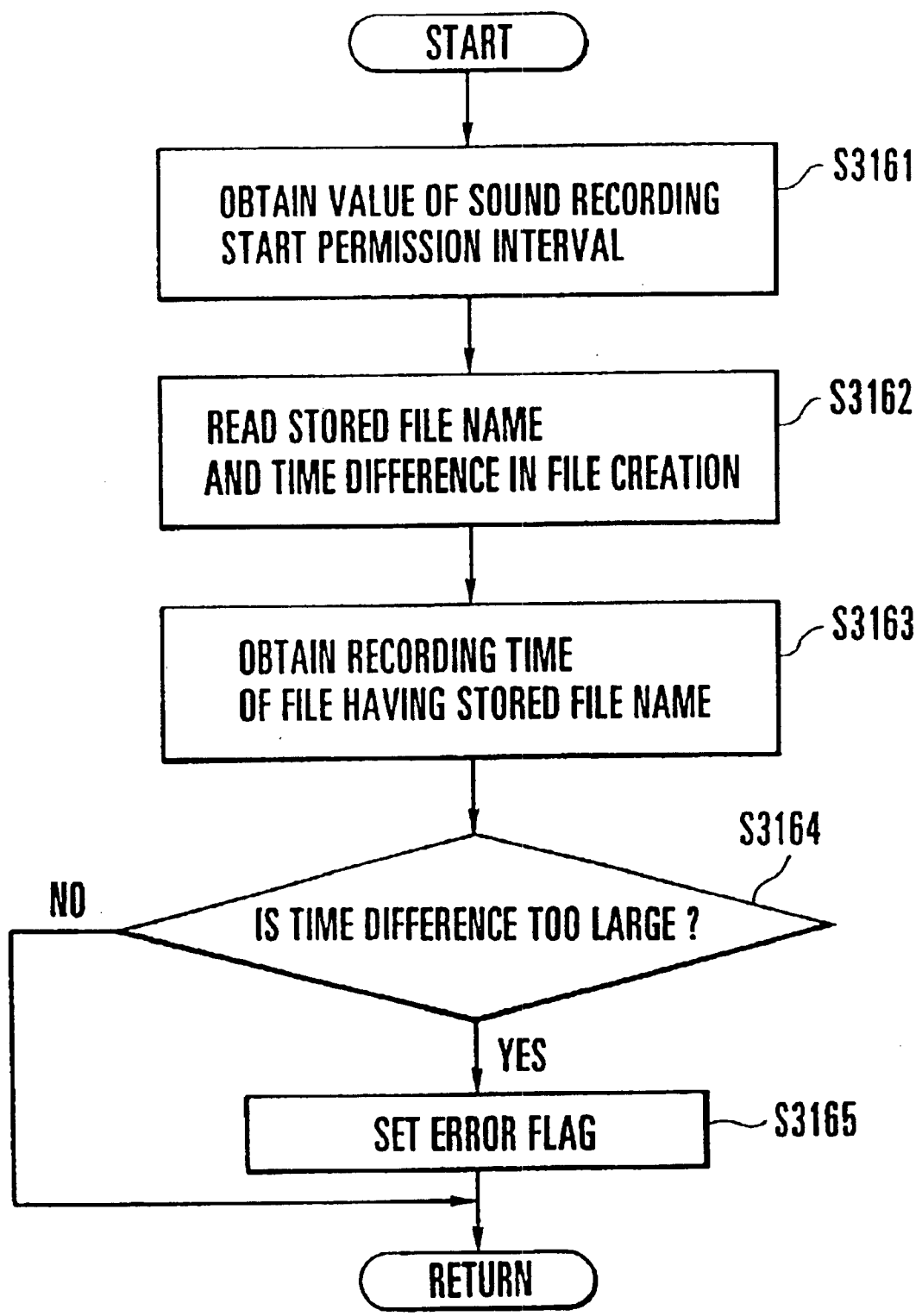
FIG. 58 is a flowchart showing in detail a combination inappropriateness determining operation according to the tenth embodiment of the present invention.

FIG. 58 is a flowchart showing in detail the combination inappropriateness determining operation executed in Step S3131 of FIG. 55 and in Step S3152 of FIG. 57. The system controlling circuit 3050 first obtains the sound recording start permission interval (time) which is used in Steps S3023 and S3024 of FIG. 46 (Step S3161). Then, on the basis of the value of the time difference in file creation, the file name and the time difference in file creation of the sound file stored in the internal register or the memory 3052 are read (Step S3162), and the recording time period of the sound file is obtained (Step S3163).

Then, if the time period of the time difference in file creation between the sound file and the image file is greater than the total time period of the sound recording start permission interval (time) and the recording time period of the sound file (Step S3164), i.e., if it cannot be determined that the recording of the sound file was performed subsequently to the recording of the image file, it is determined that the present combination is inappropriate, and an error flag is set (Step S3165). The process returns to the main routine and the combination inappropriateness determining operation is thus brought to an end.

On the other hand, if the time period of the time difference in file creation between the sound file and the image file is not greater than the total time period of the sound recording start permission interval (time) and the recording time period of the sound file (Step S3164), i.e., if it can be determined that the recording of the sound file was performed subsequently to the recording of the image file, it is determined that the present combination is appropriate, and the process returns to the main routine without setting the error flag. The combination inappropriateness determining operation is thus brought to an end.

An electronic still camera to which a recording and reproduction device according to an eleventh embodiment is applied will be described below. Since the arrangement of the electronic still camera is utterly identical to that of the tenth embodiment shown in FIG. 43, description thereof is omitted, and an operation proper to the electronic still camera will be described with reference to the flowchart shown in FIGS. 59 through 68.

Figure 60:
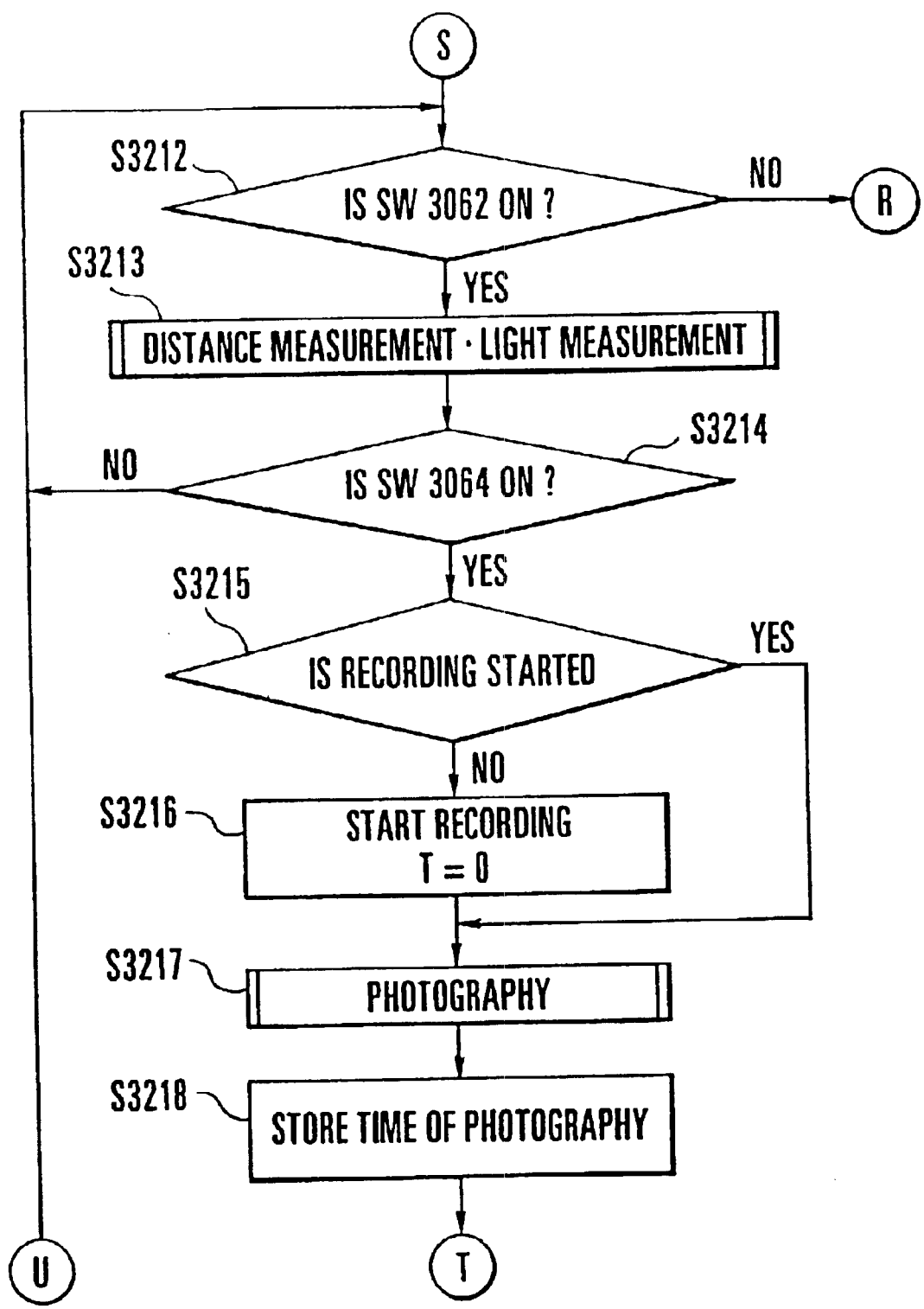
FIG. 60 is part of the flowchart showing the main operation according to the eleventh embodiment of the present invention.
Figure 61:
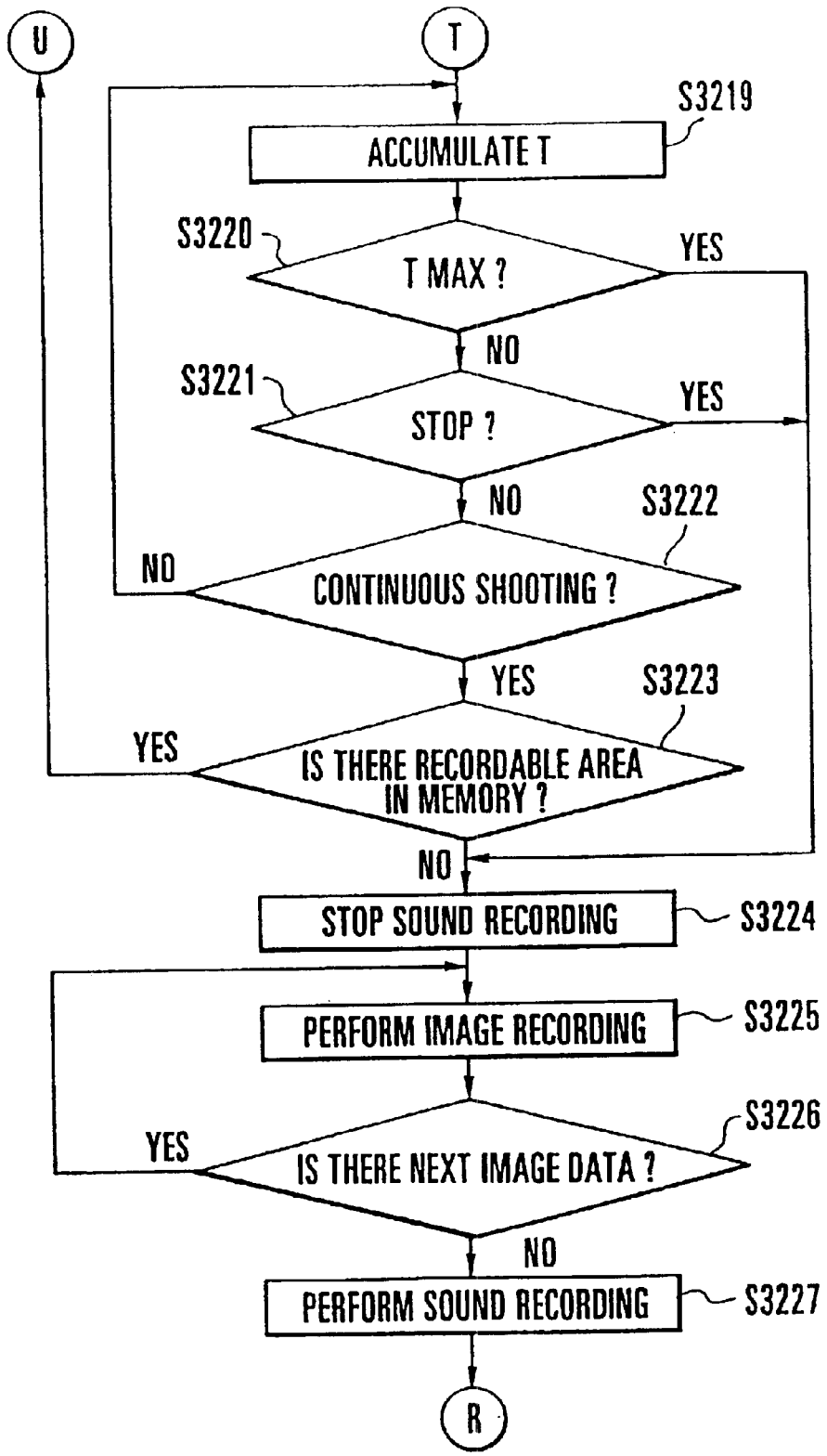
FIG. 61 is part of the flowchart showing the main operation according to the eleventh embodiment of the present invention.

FIGS. 59 to 61 show in combination the flowchart of the main routine of the eleventh embodiment.

Referring to FIG. 59, when the power supply circuit 3080 is turned on, the system controlling circuit 3050 initializes various flags and control variables (Step S3201). If the main switch 3060 is turned on (Step S3202), a decision is made as to the kind of mode selected by the main mode switch 3074 (Step S3203). If the reproduction mode is selected, predetermined reproduction processing for the reproduction mode is executed (Step S3210). If the transmission mode is selected, predetermined transmission processing for the transmission mode is executed (Step S3211) and the process returns to Step S3202. The reproduction processing and the transmission processing will be described later.

If the recording mode is selected, it is determined whether the storage recording medium 3100, such as a memory card or a hard disk unit, is connected to the electronic still camera 3200 (Step S3204). If the storage recording medium 3100 is connected to the electronic still camera 3200, it is determined whether the writing protection 3110 of the connected storage recording medium 3100 is cancelled (Step S3205). If it is determined that the writing protection 3110 of the connected storage recording medium 3100 is cancelled, retrieval is performed as to the state of recording in the management data area 3102, the information data area 3104 and the like of the storage recording medium 3100 (Step S3206). On the basis of the management data of the management data area 3102, each of the modes set by the switch group 3056 and the mode selected according to the kind of the connected storage recording medium 3100, the display device 3054 is made to display information such as exposure number, date and operation mode (Step S3207). If there is a recordable empty area in the management data area 3102 (Step S3208), the process proceeds to Step S3212.

If the storage recording medium 3100, such as a hard disk unit or a memory card, is not connected to the electronic still camera 3200 (Step S3204), or if the writing protection 3110 of the connected storage recording medium 3100 is set (Step S3205), or if there is no recordable empty area in the management data area 3102 (Step S3208), the display device 3054 is made to provide an associated warning display (Step S3209). Subsequently, the process waits for the main switch 3060 is operated (Step S3202).

In Step S3212, it is determined whether the distance-light measuring switch 3062 has been turned on. If the distance-light measuring switch 3062 has not been turned on, the process returns to Step S3202. If the distance-light measuring switch 3062 has been turned on, the distance measuring circuit 3044 and the light measuring circuit 3046 are made to perform distance measurement and light measurement, respectively. Then, the photographic lens 3010 is focused on a subject by the lens driving circuit 3042 and a shutter time is determined (Step S3213). The distance-light measuring operation has previously been described in detail with reference to FIG. 47. The distance-light measuring operation is repeated until the release switch 3064 is turned on after the distance-light measuring switch 3062 is turned on (Steps S3212 to S3214). If the release switch 3064 is turned on (Step S3214) and if no recording has yet been started (Step S3215), the sound recording timer T is initialized to "0" and sound recording is then started (Step S3226). Simultaneously, photography is executed and the obtained image data is written into the image·sound memory 3024 (Step S3217). If the recording medium 3100 is provided with a mechanical driving mechanism, as in the case of a hard disk unit or the like, the system controlling circuit 3050 stops the rotation of the hard disk unit or the like prior to initiation of the sound recording and inhibits any access accompanied by a head travel, thereby preventing recording of a mechanical noise due to an operation of the hard disk unit or the like. If the recording medium 3100 does not have a mechanical driving mechanism, as in the case of a memory card or the like, no access is inhibited even during sound recording. The detail of the photographic operation has previously been described with reference to FIG. 48. When the photographic operation up to the writing of the image data is completed, the time of photography associated with the image is stored in the memory 3052 (Step S3218).

Then, while the count value of the sound recording timer T is being cumulatively displayed, a sound signal from the microphone 3090 is taken out and the obtained sound data is written into the image·sound memory 3024 through the A/D converter 3092 and the memory controlling circuit 3020 (Step S3219). If the sound recording timer T reaches a predetermined value or is forcedly stopped, the writing of the sound data is brought to an end (Steps S3220, S3221 and S3224). If photography in the continuous-shooting mode is to be continued during recording (Step S3222), the process proceeds to Step S3223. If it is determined in Step S3223 that there is a recordable area in the image·sound memory 3024, the process returns to Step S3212 and a similar operation is repeated. If it is determined in Step S3223 that there is no recordable area in the image·sound memory 3024, the writing of the sound data, i.e., the sound recording, is stopped and the sound recording time is stored in the internal memory or the memory 3052 (Step S3224).

The stopping of the sound recording is performed by turning off the release switch 3064 in the case of a mode in which sound recording is performed during the ON interval of the release switch 3064. In the case of another mode in which, even if the release switch 3064 is turned off, sound recording is continued until a desired time elapses, the stopping of the sound recording is performed, as by operating the sound mode switch 3076 or the sound start switch 3078.

After the sound recording has been stopped, if the recording medium 3100 is provided with a mechanical driving mechanism, as in the case of a hard disk unit or the like, the system controlling circuit 3050 starts up the hard disk unit or the like prior to initiation of a recording on the recording medium 3100 and cancels the inhibition of access accompanied by a head movement. If the sound recording comes to an end, the inhibition of photography to be executed by the release switch 3064 is cancelled.

The image data and the time of photography associated with the image data are respectively read from the image·sound memory 3024 and the memory 3052 under the control of the memory controlling circuit 3020. The image data is recorded in file form in the information data area 3104 of the recording medium 3100, while management information about the image data, such as the time of photography and the time of image-file creation, is recorded in the management data area 3102, through the interface 3026, the connector 3030, the connector 3108 and the interface 3106 (Step S3225). The image recording operation of Step S3019 is repeated by the amount of the image data stored in the image·sound memory 3024 (Steps S3226 to S3225).

When the image recording on the recording medium 3100 is completed, the recording of the sound data is performed (Step S3227) and the process returns to Step S3202. The recording of the sound data is performed in the following manner. The sound data is read from the image·sound memory 3024 under the control of the memory controlling circuit 3020, and the sound data and the time period of sound recording are recorded in file form in the information data area 3104 of the recording medium 3100 through the interface 3026, the connector 3030, the connector 3108 and the interface 3106 while management information about the sound data, such as the time of the sound recording and the time of sound-file creation, is recorded in the management data area 3102. Thus, image data indicative of a plurality of continuous images are recorded in combination with the associated sounds.

Figure 62:
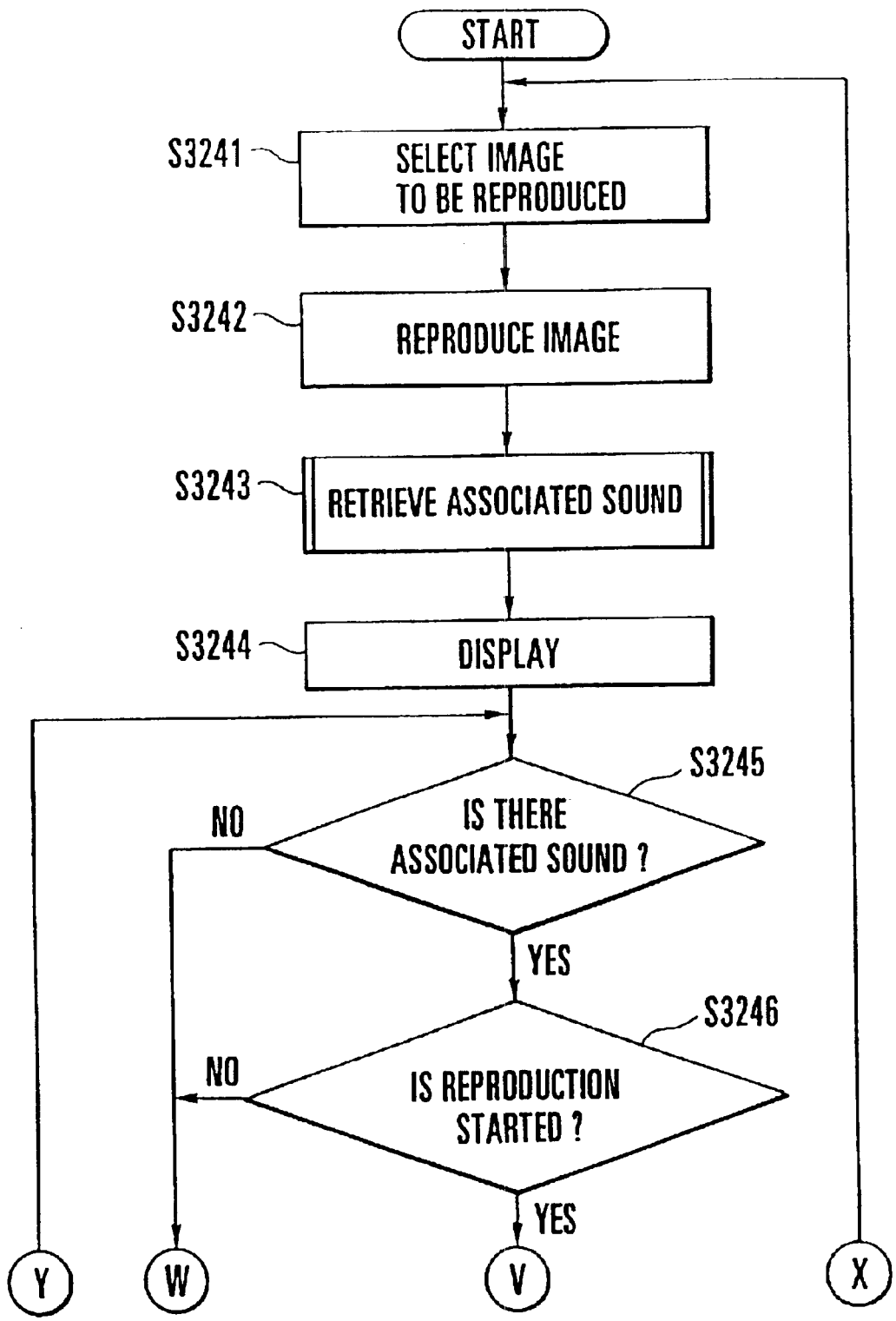
FIG. 62 is part of a flowchart showing in detail a reproducing operation according to the eleventh embodiment of the present invention.
Figure 63:
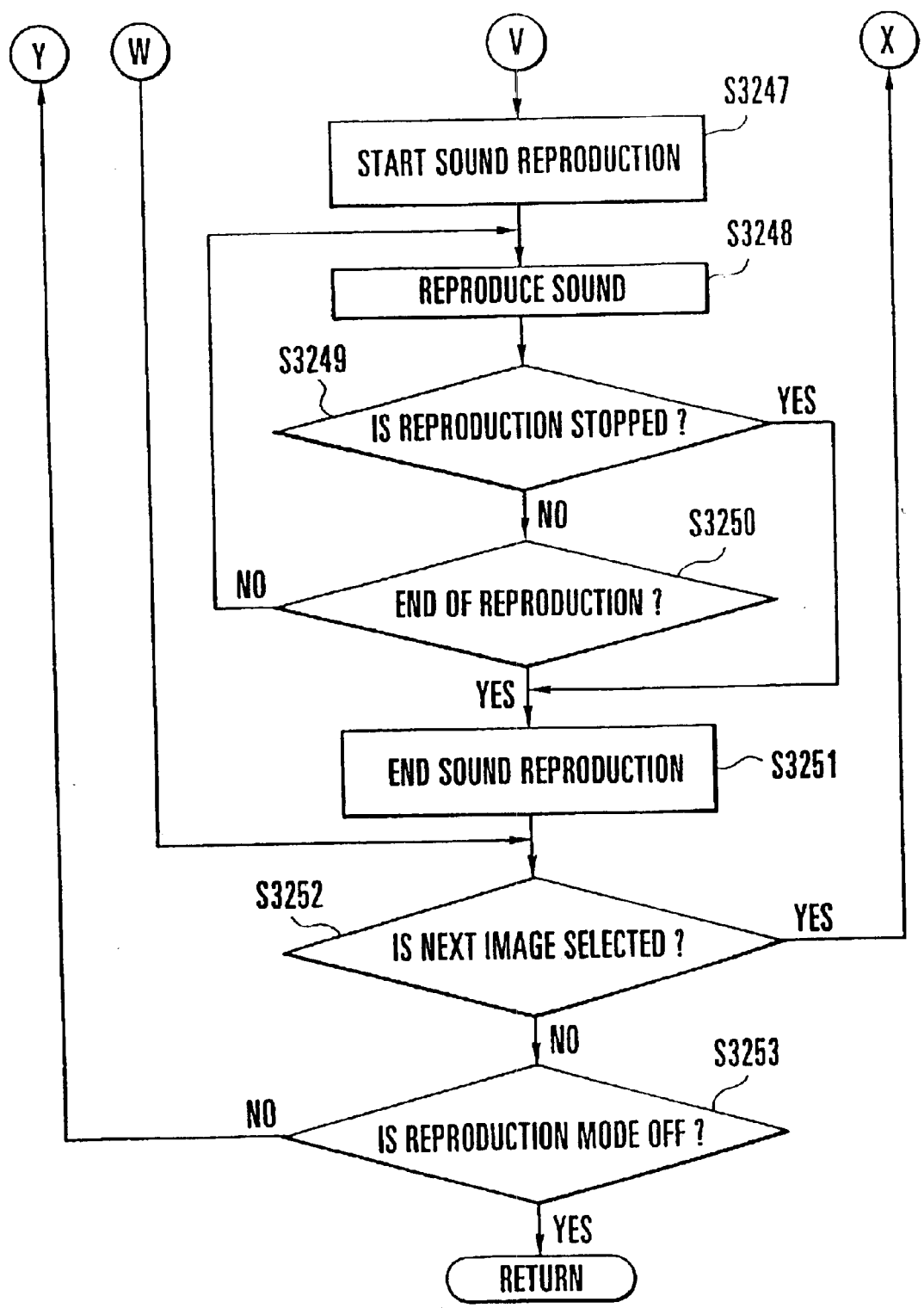
FIG. 63 is part of the flowchart showing in detail the reproducing operation according to the eleventh embodiment of the present invention.

FIGS. 62 and 63 are flowcharts showing in combination the details of the reproducing operation executed in Step S3210 of FIG. 59. If an image to be reproduced is selected by setting an input button (not shown) or an input dial (not shown) or by external communication (Step S3241), the system controlling circuit 3050 reads out the necessary management information containing the time of photography by performing retrieval from the management data area 3102 of the recording medium 3100. On the basis of the read necessary management information, the corresponding image data is read from the information data area 3104, and is written into the image·sound memory 3024 through the interface 3106, the connector 3108, the connector 3030, the interface 3026 and the memory controlling circuit 3020. At this time, the read necessary management information containing the time of photography is stored in the memory 3052. Then, the image data is read from the image·sound memory 3024 through the memory controlling circuit 3020, and the read image data is subjected to D/A conversion in the D/A converter 3036. The analog image data is visually displayed on the image display device 3038 (Step S3242). At this time, if necessary, the image data is expanded by the compressing·expanding circuit 3022. If it is necessary to compress the image data to a signal suitable for display on the image display device 3038, as by reducing the number of pixels, the image data is compressed by the compressing·expanding circuit 3022.

Then, retrieval is performed from the management data area 3102 of the recording medium 3100 to retrieve associated sound data to be combined with the selected image as well as a plurality of photographic images which are continuously recorded together with the selected image (Step S3243). The retrieval of the associated sound and the plurality of images is performed by comparing the time of photography of the selected image stored in the memory 3052 with the time of recording of the sound, which is read from the recording medium 3100. Such a retrieval operation will be described later in detail. The result of the retrieval (retrieved combination information or the absence of sound data to be combined) is displayed on the display device 3054 and on the image display device 3038 (Step S3244).

Then, if sound data associated with the selected image is present (Step S3245) and if the sound start switch 3078 is turned on (Step S3246), reproduction of the associated sound data is started (Step S3247). The reproduction of the associated sound data is performed in the following manner. The management information is read out by performing retrieval from the management data area 3102 of the recording medium 3100, and the corresponding sound data (sound data associated with the plurality of photographic images continuously recorded together with the selected image) is read from the information data area 3104 on the basis of the management information and is written into the image·sound memory 3024 through the interface 3106, the connector 3108, the connector 3030, the interface 3026 and the memory controlling circuit 3020. Then, the sound data is read from the image-sound memory 3024 through the memory controlling circuit 3020 and the read sound data is subjected to D/A conversion in the D/A converter 3094, and the audio output device 3096 produces an audio output. At this time, if necessary, the sound data is expanded by the compressing-expanding circuit 3022.

If the sound recording is forcedly stopped (Step S3249) or if all the sound data associated with the selected image are outputted (Step S3250), the reproduction and outputting of sound data is brought to an end (Step S3251).

Then, if the next image is selected (Step S3252), the process returns to Step S3241, and similar processing is repeated in connection with the selected image. If the next image is not selected and if the main mode switch 3074 is not switched and the reproducing mode has not been turned off (Step S3253), the process returns to Step S3245 and the reproduction and outputting of sound data associated with the selected image as well as sound data associated with the plurality of photographic images recorded continuously together with the selected image is repeated. If the main mode switch 3074 is switched and the reproducing mode is turned off (Step S3253), the process returns to the main routine and the reproducing operation is thus brought to an end.

Figure 65:
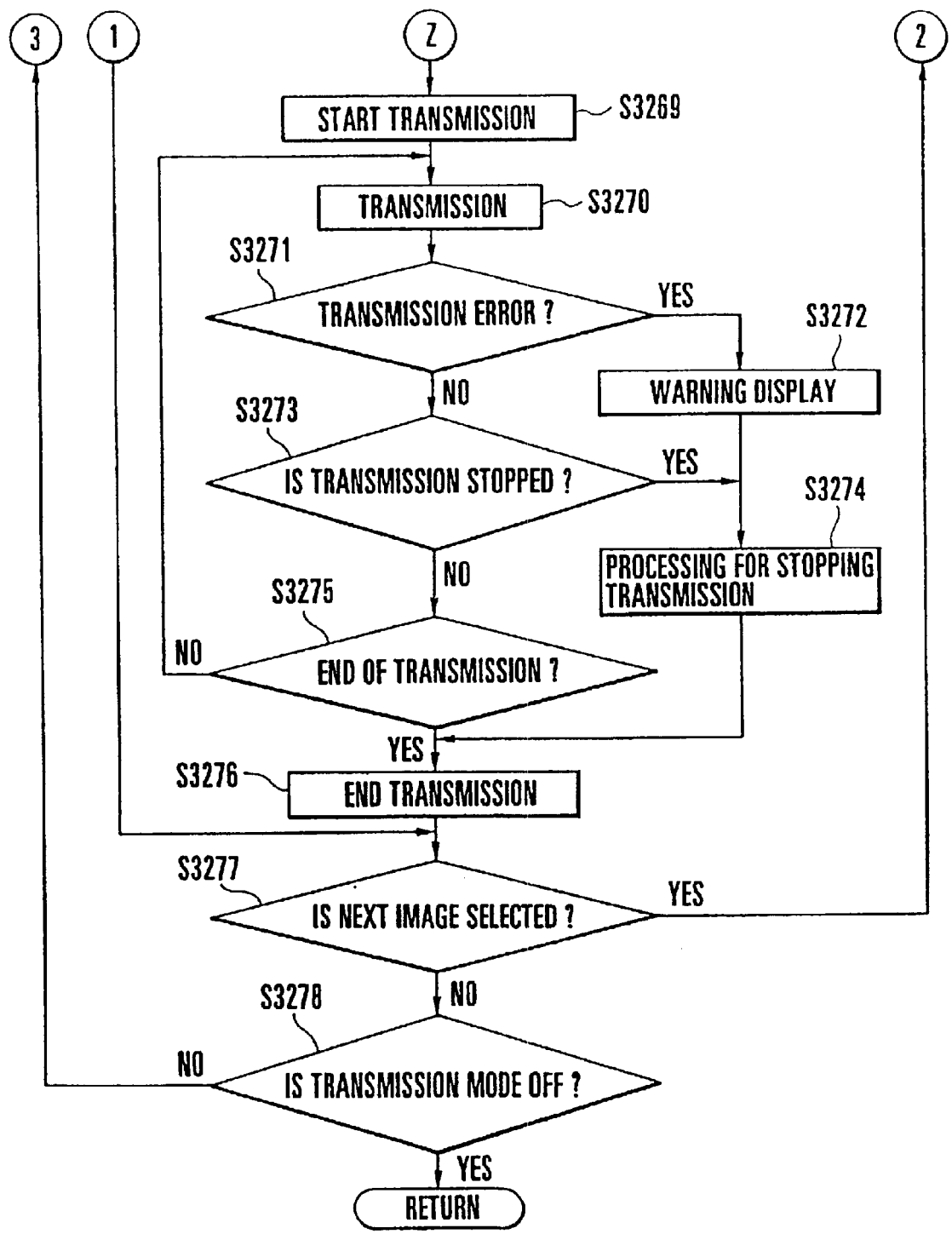
FIG. 65 is part of the flowchart showing in detail the transmission operation according to the eleventh embodiment of the present invention.

FIGS. 64 and 65 are flowcharts showing in combination the details of the transmission operation executed in Step S3211 of FIG. 59. If an image to be transmitted is selected by setting an input button (not shown) or an input dial (not shown) or by external communication (Step S3261), the system controlling circuit 3050 reads out the necessary management information containing the time of photography by performing retrieval from the management data area 3102 of the recording medium 3100. On the basis of the read necessary management information, the corresponding image data is read from the information data area 3104, and is written into the image-sound memory 3024 through the interface 3106, the connector 3108, the connector 3030, the interface 3026 and the memory controlling circuit 3020. At this time, the read necessary management information containing the time of photography is written into the memory 3052. Then, the image data is read from the image-sound memory 3024 through the memory controlling circuit 3020, and the read image data is subjected to D/A conversion in the D/A converter 3036. The analog image data is visually displayed on the image display device 3038 (Step S3262). At this time, if necessary, the image data is expanded by the compressing-expanding circuit 3022. If it is necessary to compress the image data to a signal suitable for display on the image display device 3038, as by reducing the number of pixels, the image data is compressed by the compressing-expanding circuit 3022.

Then, retrieval is performed from the management data area 3102 of the recording medium 3100 to retrieve associated sound data to be combined with the selected image as well as a plurality of photographic images which are continuously recorded together with the selected image (Step S3263). The retrieval of the associated sound and the plurality of images is performed by comparing the time of photography of the selected image stored in the memory 3052 with the time of recording of the sound, which is read from the recording medium 3100. Such a retrieval operation will be described later in detail. The result of the retrieval (retrieved combination information or the absence of sound data to be combined) is displayed on the display device 3054 and on the image display device 3038 (Step S3264).

Then, if sound data associated with the selected image is present (Step S3265), a combination of the selected image data and the plurality of photographic images recorded continuously together with the selected image and the associated sound data is set on the table of a file to be transmitted, which file is prepared in the memory 3052 (Step S3266). If sound data associated with the selected image is absent, only the selected image data is set on the table of the file to be transmitted, which file is prepared in the memory 3052 (Step S3267).

Then, if a transmission start switch (not shown) is turned on (Step S3268), connection with a line is established and transmission of the file contents set on the table is started (Step S3269). The transmission of an image file and a sound file is performed in the following manner. The necessary management information is read out by performing retrieval from the management data area 3102 of the recording medium 3100, and the corresponding image data and sound data are read from the information data area 3104 on the basis of the management information and are written into the image-sound memory 3024 through the connector 3030, the interface 3026 and the memory controlling circuit 3020. Then, the image data and the sound data are read from the image-sound memory 3024 through the memory controlling circuit 3020 and the read image data and sound data are transmitted to an external device (not shown), such as a personal computer or a printer, through the interface 3026, the modem 3028, the connector 3034 and a cable (not shown) (Step S3270). At this time, if necessary, the image data and the sound data are expanded by the compressing-expanding circuit 3022 before transmission.

If an error occurs during the transmission (Step S3271), each of the display device 3054 and the image display device 3038 is made to provide a warning display (Step S3272). The processing of stopping the transmission is performed (Step S3274), and the connection with the line is cancelled to bring the transmission to an end (Step S3276).

If the transmission is forcedly stopped (Step S3273) or if all the desired data are transmitted (Step S3275), the connection with the line is cancelled to bring the transmission to an end (Step S3276).

Then, if the next image is selected (Step S3277), the process returns to Step S3261, and similar processing is repeated in connection with the selected image. If the next image is not selected and if the main mode switch 3074 is not switched and the transmission mode has not been turned off (Step S3278), the process returns to Step S3268 and the transmission of the image data and the sound data is repeated. If the main mode switch 3074 is switched and the transmission mode is turned off (Step S3278), the process returns to the main routine and the transmission operation is thus brought to an end. Thus, image data indicative of the plurality of images can be transmitted in combination with the associated sound data.

Figure 66:
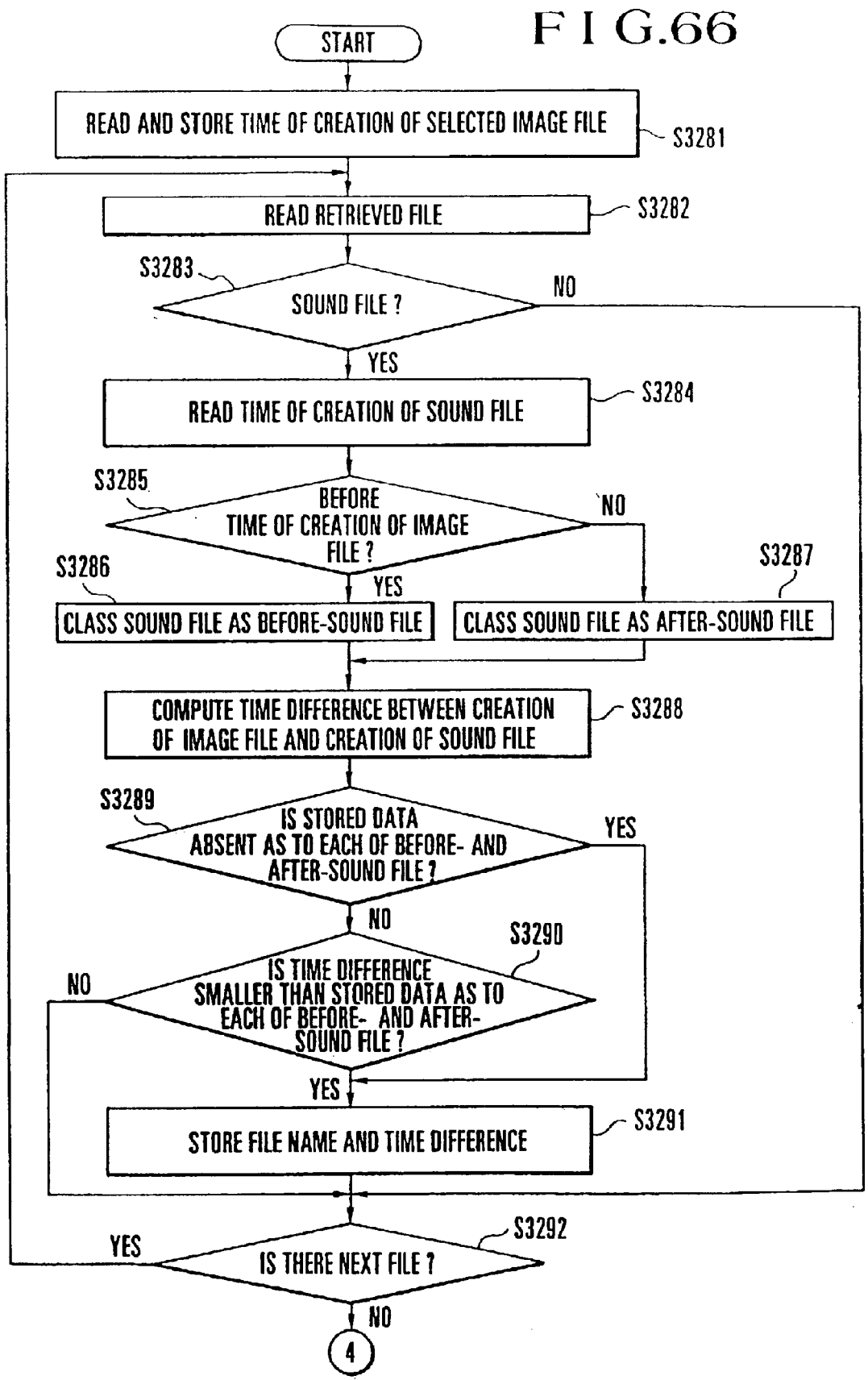
FIG. 66 is part of a flowchart showing in detail an associated-sound retrieval operation according to the eleventh embodiment of the present invention.

FIGS. 66 to 67 are flowcharts showing in combination one operational example, proper to the eleventh embodiment, of the associated-sound retrieving operation executed in Step S3243 of FIG. 62 and in Step S3263 of FIG. 64. The system controlling circuit 3050 first reads management data, such as file name, file-creation time and file attribute, about a selected image file from the management data area 3102 of the recording medium 3100, and stores the read management data in the internal register or the memory 3052 (Step S3281). This storing operation is performed in the following manner. The necessary data is read from the management data area 3102 or the information data area 3104 and is written into the image-sound memory 3024 through the interface 3106, the connector 3108, the connector 3030, the interface 3026 and the memory controlling circuit 3020. After that, the written data is stored in the internal register of the system controlling circuit 3050 or the memory 3052 through the memory controlling circuit 3020.

Then, all the management data are sequentially read from the management data area 3102 (Step S3282), and if the read data is a sound file (Step S3283), the time of the creation of the sound file is read (Step S3284). If the time of the creation of the sound file is earlier than the time of the creation of the image file (Step S3285), the sound file is classified as a before-sound file indicative of a sound file recorded before the selected image file (Step S3286). If the time of the creation of the read sound file is later than the time of the creation of the image file (Step S3285), the sound file is classified as an after-sound file indicative of a sound file recorded after the selected image file (Step S3287).

Then, the time difference in file creation between the sound file and the image file stored in the internal register or the memory 3052 is computed (Step S3288). If the read data is not a sound file (Step S3283), the process proceeds to Step S3292 which will be described later.

Then, if the time difference in file creation for each of the before- and after-sound files has not yet been stored (Step S3289), the time difference in file creation associated with the selected image file is stored in the internal register or the memory 3052 (Step S3291). If the time difference in file creation has been stored (Step S3289), the presently stored time difference in file creation and the presently computed time difference in file creation are compared with each other. If the presently computed time difference in file creation is small compared to the presently stored time difference in file creation (Step S3290), the presently computed time difference in file creation and the associated sound file are stored in the internal register or the memory 3052 (Step S3291). If the presently computed time difference in file creation is large compared to the presently stored time difference in file creation (Step S3290), the process skips Step S3291 and proceeds to Step S3292. In other words, the file name and the time difference in file creation of a sound file which shows the smallest time difference in file creation with respect to the selected image file are stored.

If management data which has not yet been read from the management data area 3102 (particularly, a sound file) is present (Step S3292), the process returns to Step S3282 and reading of the management data is continued and similar processing is performed on the read sound file.

If the stored data indicative of the time difference in file creation is absent (Step S3293), for example, if no sound file is present in the management data area 3102, each of the display device 3054 and the image display device 3038 is made to provide a warning display (Step S3300). The process returns to the main routine and the associated-sound retrieving operation is thus brought to an end.

If the stored data indicative of the time difference in file creation is present (Step S3293), sound files which are recorded before and after the selected image file and which are temporally closest to the selected image file are determined (Step S3294). Then, an image file recorded at an intermediate time between the times of creation of the two sound files recorded before and after the selected image file is determined. More specifically, an image file is read from the information data area 3104 by sequentially reading the management data from the management data area 3102 (Step S3295), and if an image file is detected which is recorded after the time of creation of a sound file within the before-sound file (Step S3296) and before the time of creation of a sound file within the after-sound file (Step S3297), it is determined whether the combination of this image file and the sound file within the after-sound file is inappropriate, on the basis of the value of the time difference in file creation regarding the sound file within the after-sound file (Step S3298). The combination inappropriateness determining operation will be described later. If it is determined that such combination is inappropriate, each of the display device 3054 and the image display device 3038 is made to provide a warning display (Step S3300). The process returns to the main routine and the associated-sound retrieving operation is thus brought to an end. On the other hand, if it is determined that such combination is appropriate, the file name of the aforesaid detected image file is stored (Step S3301). Then, if an image file which has not yet been read from the information data area 3104 remains (Step S3302), the process returns to Step S3295 and similar processing is repeated. In the above-described manner, from among a plurality of image files recorded at intermediate times between the times of creation of the two determined sound files before and after the selected image file, image files which are appropriately combined with a sound file within the after-sound file are sequentially stored.

If the retrieval of the image files is completed (Step S3302), the process makes a decision to select the combination of the plurality of image files, which have been stored as image files which can be appropriately combined with the sound file within the after-soung file, and the sound file within the after-sound file (Step S3303). The process returns to the main routine and the associated-sound retrieving operation is thus brought to an end.

Figure 68:
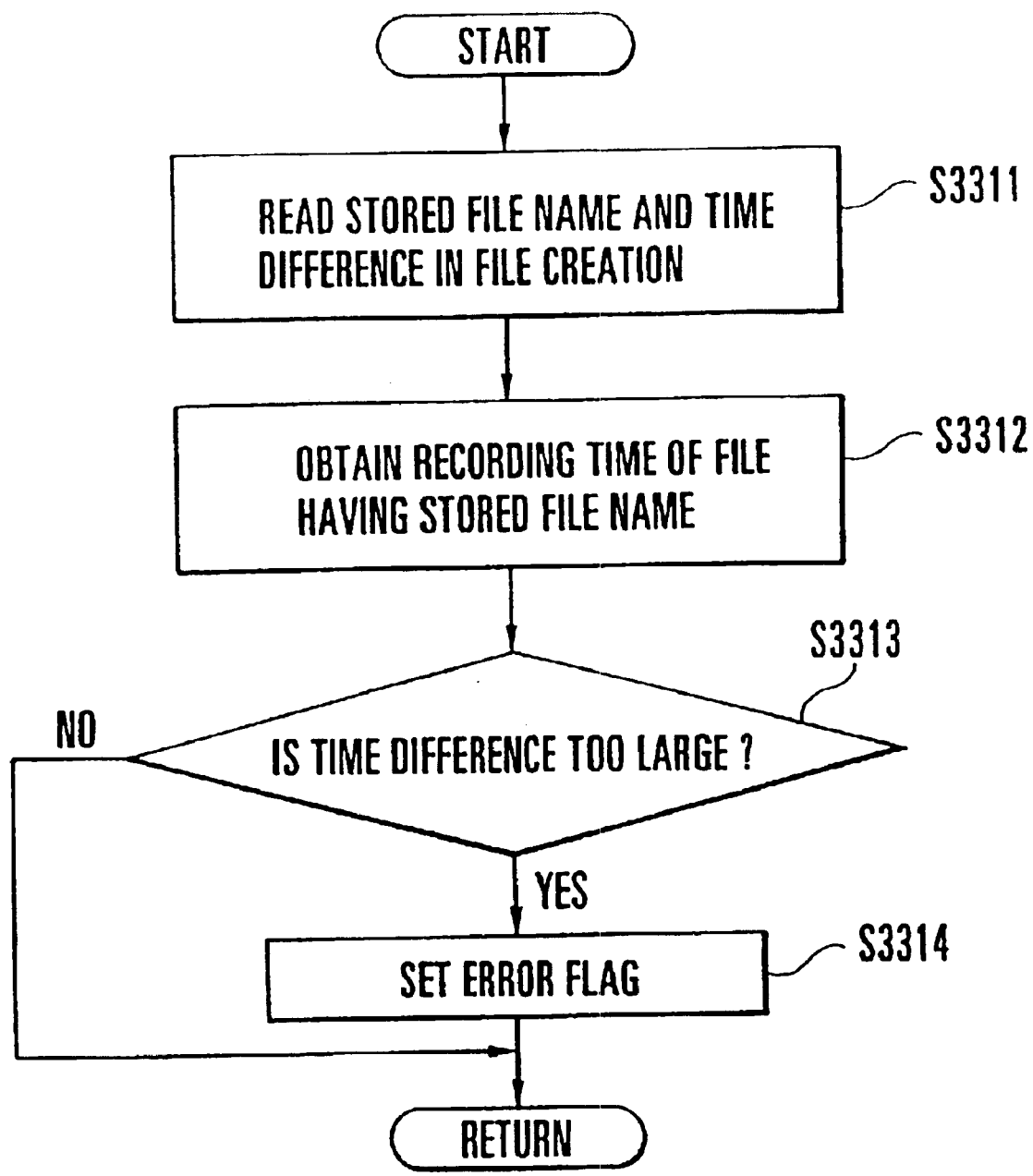
FIG. 68 is a flowchart showing in detail a combination inappropriateness determining operation according to the eleventh embodiment of the present invention.

FIG. 68 is a flowchart showing in detail the combination inappropriateness determining operation executed in Step S3298 of FIG. 67. The system controlling circuit 3050 first reads the file name and the time difference in file creation of the sound file stored in the internal register or the memory 3052, on the basis of the value of the time difference in file creation (Step S3311), and obtains the recording time period of the sound file (Step S3312).

Then, if the time period of the time difference in file creation between the sound file and the image file is greater than the time period obtained by adding a predetermined value to the recording time period of the sound file (Step S3313), i.e., if it cannot be determined that photography and sound recording were executed at the same time and the recording of the sound file was performed subsequently to the recording of the image file, it is determined that the present combination is inappropriate, and an error flag is set (Step S3314). The process returns to the main routine and the combination inappropriateness determining operation is thus brought to an end.

On the other hand, if the time period of the time difference in file creation between the sound file and the image file is less than the time period obtained by adding the predetermined value to the recording time period of the sound file (Step S3313), i.e., if it is determined that photography and sound recording were executed at the same time and the recording of the sound file was performed subsequently to the recording of the image file, it is determined that the present combination is appropriate, and the process returns to the main routine without setting the error flag. The combination inappropriateness determining operation is thus brought to an end.

An electronic still camera to which a recording and reproduction device according to a twelfth embodiment is applied will be described below. Since the arrangement of the electronic still camera is utterly identical to that of the eleventh embodiment shown in FIG. 43, description therof is omitted, and only an operation proper to the electronic still camera will be described below.

Figure 69:
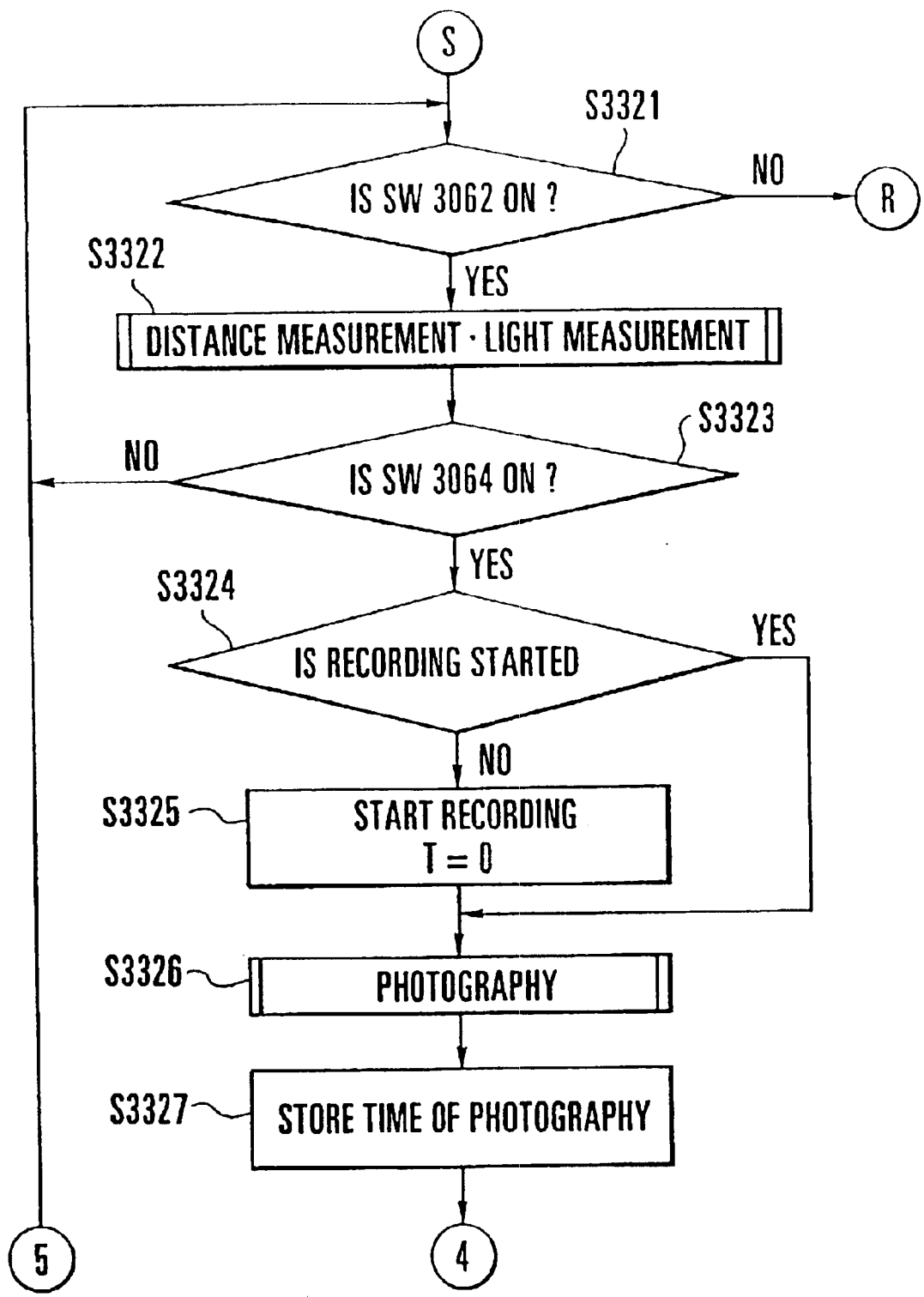
FIG. 69 is a flowchart showing part of a main operation according to a twelfth embodiment of the present invention.
Figure 70:
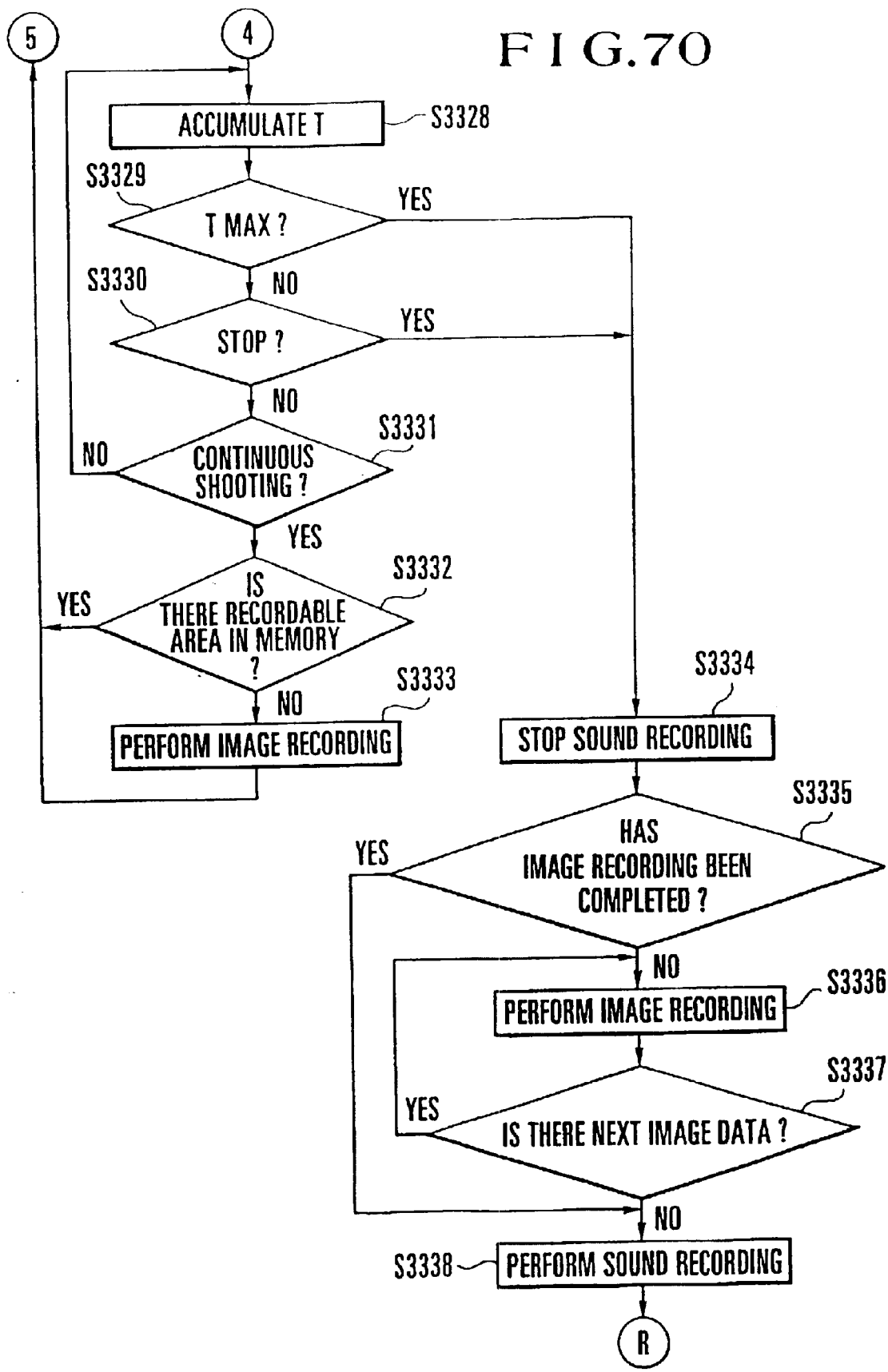
FIG. 70 is a flowchart showing part of the main operation according to the twelfth embodiment of the present invention.

In the operation of the twelfth embodiment, the operation shown in FIGS. 69 and 70 is substituted for the operation, shown in FIGS. 60 and 61, of the eleventh embodiment. Since recording in the recording medium 3100 is performed while sound recording is being performed, the twelfth embodiment can be usefully applied to the recording medium 3100 does not have a mechanical driving mechanism, as in the case of a memory card.

Essential operations proper to the twelfth embodiment will be described below with reference to only FIGS. 69 and 70. The other operations are utterly identical to those which have been described in connection with the eleventh embodiment.

In Step S3321, it is determined whether the distance-light measuring switch 3062 has been turned on. If the distance-light measuring switch 3062 has not been turned on, the process returns to Step S3202. If the distance-light measuring switch 3062 has been turned on, the distance measuring circuit 3044 and the light measuring circuit 3046 are made to perform distance measurement and light measurement, respectively. Then, the photographic lens 3010 is focused on a subject by the lens driving circuit 3042 and a shutter time is determined (Step S3322). The distance-light measuring operation has previously been described in detail with reference to FIG. 47. The distance-light measuring operation is repeated until the release switch 3064 is turned on after the distance-light measuring switch 3062 is turned on (Steps S3321 to S3323). If the release switch 3064 is turned on (Step S3323) and if no recording has yet been started (Step S3324), the sound recording timer T is initialized to "0" and sound recording is then started (Step S3325). Simultaneously, photography is executed and the obtained image data is written into the image-sound memory 3024 (Step S3226). If the recording medium 3100 is provided with a mechanical driving mechanism, as in the case of a hard disk unit or the like, the system controlling circuit 3050 stops the rotation of the hard disk unit or the like prior to initiation of the sound recording and inhibits any access accompanied by a head travel, thereby preventing recording of a mechanical noise due to an operation of the hard disk unit or the like. The detail of the photographic operation has previously been described with reference to FIG. 47. When the photographic operation up to the writing of the image data is completed, the time of photography associated with the image is stored in the memory 3052 (Step S3327).

Then, while the count value of the sound recording timer T is being cumulatively displayed, a sound signal from the microphone 3090 is taken out and the obtained sound data is written into the image-sound memory 3024 through the A/D converter 3092 and the memory controlling circuit 3020 (Step S3328). If the sound recording timer T reaches a predetermined value or is forcedly stopped, the writing of the sound data, i.e., sound recording, is brought to an end (Steps S3229, S3330 and S3334). If the sound recording is stopped, the recording time period is stored in the internal register and the memory 3052. The stopping of the sound recording is performed by turning off the release switch 3064 in the case of the mode in which sound recording is performed during the ON interval of the release switch 3064. In the case of the mode in which, even if the release switch 3064 is turned off, sound recording is continued until the desired time elapses, the stopping of the sound recording is performed, as by operating the sound mode switch 3076 or the sound start switch 3078.

If photography in the continuous-shooting mode is to be continued during recording (Step S3331), the process proceeds to Step S3332. If it is determined in Step S3332 that there is a recordable area in the image-sound memory 3024, the process returns to Step S3321 and similar processing is performed on each photographic image. If it is determined in Step S3332 that there is no recordable area in the image-sound memory 3024, image data and the time of photography associated with the image data are respectively read from the image-sound memory 3024 and the memory 3052 under the control of the memory controlling circuit 3020. The image data and management information about the image data, such as the time of photography and the time of image-file creation, are recorded in the information data area 3104 of the recording medium 3100 and in the management data area 3102, respectively, through the interface 3026, the connector 3030, the connector 3108 and the interface 3106 (Step S3333). The process returns to Step S3321, and similar processing is repeated.

After the sound recording has been stopped in Step S3334, it is determined whether all the image data in the image-sound memory 3024 have been recorded in the recording medium 3100 (Step S3335). If all the image data in the image-sound memory 3024 have not been recorded, the image data and the time of photography associated with the image data are respectively read from the image-sound memory 3024 and the memory 3052 under the control of the memory controlling circuit 3020. The image data are recorded in file form in the information data area 3104 of the recording medium 3100 through the interface 3026, the connector 3030, the connector 3108 and the interface 3106 while the time of photography, management information about the image data, and the like, are recorded in the management data area 3102 (Step S3336). Thus, the image recording operation of Step S3336 is repeated by the amount of the image data stored in the image-sound memory 3024 (Steps S3337).

When the image recording on the recording medium 3100 is completed, the recording of the sound data is performed (Step S3338) and the process returns to Step S3202 of FIG. 59. The recording of the sound data is performed in the following manner. The sound data is read from the image-sound memory 3024 under the control of the memory controlling circuit 3020, and the sound data and the time period of sound recording are recorded in file form in the information data area 3104 of the recording medium 3100 through the interface 3026, the connector 3030, the connector 3108 and the interface 3106 while management information about the sound data, such as the time of the sound recording and the time of sound-file creation, is recorded in the management data area 3102. Thus, image data indicative of a plurality of continuous images are recorded in combination with the associated sounds.

Although the tenth to twelfth embodiments have been described, the present invention is not limited to these embodiments. For example, if there is a control file in which relation information indicative of the relation between an image file and a sound file is described, the above-described processing may be executed in accordance with the description of the control file. Only if there is no control file, as in the above-described embodiments, whether a combination of an image file and a sound file is appropriate may be determined on the basis of the time of file creation to determine the combination of the image file and the sound file so that processing such as reproduction or transmission can be performed.

The present invention is applicable to not only a camera but also various other kinds of apparatus to which the aforesaid recording medium is attachable, such as a recording and reproducing apparatus, a reproducing apparatus, a transmission apparatus, a computer, a portable telephone set or an apparatus consisting of an arbitrary combination of them. The line used for transmission may be selected from a telephone line, an ISBN, a wireless line, a LAN, a WAN, an analog line, a digital and a line consisting of an arbitrary combination of them.

Although the recording medium has been described as a recording medium which is separate from and connectable to the body of the recording apparatus, the recording medium may be fixed to (built in) the body of the recording apparatus.

The present invention is also applicable to an arrangement in which two or more recording media are connectable to the body of the recording apparatus. Further, the present invention is applicable to an arrangement in which one or more recording media are fixed to the body of the recording apparatus and one or more recording media are arbitrarily connectable to the body of the recording apparatus.

The recording medium is not limited to a hard disk unit or a memory card, and may be composed of a micro DAT, an optomagneto disk unit, an optical disk unit and the like. The recording medium may also be a composite recording medium in which a memory card and a hard disk unit are integrally assembled. The composite recording medium may also removably include a memory card part so that the memory card part can be arbitrarily connected to or separated from the body of the composite recording medium. Otherwise, the composite recording medium may also removably include a hard disk unit so that the hard disk unit can be arbitrarily connected to or separated from the body of the composite recording medium. Of course, the composite recording medium may be composed of two or more kinds of recording media selected from among the hard disk unit, the memory card, the micro DAT, the optomagneto disk unit, the optical disk unit and the like.

As is apparatus from the above detailed description, in accordance with the recording and reproduction processing apparatus according to the present embodiments, whether a combination of image data and sound data is appropriate is determined on the basis of the time of file creation (the time of data recording) to determine the combination of the image data and the sound data so that processing such as reproduction or transmission is performed. Accordingly, even if there is no information indicative of the correspondence between the image data and the sound data, the image data can be optimumly combined with the sound data to execute reproduction or transmission.

What is claimed is:

1. An information signal processing apparatus arranged to record an information signal in a recording medium, comprising:
   (A) an image pickup which picks up an image of a subject and generates an image signal indicate of the pick-up image of the subject;
   (B) a first switch which instructs to start an image pickup operation by said image pickup;
   (C) state-of-image-pickup-operation controlling unit which controls a state of an image-of-subject pickup operation which is executed in said image pickup;
   (D) temporarily storing unit which receives, as an input, an image signal generated by said pickup and temporarily stores the input image signal;
   (E) a second switch which instructs to start an operation of storing the image signal into said temporarily storing unit;
   (F) a display which selectively displays either information relative to a control operation of said state-of-image-pickup-operation controlling unit or information relative to an information amount of the information signal stored in said temporarily storing unit;
   (G) a recording unit which records the information signal on the recording medium; and
   (H) a controlling unit which controls said temporarily storing unit and said recording unit so as to read out the information signal stored in said temporarily storing unit and record on the recording medium the information signal thus read out, and selectively displays by means of said display either information relative to a control operation of said state-of-image-pickup-operation controlling unit or information relative to an information amount of the information signal stored in said temporarily storing unit,
   wherein said controlling unit causes said display to display information relative to a control operation of said state-of-image-pickup operation controlling unit in response to an instruction to start the image-of-subject pickup operation by the first switch as well as cause said display to display information relative to an information amount of the information signal stored in said temporarily storing unit in response to an instruction to start the storing operation by the second switch, and keeps displaying the information relative to an information amount of the information signal stored in said temporarily storing unit in accordance with an information amount of an image signal not being recorded yet on said recording medium in said temporarily storing unit in case of no instruction by said second switch and said first switch.

2. An electronic camera arranged to record an information signal in a recording medium, comprising:
   (A) an image pickup which picks up an image of a subject and generates an image signal indicate of the pick-up image of the subject;
   (B) a first switch which instructs to start an image pickup operation by said image pickup, said first switch being turned on in response to a press of a first step of a release switch;
   (C) state-of-image-pickup-operation controlling unit for controlling a state of an image-of-subject pickup operation which is executed in said image pickup;
   (D) temporarily storing unit which receives, as an input, an image signal generated by said pickup and temporarily storing the input image signal;
   (E) a second switch which instructs to start an operation of storing the image signal into said temporarily storing unit, said second switch being turned on in response to a press of second step of said release switch;
   (F) a display which selectively displays either information relative to an exposure control operation of said state-of-image-pickup-operation controlling unit or information relative to an information amount of the information signal stored in said temporarily storing unit;
   (G) a recording unit which records the information signal on the recording medium; and
   (H) a controlling unit which controls said temporarily storing unit and said recording unit so as to read our the information signal stored in said temporarily storing unit and record on the recording medium the information signal thus read out, and selectively displays by means of said display either information relative to an exposure control operation of said state-of-image-pickup-operation controlling unit or information relative to an information amount of the information signal stored in said temporarily storing unit, wherein said controlling unit causes said display unit to display information relative to an exposure control operation of said state-of-image-pickup operation controlling unit in response to an instruction to start the image-of-subject pickup operation by the first switch as well as cause said display to display information relative to an information amount of the information signal stored in said temporarily storing unit in response to an instruction to start the storing operation by the second switch, and keeps displaying the information relative to an information amount of the information signal stored in said temporarily storing unit in accordance with an information amount of an image signal not being recorded yet on said recording medium in said temporarily storing unit in case of no instruction by said second switch and said first switch.

* * * * *

UNITED STATES PATENT AND TRADEMARK OFFICE
CERTIFICATE OF CORRECTION

PATENT NO. : 6,834,157 B2
DATED : December 21, 2004
INVENTOR(S) : Yoichi Yamagishi It is certified that error appears in the above-identified patent and that said Letters Patent is hereby corrected as shown below:

Column 71,
Line 1, delete "of course" and insert -- Of course --.

Column 96,
Line 63, delete "transmission[]operation" and insert -- transmission operation --.

Column 98,
Lines 2 and 8, delete "is thur brought" and insert -- is thus brought --.

Signed and Sealed this

Thirtieth Day of May, 2006

JON W. DUDAS
*Director of the United States Patent and Trademark Office*